United States Patent
Oda et al.

(10) Patent No.: US 12,090,025 B2
(45) Date of Patent: Sep. 17, 2024

(54) ORTHODONTIC APPLIANCE WITH NON-SLIDING ARCHFORM

(71) Applicant: Swift Health Systems Inc., Irvine, CA (US)

(72) Inventors: Todd Oda, Torrance, CA (US); Alston Chung, Redondo Beach, CA (US); Andres Rodriguez, Madera, CA (US); Farrokh Farzin-Nia, Inglewood, CA (US)

(73) Assignee: Swift Health Systems Inc., Irvine, CA (US)

( * ) Notice: Subject to any disclaimer, the term of this patent is extended or adjusted under 35 U.S.C. 154(b) by 323 days.

(21) Appl. No.: 17/303,860

(22) Filed: Jun. 9, 2021

(65) Prior Publication Data
US 2021/0401548 A1 Dec. 30, 2021

Related U.S. Application Data

(60) Provisional application No. 63/160,222, filed on Mar. 12, 2021, provisional application No. 63/148,263, filed on Feb. 11, 2021, provisional application No. 63/037,974, filed on Jun. 11, 2020.

(51) Int. Cl.
*A61C 7/12* (2006.01)
*A61C 7/34* (2006.01)

(52) U.S. Cl.
CPC ...................................... *A61C 7/34* (2013.01)

(58) Field of Classification Search
CPC .... A61C 7/12; A61C 7/14; A61C 7/28; A61C 7/34
See application file for complete search history.

(56) References Cited

U.S. PATENT DOCUMENTS

| 1,005,131 A | 10/1911 | Angle et al. |
| 1,108,493 A | 8/1914 | Federspiel |
| 1,307,382 A | 6/1919 | Stanton |
| 1,323,141 A | 11/1919 | Young |
| 1,429,749 A | 9/1922 | Maeulen et al. |

(Continued)

FOREIGN PATENT DOCUMENTS

| CN | 1372872 | 10/2002 |
| CN | 201079455 | 7/2008 |

(Continued)

OTHER PUBLICATIONS

Sinodentalgroup, "Braces Bonding Teeth Gems Glue Light Cure Adhesive", https://sinodentalgroup.myshopify.com/products/sino-dental-group-orthodontic-brackets-glue-braces-bonding-light-cure-adhesive-kit?pr_prod_strat=use_description&pr_rec_id=0d0a6cdc9&pr_rec_pid=6687895355572&pr_ref_pid=6705886363828&pr_seq=uniform, dated as downloaded Jun. 7, 2023 in 12 pages.

(Continued)

*Primary Examiner* — Ralph A Lewis
(74) *Attorney, Agent, or Firm* — Knobbe, Martens, Olson & Bear, LLP

(57) ABSTRACT

An orthodontic bracket and archform system that uses friction-free mechanics are disclosed. The archform can have a male fastener that can be retained within an orthodontic bracket. The orthodontic bracket can have varying locking mechanism, such as deflectable tabs, springs, locking pins, and others, that can cooperate with features of the male fastener to prevent sliding between the archform and the bracket.

20 Claims, 59 Drawing Sheets

(56) References Cited

U.S. PATENT DOCUMENTS

| | | | |
|---|---|---|---|
| 1,638,006 | A | 2/1926 | Aderer |
| 2,257,069 | A | 9/1941 | Peak |
| 2,495,692 | A | 1/1950 | Brusse |
| 2,524,763 | A | 10/1950 | Brusse |
| 2,582,230 | A | 1/1952 | Brusse |
| 3,256,602 | A | 6/1966 | Broussard |
| 3,262,207 | A | 7/1966 | Kesling |
| 3,374,542 | A | 3/1968 | Moylan, Jr. |
| 3,464,113 | A * | 9/1969 | Silverman .............. A61C 7/00 433/11 |
| 3,593,421 | A | 7/1971 | Brader |
| 3,600,808 | A | 8/1971 | Reeve |
| 3,683,502 | A | 8/1972 | Wallshein |
| 3,691,635 | A | 9/1972 | Wallshein |
| 3,762,050 | A | 10/1973 | Dal Pont |
| 3,765,091 | A | 10/1973 | Northcutt |
| 3,878,610 | A | 4/1975 | Coscina |
| 3,936,938 | A | 2/1976 | Northcutt |
| 3,946,488 | A * | 3/1976 | Miller .................... A61C 7/287 433/11 |
| 3,949,477 | A | 4/1976 | Cohen et al. |
| 3,975,823 | A | 8/1976 | Sosnay |
| 4,103,423 | A | 8/1978 | Kessel |
| 4,171,568 | A | 10/1979 | Forster |
| 4,192,070 | A | 3/1980 | Lemchen et al. |
| 4,193,195 | A | 3/1980 | Merkel et al. |
| 4,197,643 | A | 4/1980 | Burstone et al. |
| 4,268,250 | A | 5/1981 | Reeve |
| 4,330,273 | A | 5/1982 | Kesling |
| 4,354,833 | A | 10/1982 | Fujita |
| 4,354,834 | A | 10/1982 | Wilson |
| 4,382,781 | A | 5/1983 | Grossman |
| 4,385,890 | A | 5/1983 | Klein |
| 4,412,819 | A | 11/1983 | Cannon |
| 4,424,033 | A | 1/1984 | Wool |
| 4,436,510 | A | 3/1984 | Klein |
| 4,479,779 | A | 10/1984 | Wool |
| 4,483,674 | A | 11/1984 | Schütz |
| 4,490,112 | A | 12/1984 | Tanaka et al. |
| 4,501,554 | A | 2/1985 | Hickham |
| 4,516,938 | A | 5/1985 | Hall |
| 4,533,320 | A | 8/1985 | Piekarsky |
| 4,561,844 | A | 12/1985 | Bates |
| 4,580,976 | A | 4/1986 | O'Meara |
| 4,582,487 | A | 4/1986 | Creekmore |
| 4,585,414 | A | 4/1986 | Kottermann |
| 4,592,725 | A | 6/1986 | Goshgarian |
| 4,634,662 | A | 1/1987 | Rosenberg |
| 4,656,860 | A | 4/1987 | Orthuber et al. |
| 4,659,310 | A | 4/1987 | Kottermann |
| 4,664,626 | A | 5/1987 | Kesling |
| 4,674,978 | A | 6/1987 | Acevedo |
| 4,676,747 | A | 6/1987 | Kesling |
| 4,725,229 | A | 2/1988 | Miller |
| 4,797,093 | A | 1/1989 | Bergersen |
| 4,797,095 | A | 1/1989 | Armstrong et al. |
| 4,838,787 | A | 6/1989 | Lerner |
| 4,842,514 | A | 6/1989 | Kesling |
| 4,872,449 | A | 10/1989 | Beeuwkes |
| 4,881,896 | A | 11/1989 | Bergersen |
| 4,892,479 | A | 1/1990 | McKenna |
| 4,897,035 | A | 1/1990 | Green |
| 4,900,251 | A | 2/1990 | Andreasen |
| 4,978,323 | A | 12/1990 | Freedman |
| 5,011,405 | A | 4/1991 | Lemchen |
| 5,017,133 | A | 5/1991 | Miura |
| 5,044,947 | A | 9/1991 | Sachdeva et al. |
| 5,055,039 | A | 10/1991 | Abbatte et al. |
| 5,092,768 | A | 3/1992 | Korn |
| 5,114,339 | A | 5/1992 | Guis |
| 5,123,838 | A | 6/1992 | Cannon |
| 5,127,828 | A | 7/1992 | Suyama |
| 5,131,843 | A | 7/1992 | Hilgers et al. |
| 5,154,606 | A | 10/1992 | Wildman |
| 5,174,754 | A | 12/1992 | Meritt |
| 5,176,514 | A | 1/1993 | Viazis |
| 5,176,618 | A | 1/1993 | Freedman |
| 5,238,404 | A | 8/1993 | Andreiko |
| 5,242,304 | A | 9/1993 | Truax et al. |
| 5,248,257 | A | 9/1993 | Cannon |
| 5,259,760 | A | 11/1993 | Orikasa |
| 5,312,247 | A | 5/1994 | Sachdeva et al. |
| 5,344,315 | A | 9/1994 | Hanson |
| 5,368,478 | A | 11/1994 | Andreiko |
| 5,380,197 | A | 1/1995 | Hanson |
| 5,399,087 | A | 3/1995 | Arndt |
| 5,431,562 | A | 7/1995 | Andreiko |
| 5,447,432 | A | 9/1995 | Andreiko |
| 5,454,717 | A | 10/1995 | Andreiko |
| RE35,169 | E | 3/1996 | Lemchen et al. |
| 5,516,284 | A | 5/1996 | Wildman |
| 5,556,277 | A | 9/1996 | Yawata et al. |
| 5,624,258 | A | 4/1997 | Wool |
| 5,630,715 | A | 5/1997 | Voudouris |
| 5,683,243 | A | 11/1997 | Andreiko |
| 5,683,245 | A | 11/1997 | Sachdeva et al. |
| 5,722,827 | A | 3/1998 | Allesee |
| 5,727,941 | A | 3/1998 | Kesling |
| 5,816,800 | A | 10/1998 | Brehm |
| 5,820,370 | A | 10/1998 | Brosius |
| 5,863,198 | A | 1/1999 | Doyle |
| 5,890,893 | A * | 4/1999 | Heiser .................... A61C 7/287 433/14 |
| 5,971,754 | A | 10/1999 | Sondhi et al. |
| 5,975,893 | A | 11/1999 | Chishti et al. |
| 5,993,208 | A | 11/1999 | Jonjic |
| 6,015,289 | A | 1/2000 | Andreiko |
| 6,036,489 | A | 3/2000 | Brosius |
| 6,042,374 | A | 3/2000 | Farzin-Nia et al. |
| 6,086,364 | A | 7/2000 | Brunson |
| 6,089,861 | A | 7/2000 | Kelly |
| 6,095,809 | A | 8/2000 | Kelly et al. |
| 6,099,304 | A | 8/2000 | Carter |
| 6,123,544 | A | 9/2000 | Cleary |
| 6,183,250 | B1 | 2/2001 | Kanno et al. |
| 6,190,166 | B1 * | 2/2001 | Sasakura ................ A61C 7/287 433/14 |
| 6,196,839 | B1 | 3/2001 | Ross |
| 6,213,767 | B1 | 4/2001 | Dixon et al. |
| 6,217,325 | B1 | 4/2001 | Chishti et al. |
| 6,227,850 | B1 | 5/2001 | Chishti et al. |
| 6,244,861 | B1 | 6/2001 | Andreiko |
| 6,250,918 | B1 | 6/2001 | Sachdeva et al. |
| 6,258,118 | B1 | 7/2001 | Baum et al. |
| 6,315,553 | B1 | 11/2001 | Sachdeva et al. |
| 6,318,994 | B1 | 11/2001 | Chishti et al. |
| 6,318,995 | B1 | 11/2001 | Sachdeva et al. |
| 6,334,853 | B1 | 1/2002 | Kopelman et al. |
| 6,350,120 | B1 | 2/2002 | Sachdeva et al. |
| 6,358,045 | B1 | 3/2002 | Farzin-Nia et al. |
| 6,371,761 | B1 | 4/2002 | Cheang et al. |
| 6,375,458 | B1 | 4/2002 | Moorleghem et al. |
| 6,394,801 | B2 | 5/2002 | Chishti et al. |
| 6,398,548 | B1 | 6/2002 | Muhammad et al. |
| 6,413,084 | B1 | 6/2002 | Rubbert et al. |
| 6,431,870 | B1 | 8/2002 | Sachdeva |
| 6,450,807 | B1 | 9/2002 | Chishti et al. |
| 6,464,495 | B1 | 10/2002 | Voudouris |
| 6,464,496 | B1 | 10/2002 | Sachdeva et al. |
| 6,471,511 | B1 | 10/2002 | Chishti et al. |
| 6,471,512 | B1 | 10/2002 | Sachdeva et al. |
| 6,512,994 | B1 | 1/2003 | Sachdeva |
| 6,514,074 | B1 | 2/2003 | Chishti et al. |
| 6,532,299 | B1 | 3/2003 | Sachdeva et al. |
| 6,540,512 | B1 | 4/2003 | Sachdeva et al. |
| 6,554,613 | B1 | 4/2003 | Sachdeva et al. |
| 6,572,693 | B1 | 6/2003 | Wu et al. |
| 6,582,226 | B2 | 6/2003 | Jordan et al. |
| 6,587,828 | B1 | 7/2003 | Sachdeva |
| 6,595,774 | B1 | 7/2003 | Risse |
| 6,554,611 | B2 | 8/2003 | Chishti et al. |
| 6,602,070 | B2 | 8/2003 | Miller et al. |
| 6,612,143 | B1 | 9/2003 | Butscher et al. |
| 6,616,444 | B2 | 9/2003 | Andreiko |

(56) References Cited

U.S. PATENT DOCUMENTS

| | | |
|---|---|---|
| 6,626,666 B2 | 9/2003 | Chishti et al. |
| 6,629,840 B2 | 10/2003 | Chishti et al. |
| 6,632,089 B2 | 10/2003 | Rubbert |
| 6,648,640 B2 | 11/2003 | Rubbert |
| 6,663,385 B2 | 12/2003 | Tepper |
| 6,679,700 B2 | 1/2004 | McGann |
| 6,682,344 B1 | 1/2004 | Stockstill |
| 6,685,469 B2 | 2/2004 | Chishti et al. |
| 6,685,470 B2 | 2/2004 | Chishti et al. |
| 6,688,885 B1 | 2/2004 | Sachdeva et al. |
| 6,699,037 B2 | 3/2004 | Chishti et al. |
| 6,702,575 B2 | 3/2004 | Hilliard |
| 6,705,863 B2 | 3/2004 | Phan et al. |
| 6,722,878 B2 | 4/2004 | Graham |
| 6,722,880 B2 | 4/2004 | Chishti et al. |
| 6,728,423 B1 | 4/2004 | Rubbert et al. |
| 6,729,876 B2 | 5/2004 | Chishti et al. |
| 6,732,558 B2 | 5/2004 | Butscher et al. |
| 6,733,285 B2 | 5/2004 | Puttler et al. |
| 6,733,287 B2 | 5/2004 | Wilkerson |
| 6,733,288 B2 | 5/2004 | Vallittu et al. |
| 6,736,638 B1 | 5/2004 | Sachdeva et al. |
| 6,738,508 B1 | 5/2004 | Rubbert et al. |
| 6,739,869 B1 | 5/2004 | Taub et al. |
| 6,744,914 B1 | 6/2004 | Rubbert et al. |
| 6,744,932 B1 | 6/2004 | Rubbert et al. |
| 6,746,241 B2 | 6/2004 | Townsend-Hansen |
| 6,755,064 B2 | 6/2004 | Butscher |
| 6,771,809 B1 | 8/2004 | Rubbert et al. |
| 6,776,614 B2 | 8/2004 | Wiechmann |
| 6,830,450 B2 | 12/2004 | Knopp et al. |
| 6,845,175 B2 | 1/2005 | Kopelman et al. |
| 6,846,179 B2 | 1/2005 | Chapouland |
| 6,851,949 B1 | 2/2005 | Sachdeva et al. |
| 6,860,132 B2 | 3/2005 | Butscher |
| 6,893,257 B2 | 5/2005 | Kelly |
| 6,928,733 B2 | 8/2005 | Rubbert et al. |
| 6,948,931 B2 | 9/2005 | Chishti et al. |
| 6,960,079 B2 | 11/2005 | Brennan et al. |
| 6,971,873 B2 | 12/2005 | Sachdeva |
| 6,976,627 B1 | 12/2005 | Culp et al. |
| 6,988,889 B2 | 1/2006 | Abels |
| 7,008,221 B2 | 3/2006 | McGann |
| 7,013,191 B2 | 3/2006 | Rubbert |
| 7,020,963 B2 | 4/2006 | Cleary et al. |
| 7,029,275 B2 | 4/2006 | Rubbert |
| 7,033,171 B2 | 4/2006 | Wilkerson |
| 7,037,107 B2 | 5/2006 | Yamamoto |
| 7,056,115 B2 | 6/2006 | Phan et al. |
| 7,063,531 B2 | 6/2006 | Maijer et al. |
| 7,068,836 B1 | 6/2006 | Rubbert et al. |
| 7,076,980 B2 | 7/2006 | Butscher |
| 7,077,646 B2 | 7/2006 | Hilliard |
| 7,077,647 B2 | 7/2006 | Choi et al. |
| 7,080,979 B2 | 7/2006 | Rubbert et al. |
| 7,092,107 B2 | 8/2006 | Babayoff et al. |
| 7,094,053 B2 | 8/2006 | Andreiko |
| 7,112,065 B2 | 9/2006 | Kopelman et al. |
| 7,125,248 B2 | 10/2006 | Phan et al. |
| 7,134,874 B2 | 11/2006 | Chishti et al. |
| 7,137,812 B2 | 11/2006 | Cleary et al. |
| 7,155,373 B2 | 12/2006 | Jordan et al. |
| 7,156,661 B2 | 1/2007 | Choi et al. |
| 7,160,110 B2 | 1/2007 | Imgrund et al. |
| 7,168,950 B2 | 1/2007 | Cinader, Jr. et al. |
| 7,172,417 B2 | 2/2007 | Sporbert et al. |
| 7,175,428 B2 | 2/2007 | Nicholson |
| 7,186,115 B2 | 3/2007 | Goldberg et al. |
| 7,188,421 B2 | 3/2007 | Cleary et al. |
| 7,201,574 B1 | 4/2007 | Wiley |
| 7,204,690 B2 * | 4/2007 | Hanson .............. A61C 7/145 433/10 |
| 7,214,056 B2 | 5/2007 | Stockstill |
| 7,229,282 B2 | 6/2007 | Andreiko |
| 7,234,934 B2 | 6/2007 | Rosenberg |
| 7,234,936 B2 | 6/2007 | Lai |
| 7,234,937 B2 | 6/2007 | Sachdeva et al. |
| 7,240,528 B2 | 7/2007 | Weise et al. |
| 7,244,121 B2 | 7/2007 | Brosius |
| 7,245,977 B1 | 7/2007 | Simkins |
| 7,252,506 B2 | 8/2007 | Lai |
| 7,267,545 B2 | 9/2007 | Oda |
| 7,283,891 B2 | 10/2007 | Butscher |
| 7,296,996 B2 | 11/2007 | Sachdeva |
| 7,335,021 B2 | 2/2008 | Nikodem |
| 7,347,688 B2 | 3/2008 | Kopelman et al. |
| 7,354,268 B2 | 4/2008 | Raby et al. |
| 7,357,634 B2 | 4/2008 | Knopp |
| 7,361,017 B2 | 4/2008 | Sachdeva |
| 7,364,428 B2 | 4/2008 | Cinader, Jr. et al. |
| 7,404,714 B2 | 7/2008 | Cleary et al. |
| 7,410,357 B2 | 8/2008 | Cleary et al. |
| 7,416,408 B2 | 8/2008 | Farzin-Nia et al. |
| 7,442,041 B2 | 10/2008 | Imgrund et al. |
| 7,452,205 B2 | 11/2008 | Cinader, Jr. et al. |
| 7,458,812 B2 | 12/2008 | Sporbert et al. |
| 7,469,783 B2 | 12/2008 | Rose, Sr. |
| 7,471,821 B2 | 12/2008 | Rubbert et al. |
| 7,473,097 B2 | 1/2009 | Raby et al. |
| 7,556,496 B2 | 7/2009 | Cinader, Jr. et al. |
| 7,578,673 B2 | 8/2009 | Wen et al. |
| 7,578,674 B2 | 8/2009 | Chishti et al. |
| 7,585,172 B2 | 9/2009 | Rubbert |
| 7,590,462 B2 | 9/2009 | Rubbert |
| 7,604,181 B2 | 10/2009 | Culp et al. |
| 7,621,743 B2 | 11/2009 | Bathen |
| 7,641,473 B2 | 1/2010 | Sporbert |
| 7,674,110 B2 | 3/2010 | Oda |
| 7,677,887 B2 | 3/2010 | Nicholson |
| 7,699,606 B2 | 4/2010 | Sachdeva et al. |
| 7,704,072 B2 | 4/2010 | Damon |
| 7,717,708 B2 | 5/2010 | Sachdeva |
| 7,722,354 B1 | 5/2010 | Dumas |
| 7,726,470 B2 | 6/2010 | Cinader, Jr. et al. |
| 7,726,968 B2 | 6/2010 | Raby et al. |
| 7,751,925 B2 | 7/2010 | Rubbert |
| 7,762,815 B2 | 7/2010 | Cinader, Jr. et al. |
| 7,811,087 B2 | 10/2010 | Wiechmann |
| 7,837,464 B2 | 11/2010 | Marshall |
| 7,837,466 B2 | 11/2010 | Griffith et al. |
| 7,837,467 B2 | 11/2010 | Butscher |
| 7,845,938 B2 | 12/2010 | Kim et al. |
| 7,850,451 B2 | 12/2010 | Wiechmann |
| 7,871,267 B2 | 1/2011 | Griffith et al. |
| 7,878,806 B2 | 2/2011 | Lemchen |
| 7,909,603 B2 | 3/2011 | Oda |
| D636,084 S | 4/2011 | Troester |
| D636,085 S | 4/2011 | Troester |
| 7,950,131 B2 | 5/2011 | Hilliard |
| 7,993,133 B2 | 8/2011 | Cinader, Jr. et al. |
| 8,021,146 B2 | 9/2011 | Cinader, Jr. et al. |
| 8,029,275 B2 | 10/2011 | Kesling |
| 8,033,824 B2 | 10/2011 | Oda et al. |
| 8,038,444 B2 | 10/2011 | Kitching et al. |
| 8,047,034 B2 | 11/2011 | Butscher |
| 8,057,226 B2 | 11/2011 | Wiechmann |
| 8,070,487 B2 | 12/2011 | Chishti et al. |
| 8,082,769 B2 | 12/2011 | Butscher |
| 8,092,215 B2 | 1/2012 | Stone-collonge et al. |
| 8,102,538 B2 | 1/2012 | Babayoff |
| 8,113,828 B1 | 2/2012 | Greenfield |
| 8,113,829 B2 | 2/2012 | Sachdeva |
| 8,114,327 B2 | 2/2012 | Cinader, Jr. et al. |
| 8,121,718 B2 | 2/2012 | Rubbert |
| 8,142,187 B2 | 3/2012 | Sporbert |
| 8,152,519 B1 | 4/2012 | Dumas et al. |
| 8,177,551 B2 | 5/2012 | Sachdeva et al. |
| 8,192,196 B2 | 6/2012 | Singh |
| 8,192,197 B2 | 6/2012 | Sporbert |
| 8,194,067 B2 | 6/2012 | Raby |
| 8,220,195 B2 | 7/2012 | Maijer et al. |
| 8,251,699 B2 | 8/2012 | Reising et al. |
| 8,266,940 B2 | 9/2012 | Riemeir et al. |
| 8,297,970 B2 | 10/2012 | Kanomi |

(56) References Cited

U.S. PATENT DOCUMENTS

| | | | |
|---|---|---|---|
| 8,308,478 B2 | 11/2012 | Primus et al. | |
| 8,313,327 B1 | 11/2012 | Won | |
| 8,359,115 B2 | 1/2013 | Kopelman et al. | |
| 8,363,228 B2 | 1/2013 | Babayoff | |
| 8,366,440 B2 | 2/2013 | Bathen | |
| 8,376,739 B2 | 2/2013 | Dupray | |
| 8,382,917 B2 | 2/2013 | Johnson | |
| 8,393,896 B2 | 3/2013 | Oda | |
| 8,417,366 B2 | 4/2013 | Getto | |
| 8,439,671 B2 | 5/2013 | Cinader, Jr. | |
| 8,439,672 B2 | 5/2013 | Matov et al. | |
| 8,451,456 B2 | 5/2013 | Babayoff | |
| 8,454,364 B2 | 6/2013 | Taub et al. | |
| 8,459,988 B2 | 6/2013 | Dumas | |
| 8,465,279 B2 | 6/2013 | Bathen | |
| 8,469,704 B2 | 6/2013 | Oda et al. | |
| 8,479,393 B2 | 7/2013 | Abels et al. | |
| 8,485,816 B2 | 7/2013 | Macchi | |
| 8,491,306 B2 | 7/2013 | Raby et al. | |
| D688,803 S | 8/2013 | Gilbert | |
| 8,500,445 B2 | 8/2013 | Borri | |
| 8,517,727 B2 | 8/2013 | Raby et al. | |
| 8,545,221 B2 | 10/2013 | Sonte-collenge et al. | |
| 8,550,814 B1 * | 10/2013 | Collins | A61C 7/287 433/17 |
| 8,562,337 B2 | 10/2013 | Kuo et al. | |
| 8,573,972 B2 | 11/2013 | Matov et al. | |
| 8,591,225 B2 | 11/2013 | Wu et al. | |
| 8,591,226 B2 | 11/2013 | Griffith et al. | |
| 8,636,505 B2 | 1/2014 | Fornoff | |
| 8,638,447 B2 | 1/2014 | Babayoff et al. | |
| 8,638,448 B2 | 1/2014 | Babayoff et al. | |
| 8,675,207 B2 | 3/2014 | Babayoff | |
| 8,678,818 B2 | 3/2014 | Dupray | |
| 8,690,568 B2 | 4/2014 | Chapouland | |
| 8,708,697 B2 | 4/2014 | Li et al. | |
| 8,714,972 B2 | 5/2014 | Eichenberg | |
| 8,734,149 B2 | 5/2014 | Phan et al. | |
| 8,734,690 B2 | 5/2014 | Komori | |
| 8,780,106 B2 | 7/2014 | Chishti et al. | |
| 8,805,048 B2 | 8/2014 | Batesole | |
| 8,805,563 B2 | 8/2014 | Kopelman et al. | |
| 8,807,995 B2 | 8/2014 | Kabbani et al. | |
| 8,827,697 B2 | 9/2014 | Cinader, Jr. et al. | |
| 8,845,330 B2 | 9/2014 | Taub et al. | |
| 8,871,132 B2 | 10/2014 | Abels et al. | |
| 8,931,171 B2 | 1/2015 | Rosenberg | |
| 8,932,054 B1 | 1/2015 | Rosenberg | |
| 8,936,464 B2 | 1/2015 | Kopelman | |
| 8,961,172 B2 | 2/2015 | Dupray | |
| 8,968,365 B2 | 3/2015 | Aschmann et al. | |
| 8,979,528 B2 | 3/2015 | Macchi | |
| 8,986,004 B2 | 3/2015 | Dumas | |
| 8,992,215 B2 | 3/2015 | Chapouland | |
| 8,998,608 B2 | 4/2015 | Imgrund et al. | |
| 9,022,781 B2 | 5/2015 | Kuo et al. | |
| D731,659 S | 6/2015 | Singh | |
| 9,066,775 B2 | 6/2015 | Bukhary | |
| 9,089,386 B2 | 7/2015 | Hagelganz | |
| D736,945 S | 8/2015 | Singh | |
| 9,101,433 B2 | 8/2015 | Babayoff | |
| 9,119,689 B2 | 9/2015 | Kabbani | |
| 9,127,338 B2 | 9/2015 | Johnson | |
| 9,144,473 B2 | 9/2015 | Aldo | |
| 9,161,823 B2 | 10/2015 | Morton et al. | |
| 9,204,942 B2 | 12/2015 | Phan et al. | |
| 9,299,192 B2 | 3/2016 | Kopelman | |
| 9,301,815 B2 | 4/2016 | Dumas | |
| 9,329,675 B2 | 5/2016 | Ojelund et al. | |
| 9,339,352 B2 | 5/2016 | Cinader et al. | |
| 9,387,055 B2 | 7/2016 | Cinader, Jr. et al. | |
| 9,402,695 B2 | 8/2016 | Curiel et al. | |
| 9,427,291 B2 | 8/2016 | Khoshnevis et al. | |
| 9,427,916 B2 | 8/2016 | Taub et al. | |
| 9,433,477 B2 | 9/2016 | Borovinskih et al. | |
| 9,439,737 B2 | 9/2016 | Gonzales et al. | |
| 9,451,873 B1 | 9/2016 | Kopelman et al. | |
| 9,492,246 B2 | 11/2016 | Lin | |
| 9,498,302 B1 | 11/2016 | Patel | |
| D774,193 S | 12/2016 | Makmel et al. | |
| 9,510,757 B2 | 12/2016 | Kopelman et al. | |
| 9,517,112 B2 | 12/2016 | Hagelganz et al. | |
| 9,529,970 B2 | 12/2016 | Andreiko | |
| 9,532,854 B2 * | 1/2017 | Cinader, Jr. | A61C 7/30 |
| 9,539,064 B2 | 1/2017 | Abels et al. | |
| 9,554,875 B2 | 1/2017 | Gualano | |
| 9,566,132 B2 | 2/2017 | Stone-collonge et al. | |
| 9,566,134 B2 | 2/2017 | Hagelganz et al. | |
| 9,585,733 B2 | 3/2017 | Voudouris | |
| 9,585,734 B2 | 3/2017 | Lai et al. | |
| 9,597,165 B2 | 3/2017 | Kopelman | |
| 9,610,628 B2 | 4/2017 | Riemeier | |
| 9,615,901 B2 | 4/2017 | Babyoff et al. | |
| 9,622,834 B2 | 4/2017 | Chapouland | |
| 9,622,835 B2 | 4/2017 | See et al. | |
| 9,629,551 B2 | 4/2017 | Fisker et al. | |
| 9,629,694 B2 | 4/2017 | Chun et al. | |
| 9,642,678 B2 | 5/2017 | Kuo | |
| 9,675,435 B2 | 6/2017 | Karazivan et al. | |
| 9,707,056 B2 | 7/2017 | Machata et al. | |
| 9,763,750 B2 | 9/2017 | Kim et al. | |
| 9,788,917 B2 | 10/2017 | Mah | |
| 9,814,543 B2 | 11/2017 | Huang et al. | |
| 9,844,420 B2 | 12/2017 | Cheang | |
| 9,848,958 B2 | 12/2017 | Matov et al. | |
| 9,867,678 B2 | 1/2018 | Macchi | |
| 9,867,680 B2 | 1/2018 | Damon | |
| 9,872,741 B2 | 1/2018 | Gualano | |
| 9,877,804 B2 | 1/2018 | Chester | |
| 9,877,805 B2 | 1/2018 | Abels et al. | |
| 9,925,020 B2 | 3/2018 | Jo | |
| 9,937,018 B2 | 4/2018 | Martz et al. | |
| 9,937,020 B2 | 4/2018 | Choi | |
| 9,956,058 B2 | 5/2018 | Kopelman | |
| 9,962,244 B2 | 5/2018 | Esbech et al. | |
| 9,975,294 B2 | 5/2018 | Taub et al. | |
| 9,987,105 B2 | 6/2018 | Dupray | |
| 10,028,804 B2 | 7/2018 | Schulhof et al. | |
| 10,045,834 B2 | 8/2018 | Gualano | |
| 10,052,177 B2 | 8/2018 | Andreiko | |
| 10,058,400 B2 | 8/2018 | Abels et al. | |
| 10,058,401 B2 | 8/2018 | Tan | |
| 10,064,706 B2 | 9/2018 | Dickerson | |
| 10,070,943 B2 | 9/2018 | Fornoff | |
| 10,076,780 B2 | 9/2018 | Riemeier et al. | |
| 10,098,709 B1 | 10/2018 | Kitching et al. | |
| 10,130,987 B2 | 11/2018 | Riemeier et al. | |
| 10,136,966 B2 | 11/2018 | Reybrouck et al. | |
| 10,149,738 B2 | 12/2018 | Lee | |
| 10,179,035 B2 | 1/2019 | Shivapuja et al. | |
| 10,179,036 B2 | 1/2019 | Lee | |
| 10,219,877 B2 | 3/2019 | Khoshnevis et al. | |
| 10,226,312 B2 | 3/2019 | Khoshnevis et al. | |
| 10,238,476 B2 | 3/2019 | Karazivan et al. | |
| 10,241,499 B1 | 3/2019 | Griffin | |
| 10,278,791 B2 | 5/2019 | Schumacher | |
| 10,278,792 B2 | 5/2019 | Wool | |
| 10,278,793 B2 | 5/2019 | Gonzalez et al. | |
| 10,292,789 B2 | 5/2019 | Martz et al. | |
| 10,307,221 B2 | 6/2019 | Cinader, Jr. | |
| 10,314,673 B2 | 6/2019 | Schulhof et al. | |
| 10,327,867 B2 | 6/2019 | Nikolskiy et al. | |
| 10,342,640 B2 | 7/2019 | Cassalia | |
| 10,368,961 B2 | 8/2019 | Paehl et al. | |
| 10,383,707 B2 * | 8/2019 | Roein Peikar | A61C 7/002 |
| D859,663 S | 9/2019 | Cetta et al. | |
| 10,413,386 B2 | 9/2019 | Moon et al. | |
| 10,426,575 B1 | 10/2019 | Raslambekov | |
| 10,456,228 B2 | 10/2019 | Karazivan et al. | |
| 10,478,271 B2 | 11/2019 | Patel | |
| 10,485,638 B2 | 11/2019 | Salah | |
| 10,492,889 B2 | 12/2019 | Kim et al. | |
| 10,492,890 B2 | 12/2019 | Cinader, Jr. et al. | |
| 10,555,792 B2 | 2/2020 | Kopelman et al. | |

(56) References Cited

U.S. PATENT DOCUMENTS

| | | |
|---|---|---|
| 10,588,717 B2 | 3/2020 | Chun et al. |
| 10,595,966 B2 | 3/2020 | Carrier, Jr. et al. |
| 10,603,137 B2 | 3/2020 | Alauddin et al. |
| 10,636,522 B2 | 4/2020 | Katzman et al. |
| 10,639,130 B2 | 5/2020 | Blees et al. |
| 10,639,134 B2 | 5/2020 | Shangjani et al. |
| 10,717,208 B1 | 7/2020 | Raslambekov et al. |
| 10,754,325 B1 | 8/2020 | Griffin, III |
| 10,758,323 B2 | 9/2020 | Kopelman |
| 10,772,706 B2 | 9/2020 | Schumacher |
| 10,806,376 B2 | 10/2020 | Lotan et al. |
| 10,809,697 B2 | 10/2020 | Grapsas |
| 10,828,133 B2 | 11/2020 | Tong et al. |
| 10,849,723 B1 | 12/2020 | Yancey et al. |
| 10,869,738 B2 | 12/2020 | Witte et al. |
| 10,881,488 B2 | 1/2021 | Kopelman |
| 10,881,489 B2 | 1/2021 | Tong et al. |
| 10,905,527 B2 | 2/2021 | Roein Peikar et al. |
| 10,932,887 B2 | 3/2021 | Hung |
| 10,935,958 B2 | 3/2021 | Sirovskiy et al. |
| 10,952,820 B2 | 3/2021 | Song et al. |
| 10,980,614 B2 | 4/2021 | Roein Peikar et al. |
| 10,984,549 B2 | 4/2021 | Goncharov et al. |
| 10,993,782 B1 | 5/2021 | Raslambekov |
| 10,993,785 B2 | 5/2021 | Roein Peikar et al. |
| 10,996,813 B2 | 5/2021 | Makarenkova et al. |
| 11,020,205 B2 | 6/2021 | Li et al. |
| 11,045,281 B2 | 6/2021 | Tsai et al. |
| 11,045,295 B2 | 6/2021 | Karazivan et al. |
| 11,058,517 B2 | 7/2021 | Tong et al. |
| 11,058,518 B2 | 7/2021 | Roein Peikar et al. |
| 11,058,520 B2 | 7/2021 | Khoshnevis et al. |
| 11,072,021 B2 | 7/2021 | Riemeier et al. |
| 11,083,411 B2 | 8/2021 | Yancey et al. |
| 11,083,546 B2 | 8/2021 | Cassalia |
| 11,103,330 B2 | 8/2021 | Webber et al. |
| 11,129,696 B2 | 9/2021 | Khoshnevis et al. |
| 11,147,652 B2 | 10/2021 | Mason et al. |
| 11,154,382 B2 | 10/2021 | Kopelman et al. |
| 11,229,505 B2 | 1/2022 | Schumacher et al. |
| 11,234,794 B2 | 2/2022 | Pokotilov et al. |
| 11,304,781 B2 | 4/2022 | Chun et al. |
| 11,317,994 B2 | 5/2022 | Peikar et al. |
| 11,317,995 B2 | 5/2022 | Peikar et al. |
| 11,324,572 B2 | 5/2022 | Peikar et al. |
| 11,331,165 B2 | 5/2022 | Owen |
| 11,337,486 B2 | 5/2022 | Oda et al. |
| 11,357,598 B2 | 6/2022 | Cramer |
| 11,382,720 B2 | 7/2022 | Kopelman et al. |
| 11,413,117 B2 | 8/2022 | Griffin, III et al. |
| 11,419,701 B2 | 8/2022 | Shanjani et al. |
| 11,433,658 B2 | 9/2022 | Friedrich et al. |
| 11,435,142 B2 | 9/2022 | Hauptmann |
| 11,446,117 B2 | 9/2022 | Paehl et al. |
| 11,446,219 B2 | 9/2022 | Kohler et al. |
| 11,464,604 B2 | 10/2022 | Makarenkova et al. |
| 11,471,254 B2 | 10/2022 | Owen |
| 11,471,255 B2 | 10/2022 | Cinader, Jr. et al. |
| 11,478,335 B2 | 10/2022 | Lai et al. |
| 11,478,337 B2 | 10/2022 | Griffin, III et al. |
| 11,490,995 B2 | 11/2022 | Wratten, Jr. et al. |
| 11,500,354 B2 | 11/2022 | Griffin, III et al. |
| 11,504,212 B2 | 11/2022 | Wratten, Jr. et al. |
| 11,510,757 B2 | 11/2022 | Khoshnevis et al. |
| 11,510,758 B2 | 11/2022 | Khoshnevis et al. |
| D972,732 S | 12/2022 | Villanueva |
| 11,517,405 B2 | 12/2022 | Khoshnevis et al. |
| 11,612,458 B1 | 3/2023 | Tong et al. |
| 11,612,459 B2 | 3/2023 | Tong et al. |
| 11,696,816 B2 | 7/2023 | Gardner |
| 11,911,971 B2 | 2/2024 | Tong et al. |
| 2001/0055741 A1 | 12/2001 | Dixon et al. |
| 2002/0006597 A1 | 1/2002 | Andreiko et al. |
| 2002/0010568 A1 | 1/2002 | Rubbert et al. |
| 2002/0081546 A1 | 6/2002 | Tricca et al. |
| 2002/0098460 A1 | 7/2002 | Farzin-Nia |
| 2002/0192617 A1 | 12/2002 | Phan et al. |
| 2003/0049582 A1 | 3/2003 | Abels et al. |
| 2003/0070468 A1 | 4/2003 | Butscher et al. |
| 2003/0180689 A1 | 9/2003 | Arx et al. |
| 2003/0194677 A1 | 10/2003 | Sachdeva et al. |
| 2003/0207224 A1 | 11/2003 | Lotte |
| 2004/0048222 A1 | 3/2004 | Forster et al. |
| 2004/0072120 A1 | 4/2004 | Lauren |
| 2004/0083611 A1 | 5/2004 | Rubbert et al. |
| 2004/0166459 A1 | 8/2004 | Voudouris |
| 2004/0168752 A1 | 9/2004 | Julien |
| 2004/0199177 A1 | 10/2004 | Kim |
| 2004/0219471 A1 | 11/2004 | Cleary et al. |
| 2005/0043837 A1 | 2/2005 | Rubbert et al. |
| 2005/0074716 A1 | 4/2005 | Cleary et al. |
| 2005/0106529 A1 | 5/2005 | Abolfathi et al. |
| 2005/0181332 A1 | 8/2005 | Sernetz |
| 2005/0191592 A1 | 9/2005 | Farzin-Nia et al. |
| 2005/0233276 A1 | 10/2005 | Kopelman et al. |
| 2005/0244780 A1 | 11/2005 | Abels et al. |
| 2005/0244781 A1 | 11/2005 | Abels et al. |
| 2005/0244790 A1 | 11/2005 | Kuperman |
| 2006/0006092 A1 | 1/2006 | DuBos |
| 2006/0014116 A1* | 1/2006 | Maijer ............... A61C 7/28 433/11 |
| 2006/0068354 A1 | 3/2006 | Jeckel |
| 2006/0127834 A1 | 6/2006 | Szwajkowski et al. |
| 2006/0175209 A1 | 8/2006 | Sabilla et al. |
| 2006/0223021 A1 | 10/2006 | Cinader et al. |
| 2006/0223031 A1 | 10/2006 | Cinader, Jr. et al. |
| 2006/0257813 A1 | 11/2006 | Highland |
| 2006/0257821 A1 | 11/2006 | Cinader, Jr. et al. |
| 2007/0015103 A1 | 1/2007 | Sorel |
| 2007/0031773 A1 | 2/2007 | Scuzzo |
| 2007/0031775 A1 | 2/2007 | Andreiko |
| 2007/0087302 A1 | 4/2007 | Reising et al. |
| 2007/0107745 A1 | 5/2007 | Kiyomoto |
| 2007/0111154 A1 | 5/2007 | Sampermans |
| 2007/0118215 A1 | 5/2007 | Moaddeb |
| 2007/0134611 A1 | 6/2007 | Nicholson |
| 2007/0134612 A1 | 6/2007 | Contencin |
| 2007/0141525 A1 | 6/2007 | Cinader, Jr. |
| 2007/0154859 A1 | 7/2007 | Hilliard |
| 2007/0172788 A1 | 7/2007 | Hill, II et al. |
| 2007/0190478 A1 | 8/2007 | Goldberg et al. |
| 2007/0231768 A1 | 10/2007 | Hutchinson |
| 2007/0235051 A1 | 10/2007 | Robinson |
| 2007/0287121 A1 | 12/2007 | Cinader et al. |
| 2008/0032250 A1 | 2/2008 | Kopelman et al. |
| 2008/0057460 A1 | 3/2008 | Hicks |
| 2008/0063995 A1 | 3/2008 | Farzin-Nia et al. |
| 2008/0131831 A1 | 6/2008 | Abels et al. |
| 2008/0160475 A1 | 7/2008 | Rojas-Pardini |
| 2008/0199825 A1 | 8/2008 | Jahn |
| 2008/0227049 A1 | 9/2008 | Sevinc |
| 2008/0233528 A1 | 9/2008 | Kim et al. |
| 2008/0233530 A1 | 9/2008 | Cinader |
| 2008/0233531 A1 | 9/2008 | Raby et al. |
| 2008/0248439 A1 | 10/2008 | Griffith et al. |
| 2008/0254403 A1 | 10/2008 | Hilliard |
| 2008/0286711 A1 | 11/2008 | Corcoran et al. |
| 2008/0305450 A1 | 12/2008 | Steen |
| 2009/0004619 A1 | 1/2009 | Oda et al. |
| 2009/0019698 A1 | 1/2009 | Christoff |
| 2009/0042160 A1 | 2/2009 | Ofir |
| 2009/0088838 A1 | 4/2009 | Shaolian et al. |
| 2009/0191502 A1 | 7/2009 | Cao et al. |
| 2009/0197217 A1 | 8/2009 | Butscher et al. |
| 2009/0216322 A1 | 8/2009 | Le et al. |
| 2009/0220907 A1 | 9/2009 | Suyama |
| 2009/0220920 A1 | 9/2009 | Primus et al. |
| 2009/0222075 A1 | 9/2009 | Gordon |
| 2010/0092903 A1 | 4/2010 | Sabilla |
| 2010/0092905 A1 | 4/2010 | Martin |
| 2010/0105000 A1 | 4/2010 | Scommegna et al. |
| 2010/0129765 A1 | 5/2010 | Mohr et al. |
| 2010/0129766 A1 | 5/2010 | Hilgers |
| 2010/0178628 A1 | 7/2010 | Kim |

(56) References Cited

U.S. PATENT DOCUMENTS

| | | |
|---|---|---|
| 2010/0179789 A1 | 7/2010 | Sachdeva et al. |
| 2010/0193979 A1 | 8/2010 | Goldberg et al. |
| 2010/0241120 A1 | 9/2010 | Bledsoe et al. |
| 2010/0279243 A1 | 11/2010 | Cinader, Jr. et al. |
| 2010/0304321 A1 | 12/2010 | Patel |
| 2011/0008745 A1 | 1/2011 | McQuillan et al. |
| 2011/0027743 A1 | 2/2011 | Cinader, Jr. et al. |
| 2011/0059414 A1 | 3/2011 | Hirsch |
| 2011/0091832 A1 | 4/2011 | Kim et al. |
| 2011/0220612 A1 | 9/2011 | Kim |
| 2011/0250556 A1 | 10/2011 | Heiser |
| 2011/0270583 A1 | 11/2011 | Getto et al. |
| 2011/0287376 A1 | 11/2011 | Walther |
| 2011/0314891 A1 | 12/2011 | Gilbert |
| 2012/0048432 A1 | 3/2012 | Johnson et al. |
| 2012/0148972 A1 | 6/2012 | Lewis |
| 2012/0208144 A1 | 8/2012 | Chiaramonte |
| 2012/0266419 A1 | 10/2012 | Browne et al. |
| 2012/0315595 A1 | 12/2012 | Beaudoin |
| 2012/0322019 A1 | 12/2012 | Lewis |
| 2013/0065193 A1 | 3/2013 | Curiel et al. |
| 2013/0122443 A1 | 5/2013 | Huang et al. |
| 2013/0177862 A1 | 7/2013 | Johnson |
| 2013/0196281 A1 | 8/2013 | Thornton |
| 2013/0196282 A1 | 8/2013 | Eichelberger et al. |
| 2013/0260329 A1 | 10/2013 | Voudouris |
| 2013/0315595 A1 | 11/2013 | Barr |
| 2014/0154637 A1 | 6/2014 | Hansen et al. |
| 2014/0170586 A1 | 6/2014 | Cantarella |
| 2014/0234794 A1 | 8/2014 | Vu |
| 2014/0255864 A1 | 9/2014 | Machata et al. |
| 2014/0287376 A1 | 9/2014 | Hultgren et al. |
| 2014/0363782 A1 | 12/2014 | Wiechmann et al. |
| 2015/0010879 A1 | 1/2015 | Kurthy |
| 2015/0064641 A1 | 3/2015 | Gardner |
| 2015/0072299 A1 | 3/2015 | Alauddin et al. |
| 2015/0140501 A1 | 5/2015 | Kim |
| 2015/0201943 A1 | 7/2015 | Brooks et al. |
| 2015/0265376 A1 | 9/2015 | Kopelman |
| 2015/0305833 A1 | 10/2015 | Cosse |
| 2015/0313687 A1 | 11/2015 | Blees et al. |
| 2015/0351872 A1 | 12/2015 | Jo |
| 2015/0359610 A1 | 12/2015 | Gonzalez et al. |
| 2015/0366638 A1 | 12/2015 | Kopelman et al. |
| 2016/0074139 A1 | 3/2016 | Machata et al. |
| 2016/0095670 A1 | 4/2016 | Witte et al. |
| 2016/0106522 A1* | 4/2016 | Kim ................... A61C 7/16 433/9 |
| 2016/0135926 A1 | 5/2016 | Djamchidi |
| 2016/0166357 A1 | 6/2016 | Portalupi |
| 2016/0175073 A1 | 6/2016 | Huang |
| 2016/0206403 A1 | 7/2016 | Ouellette et al. |
| 2016/0228214 A1 | 8/2016 | Sachdeva et al. |
| 2016/0242871 A1 | 8/2016 | Morton et al. |
| 2016/0270885 A1 | 9/2016 | Kwon et al. |
| 2016/0278883 A1 | 9/2016 | Fasci et al. |
| 2016/0287354 A1 | 10/2016 | Viecilli et al. |
| 2016/0310239 A1 | 10/2016 | Paehl et al. |
| 2016/0374780 A1 | 12/2016 | Carrillo Gonzalez et al. |
| 2017/0086948 A1* | 3/2017 | Von Mandach ....... A61C 7/141 |
| 2017/0105816 A1 | 4/2017 | Ward |
| 2017/0105817 A1 | 4/2017 | Chun et al. |
| 2017/0128169 A1 | 5/2017 | Lai et al. |
| 2017/0135793 A1 | 5/2017 | Webber et al. |
| 2017/0140381 A1 | 5/2017 | Ducrohet et al. |
| 2017/0151037 A1 | 6/2017 | Lee |
| 2017/0156823 A1 | 6/2017 | Roein Peikar et al. |
| 2017/0165032 A1 | 6/2017 | Webber et al. |
| 2017/0165532 A1 | 6/2017 | Khan et al. |
| 2017/0181813 A1 | 6/2017 | Kalkhoran |
| 2017/0196660 A1 | 7/2017 | Lee |
| 2017/0224444 A1 | 8/2017 | Viecilli et al. |
| 2017/0231721 A1 | 8/2017 | Akeel et al. |
| 2017/0246682 A1 | 8/2017 | Duerig |
| 2017/0252140 A1 | 9/2017 | Murphy et al. |
| 2017/0281313 A1 | 10/2017 | Kim |
| 2017/0281314 A1 | 10/2017 | Freimuller |
| 2017/0296253 A1 | 10/2017 | Brandner et al. |
| 2017/0296304 A1* | 10/2017 | Tong .................... A61C 7/28 |
| 2017/0312052 A1 | 11/2017 | Moss et al. |
| 2017/0318881 A1 | 11/2017 | Fonte et al. |
| 2017/0325911 A1 | 11/2017 | Marshall |
| 2017/0340777 A1 | 11/2017 | Ma et al. |
| 2018/0014915 A1 | 1/2018 | Voudouris |
| 2018/0014916 A1 | 1/2018 | Cinader, Jr. et al. |
| 2018/0021108 A1 | 1/2018 | Cinader, Jr. et al. |
| 2018/0049847 A1* | 2/2018 | Oda ..................... A61C 7/30 |
| 2018/0055605 A1 | 3/2018 | Witte et al. |
| 2018/0071057 A1 | 3/2018 | Rudman |
| 2018/0110589 A1 | 4/2018 | Gao |
| 2018/0132974 A1 | 5/2018 | Rudman |
| 2018/0161121 A1 | 6/2018 | Butler et al. |
| 2018/0161126 A1 | 6/2018 | Marshall et al. |
| 2018/0168788 A1 | 6/2018 | Fernie |
| 2018/0185120 A1 | 7/2018 | Wool |
| 2018/0185121 A1 | 7/2018 | Pitts et al. |
| 2018/0206941 A1 | 7/2018 | Lee |
| 2018/0214250 A1 | 8/2018 | Martz |
| 2018/0235437 A1 | 8/2018 | Ozerov et al. |
| 2018/0243052 A1 | 8/2018 | Lee |
| 2018/0338564 A1 | 11/2018 | Oda et al. |
| 2019/0001396 A1 | 1/2019 | Riemeier et al. |
| 2019/0019187 A1 | 1/2019 | Miller et al. |
| 2019/0053876 A1 | 2/2019 | Sterental et al. |
| 2019/0090988 A1 | 3/2019 | Schumacher et al. |
| 2019/0090989 A1 | 3/2019 | Jo |
| 2019/0125494 A1 | 5/2019 | Li et al. |
| 2019/0142551 A1 | 5/2019 | Dickenson et al. |
| 2019/0159871 A1 | 5/2019 | Chan et al. |
| 2019/0163060 A1 | 5/2019 | Skamser et al. |
| 2019/0175304 A1 | 6/2019 | Morton et al. |
| 2019/0231488 A1 | 8/2019 | Dickerson |
| 2019/0247147 A1 | 8/2019 | Grande et al. |
| 2019/0252065 A1 | 8/2019 | Katzman et al. |
| 2019/0262103 A1 | 8/2019 | Cassalia |
| 2019/0276921 A1 | 9/2019 | Duerig et al. |
| 2019/0321136 A1 | 10/2019 | Martz et al. |
| 2019/0321138 A1 | 10/2019 | Roein Peikar et al. |
| 2019/0328487 A1 | 10/2019 | Levin et al. |
| 2019/0328491 A1 | 10/2019 | Hostettler et al. |
| 2019/0343606 A1 | 11/2019 | Wu et al. |
| 2019/0350682 A1 | 11/2019 | Cinader, Jr. et al. |
| 2019/0365507 A1 | 12/2019 | Khoshnevis et al. |
| 2019/0388189 A1 | 12/2019 | Shivapuja et al. |
| 2020/0000551 A1 | 1/2020 | Li et al. |
| 2020/0066391 A1 | 2/2020 | Sachdeva et al. |
| 2020/0078137 A1 | 3/2020 | Chen et al. |
| 2020/0107911 A1 | 4/2020 | Roein Peikar et al. |
| 2020/0129272 A1 | 4/2020 | Roein Peikar et al. |
| 2020/0138549 A1 | 5/2020 | Chun et al. |
| 2020/0146779 A1 | 5/2020 | Zhang |
| 2020/0146791 A1 | 5/2020 | Schülke et al. |
| 2020/0170757 A1 | 6/2020 | Kopelman et al. |
| 2020/0188063 A1 | 6/2020 | Cinader, Jr. et al. |
| 2020/0197131 A1 | 6/2020 | Matov et al. |
| 2020/0214806 A1 | 7/2020 | Hung |
| 2020/0229903 A1 | 7/2020 | Sandwick |
| 2020/0275996 A1 | 9/2020 | Tong et al. |
| 2020/0281611 A1 | 9/2020 | Kelly et al. |
| 2020/0338706 A1 | 10/2020 | Cunningham et al. |
| 2020/0345455 A1 | 11/2020 | Roein Peikar et al. |
| 2020/0345459 A1 | 11/2020 | Schueller et al. |
| 2020/0345460 A1 | 11/2020 | Roein Peikar et al. |
| 2020/0352765 A1 | 11/2020 | Lin |
| 2020/0360109 A1 | 11/2020 | Gao et al. |
| 2020/0375270 A1 | 12/2020 | Holschuh et al. |
| 2020/0375699 A1 | 12/2020 | Roein Peikar et al. |
| 2020/0390524 A1 | 12/2020 | Roein Peikar et al. |
| 2020/0390535 A1 | 12/2020 | Curtis et al. |
| 2020/0405191 A1 | 12/2020 | Lotan et al. |
| 2020/0405452 A1 | 12/2020 | Song et al. |
| 2021/0007830 A1 | 1/2021 | Roein Peikar et al. |
| 2021/0007832 A1 | 1/2021 | Roein Peikar et al. |
| 2021/0045701 A1 | 2/2021 | Unklesbay et al. |

(56) References Cited

U.S. PATENT DOCUMENTS

| | | | |
|---|---|---|---|
| 2021/0068928 A1 | 3/2021 | Witte et al. |
| 2021/0077227 A1 | 3/2021 | Griffin, III et al. |
| 2021/0093422 A1 | 4/2021 | Tong et al. |
| 2021/0128275 A1 | 5/2021 | Suh et al. |
| 2021/0134450 A1 | 5/2021 | Katzman et al. |
| 2021/0137644 A1 | 5/2021 | Benarouch et al. |
| 2021/0145547 A1 | 5/2021 | Roein Peikar et al. |
| 2021/0177551 A1 | 6/2021 | Roein Peikar et al. |
| 2021/0186662 A1 | 6/2021 | Roein Peikar et al. |
| 2021/0205049 A1 | 7/2021 | Cinader, Jr. |
| 2021/0212803 A1 | 7/2021 | Tong et al. |
| 2021/0244502 A1 | 8/2021 | Farkash et al. |
| 2021/0244505 A1 | 8/2021 | Tong et al. |
| 2021/0244507 A1 | 8/2021 | Curiel et al. |
| 2021/0251730 A1 | 8/2021 | Curiel et al. |
| 2021/0259808 A1 | 8/2021 | Ben-Gal Nguyen et al. |
| 2021/0275286 A1 | 9/2021 | Karazivan et al. |
| 2021/0330430 A1 | 10/2021 | Khoshnevis et al. |
| 2021/0338380 A1 | 11/2021 | Park et al. |
| 2021/0346127 A1 | 11/2021 | Cassalia |
| 2021/0353389 A1 | 11/2021 | Peikar et al. |
| 2021/0369413 A1 | 12/2021 | Li et al. |
| 2021/0378792 A1 | 12/2021 | Akopov et al. |
| 2021/0386523 A1 | 12/2021 | Raby, II et al. |
| 2021/0393375 A1 | 12/2021 | Chekh et al. |
| 2021/0401546 A1 | 12/2021 | Gardner |
| 2022/0008169 A1 | 1/2022 | Reisman |
| 2022/0023009 A1 | 1/2022 | Tong et al. |
| 2022/0031428 A1 | 2/2022 | Khoshnevis et al. |
| 2022/0039921 A1 | 2/2022 | Kopelman et al. |
| 2022/0039922 A1 | 2/2022 | Yamaguchi |
| 2022/0061964 A1 | 3/2022 | Khoshnevis et al. |
| 2022/0087783 A1 | 3/2022 | Khoshnevis et al. |
| 2022/0133438 A1 | 5/2022 | Wratten, Jr. et al. |
| 2022/0137592 A1 | 5/2022 | Cramer et al. |
| 2022/0168072 A1 | 6/2022 | Tong et al. |
| 2022/0183797 A1 | 6/2022 | Khoshnevis et al. |
| 2022/0226076 A1 | 7/2022 | Roein Peikar et al. |
| 2022/0226077 A1 | 7/2022 | Roein Peikar et al. |
| 2022/0249201 A1 | 8/2022 | Shuman et al. |
| 2022/0257341 A1 | 8/2022 | Somasundaram et al. |
| 2022/0257344 A1 | 8/2022 | Tsai et al. |
| 2022/0287804 A1 | 9/2022 | Oda |
| 2022/0304773 A1 | 9/2022 | Wratten, Jr. et al. |
| 2022/0304774 A1 | 9/2022 | Wratten, Jr. et al. |
| 2022/0314508 A1 | 10/2022 | Subramaniam et al. |
| 2022/0323183 A1 | 10/2022 | Dufour et al. |
| 2022/0338960 A1 | 10/2022 | Reising |
| 2022/0346912 A1 | 11/2022 | Li et al. |
| 2022/0361996 A1 | 11/2022 | Raby et al. |
| 2023/0070165 A1 | 3/2023 | Tong et al. |
| 2023/0070837 A1 | 3/2023 | Oda |
| 2023/0072074 A1 | 3/2023 | Oda |
| 2023/0100466 A1 | 3/2023 | Huynh et al. |
| 2023/0404715 A1 | 12/2023 | Peikar et al. |
| 2023/0414327 A1 | 12/2023 | Peikar et al. |
| 2024/0058101 A1 | 2/2024 | Tong et al. |
| 2024/0061966 A1 | 2/2024 | Oda et al. |
| 2024/0090980 A1 | 3/2024 | Tong et al. |

FOREIGN PATENT DOCUMENTS

| | | |
|---|---|---|
| CN | 201320224 Y | 10/2009 |
| CN | 102215773 | 10/2011 |
| CN | 202365955 | 8/2012 |
| CN | 202892116 | 4/2013 |
| CN | 203074896 | 7/2013 |
| CN | 103505293 | 1/2014 |
| CN | 203506900 | 4/2014 |
| CN | 104188728 | 12/2014 |
| CN | 204049881 | 12/2014 |
| CN | 205126459 | 4/2016 |
| CN | 105596098 | 5/2016 |
| CN | 105662615 | 6/2016 |
| CN | 205569100 | 9/2016 |
| CN | 106029002 | 10/2016 |
| CN | 106137419 | 11/2016 |
| CN | 108690967 | 10/2018 |
| CN | 109009504 | 12/2018 |
| CN | 117695035 | 3/2024 |
| DE | 3915807 | 11/1990 |
| DE | 20 2018 003 574 U1 | 8/2018 |
| DE | 10 2018 005 769 A1 | 1/2020 |
| DE | 10 2018 133 705 A1 | 7/2020 |
| DE | 10 2015 017 301 B3 | 3/2022 |
| EP | 0 778 008 | 6/1997 |
| EP | 1 139 902 | 10/2001 |
| EP | 1 276 433 | 1/2003 |
| EP | 1 379 193 B1 | 2/2007 |
| EP | 2 076 207 | 7/2009 |
| EP | 1 073 378 B1 | 1/2012 |
| EP | 2 522 298 | 11/2012 |
| EP | 2 617 383 | 7/2013 |
| EP | 3 285 678 | 5/2021 |
| EP | 3 954 320 | 2/2022 |
| EP | 2 726 049 | 8/2022 |
| EP | 3 019 141 | 8/2022 |
| EP | 4 034 077 | 8/2022 |
| EP | 4 035 649 | 8/2022 |
| EP | 4 044 959 | 8/2022 |
| EP | 4 048 196 | 8/2022 |
| EP | 4065647 A1 | 8/2022 |
| EP | 3 691 559 | 9/2022 |
| EP | 3 823 813 | 9/2022 |
| EP | 3 905 986 | 9/2022 |
| EP | 4 056 144 | 9/2022 |
| ES | 2315046 | 4/2010 |
| FR | 2 525 469 | 10/1983 |
| FR | 3 056 393 B1 | 10/2018 |
| JP | 11221235 A | 8/1999 |
| JP | 2009205330 A | 9/2009 |
| KR | 100549294 | 2/2006 |
| KR | 100737442 | 7/2007 |
| KR | 100925286 | 11/2009 |
| KR | 101301886 | 8/2013 |
| KR | 101583547 | 1/2016 |
| KR | 101584737 | 1/2016 |
| KR | 101723674 | 4/2017 |
| RU | 133408 U1 | 10/2013 |
| WO | WO 01/80761 | 11/2001 |
| WO | WO 01/85047 | 11/2001 |
| WO | WO 2003/045266 | 6/2003 |
| WO | WO 2005/008441 | 1/2005 |
| WO | WO 2005/094716 | 10/2005 |
| WO | WO 2007/069286 | 6/2007 |
| WO | WO 2008/051774 | 5/2008 |
| WO | WO 2011/034522 | 3/2011 |
| WO | WO 2011/090502 | 7/2011 |
| WO | WO 2011/103669 | 9/2011 |
| WO | WO 2012/089735 | 7/2012 |
| WO | WO 2012/140021 | 10/2012 |
| WO | WO 2013/019398 | 2/2013 |
| WO | WO 2014/070920 | 5/2014 |
| WO | WO 2016/148961 | 9/2016 |
| WO | WO 2016/149008 | 9/2016 |
| WO | WO 2016/199972 | 12/2016 |
| WO | WO 2016/210402 | 12/2016 |
| WO | WO 2017/007079 | 1/2017 |
| WO | WO 2017/112004 | 6/2017 |
| WO | WO 2017/172537 | 10/2017 |
| WO | WO 2017/184632 | 10/2017 |
| WO | WO 2017/194478 | 11/2017 |
| WO | WO 2017/198640 | 11/2017 |
| WO | WO 2018/102588 | 6/2018 |
| WO | WO 2018/122862 | 7/2018 |
| WO | WO 2018/144634 | 8/2018 |
| WO | WO 2018/195356 | 10/2018 |
| WO | WO 2019/135504 | 7/2019 |
| WO | WO 2020/095182 | 5/2020 |
| WO | WO 2020/178353 | 9/2020 |
| WO | WO 2020/180740 | 9/2020 |
| WO | WO 2020/223744 | 11/2020 |
| WO | WO 2020/223745 | 11/2020 |
| WO | WO 2021/087158 | 5/2021 |

(56) References Cited

FOREIGN PATENT DOCUMENTS

| | | |
|---|---|---|
| WO | WO 2021/105878 | 6/2021 |
| WO | WO 2021/214613 | 10/2021 |
| WO | WO 2021/225916 A2 | 11/2021 |
| WO | WO 2021/226618 | 11/2021 |
| WO | WO 2021/225916 A3 | 12/2021 |
| WO | WO 2021/245484 | 12/2021 |
| WO | WO 2021/252675 | 12/2021 |
| WO | WO 2022/099263 | 5/2022 |
| WO | WO 2022/099267 | 5/2022 |
| WO | WO 2022/123402 | 6/2022 |
| WO | WO 2022/137109 | 6/2022 |
| WO | WO 2022/145602 | 7/2022 |
| WO | WO 2022/159738 | 7/2022 |
| WO | WO 2022/162488 | 8/2022 |
| WO | WO 2022/162528 | 8/2022 |
| WO | WO 2022/162614 | 8/2022 |
| WO | WO 2022/167899 | 8/2022 |
| WO | WO 2022/167995 | 8/2022 |
| WO | WO 2022/180466 | 9/2022 |
| WO | WO 2022/189906 | 9/2022 |
| WO | WO 2022/192409 | 9/2022 |
| WO | WO 2022/195391 | 9/2022 |
| WO | WO 2022/204711 | 9/2022 |
| WO | WO 2022/214895 | 10/2022 |
| WO | WO 2022/217269 | 10/2022 |
| WO | WO 2022/219459 | 10/2022 |
| WO | WO 2022/229734 | 11/2022 |
| WO | WO 2022/229739 | 11/2022 |
| WO | WO 2022/236287 | 11/2022 |
| WO | WO 2023/033869 | 3/2023 |
| WO | WO 2023/033870 | 3/2023 |
| WO | WO 2023/034876 | 3/2023 |
| WO | WO 2024/040008 | 2/2024 |
| WO | WO 2024/059653 | 3/2024 |

OTHER PUBLICATIONS

Spini et al., "Transition temperature range of thermally activated nickel-titanium archwires", J Appl Oral Sci., dated Apr. 2014, vol. 22, No. 2, pp. 109-117.
In Brace, Brush & Floss Easily with In Brace, Dated as uploaded on: May 26, 2022, YouTube, Retrieved from Internet: https://www.youtube.com/watch?v=uAsxiBlbY4Y (Dated Year: 2022).
MEAW School, Introduction to MEAW (Multi-loop Edgewise Arch Wire), Dated as uploaded On: Mar. 24, 2021, YouTube, Retrieved from Internet: https://www.youtube.com/watch?v=ne785jlzN Pg (Dated Year: 2021).
Richard Gawel, Swift Health Systems Raises $45 Million to Finance Invisible Orthodontics, Dated as Published on: Dec. 4, 2019, dentistrytoday.com, Retrieved from Internet: https://www.dentistrytoday.com/products/swift-health-systems-raises-45-million-to-finance-invisible-orthodontics/ (Dated Year: 2019).
In Brace, What Is In Brace?—Integration Booster, Dated as uploaded on: May 22, 2023, YouTube, Retrieved from Internet: https://www.youtube.com/watch?v=ANUPkCSfQo4 (Dated Year: 2023).
Coro, Jorge C. et al., "MEAW Therapy" MEAW Therapy-Orthodontic Products, accessed via http://www.orthodonticproductsonline.com/2012/11/meaw-therapy/ on Mar. 14, 2016, published Nov. 12, 2012 in 6 pages.
Elsheikh, Moaaz Mohamed, et al. "A Forsus Distalizer: A Pilot Typodont Study". Jul.-Dec. 2004, KDJ, vol. 7, No. 2, pp. 107-115.
Gilbert, Alfredo. An in-office wire-bending robot for lingual orthodontics. ResearchGate. Article in Journal of clinical orthodontics: JCO, Apr. 2011.
Glauser-Williams Orthodontics: Appliances, http://www.glauserwilliamsorthodontics.com/treatments/orthodontic-appliances.php , accessed Nov. 30, 2015 in 4 pages.
Jiang et al. Bending Process Analysis and Structure Design of Orthodontic Archwire Bending Robot. International Journal of Smart Home. vol. 7, No. 5 (2013), pp. 345-352. http://dx.doi.org/10.14257/ijsh.2013.7.5.33.
Jiang et al. A Review on Robot in Prosthodontics and Orthodontics. Hindawi Publishing Corporation. Advances in Mechanical Engineering. Article ID 198748. 2014. 11 pages.
Mahony, Derek, "How We Got From There to Here and Back". Dental Learning Hub (Capture of web page dated Jun. 24, 2013 downloaded from http://web.archive.org/web/20130624145806/http://www.dental-learninghub.com/Clinical/Orthodontics.aspx, downloaded Feb. 7, 2014).
Miller, R.J. et al. "Validation of Align Technology's Treat III™ Digital Model Superimposition Tool and Its Case Application". Orthodontic Craniofacial Res.,2003, vol. 6 (Suppl 1): pp. 143-149.
SureSmile. 2013. About SureSmile. (Capture of web page dated Jun. 21, 2013 downloaded from http://web.archive.org/web/20130621031404/http://suresmile.com/About-SureSmile, downloaded Feb. 7, 2014).
Xia, et al. Development of a Robotic System for Orthodontic Archwire Bending. 2016 IEEE International Conference on Robotics and Automation (ICRA). Stockholm, Sweden, May 16-21, 2016. pp. 730-735.
Yang, Won-Sik, et al. "A Study of the Regional Load Deflection Rate of Multiloop Edgewise Arch Wire." Angle Orthodontist, 2001, vol. 7, No. 2, pp. 103-109.
IPhone 3D scanning to dental software, screen shots at 0:09 and 7:00 of YouTube video, https://www.youtube.com/watch?v=QONGdQ3QiFE, uploaded Oct. 1, 2018 in 2 pages.
Invisalign@ SmileView™, How Would You Look with Straight Teeth?, https://www.invisalign.com/get-started/invisalign-smileview?v=0#start, printed Jun. 7, 2022 in 2 pages.
A ScanBox demo, https://www.youtube.com/watch?v=MsCfv2PDQ0o, screen shots at 0:08 and 0:19 of YouTube video, uploaded May 5, 2019 in 2 pages.
Southern Maine Orthodontics, Virtual Orthodontic Treatment, https://southernmainebraces.com/virtual-orthodontic-treatment/, printed Jun. 7, 2022 in 3 pages.
International Search Report and Written Opinion in Application No. PCT/US2021/036675, dated Nov. 9, 2021, in 27 pages.

\* cited by examiner

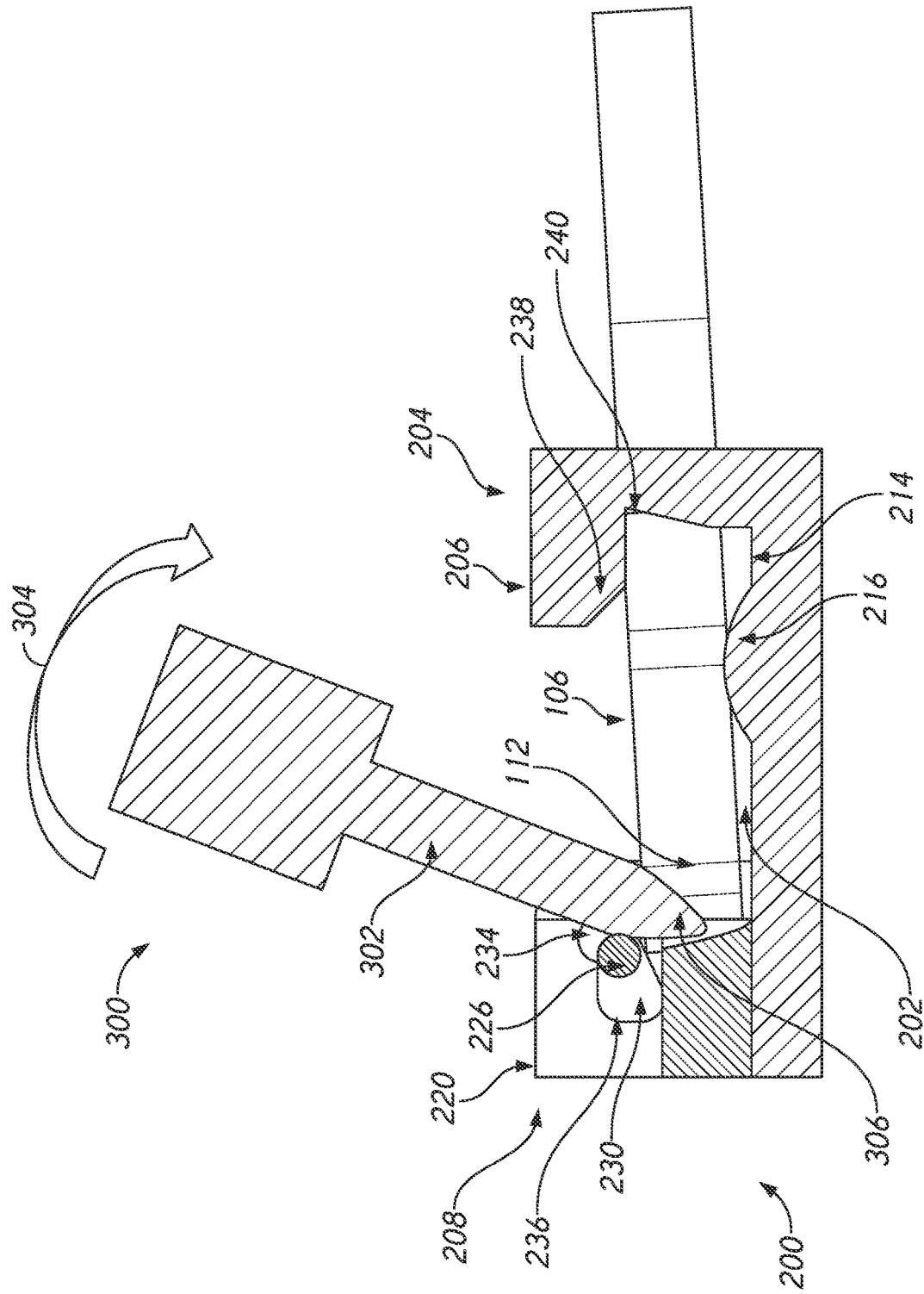

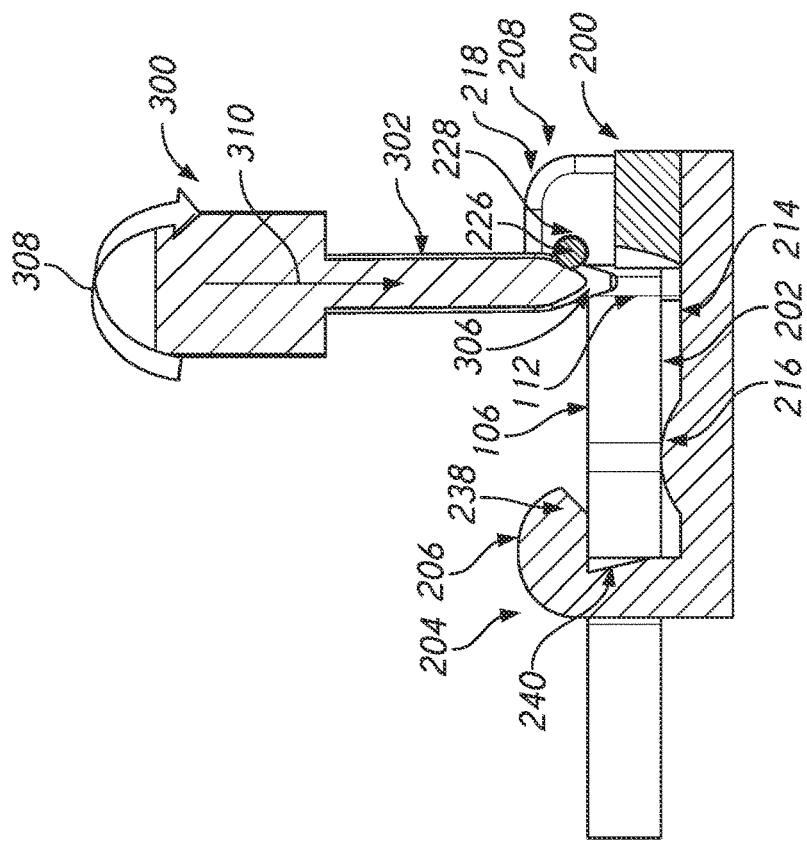
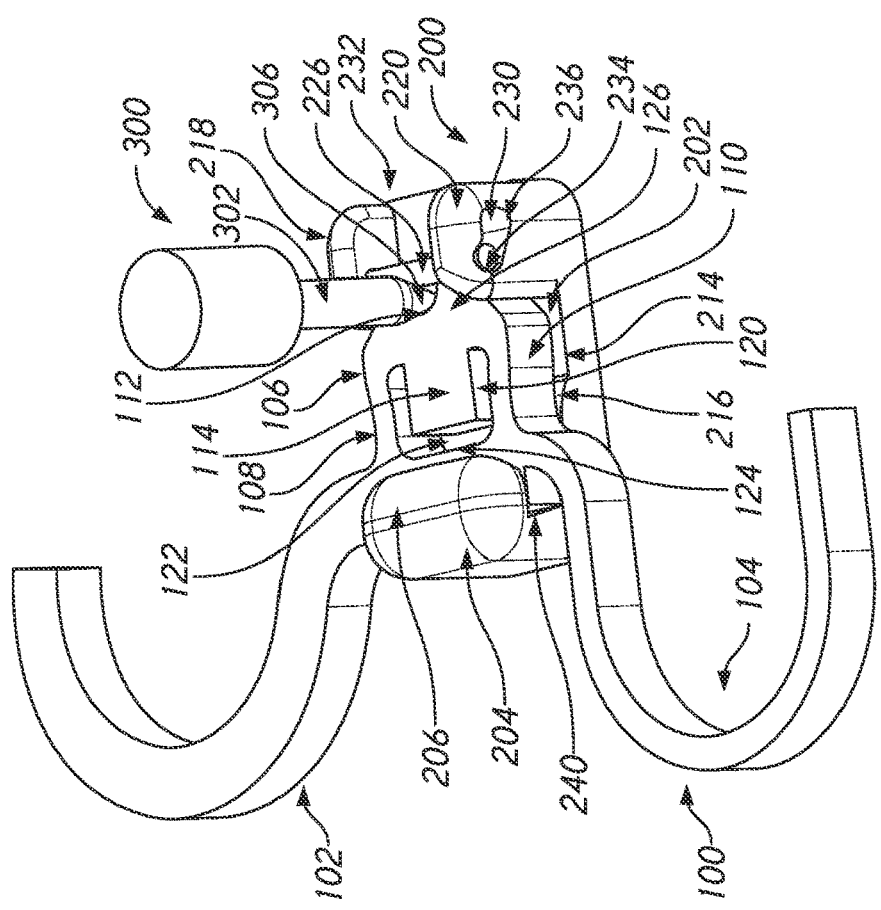
FIG. 2I
FIG. 2H

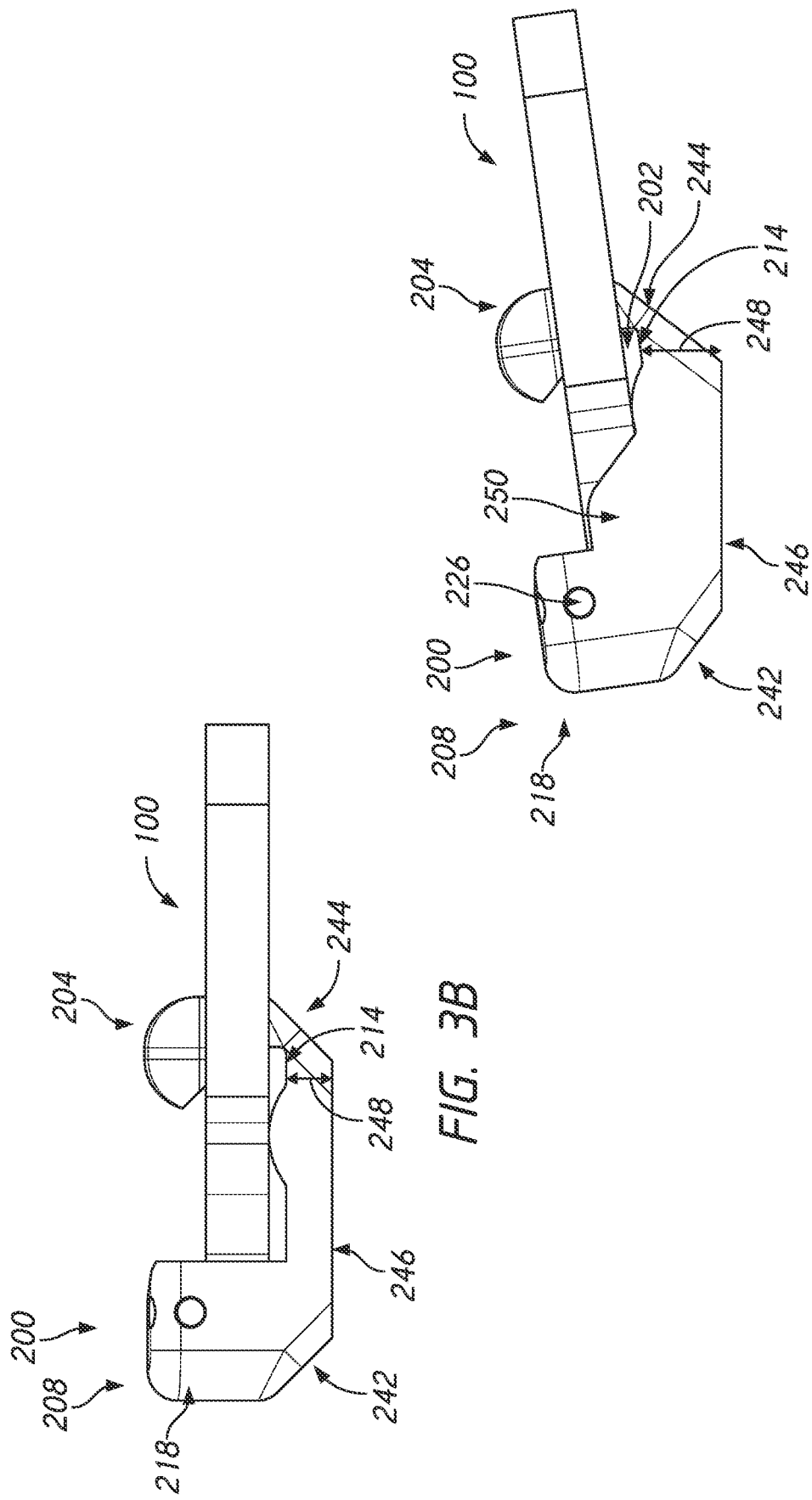

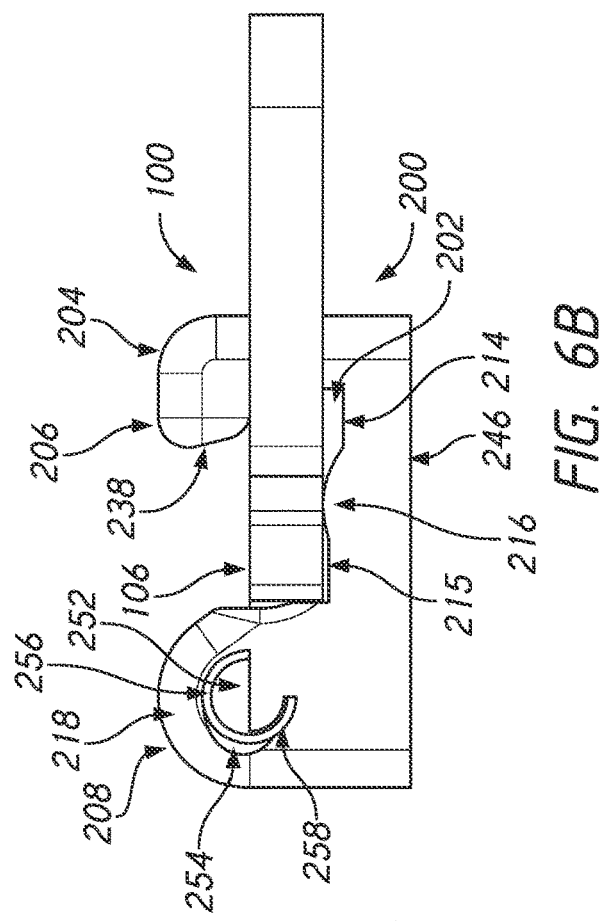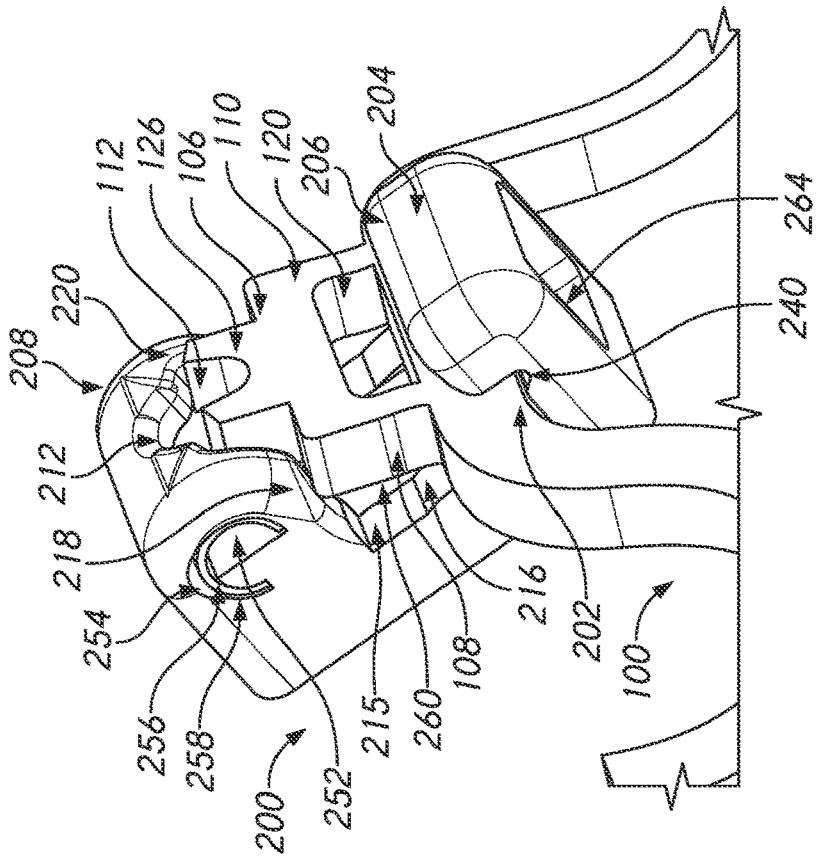
FIG. 6B
FIG. 6A

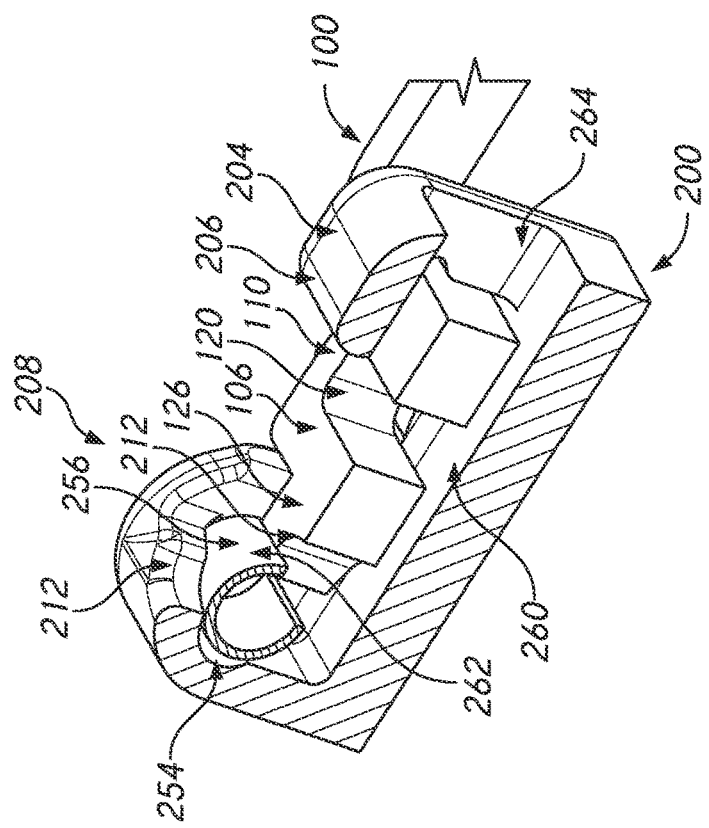
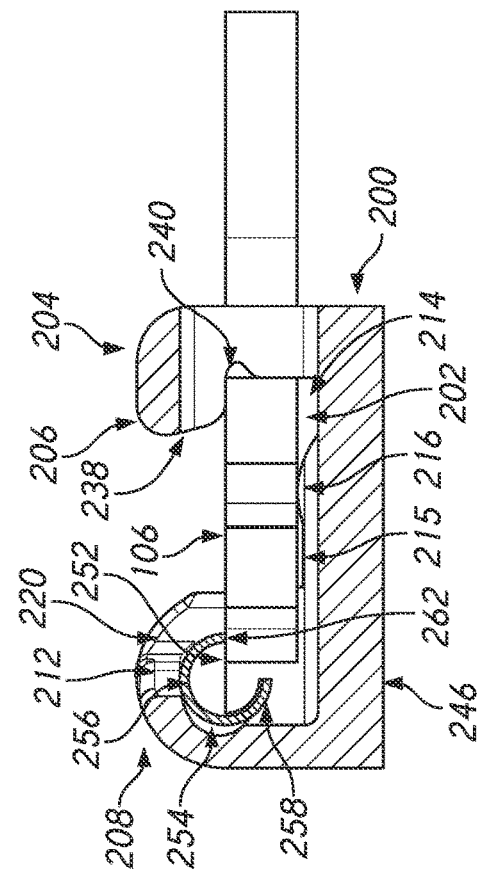
FIG. 6D
FIG. 6C

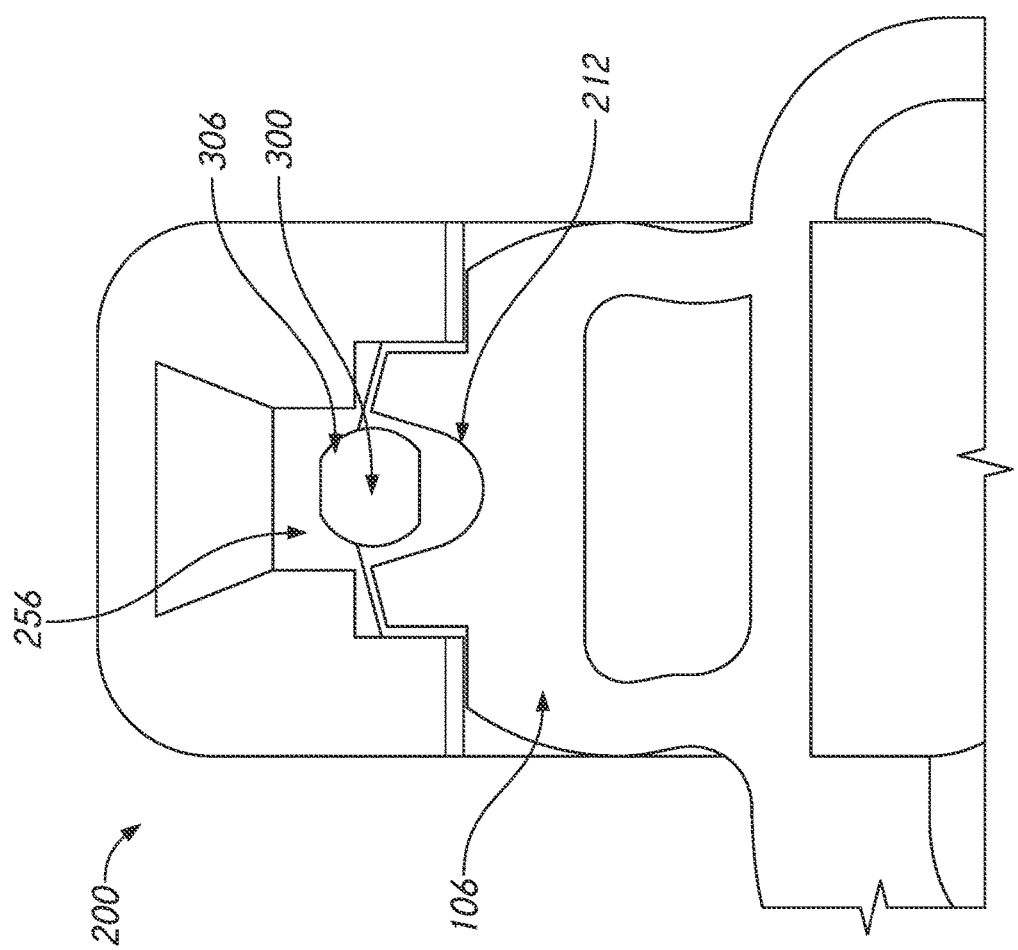

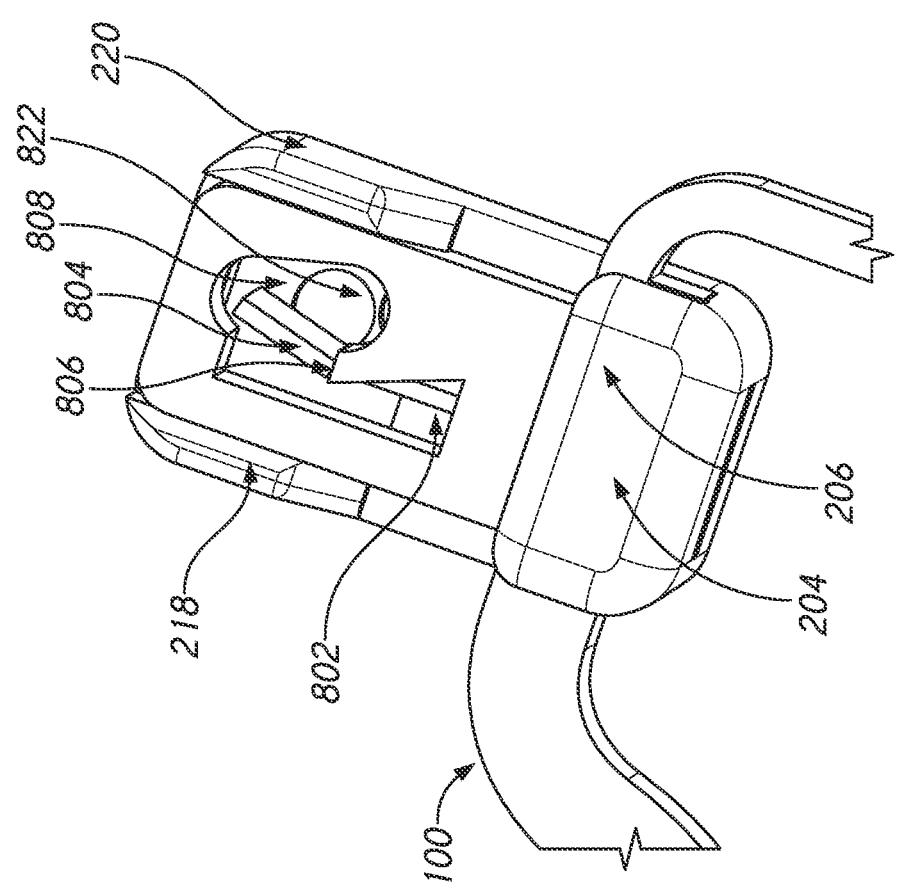

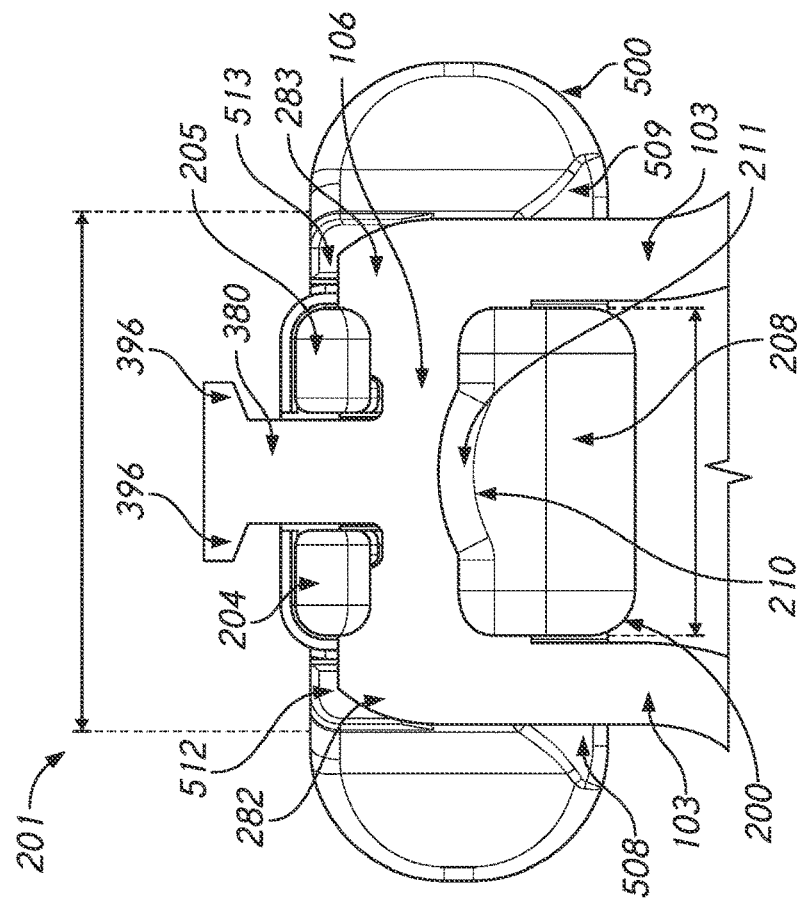
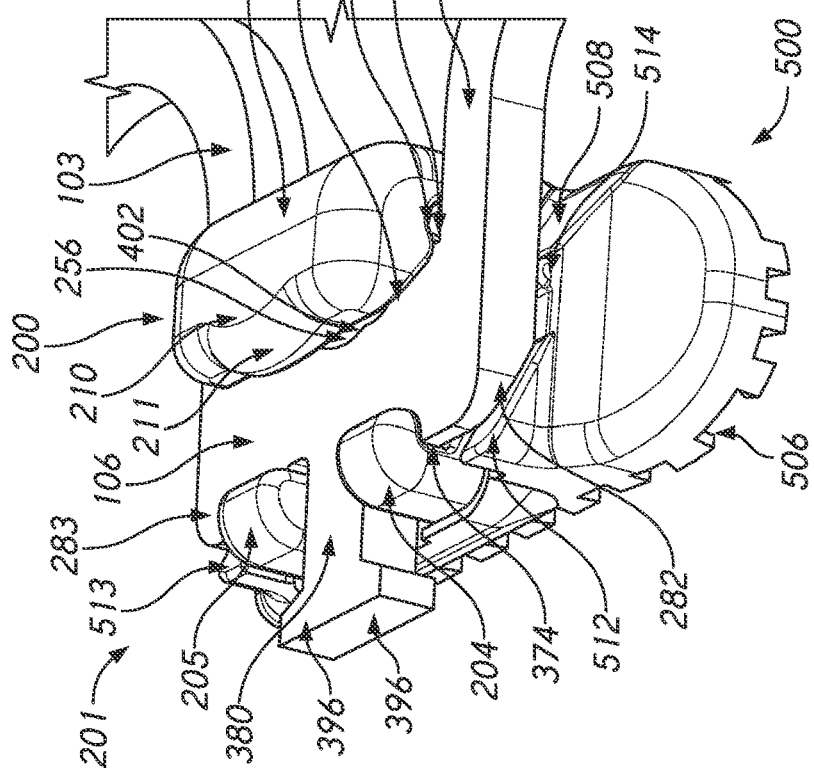

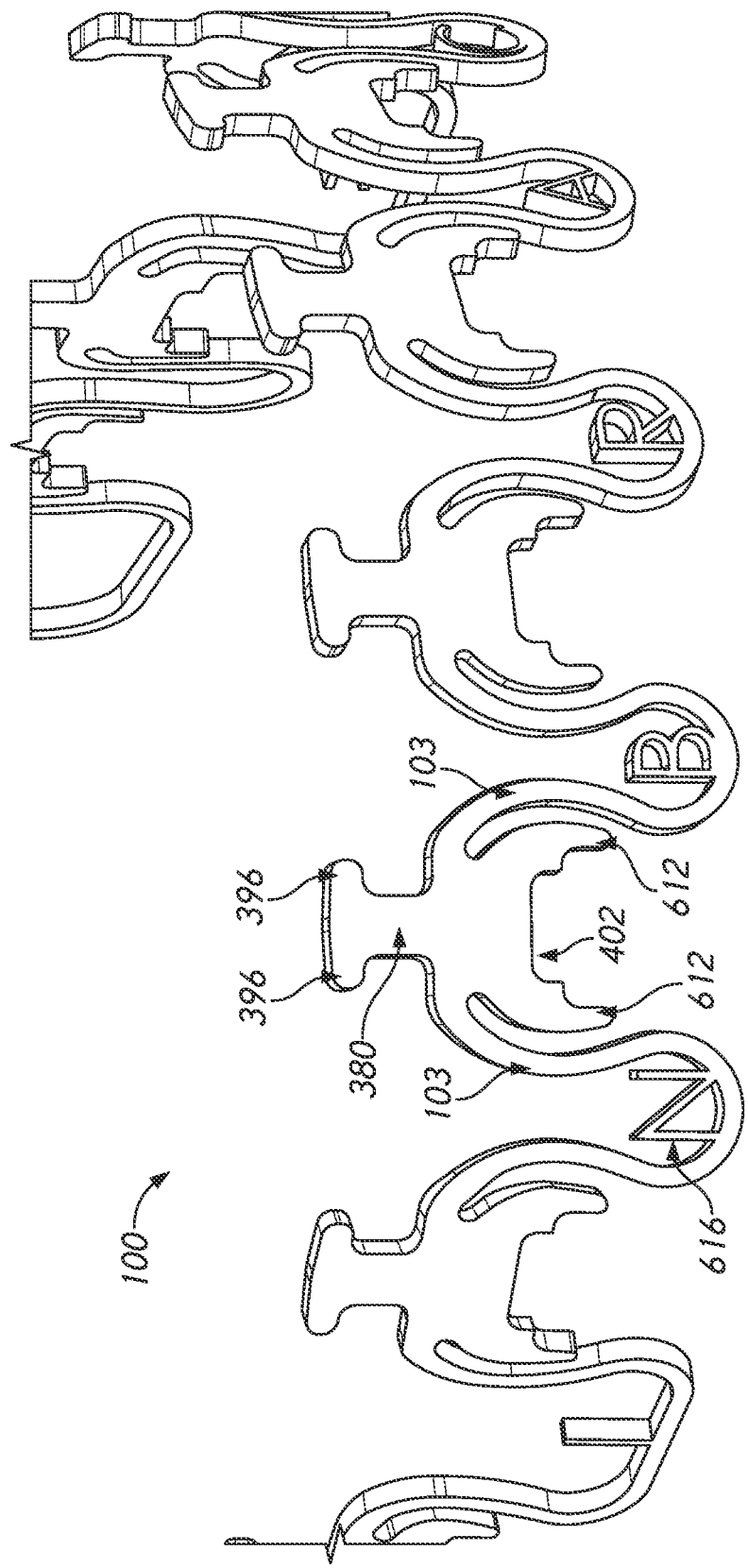

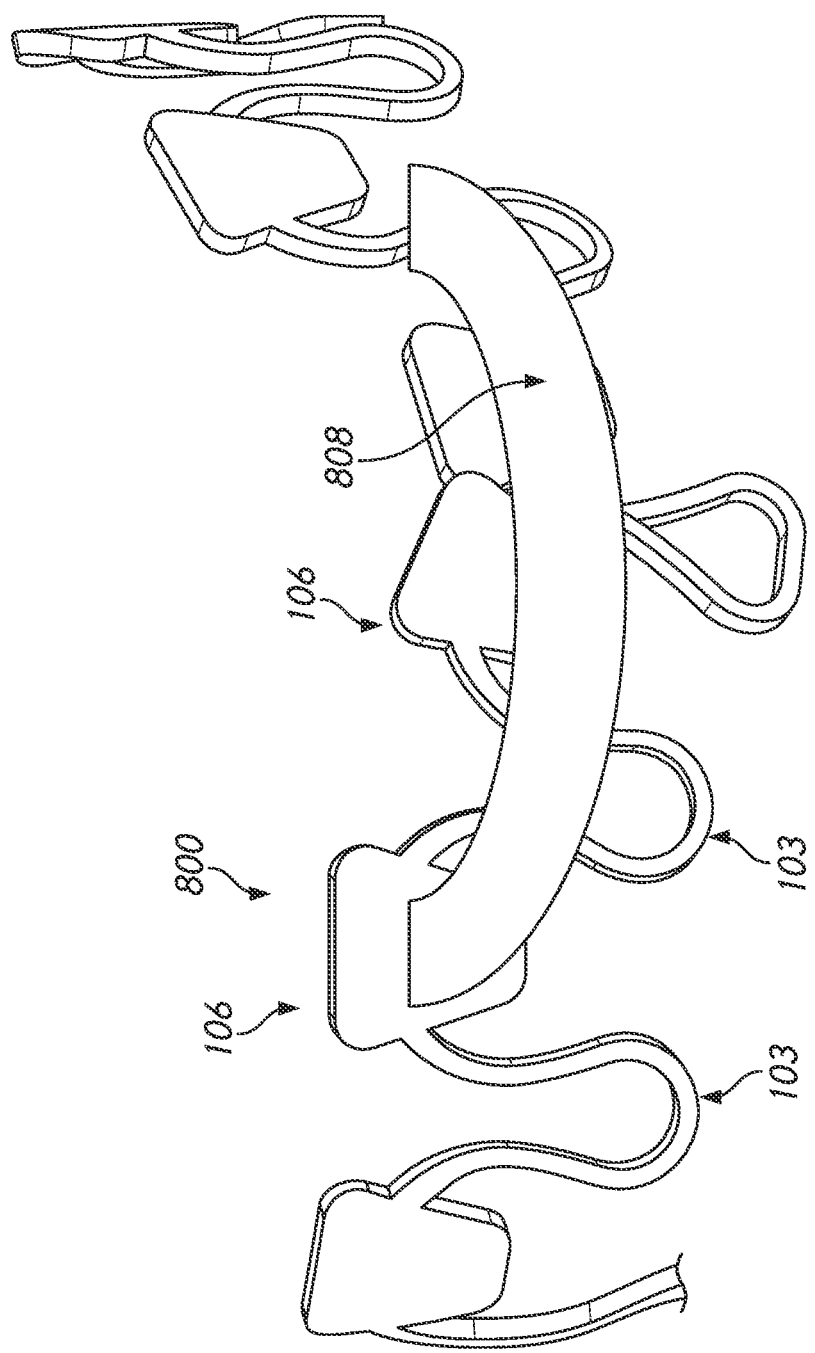

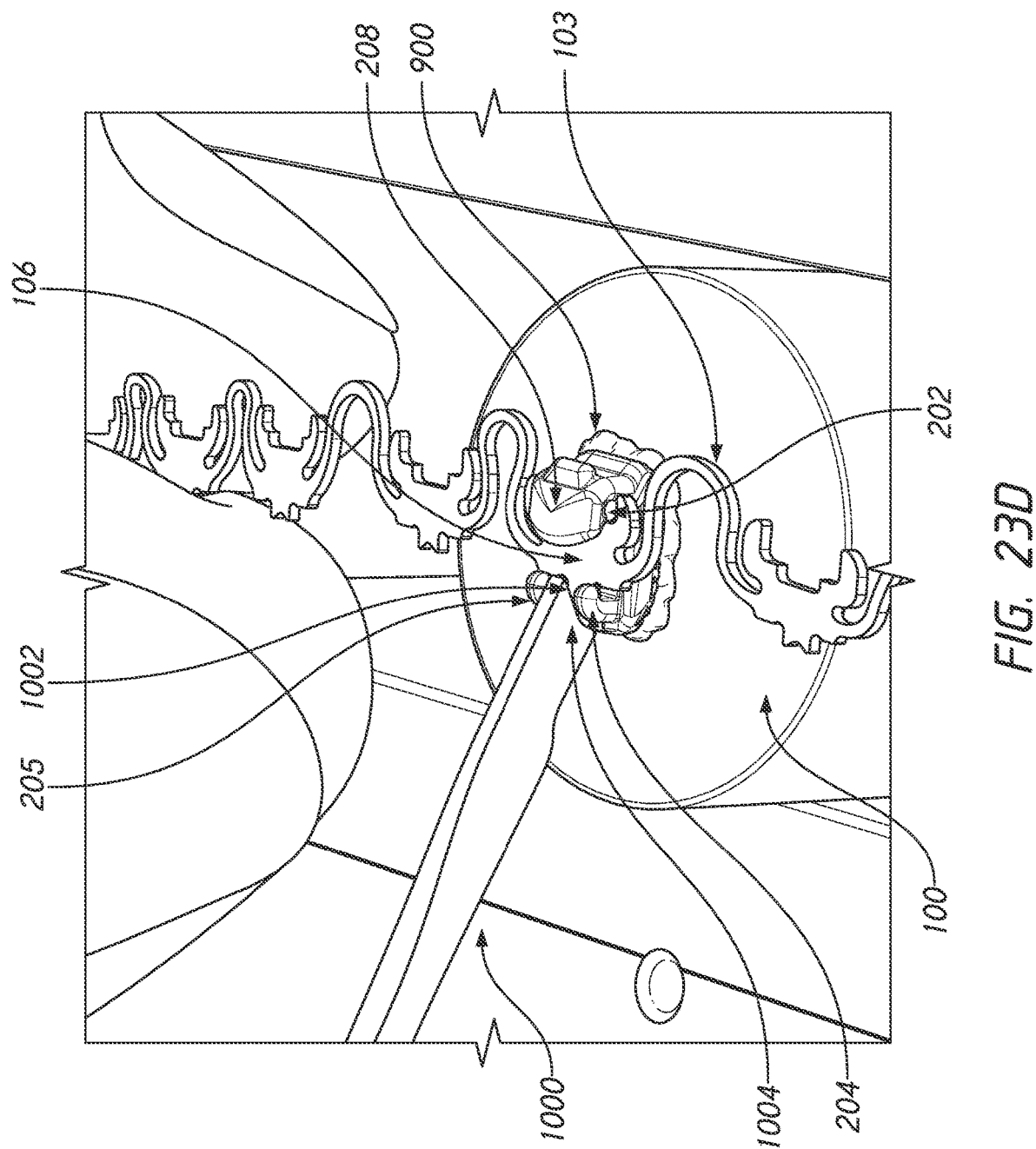

ORTHODONTIC APPLIANCE WITH NON-SLIDING ARCHFORM

CROSS REFERENCE TO RELATED APPLICATIONS

This application claims priority to U.S. Provisional Patent Application Nos. 63/037,974, filed Jun. 11, 2020, 63/148,263, filed Feb. 11, 2021, and 63/160,222, filed Mar. 12, 2021, which are incorporated herein by reference in their entireties. Any and all applications, if any, for which a foreign or domestic priority claim is identified in the Application Data Sheet of the present application are hereby incorporated by reference under 37 CFR 1.57.

BACKGROUND

Field of the Invention

This invention relates in some aspects to orthodontic appliances, including orthodontic brackets and non-sliding archforms.

SUMMARY

In some variants, an orthodontic bracket is disclosed herein that can be disposed on a patient's tooth. The orthodontic bracket can include a slot that can receive a male fastener of an archform. The orthodontic bracket can include a stop that can be disposed on a gingival side of the bracket that can prevent movement of the male fastener in the gingival direction. The orthodontic bracket can include a retainer disposed on an occlusal side of the bracket that can prevent movement of the male fastener in the occlusal, mesial, and/or distal directions. The retainer can include a locking pin that can deflect to facilitate the male fastener being inserted into or removed from the slot.

In some variants, the stop can include an overhang that can retain the male fastener within the slot.

In some variants, the retainer can include walls that can be disposed on mesial and distal sides of the orthodontic bracket.

In some variants, the locking pin can include a fixed end in one of the walls of the retainer and a free end that can be moveably disposed within an aperture of the other wall of the retainer. The free end can deflect in the occlusal direction to permit the male fastener to be positioned thereunder or to permit the male fastener to be removed from thereunder.

In some variants, the aperture of the wall of the retainer can include a locking portion that can retain the free end of the locking pin therein when the male fastener is disposed under the locking pin.

In some variants, the bracket can include a face and a protrusion. The protrusion can extend away from the face and can push the male fastener against the retainer and locking pin to prevent sliding between the archform and the bracket.

In some variants, the male fastener can include arms that are configured to flex under a load.

In some variants, the male fastener can include a space separating the arms.

In some variants, the orthodontic bracket can include a block extending into the space and between the arms. The block can prevent excessive deflection of the arms.

In some variants, the archform can include interproximal loops on opposing sides of the male fastener.

In some variants, the male fastener can include a tab that can be positioned under the locking pin.

In some variants, the male fastener can include a groove that can interface with a tool for insertion and removal of the male fastener from within a slot of the bracket.

In some variants, a method of coupling an archform to a bracket is disclosed herein. The method can include angling a male fastener of the archform relative to a face of the bracket. The method can include inserting a portion of the male fastener into a slot of the bracket and against a stop disposed on a gingival side of the bracket. The method can include positioning a tab portion of the male fastener onto a locking pin supported by a retainer disposed on an occlusal side of the bracket. The method can include inserting a tool between the locking pin and a groove disposed on the tab of the male fastener. The method can include rotating the tool toward the stop of the bracket such that the locking pin deflects to enable the tab portion of the male fastener to be positioned thereunder.

In some variants, rotating the tool toward the stop of the bracket rotates the male fastener toward the face of the bracket.

In some variants, rotating the tool toward the stop of the bracket applies a force to the groove disposed on the tab to deflect arms of the male fastener.

In some variants, an orthodontic bracket is disclosed herein that can be disposed on a patient's tooth. The orthodontic bracket can include a slot that can receive a male fastener of an archform. The orthodontic bracket can include a stop disposed on a gingival side of the bracket that can prevent movement of the male fastener in the gingival direction. The orthodontic bracket can include a retainer disposed on an occlusal side of the bracket that can prevent movement of the male fastener in the occlusal, mesial, and/or distal directions. The retainer can include a C spring that can deflect to facilitate the male fastener being inserted into or removed from the slot.

In some variants, a central axis of the C spring extends in the mesio-distal direction.

In some variants, an end of the C spring can be fixedly positioned within a slot of the retainer and a free end of the C spring can be free to deflect.

In some variants, the free end of the C spring can retain a tab of the male fastener thereunder.

In some variants, the retainer can include a groove that can provide access to the C spring.

In some variants, bracket can include a face and a protrusion. The protrusion can extend away from the face and can push the male fastener against the free end of the C spring and an overhang of the stop.

In some variants, the male fastener can include arms that can flex under a load.

In some variants, the male fastener can include a space separating the arms.

In some variants, the archform can include interproximal loops on opposing sides of the male fastener.

In some variants, the male fastener can include a groove that can interface with a tool for insertion and removal of the male fastener from within the slot of the bracket.

In some variants, the bracket can include a protrusion that can push the male fastener against a free end of the C spring and an overhang of the stop to reduce sliding between the archform and the bracket.

In some variants, a method of coupling an archform to a bracket is disclosed herein. The method can include angling a male fastener of the archform relative to a face of the bracket. The method can include inserting a portion of the male fastener into a slot of the bracket and against a stop disposed on a gingival side of the bracket. The method can include positioning a tab portion of the male fastener against a portion of a C spring disposed within a retainer on an occlusal side of the bracket. The method can include inserting a tool between a groove disposed on the tab of the male fastener and a groove disposed on the retainer such that the tool is contact the C spring. The method can include pushing the tool toward a surface of the bracket and into the C spring while rotating the tool toward the stop of the bracket such that a free end of the C spring deflects to enable the tab portion of the male fastener to be positioned thereunder.

In some variants, rotating the tool toward the stop of the bracket rotates the male fastener toward the face of the bracket.

In some variants, rotating the tool toward the stop of the bracket applies a force to the groove disposed on the tab to deflect arms of the male fastener.

In some variants, an orthodontic bracket is disclosed herein that can be disposed on a patient's tooth. The orthodontic bracket can include a slot that can receive a male fastener of an archform. The orthodontic bracket can include a retainer that can be disposed on a gingival side of the bracket. The retainer can include a C spring that can deflect to facilitate the male fastener being retained within or removed from the slot. The orthodontic bracket can include a stop disposed on an occlusal side of the bracket that can prevent movement of the male fastener in an occlusal direction.

In some variants, the C spring can be oriented perpendicular to a face of the bracket.

In some variants, the C spring can be within an opening of the retainer that can facilitate flexing of the C spring. The C spring can be retained on a guide.

In some variants, the opening can be oval shaped and can prevent over deflection of the C spring.

In some variants, the C spring can provide a force to the male fastener to secure the male fastener within the slot of the bracket.

In some variants, the stop can include undercuts that can receive portions of the male fastener. The C spring can apply a force to the male fastener to secure the portion of the male fastener within the undercuts.

In some variants, the portions of the male fastener can be wedges.

In some variants, the wedges can be formed by waterjet cutting the male fastener.

In some variants, the male fastener can include angled surfaces and/or recesses that can enable the male fastener to be positioned within the slot at an angle.

In some variants, the male fastener can include a handle that can be gripped by pliers. The handle, if damaged by the pliers, may not negatively affect performance of the archform.

In some variants, the handle can include a hole that can receive a tool for maneuvering the male fastener.

In some variants, the archform can include interproximal loops on opposing sides of the male fastener.

In some variants, portions of the archform that are proximate the male fastener can interface with mesial and distal sides of the bracket.

In some variants, the portions of the archform that are proximate the male fastener can prevent lateral sliding between the male fastener and the archform.

In some variants, a method of coupling an archform to a bracket is disclosed herein. In some variants, the method can include angling a male fastener of the archform relative to a face of the bracket. The method can include inserting a portion of the male fastener into a slot of the bracket and against a C spring disposed within a retainer. The retainer can be positioned on a gingival side of the bracket. The method can include applying a force to the male fastener such that the male fastener pushes against the C spring such that the C spring flexes. The method can include rotating the male fastener toward a face of the bracket. The method can include ceasing to apply a force to the male fastener such that the C spring pushes portions of the male fastener into cut outs in stops disposed on the occlusal side of the bracket such that the male fastener is secured within the bracket.

In some variants, the method can include grasping a handle of the male fastener to manipulate the male fastener.

In some variants, the method can include inserting a tool into a hole within a handle of the male fastener to manipulate the male fastener.

In some variants, an orthodontic archform is disclosed herein. The orthodontic archform can include a plurality of bracket connectors that can connect to respective brackets. The orthodontic archform can include a plurality of interproximal structures in between at least 50% of adjacent pairs of the plurality of bracket connectors. The plurality of interproximal structures can deflect when the bracket connectors are connected to the respective brackets, thus causing orthodontic tooth movement. The bracket connectors can include a plurality of struts joined by a central member and circumscribing a void region. The central member can include a handle element extending away from the central member. The handle element can allow a tool to grip the handle and insert the archform into respective brackets.

In some variants, the handle element can include an aperture.

In some variants, the interproximal structures can include loop(s).

In some variants, the central segment can include a curved surface opposite a surface from which the handle element extends.

In some variants, the handle element can be arch-shaped.

In some variants, at least two of the plurality of interproximal structures can include different geometries.

In some variants, the archform can be formed from a ribbon-shaped material.

In some variants, an orthodontic bracket is disclosed herein that can be disposed on a patient's tooth. The orthodontic bracket can include a channel that can be disposed between a mesial wall and distal wall of the bracket. The orthodontic bracket can include a slot at least partially formed by a stop disposed on a gingival side of the bracket. The channel can guide a male fastener into the slot. The orthodontic bracket can include a deflectable tab disposed on a surface of the bracket. The deflectable tab can interface with one or more surfaces of a male fastener of an archform to secure the male fastener to the archform.

In some variants, the stop can include an overhang that can retain the male fastener within the slot.

In some variants, the stop has recesses and/or angled surfaces that can allow the male fastener to be rotated within the slot during insertion and/or removal.

In some variants, the bracket can have more than one engagement stage such that the male fastener can be retained within the slot at different positions.

In some variants, the deflectable tab can engage with different surfaces of the male fastener to retain the male fastener at varied depths.

In some variants, the male fastener can be retained at varied depths within the slot.

In some variants, a method of coupling an archform to a bracket is disclosed herein. The method can include positioning a male fastener of an archform on the face of a bracket between mesial and distal walls. The method can include advancing the male fastener toward a slot at least partially defined by a stop disposed on a gingival side of the bracket such that a tab disposed on the face of the bracket engages with surfaces of a guiding channel within the male fastener of the archform to engage a holding surface such that the male fastener is securely retained within the slot.

In some variants, the method can include engaging the male fastener with a wedge disposed on an overhang of the slot to secure the male fastener therein to eliminate and/or reduce play between the male fastener and the bracket.

In some variants, the method can include positioning the male fastener at one of a plurality of engagement stages. The clinician selects between the plurality of engagement stages based on desired tooth control.

In some variants, the method can include a method of decoupling an archform from a bracket. In some variants, the method can include inserting a tool into a tool receiving recess disposed on a face of the bracket and moving the tool in a generally occlusal direction through a tool receiving channel of a male fastener of the archform. The tool can be guided to engage with and deflect a tab of the bracket away from a holding surface of the male fastener of the archform such that the male fastener can be moved in an occlusal direction. The tool can engage with a periphery of the tool receiving channel to move the male fastener in the occlusal direction and out of a slot of the bracket.

In some variants, a tool for installing and removing a male fastener of an archform into or from a bracket is disclosed herein. The tool can include a shaft and conical tip that can be disposed on a distal end of the shaft. The shaft and conical tip can apply equal and opposite forces to the male fastener and bracket during installation and removal.

In some variants, an orthodontic bracket assembly is disclosed herein that can be disposed on a patient's tooth. The orthodontic bracket assembly can include a pad that can be bonded to the patient's tooth. The pad can include a pocket that can receive a bracket. The bracket can be coupled to the pad. The bracket can include a slot that can receive a male fastener of an archform. The bracket can include a retainer disposed on a gingival side of the bracket. The retainer can include a C spring that can deflect to facilitate the male fastener being retained within or removed from the slot. The bracket can include one or more stops disposed on an occlusal side of the bracket that can prevent movement of the male fastener in an occlusal direction.

In some variants, the pad can include undercuts that can be disposed on an opposing side of the pad relative to the pocket. The undercuts can facilitate bonding the pad to a tooth of the patient.

In some variants, the pad can include filling material that can be used to laser weld the bracket to the pad.

In some variants, the one or more stops can include ramps that can contact wedges of the male fastener when the male fastener is positioned within the slot of the bracket.

In some variants, the one or more stops can include cutouts that can receive at least a portion of wedges of the male fastener.

In some variants, the pad can include a protrusion that can be inserted through an aperture of the bracket and welded to the bracket.

In some variants, the bracket can include a protrusion disposed on a face of the bracket that can push a male fastener against the retainer to retain the male fastener within the slot of the bracket.

In some variants, the pad can include bumps that are disposed on opposing sides of the pocket that can push the male fastener against the retainer.

In some variants, the pad can include inclined surfaces configured to engage portions of the male fastener to provide rotational control.

In some variants, the pad can angle the bracket such that the male fastener is angled relative to the surface of the patient's tooth with the male fastener retained in the bracket.

In some variants, the male fastener can be angled at ten degrees relative to the surface of the patient's tooth with the male fastener retained in the bracket.

In some variants, the male fastener can be angled at five degrees relative to the surface of the patient's tooth with the male fastener retained in the bracket.

In some variants, the pad can be customized to the patient's tooth and the bracket may not be customized.

In some variants, the archform can include hooks that can interface with elastics.

In some variants, the bracket can include features that can prevent the C spring from deflecting past an elastic limit of the C spring.

In some variants, the C spring can be disposed around a guide that orients the C spring and prevents deflection past the elastic limit.

In some variants, a surface of the bracket can engage with a surface of the male fastener to prevent deflection past the elastic limit of the C spring.

In some variants, a method of treating malocclusion is disclosed herein. The method can include forming pads customized to teeth of a patient. The method can include coupling the customized pads to the teeth of the patient. The method can include coupling one of a plurality of first style brackets to each of the customized pads coupled to lower anterior teeth of the patient. The method can include coupling one of a plurality of second style brackets to the customized pads coupled to other teeth of the patient. The method can include coupling a male fastener of an archform to each of the plurality of first style brackets and each of the plurality of second style brackets.

In some variants, the method can include forming hooks in the archform for use with elastics.

In some variants, coupling a male fastener of the archform to each of the plurality of first style brackets and each of the plurality of second style brackets can include grasping a handle of the male fastener with forceps; positioning a portion of the male fastener opposite the handle against an oval spring of the bracket such that the male fastener is angled relative to the bracket; gripping an occlusal surface of the male fastener and gingival surface of the bracket between forceps; squeezing the forceps to push the male fastener against the oval spring of the bracket such that the oval spring deflects; rotating the male fastener towards the bracket; and/or releasing the forceps to allow the oval spring to push the male fastener against and under stops of the bracket to securely retain the male fastener in the bracket.

In some variants, an orthodontic bracket that can be disposed on a patient's tooth is disclosed herein. The orthodontic bracket can include a slot that can receive a male fastener of an archform. The orthodontic bracket can include a retainer that can be disposed on a gingival side of the bracket. The retainer can include a C spring that can deflect to facilitate the male fastener being retained within or removed from the slot and a protrusion that can engage with an installation tool. The retainer can include one or more stops disposed on an occlusal side of the bracket that can prevent movement of the male fastener in an occlusal direction.

In some variants, the orthodontic bracket can include undercuts that can facilitate bonding the bracket to a tooth of the patient.

In some variants, the one or more stops can include ramps that can contact wedges of the male fastener when the male fastener is positioned within the slot of the bracket.

In some variants, the one or more stops can include cutouts that can receive at least a portion of the male fastener.

In some variants, the bracket can include a protrusion that can be disposed on a face of the bracket that can push a male fastener against the retainer to retain the male fastener within the slot of the bracket.

In some variants, the archform can include interproximal loops configured to interface with elastics.

In some variants, the archform can include a tongue that can be disposed between the one or more stops of the bracket.

In some variants, the archform can include two arms that can engage with mesial and distal sides of the retainer of the bracket.

In some variants, the archform can include curves that can engage with the retainer of the bracket to provide rotational control of the patient's tooth.

In some variants, an archform configured to be disposed around at least a portion of an arch of a patient's mouth is disclosed herein. The archform can include a plurality of male fasteners that can be positioned within brackets disposed on teeth of the patient. The male fastener can include a tongue configured to be disposed between stops of the bracket and two arms disposed on mesial and distal sides of the male fastener and extending in a direction opposite the tongue. The two arms can engage features of the bracket to secure the male fastener relative to the bracket. The archform can include a plurality of interproximal loops. The interproximal loops can be disposed between adjacent male fasteners of the plurality of male fasteners.

In some variants, the archform can include curves disposed on mesial and distal sides of the male fastener.

In some variants, the two arms can each include flanges that can extend inward to engage the features of the bracket.

In some variants, the archform can include one or more symbols disposed on the interproximal loops.

In some variants, the symbols can be letters configured to convey a message.

In some variants, an orthodontic appliance that can be disposed around at least a portion of an arch of a patient's mouth is disclosed herein. In some variants, the orthodontic appliance can include an archform that can include a plurality of male fasteners that can be coupled to respective teeth of the patient and interproximal loops. The interproximal loops can be disposed between adjacent male fasteners. The orthodontic appliance can include a mounting pad that can be disposed between one of the plurality of male fasteners and one of the respective teeth of the patient. The mounting pad can include a first adhesive surface and a second adhesive surface. The first adhesive surface can be adhered to the one of the plurality of male fasteners and the second adhesive surface can be adhered to the one of the respective teeth of the patient such that the male fastener can be coupled to the one of the respective teeth of the patient.

In some variants, the orthodontic appliance can include a protective layer that can be removably disposed on the second adhesive surface to protect the second adhesive surface from contamination before installation of the orthodontic appliance around at least a portion of the arch of the patient's mouth.

In some variants, an adhesive bond between the second adhesive surface of the mounting pad and the one of the respective teeth of the patient can be broken when the mounting pad is pulled.

In some variants, the adhesive bond between the second adhesive surface of the mounting pad and the one of the respective teeth of the patient can be broken when the mounting pad is pulled in a lingual direction.

In some variants, the adhesive bond between the second adhesive surface of the mounting pad and the one of the respective teeth of the patient can be broken when the mounting pad is pulled in a direction parallel to a surface of the one of the respective teeth.

In some variants, a portion of the mounting pad can extend beyond a periphery of the male fastener. The portion being configured to be pulled.

In some variants, the portion of the mounting pad can include a hole that can interface with a tool to facilitate pulling of the mounting pad.

In some variants, the archform can include symbols that can be seen by an observer after installation in the mouth of the patient.

In some variants, the orthodontic appliance can include caps that can be coupled to a labial surface of the teeth of the patient to conceal features of the orthodontic appliance.

In some variants, an adhesive on the second adhesive surface of the mounting pad can include a whitening solution to whiten the teeth of the patient.

In some variants, the caps can be adhered to the labial surface of the teeth with an adhesive. The adhesive can include a whitening solution to whiten the teeth of the patient.

In some variants, the orthodontic appliance can include a soluble tray that can hold the archform in a configuration for installation in the mouth of the patient. The soluble tray can be dissolved after the archform is installed in the mouth of the patient.

In some variants, the archform can be formed based on 3D scans of the patient's mouth. The 3D scans can be performed by a mobile device.

In some variants, a device configured to operatively connect to the mobile device of the user facilitates performing the 3D scan.

In some variants, the archform can become malleable when exposed to temperatures below or above body temperature. Estimated body temperature can be a single temperature or range of temperatures (e.g., upper and lower limits). For example, in some variants, the archform can become malleable at and/or above ninety-nine, one hundred, one hundred and one, or one hundred and two or more degrees Fahrenheit. In some variants, the archform can become malleable at and/or below ninety-seven, ninety-six, or ninety-five or less degrees Fahrenheit.

In some variants, a method of installing an orthodontic appliance configured to be disposed around at least a portion of an arch of a patient's mouth is disclosed herein. The method can include removing a protective layer to expose an adhesive surface of a mounting pad. The mounting pad can be coupled to one of a plurality of male fasteners of an archform. The method can include positioning the adhesive surface against a surface of a tooth of the patient such that the adhesive surface of the mounting pad adheres to the surface of the tooth of the patient.

In some variants, the method can include inserting the archform into the mouth of the patient with the archform in a soluble tray that can hold the archform in a configuration for installation.

In some variants, the method can include flushing the mouth of the patient with a liquid to dissolve the soluble tray.

In some variants, the method can include adhering caps to labial surfaces of teeth of the patient to conceal features of the archform.

In some variants, the method can be performed by the patient.

In some variants, a method of manufacturing an archform is disclosed herein. The method can include performing a 3D scan of a mouth of a patient with a mobile device of the patient. The method can include sending data from the 3D scan of the mouth of the patient to a data center of a designer of orthodontic appliances. The method can include forming an archform based on the data from the 3D scan of the mouth of the patient. The archform can be shaped corresponding to a maloccluded state of teeth of the patient. The archform can move the teeth of the patient from the maloccluded state to another state.

In some variants, the method can include disposing the archform in a soluble tray that can maintain the archform in the shape corresponding to the maloccluded state. The soluble tray can dissolve in a liquid.

In some variants, the method can include adhering a mounting pad to a male fastener of the archform. The mounting pad can include an adhesive surface that can adhere to a surface of the teeth of the patient.

In some variants, the method can include covering the adhesive surface with a removable protective layer.

In some variants, an orthodontic bracket that can be disposed on a patient's tooth is disclosed herein. The orthodontic bracket can have a slot that can receive a connector of an archform such that the connector does not slide in a mesial-distal direction relative to the orthodontic bracket. The orthodontic bracket can have a stop that can be disposed on an occlusal side of the slot that can prevent movement of the connector in at least an occlusal direction. The orthodontic bracket can have a retainer that can be disposed on a gingival side of the slot that can prevent movement of the connector in at least a gingival direction. The retainer can include a spring that that can deflect to facilitate the connector being inserted into or removed from the slot. The spring can apply a force to the connector to lock the connector within the slot of the bracket.

In some variants, the spring is a C spring.

In some variants, the spring can be disposed within an opening of the retainer.

In some variants, the orthodontic bracket can include two stops disposed on the occlusal side of the bracket. The two stops can be separated by a gap. In some variants, the gap can receive a tab of the connector.

In some variants, the orthodontic bracket can include a protrusion that can be disposed on a face of the bracket. The protrusion can push the connector against an overhang of the retainer.

In some variants, the orthodontic bracket can include a ramp that can be disposed on a face of the bracket. The ramp can push the connector against an overhang of the stop.

In some variants, the orthodontic bracket can include a textured surface that can bond to a surface of a tooth.

In some variants, the orthodontic bracket can include lateral wings extending in a mesial-distal directions. The lateral wings can bond to a surface of a tooth to facilitate rotational control.

In some variants, an orthodontic appliance is disclosed herein. The orthodontic appliance can include a plurality of orthodontic brackets. Each orthodontic bracket of the plurality of orthodontic brackets can be disposed on a tooth of the patient. Each orthodontic bracket can include a slot, a stop disposed on an occlusal side of the slot, and/or a retainer disposed on a gingival side of the slot. The retainer can have a spring. The orthodontic appliance can include an archform that can move the patient's teeth from a first position to a second positon. The archform can include a plurality of connectors. Each connector of the plurality of connectors can be placed within the slot between the stop and the retainer of one orthodontic bracket of the plurality of orthodontic brackets such that the spring applies a force against the connector to push the connector against the stop, securing at least a portion of the connector behind the stop and retainer in a locked configuration. The archform can include a plurality of interproximal structures. At least one interproximal structure of the plurality of interproximal structures can be positioned between at least some adjacent connectors of the plurality of connectors. The plurality of connectors do not slide in a mesial-distal direction relative to the plurality of orthodontic brackets when the plurality of connectors are in locked configurations within the slots of the plurality of orthodontic brackets. The plurality of interproximal structures can apply a force to adjacent connectors of the plurality of connectors to move one or more teeth of the patient.

In some variants, the spring is a C spring.

In some variants, the spring is disposed within an opening of the retainer.

In some variants, each orthodontic bracket of the plurality of orthodontic brackets can include two stops disposed on the occlusal side of the bracket. The two stops can be separated by a gap.

In some variants, the gap can receive a tab of one connector of the plurality of connectors.

In some variants, each orthodontic bracket of the plurality of orthodontic brackets can include a protrusion that can be disposed on a face thereof. The protrusion can push the connector received within the slot against an overhang of the retainer.

In some variants, each orthodontic bracket of the plurality of orthodontic brackets can include a ramp that can be disposed on a face thereof. The ramp can push the connector received within the slot against an overhang of the stop.

In some variants, each orthodontic bracket of the plurality of orthodontic brackets can include a textured surface that can bond to a surface of a tooth.

In some variants, at least one orthodontic bracket of the plurality of orthodontic brackets can include lateral wings that can extend in a mesial-distal directions. The lateral wings can bond to a surface of a tooth to facilitate rotational control.

In some variants, at least one connector of the plurality of connectors can include a pair of arms that can grip mesial and distal sides of the retainer.

In some variants, each orthodontic bracket of the plurality of orthodontic brackets can include two stops that can be disposed on the occlusal side of the bracket. The two stops can be separated by a gap. Each connector of the plurality of connectors can include a tab that can be placed within the gap.

In some variants, the tab can include a groove that can contact a tool to facilitate insertion and/or removal of the plurality connectors from the slots of the plurality of orthodontic brackets.

In some variants, a rigidity of the interproximal structures can be greater at distal ends of the archform compared to a central portion.

In some variants, the plurality of interproximal structures can include interproximal loops.

In some variants, the archform can be formed from a sheet of material.

In some variants, opposing sides of the archform can be parallel to each other.

In some variants, a method of coupling an archform to a bracket is disclosed herein. The method can include angling a connector of the archform relative to a face of the bracket. The method can include inserting a portion of the connector into a slot of the bracket and against a C spring disposed within a retainer. The retainer can be positioned on a gingival side of the bracket. The method can include applying a force to the connector such that the connector pushes against the C spring so that the C spring flexes. The method can include rotating the connector toward a face of the bracket. The method can include ceasing to apply a force to the connector such that the C spring pushes portions of the connector against stops of the bracket such that the connector is secured under at least a portion of the stops and the retainer.

In some variants, a method of moving a patient's teeth is disclosed herein. The method can include bonding one or more brackets to a patient's teeth. The method can include coupling a first archform to the one or more brackets. The first archform can have a first plurality of interproximal loops. A first interproximal loop of the plurality of first interproximal loops can have a first width. The method can include decoupling the first archform from the one or more brackets. The method can include coupling a second archform to the one or more brackets. The second archform can have a second plurality of interproximal loops corresponding to the first plurality of interproximal loops. A second interproximal loop of the plurality of second interproximal loops, corresponding to the first interproximal loop, can have a second width that can be greater than the first width.

In some variants, the method can include cutting the first and second archforms from a flat sheet of material.

In some variants, an orthodontic bracket configured to be disposed on a patient's tooth is disclosed herein. The orthodontic bracket can include a slot that can receive a connector of an archform such that the connector does not slide in a mesial-distal direction relative to the orthodontic bracket. The orthodontic bracket can include a stop disposed on a first side of the slot that can prevent movement of the connector in at least a first direction. The orthodontic bracket can include a retainer disposed on a second side of the slot that can prevent movement of the connector in at least a second direction. The retainer can include a spring that can deflect to facilitate the connector being inserted into or removed from the slot. The spring can apply a force to the connector to lock the connector within the slot of the bracket.

In some variants, the spring is a C spring.

In some variants, the spring can be disposed within an opening of the retainer.

In some variants, the bracket can include two stops disposed on the second side of the bracket. The two stops can be separated by a gap.

In some variants, the gap can receive a tab of the connector.

In some variants, the bracket can include a protrusion disposed on a face of the bracket. The protrusion can push the connector against an overhang of the retainer.

In some variants, the bracket can include a ramp that can be disposed on a face of the bracket. The ramp can push the connector against an overhang of the stop.

In some variants, the bracket can include a textured surface that can bond to a surface of a tooth.

In some variants, the bracket can include lateral wings extending in a mesial-distal directions. The lateral wings can bond to a surface of a tooth to facilitate rotational control.

In some variants, an orthodontic appliance is disclosed herein. The orthodontic application can include a plurality of orthodontic brackets. Each orthodontic bracket of the plurality of orthodontic brackets can be disposed on a tooth of the patient. Each orthodontic bracket can include a slot. Each orthodontic bracket can include a stop disposed on a first side of the slot. Each orthodontic bracket can include a retainer disposed on a second side of the slot. The retainer can include a spring. The orthodontic appliance can include an archform that can move the patient's teeth from a first position to a second positon. The archform can include a plurality of connectors. Each connector of the plurality of connectors can be placed within the slot between the stop and the retainer of one orthodontic bracket of the plurality of orthodontic brackets such that the spring applies a force against the connector to push the connector against the stop, securing at least a portion of the connector behind the stop and retainer in a locked configuration. The archform can include a plurality of interproximal structures. At least one interproximal structure of the plurality of interproximal structures can be positioned between at least some adjacent connectors of the plurality of connectors. The plurality of connectors may not slide in a mesial-distal direction relative to the plurality of orthodontic brackets when the plurality of connectors are in locked configurations within the slots of the plurality of orthodontic brackets. The plurality of interproximal structures can apply a force to adjacent connectors of the plurality of connectors to move one or more teeth of the patient.

In some variants, the spring can be a C spring.

In some variants, the spring can be disposed within an opening of the retainer.

In some variants, each orthodontic bracket of the plurality of orthodontic brackets can include two stops that can be disposed on the second side of the bracket. The two stops can be separated by a gap.

In some variants, the gap can receive a tab of one connector of the plurality of connectors.

In some variants, each orthodontic bracket of the plurality of orthodontic brackets can include a protrusion disposed on a face thereof. The protrusion can push the connector received within the slot against an overhang of the retainer.

In some variants, each orthodontic bracket of the plurality of orthodontic brackets can include a ramp that can be disposed on a face thereof. The ramp can push the connector received within the slot against an overhang of the stop.

In some variants, each orthodontic bracket of the plurality of orthodontic brackets can include a textured surface that can bond to a surface of a tooth.

In some variants, at least one orthodontic bracket of the plurality of orthodontic brackets can include lateral wings that can extend in mesial-distal directions. The lateral wings can bond to a surface of a tooth to facilitate rotational control.

In some variants, at least one connector of the plurality of connectors can include a pair of arms configured to grip mesial and distal sides of the retainer.

In some variants, each orthodontic bracket of the plurality of orthodontic brackets can include two stops disposed on the second side of the bracket. The two stops can be separated by a gap. Each connector of the plurality of connectors can include a tab that can be placed within the gap.

In some variants, the tab can include a groove that can contact a tool to facilitate insertion and/or removal of the plurality connectors from the slots of the plurality of orthodontic brackets.

In some variants, a rigidity of the interproximal structures can be greater at distal ends of the archform compared to a central portion.

In some variants, the plurality of interproximal structures can include interproximal loops.

In some variants, the archform can be formed from a sheet of material.

In some variants, opposing sides of the archform are parallel to each other.

In some variants, a method of coupling an archform to a bracket is disclosed herein. The method can include angling a connector of the archform relative to a face of the bracket. The method can include inserting a portion of the connector into a slot of the bracket and against a C spring disposed within a retainer. The retainer can be positioned on a first side of the bracket. The method can include applying a force to the connector such that the connector pushes against the C spring so that the C spring flexes. The method can include rotating the connector toward a face of the bracket. The method can include ceasing to apply a force to the connector such that the C spring pushes portions of the connector against stops of the bracket such that the connector is secured under at least a portion of the stops and the retainer.

In some variants, a method of moving a patient's teeth is disclosed herein. The method can include bonding one or more brackets to a patient's teeth. The method can include coupling a first archform to the one or more brackets. The first archform can have a first plurality of interproximal loops. A first interproximal loop of the plurality of first interproximal loops can have a first width. The method can include decoupling the first archform from the one or more brackets. The method can include coupling a second archform to the one or more brackets. The second archform having a second plurality of interproximal loops corresponding to the first plurality of interproximal loops. A second interproximal loop of the plurality of second interproximal loops, corresponding to the first interproximal loop, can have a second width. The second width can be greater than the first width.

In some variants, the method can include cutting the first and second archforms from a flat sheet of material.

BRIEF DESCRIPTION OF THE DRAWINGS

These drawings are illustrative embodiments and do not present all possible embodiments of this invention. The illustrated embodiments are intended to illustrate, but not to limit, the scope of protection. Various features of the different disclosed embodiments can be combined to form further embodiments, which are part of this disclosure.

FIGS. 2E-2G illustrate views of the archform and bracket of FIG. 2A being coupled together with a tool.
FIGS. 2H and 2I illustrate views of the archform and bracket of FIG. 2A being decoupled with the tool.
FIGS. 3A and 3B illustrate an archform retained within a bracket.
FIG. 4 illustrates an archform retained within a bracket.
FIG. 6A illustrates an archform with a bracket.
FIG. 6B illustrates the archform coupled within the bracket of 6A.
FIGS. 6C and 6D illustrate sectioned views of 6B.
FIG. 6E illustrates a tool flexing a spring within the bracket of 6A.
FIG. 8D illustrates the bracket of FIG. 8A.
FIGS. 10B and 10C illustrate the multi-part bracket of FIG. 10A with a male fastener of an archform placed therein.
FIG. 13E illustrates an archform with customized features.
FIG. 15C illustrates a soluble tray that can be used to apply an archform to teeth of a patient.

FIG. 23D illustrates the male connector within the slot of the bracket.

DETAILED DESCRIPTION

Malocclusion of the teeth may be treated using orthodontic brackets and archforms. The edgewise appliance is the traditional orthodontic bracket that includes a rectangular slot that a round, square, or rectangular straight-wire segment can be inserted into. The edgewise appliance traditionally holds the straight archwire in the slot with an elastomeric or steel tie. This process of tying the archwire into each bracket can be a time-consuming procedure, especially for lingual braces.

The edgewise appliance uses sliding mechanics between the orthodontic bracket and archwire for orthodontic tooth movement. A downside of the use of sliding mechanics in some cases is that friction occurs between the bracket and archwire. The amount of friction is often unpredictable and must be overcome for tooth movement to occur. Because of the variability in the amount of friction, errors in tooth movement may occur leading to more appointments required to finish orthodontic treatment.

Friction-free mechanics, which solve the issue of friction in tooth movement, have been developed using an orthodontic bracket with a snap-fitted, non-sliding archwire. These snap-fitted connections, however, in some cases can be difficult to connect, unreliable, vary from tooth to tooth within a patient's mouth, and even permit sliding, which can impair the performance of the archwire. Disclosed herein are improved archform and bracket solutions.

Figure 1B:
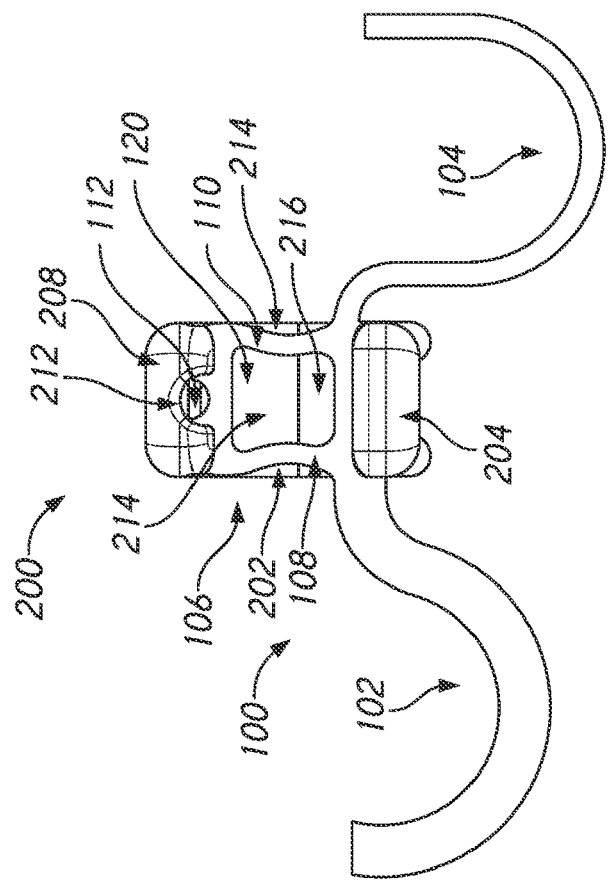
FIG. 1B illustrates another view of the archform and bracket of FIG. 1A.
Figure 1A:
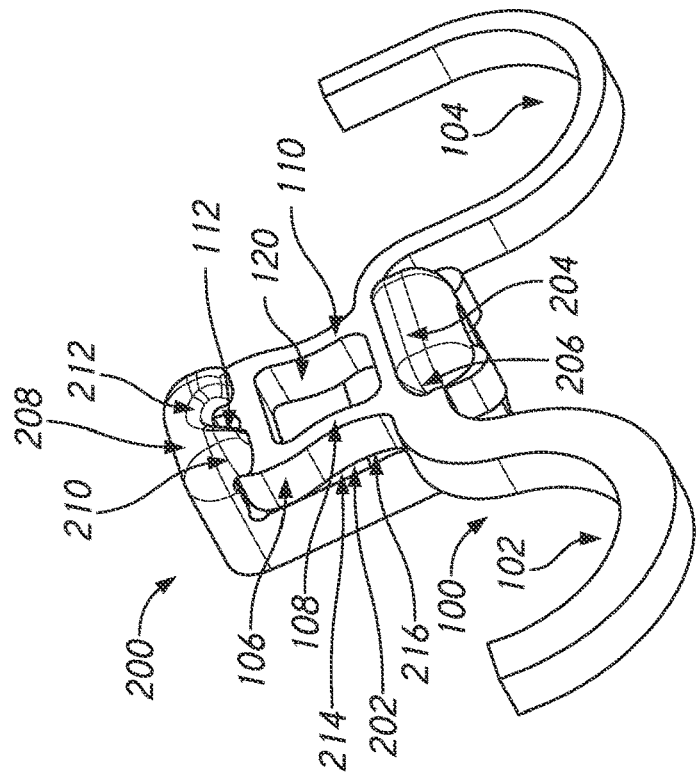
FIG. 1A illustrates an archform retained within a bracket.

FIGS. 1A and 1B illustrates an orthodontic bracket and archform system that uses friction-free mechanics. FIG. 1A illustrates an archform 100, which can also be referred to as an archwire, retained in a bracket 200. Specifically, a male fastener 106, which can also be referred to as a male connector, connector, fastener, or male structure, of the archform 100 can be retained within a slot 202 of the bracket 200. The archform could include a wire with a circular, oval, rectangular, square, or other cross-section, or combinations of the foregoing. Optionally, the archform can include a constant or variable dimension, such as a width and/or thickness for example. Optionally, the archform can be made from a sheet of material, such as a shape memory material, and laser-cut, waterjet cut, or otherwise derived from the sheet of material.

The archform 100 can have a plurality of interproximal structures, e.g., loops 102, 104. The interproximal structures could include incomplete loops that do not form a full circle. The interproximal structures could also include V shaped or other structures with a vertex that do not necessarily include an arcuate surface. The interproximal structures can also include complex 3D structures that traverse multiple planes. The interproximal loops 102, 104 can be varying sizes and configurations. The interproximal loops 102, 104 can be bends in the archform 100. For example, the interproximal loop 102 can be wider (e.g., in the occlusal-gingival direction) than the interproximal loop 104, which can result in the interproximal loop 102 exerting larger forces on a patient's teeth than the interproximal loop 104. Optionally, the interproximal loop 102 can be the same thickness (e.g., in the lingual-buccal direction) as the interproximal loop 104 while being different widths. Optionally, a single interproximal loop 102, 104 is disposed between adjacent male fasteners 106. Optionally, one or more interproximal loops 102, 104 are disposed between adjacent male fasteners 106. Optionally, one, two, or more interproximal loops 102, 104 and/or straight segments are disposed between male fasteners 106. Optionally, the interproximal loops 102, 104 can have the same or differing curvatures, extend in the gingival and/or occlusal direction, and/or extend to differing lengths in the gingival and/or occlusal directions. Optionally, interproximal structures are present in between each and every male fastener and/or tooth. Optionally, interproximal structures are present in between a majority of adjacent male fasteners but not all adjacent male fasteners, such as about, at least about, or no more than about 50%, 60%, 70%, 80%, 90%, 95%, or more or less of the adjacent male fasteners, or ranges including any two of the foregoing values.

The archform 100 can include a male fastener 106. The junctions between the male fastener 106 and the interproximal structures, e.g., loops 102, 104 can be curved, which can help to reduce stress concentrators that could lead to cracking, breaking, etc. The male fastener 106 can, optionally, be the same thickness (e.g., in the lingual-buccal direction) as the interproximal loops 102, 104. This can advantageously enable the interproximal loops 102, 104 and male fastener 106 to be cut from material having a uniform thickness (e.g., flat ribbon) during the fabrication process. Optionally, the male fastener 106 can have a different thicknesses (e.g., in the lingual-buccal direction) as the interproximal loops 102, 104. Optionally, the male fastener 106 can be positioned between interproximal loops 102, 104.

The male fastener 106 can include arms 108, 110. The arms 108, 110 can flex to allow the male fastener 106 to be locked within the bracket 200. For example, the arms 108, 110 can flex under a compressive load to temporarily reduce the length of the male fastener 106. This can advantageously enable the male fastener 106 to be positioned and retained within the slot 202 of the bracket 200, which is described in more detail herein. The arms 108, 110 can be curved inward (e.g., curved toward a central plane of the male fastener 106) such that the arms 108, 110 deflect inward when the male fastener 106 is under a compressive load. The arms 108, 110 can be the same size and/or configuration such that the arms 108, 110 flex (e.g., deflect) to substantially the same amount when under the same load. An opening 120 (e.g., void, space, aperture) can be disposed through the male fastener 106. The opening 120 can be disposed between the arms 108, 110. The arms 108, 110 can flex into the opening 120 when under a compressive load. Optionally, the void is entirely circumscribed along its periphery by the arms 108, 110 and other features of the archform 100. Optionally, the surface area or volume of the void is about or at least about 30%, 40%, 50%, 60%, 70%, 80%, 90%, or more or less of the entire surface area or volume of each male fastener component, or ranges including any two of the foregoing values.

The male fastener 106 can have a groove 112. The groove 112 (e.g., tool receptacle, tool receiver, opening, tool interface) can be configured to engage a tool. The tool can engage with the groove 112 to apply a force to the male fastener 106 such that the arms 108, 110 flex such that the male fastener 106 can be inserted into or removed from the slot 202 of the bracket 200, as described in more detail herein. The groove 112 can be disposed on an end of the male fastener 106. Optionally, the groove 112 can be disposed on the occlusal side of the male fastener 106. The groove 112 can be centered on a central plane of the male fastener 106.

The archform 100 can be made from nickel titanium, stainless steel, titanium-molybdenum alloy, shape memory alloy, super elastic metals, and/or other suitable alloys, or combinations thereof. The archform 100 can be cut, e.g., laser cut, waterjet cut, etc. from a flat ribbon, sheet of material, or the like.

The bracket 200 can have a stop 204. The stop 204 can be disposed on an end of the bracket 200. Specifically, optionally, the stop 204 can be positioned on the gingival side of the bracket 200. The stop 204 can define a portion of the slot 202. The stop 204 can have an overhang 206 that retains the male fastener 106 within the slot 202 of the bracket 200. The stop 204, and/or other features disclosed herein, can have curved surfaces that help to alleviate tongue irritation.

The bracket 200 can have a retainer 208. The retainer 208 can be disposed on an end of the bracket 200. Specifically, optionally, the retainer 208 can be positioned on the occlusal side of the bracket 200. The retainer 208 can be positioned on an opposing end of the bracket 200 that is opposite the stop 204. The retainer 208 can define a portion of the slot 202. The retainer 208 can have an overhang 210 that retains the male fastener 106 within the slot of the bracket 200. The retainer 208 can have curved surfaces that help to alleviate tongue irritation.

The retainer 208 can have a groove 212. The groove 212 can assist in placing the male fastener 106 within the slot 202 of the bracket 200 and removing the male fastener 106 therefrom. Specifically, the groove 212 can engage with a tool that is used to impart a force on the male fastener 106 to flex the arms 108, 110 when placing the male fastener 106 in the slot 202 of the bracket 200 or removing the male fastener 106 therefrom. Optionally, the groove 212 can properly position and retain (e.g., help to prevent sliding) the tool for applying a force to the male fastener 106. Optionally, the groove 212 can act as the fulcrum for the tool as the tool applies a force to the male fastener 106 during insertion or removal. A face 214 of the bracket 200, the retainer 208, and/or the stop 204 can cooperate to define the slot 202 of the bracket 200 that is configured to receive the male fastener 106. The groove 212 can curve in an opposite direction relative to the groove 112. The groove 212 can allow a tool to reach the groove 112 when the male fastener 106 is retained within the slot 202 of the bracket. The groove 212 can be centered on a central plane of the bracket 200.

During insertion, an end of the male fastener 106 opposite the groove 112 can be placed against the stop 204 and/or under the overhang 206 such that the male fastener 106 is angled relative to the face 214 of the bracket 200. A tool, such as the tools disclosed elsewhere herein, can engage the groove 212 and groove 112 and be rotated in the direction of the stop 204, pushing (e.g., compressing) the male fastener 106 against the stop 204 while rotating the male fastener 106 toward the face 214 of the bracket 200 such that the groove 112 slides along the tool and toward the bracket 200. The force applied to the male fastener 106 can cause the arms 108, 110 to flex such that the male fastener 106 is maneuvered around the retainer 208. The tool can be removed such that the arms 108, 110 deflect (e.g., spring) back into an uncompressed configuration, locking the male fastener 106 under the overhangs 210, 206. The protrusion 216, described below, can push the male fastener 106 against the overhangs 206, 210. Optionally, the protrusion 216 can cause the male fastener 106 to flex against the overhangs 206, 110.

The bracket 200 can have a protrusion (e.g., bump) 216. The protrusion 216 can be positioned on and extend from the face 214 of the bracket 200. The protrusion 216 can be rounded. The protrusion 216 can push the male fastener 106 against the overhangs 206, 210 to prevent sliding between the archform 100 (e.g., male fastener 106) and the bracket 200. Optionally, the protrusion 216 can cause the male fastener 106 to flex against the overhands 206, 210 when the male fastener 106 is positioned within the slot 202 of the bracket 200. Optionally, the protrusion 216 can extend across the entire or a portion of the face 214 of the bracket 200 in the mesio-distal direction. Optionally, the protrusion 216 can be positioned between the stop 204 and the retainer 208.

During removal, the tool can be inserted through the groove 212 and into the groove 112. The tool can be rotated away from the stop 204, with the groove 212 acting as the fulcrum, such that the tool applies a force to the groove 112 that flexes the arms 108, 110 and rotates the end of the male fastener 106 with the groove 112 away from the face 214 of the bracket 200 such that the groove 112 slides along the tool away from the bracket 200. The flexing of the arms 108, 110 can allow the male fastener 106 to be moved out from under the retainer 208 such that the end of the male fastener 106 with the groove 112 is free from the slot 202 of the bracket 200. The male fastener 106 can then be entirely removed from the slot 202 of the bracket 200.

Figure 2A:
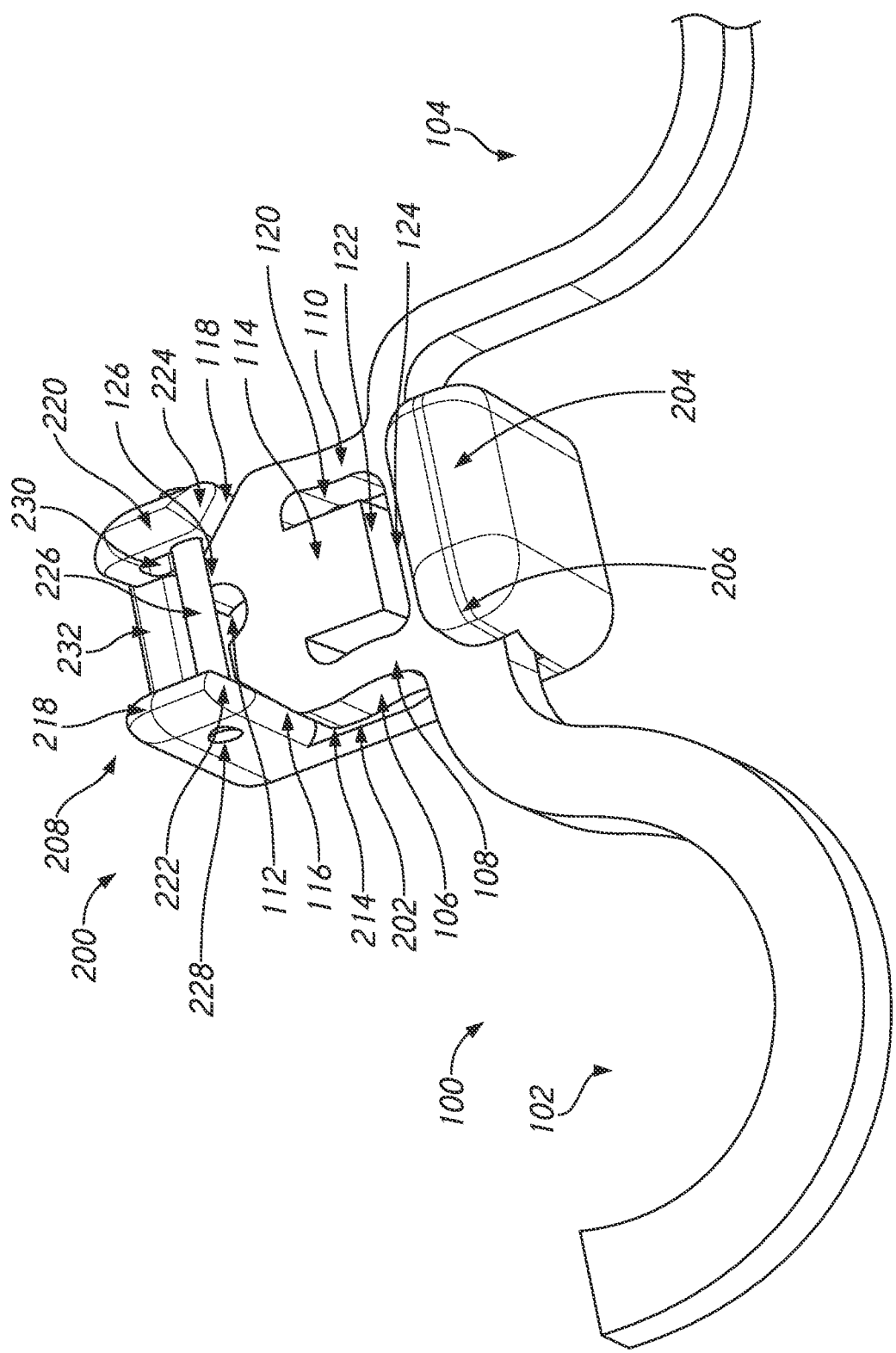
FIG. 2A illustrates an archform retained within a bracket.

FIGS. 2A-2I illustrate an orthodontic bracket and archform system that uses friction-free mechanics. FIG. 2A illustrates an archform 100 retained in a bracket 200. Specifically, a male fastener 106 of the archform 100 is retained under a locking pin 226 and within a slot 202 of the bracket 200.

The archform 100 can have a plurality of interproximal structures, e.g., loops 102, 104. The archform 100 can have a male fastener 106. The male fastener 106 can include arms 108, 110. The arms 108, 110 can flex to allow the male fastener 106 to be locked (e.g., retained) within the bracket 200. The male fastener 106 can have an opening 120. The opening 120 can be disposed between the arms 108, 110.

The male fastener 106 can have a block 114 (e.g., stopper). The block 114 can be disposed between the arms 108, 110. The block 114 can extend into the opening 120. The block 114 can extend from one side of the periphery of the opening 120 to proximate another side 124 (e.g., surface) of the periphery of the opening 120. Optionally, the block 114 can extend from the occlusal side of the periphery of the opening 120 to proximate, but offset from, the gingival-side surface 124 of the periphery of the opening 120. As illustrated in FIG. 2A, a gap 122 can space apart the block 114 from the surface 124 that forms a portion of the periphery of the opening 120 (e.g., the gingival side of the periphery of the opening 120). As the arms 108, 110 flex under a compressive force, the block 114 can move closer to the surface 124, shrinking the gap 122. The block 114 can prevent the male fastener 106 from being compressed excessively. For example, the block 114 can move toward and ultimately contact the surface 124 to prevent further flexing of the arms 108, 110. Optionally, the arms 108, 110 can flex inward and ultimately contact the block 114 to prevent further flexing of the arms 108, 110.

The male fastener 106 can have engagement surfaces 116, 118. The engagement surfaces 116, 118 can engage with retaining surfaces 222, 224 of the bracket 200, described in more detail elsewhere herein. The engagement surfaces 116, 118 can help to prevent sliding (e.g., reduce or eliminate slop, etc.) between the archform 100 and the bracket 200. The engagement surfaces 116, 118 can help to prevent lateral movement of the male fastener 106 in the mesio-distal direction. The engagement surfaces 116, 118 can be angled relative to a central plane of the male fastener 106. The engagement surfaces 116, 118 can be the same, which can include the same size, angle, etc.

The male fastener 106 can have a groove 112. The groove 112 (e.g., tool receptacle, tool receiver, opening, tool interface) can be configured to receive a tool. The groove 112 can be disposed in a tab 126 (e.g., flange) that can be positioned under the locking pin 226 to retain the male fastener 106 within the bracket 200. The engagement surfaces 116, 118 can form a portion of the tab 126. The tool can engage with the groove 112 to apply a force to the male fastener 106 such that the arms 108, 110 flex such that the male fastener 106 can be inserted into or removed from the slot 202 of the bracket 200, as described in more detail herein. The groove 112 can be disposed on an end of the male fastener 106. The groove 112 can be disposed on the tab 126. Optionally, the groove 112 can be disposed on the occlusal side of the male fastener 106. The groove 112 can be centered on a central plane of the male fastener 106.

The bracket 200 can have a stop 204. The stop 204 can have an overhang 206. The overhang 206, as clearly shown in FIG. 2C, can define an upper surface of the slot 202 of the bracket 200 that receives the male fastener 106. The overhang 206 can have a chamfer 238 (e.g., angled surface). The chamfer 238 can enable (e.g., facilitate) the male fastener 106 to rotate out of or into the slot 202 of the bracket 200 without being prohibited by the overhang 206. Similarly, the stop 204 can have a recess 240 (e.g., undercut), as detailed elsewhere herein. The recess 240 can enable (e.g., facilitate) the male fastener 106 to rotate out of or into the slot 202 of the bracket 200 without being prohibited by the stop 206, as detailed elsewhere herein.

Returning to FIGS. 2A and 2B, the bracket 200 can have a retainer 208. The retainer 208 can be disposed on an end of the bracket 200. Specifically, optionally, the retainer 208 can be positioned on the occlusal side of the bracket 200. The retainer 208 can be positioned on an end of the bracket 200 that is opposite the stop 204. The retainer 208 can define a portion of the slot 202. The retainer 208 can have curved surfaces to alleviate tongue irritation.

The retainer 208 can have walls 218, 220. The walls 218, 220 can be positioned on the mesial and distal sides of the bracket 200. The walls 218, 220 can be spaced apart from each other with a wall 232 extending therebetween. The wall 232 can be perpendicularly oriented relative to the walls 218, 220. The wall 232 can help to prevent adhesive from entering the slot 202 of the bracket 200. The wall 232 can be disposed on an end of the bracket 200. The wall 232, optionally, can be disposed on the occlusal end of the bracket 200. The walls 218, 220 can be parallel to each other.

The walls 218, 220 can, respectively, have retaining surfaces 222, 224, as clearly shown in FIG. 2A. As provided elsewhere herein, the retaining surfaces 222, 224 can engage with the engagement surfaces 116, 118. The retaining surfaces 222, 224 can be disposed on interior sides of the walls 218, 220. The retaining surfaces 222, 224 can be disposed on and/or proximate ends of the walls 218, 220.

The wall 218 can have an aperture 228. The aperture 228 can be sized and configured to receive an end of a locking pin 226 (e.g., rod, bar). Optionally, the aperture 228 can be sized and configured to fixedly receive the locking pin 226. Optionally, the locking pin 226 is staked (e.g., press-fit, friction fit, etc.) into the aperture 228 such that the locking pin 226 is substantially fixed therein.

The wall 220 can have an aperture 230. The aperture 230 can be sized and configured to moveably receive the locking pin 226. As clearly illustrated in FIG. 2B, the aperture 230 can have a locking portion 234 (e.g., detent, recess) and enlarged portion 236. Optionally, the enlarged portion 236 can be closer to the occlusal end of the bracket 200 than the locking portion 234. The enlarged portion 236 can allow the locking pin 226 to deflect while still being retained within the aperture 230 during insertion and removal of the male fastener 106 from the slot 202 of the bracket 200. The locking portion 234 can receive the locking pin 226 when the locking pin 226 is not being deflected during insertion and removal of the male fastener 106. The locking portion 234 can retain the locking pin 226 when the male fastener 106 is disposed in the slot 202 of the bracket 200. The locking portion 234 can prevent the inadvertent deflection of the locking pin 226 during teeth brushing, etc., which could cause the inadvertent removal of the male fastener 106 from the slot 202 of the bracket 200.

The locking pin 226 can retain the male fastener 106 within the slot 202 of the bracket 200. The locking pin 226 can extend between the walls 218, 220. An end of the locking pin 226 can be fixedly disposed within the aperture 228, while an opposing end of the locking pin 226 can be moveably disposed within the aperture 230. The locking pin 226 can deflect (e.g., flex) when a tool applies a force thereto. The end of the locking pin 226 can be fixed within the aperture 228 while the end of the locking pin 226 within the aperture 230 can move due to deflection of the locking pin 226. Specifically, the locking pin 226 can deflect from the locking portion 234 to the enlarged portion 236, allowing the male fastener 106 to be inserted into or removed from the slot 202 of the bracket 200. Optionally, the end of the locking pin 226 within the aperture 230 is deflected up by the male fastener 106 and into the locking portion 234 of the aperture 230 when the male fastener 106 is retained within the slot 202 of the bracket 200.

The bracket 200 can have a protrusion 216 (e.g., bump). The protrusion 216 can be rounded. The protrusion 216 can extend from mesial to distal sides of the bracket 200. The protrusion 216 can extend from the face 214. The protrusion 216, as clearly shown in FIG. 2C, can be positioned between the retainer 208 and the stop 204. A portion of the protrusion 216 can be disposed under the overhang 206. The protrusion 216 can push the male fastener 106 into the overhang 206 and the locking pin 226 such that the male fastener 106 is securely retained within the slot 202 of the bracket 200, which can reduce and/or eliminate sliding between the archform 100 (e.g., male fastener 106) and the bracket 200.

Figure 2B:
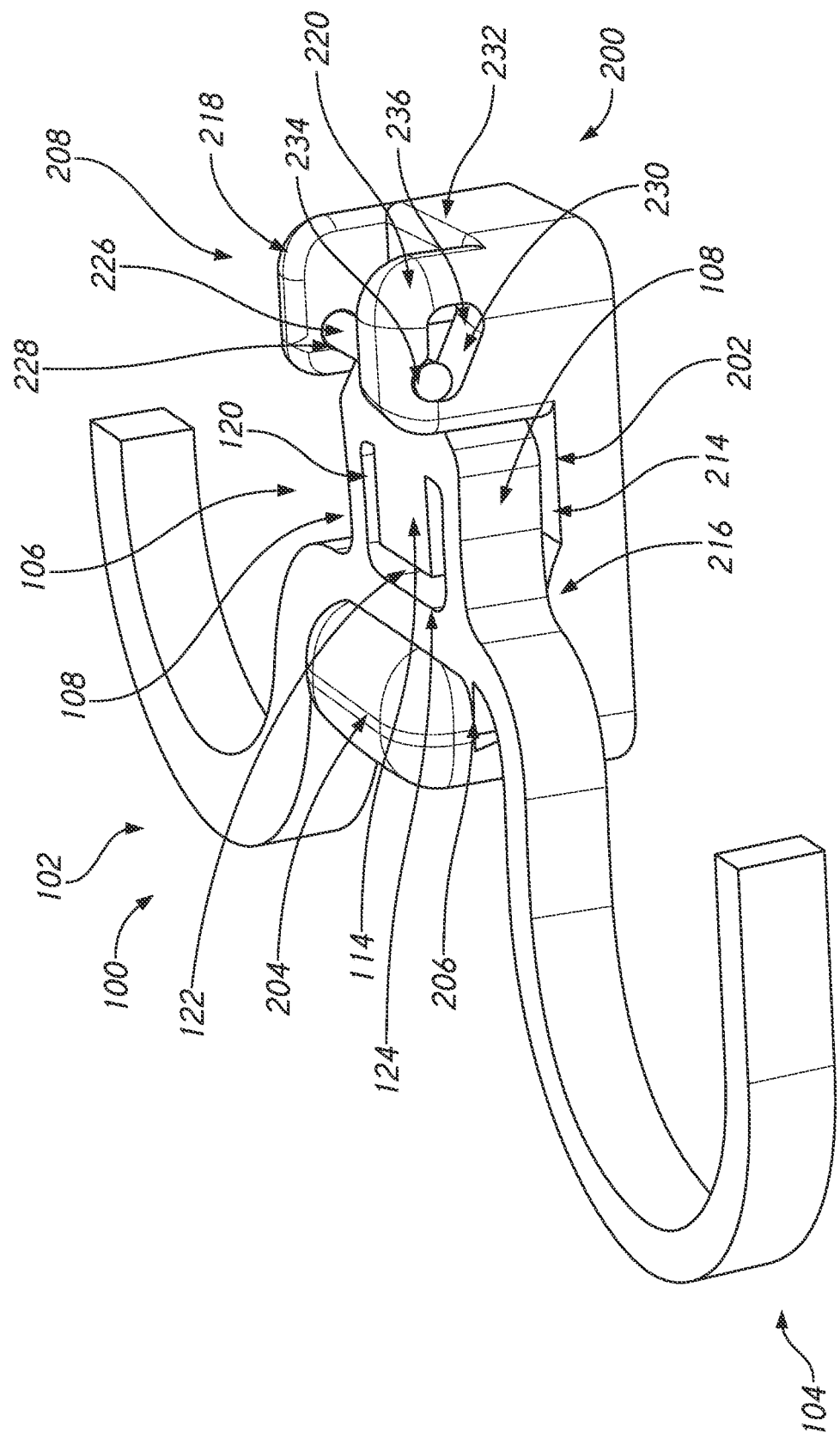
FIG. 2B illustrates another view of the archform and bracket of FIG. 2A.
Figure 2D:
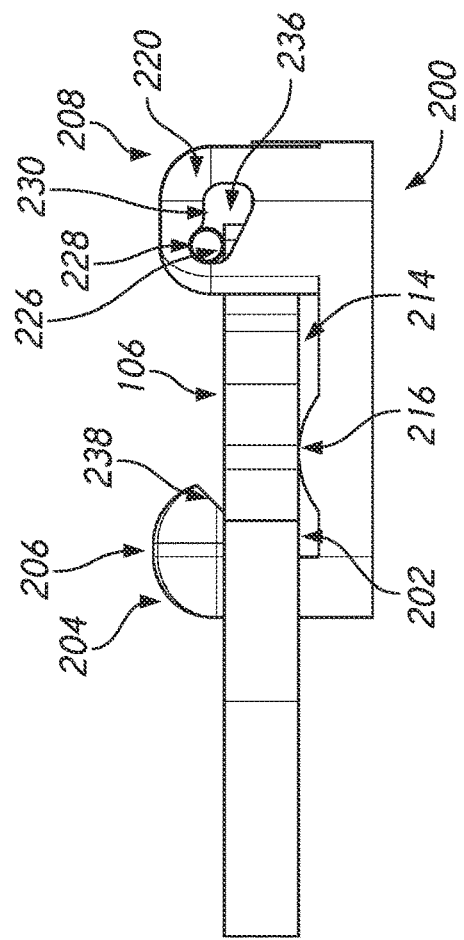
FIG. 2D illustrates a side view of the archform and bracket of FIG. 2A.
Figure 2C:
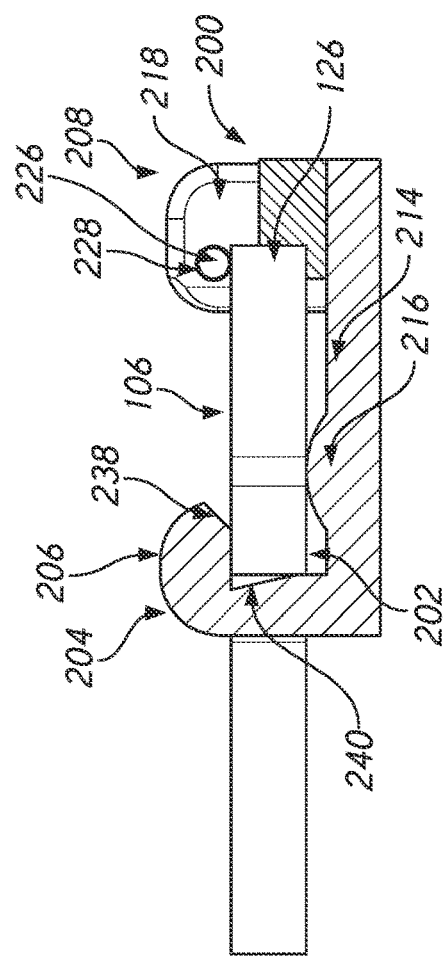
FIG. 2C illustrates a sectioned view of the archform and bracket of FIG. 2A.
Figure 2F:
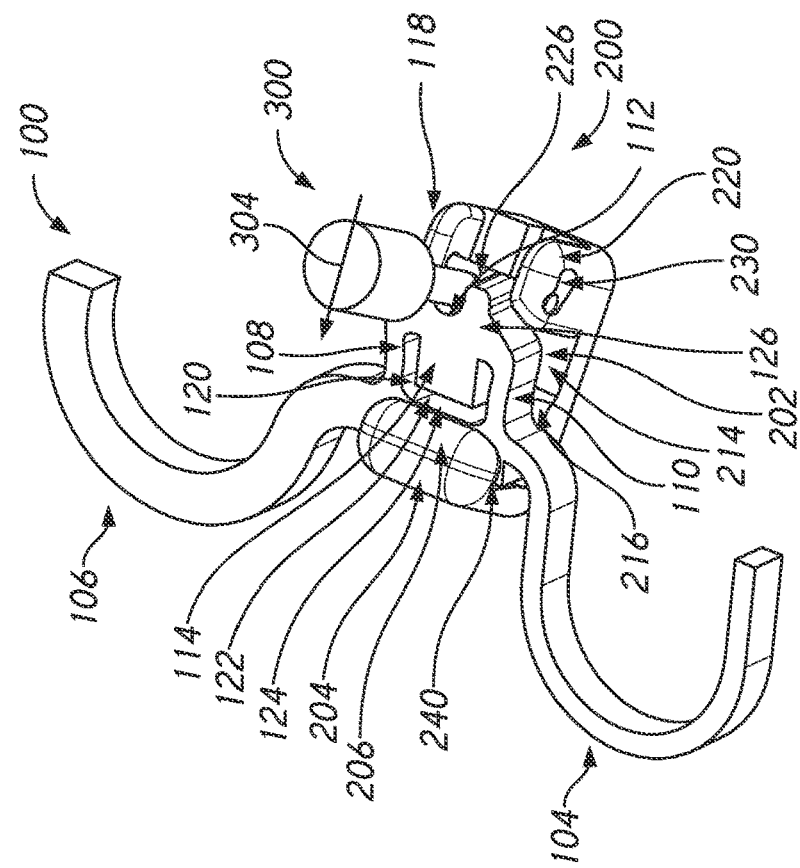
Figure 2E:
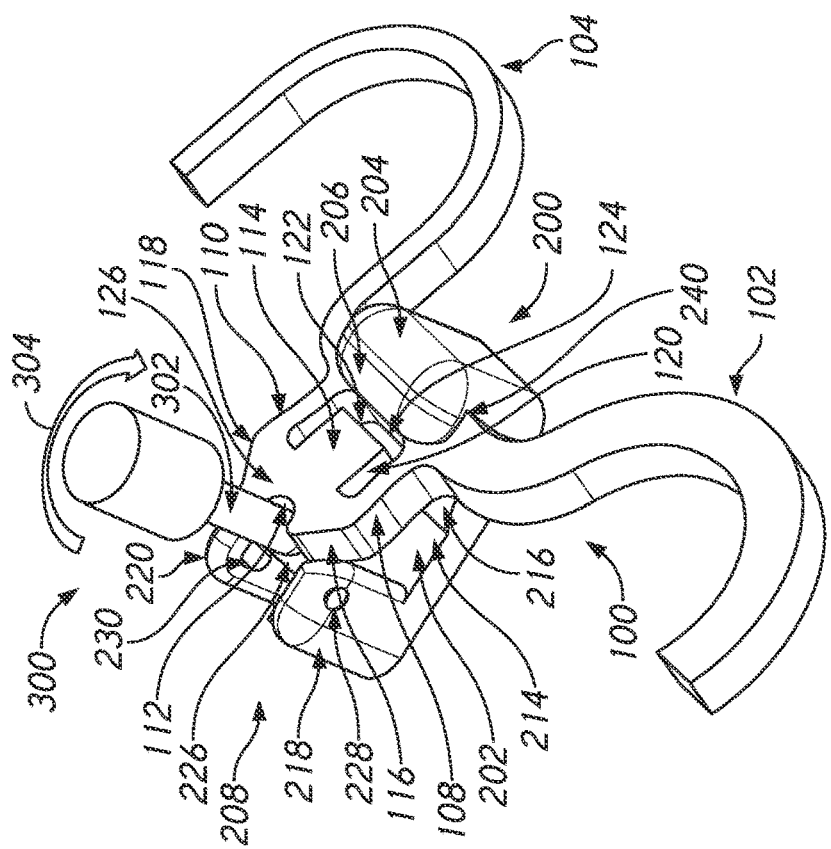

During insertion, an end of the male fastener 106 opposite the groove 112 and/or tab 126 can be placed against the stop 204 and/or under the overhang 206 such that the male fastener 106 is angled relative to the face 214 of the bracket 200, as illustrated in FIGS. 2E and 2F. A tool 300 (e.g., explorer tool, explorer) can be inserted between the locking pin 226 and the groove 112. Specifically, a tip 306 (e.g., pointed tip, conical tip) on a distal end of a shaft portion 302 can be inserted between the locking pin 226 and the groove 112. The tool 300 can be rotated in a first direction 304 (e.g., toward the retainer 204, toward the male fastener 106), deflecting the locking pin 226 into the enlarged portion 236 of the aperture 230 and rotating the portion of the male fastener 106 with the groove 112 under the locking pin 226 and into the slot 202, as shown in FIG. 2G. The tool 300 can be removed from between the locking pin 226 and the groove 112, allowing the locking pin 226 to flex into the locking portion 234 of the aperture 230, as shown in FIG. 2B. The male fastener 106 can be pushed by the protrusion 216 into the overhang 206 and the locking pin 226, helping to reduce and/or eliminate sliding (e.g., slop) between the archform 100 and the bracket 200. The engagement surfaces 116, 118 of the male fastener 106 can engage the retaining surfaces 222, 224 of the retainer 208 of the bracket 200, helping to reduce and/or eliminate sliding (e.g., slop) between the archform 100 and the bracket 200. The tool 300 can apply equal and opposite forces against one or more component(s) of the bracket 200 and/or male fastener 106 (or the bracket itself) during installation and removal. Equal and opposite forces can be important to reduce discomfort to the patient when inserting or removing the male fastener 106 from the bracket 200. For example, the tool 300 can apply equal forces to the locking pin 126 and groove 112 during installation or removal.

During removal, the tool 300 can be inserted between the locking pin 226 and the groove 112, as shown in FIGS. 2H and 2I. Specifically, a downward force 310 can be applied to the tool 300 with the tip 306 of the shaft portion 302 between the locking pin 226 and the groove 112. The tool 300 can be rotated in a second direction 308, deflecting the locking pin 126 into the enlarged portion 236 of the aperture 230 and rotating the portion of the male fastener 106 with the groove 112 and/or tab 126 away from the face 214 of the bracket 200 and out from under the locking pin 126. The male fastener 106 can then be removed from under the overhang 206 of the stop 204.

Figure 3A:
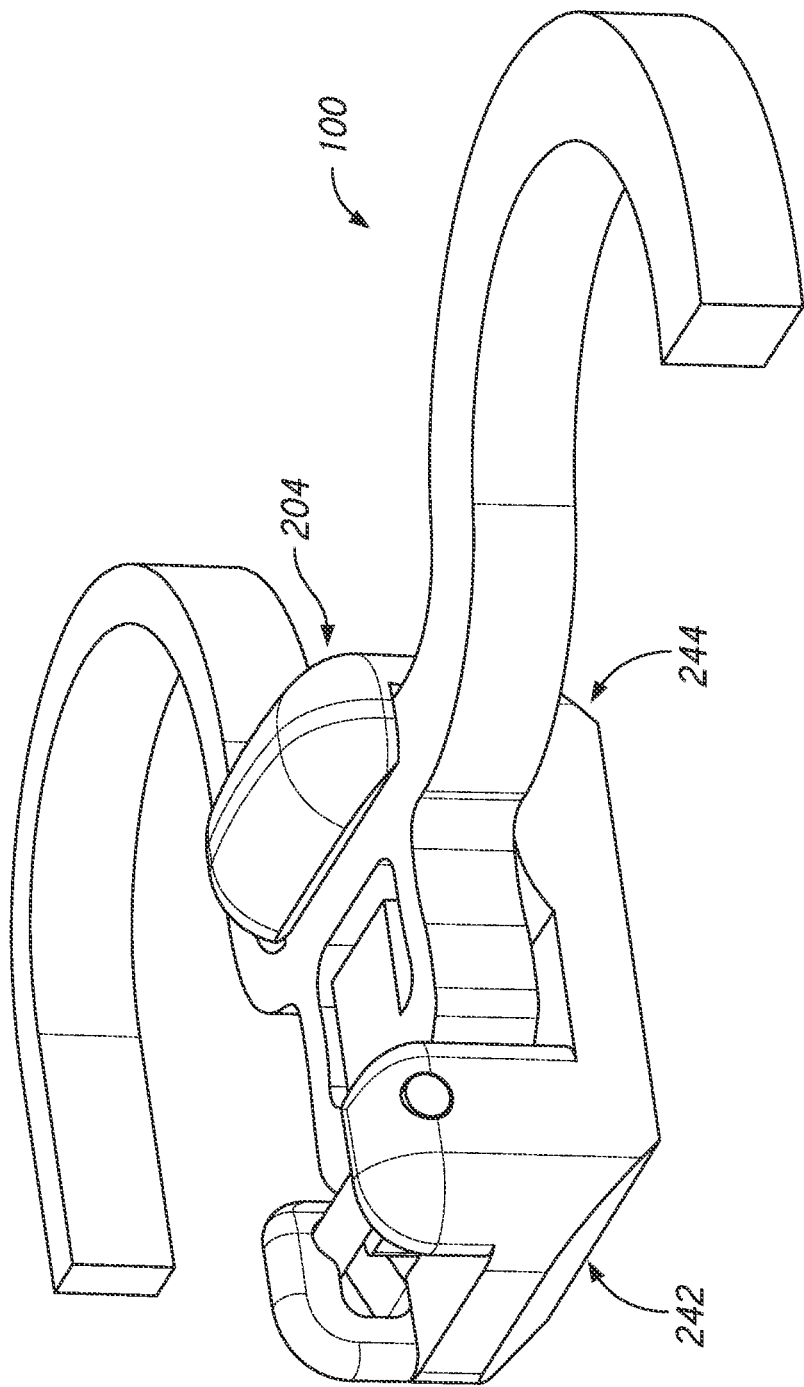

FIGS. 3A and 3B illustrate an orthodontic bracket and archform system that uses friction-free mechanics. As shown in FIGS. 3A and 3B, the bracket 200 can have grip surfaces 242, 244 (e.g., purchase points). The grip surfaces 242, 244 can be gripped by a tool, such as pliers, debonding pliers, and/or lingual debonding pliers, for handling. The grip surfaces 242, 244 can be gripped by a tool to remove the bracket 200 from being bonded to a patient's teeth. The grip surfaces 242, 244 can be gripped by a tool to position the bracket 200 onto the lingual or labial side of a patient's teeth for bonding. The grip surfaces 242, 244 can be positioned on opposing ends of the bracket 200. Optionally, the grip surface 242 can be positioned on the occlusal side of the bracket 200 and the grip surface 244 can be positioned on the gingival side of the bracket 200. The grip surfaces 242, 244 can be angled relative to each other. The grip surfaces 242, 244 can be proximate the retainer 208 and stop 204, respectively. The grip surfaces 242, 244 can be angled relative to a central plane of the bracket 200. The grip surfaces 242, 244 can be angled relative to a back surface 246 of the bracket 200, as shown in FIG. 3B. The back surface 246 of the bracket can be bonded to a patient's tooth, such as the lingual or labial side of the patient's tooth. A distance 248 can extend between the back surface 246 and the face 214 of the bracket 200.

FIG. 4 illustrates an orthodontic bracket and archform system that uses friction-free mechanics. As shown in FIG. 4, the bracket 200 has walls 250. The walls 250 can be positioned on the mesial and distal sides of the bracket 200. The walls 250 can help prevent adhesion intrusion onto the face 214 and/or into the slot 202 of the bracket 200. The walls 250 can help prevent sliding between the archform 100 (e.g., male fastener 106) and the bracket 200. The walls 250 can be part of the retainer 208 and/or walls 218, 220. Optionally, a cover (e.g., roof, top) can extend over the locking pin 226 to prevent unintentional contact (e.g., misuse) with the tool and/or prevent the intrusion of adhesive.

The portion of the bracket 200 with the stop 204 can be raised, as shown in FIG. 4, which can help prevent adhesive intrusion into the slot 202. Optionally, the gingival end of the bracket 200 can be raised. The face 214 can be angled relative to the back surface 246 such that a distance 248 between the face 214 and the back surface 246 is greater closer to the stop 200 (e.g., closer to the gingival side) than the retainer 208 (e.g., occlusal side).

Figure 5:
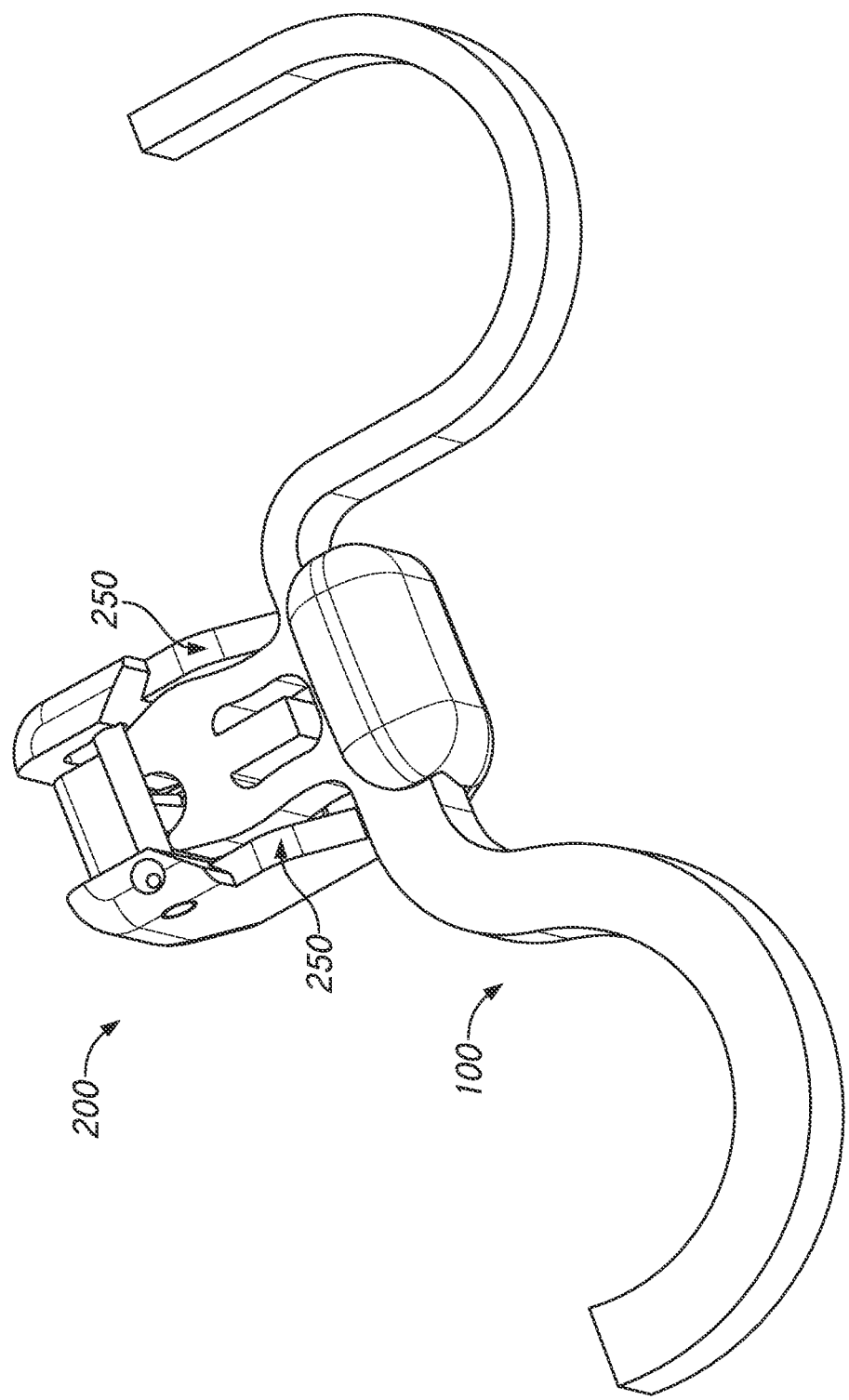
FIG. 5 illustrates an archform retained within a bracket.

FIG. 5 illustrates an orthodontic bracket and archform system that uses friction-free mechanics. As shown in FIG. 5, the bracket 200 has walls 250, as described above, that can prevent adhesive instruction. The walls 250 can also help to prevent the male fastener 106 and/or archform 100 from sliding in the bracket 200. The bracket 200, illustrated in FIG. 5, can be narrower in the mesio-distal direction than some other brackets shown herein, which can accommodate teeth of different dimensions.

6A-6E illustrate an orthodontic bracket and archform system that uses friction-free mechanics. As shown in FIG. 6A, the bracket 200 has a retainer 208. Optionally, the retainer 208 can be positioned on the occlusal side of the bracket 200. The retainer 208 releasably retains the male fastener 106 of the archform 100 within a slot 202 of the bracket 200. The retainer 208 has walls 218, 220. The walls 218, 220 can be respectively positioned on the mesial and distal sides of the bracket 200. The walls 218, 220 can secure the male fastener 106 therebetween to prohibit or reduce lateral movement of the male fastener 106 and/or sliding of the archform 100 with respect to the bracket 200. The walls, 218, 220 can prevent the intrusion of adhesive.

The retainer 200 can have a C spring 256 (e.g., spring, leaf spring, spring locking pin). The C spring 256 can retain the male fastener 106. Specifically, the C spring 256 can retain the tab 126 of the male fastener 106 to releasably prevent the male fastener 106 from being removed from the slot 202 of the bracket 200. The C spring 256 can deflect (e.g., flex) under a load and, upon removal of the load, spring back to an undeflected configuration. The C spring 256 can compress onto itself, deflect/flex inward, etc., and return to an uncompressed, deflected, and/or flexed state. The C spring 256 can be oriented in a mesio-distal direction. A central axis of the C spring 256 can be oriented in the mesio-distal direction. The C spring 256 can be oriented perpendicularly relative to the longitudinal axis of the male fastener 106 when the male fastener 106 is retained within the slot 202 of the bracket 200 and/or a longitudinal axis of the bracket 200. One end of the C spring 256 can be retained, which can include fixedly retained, within a slot 258 of the retainer 200. Another end of the C spring 256 (e.g., a free end) can extend out of the slot 258 and into an opening 252 of the retainer 208. A recess 254 can extend a portion of the opening 252 to provide space for the C spring 256 to deflect when a force is applied thereto. The free end of the C spring 256 can deflect under a force, which can cause the C spring 256 to flex into the recess 254 and/or flex in a direction that is away from the applied force. This can enable the male fastener 106 to be rotated under the C spring 256. Upon removal of the force, the C spring 256 can spring, which can include returning to an undeflected state, to retain the male fastener 106 (e.g., tab 126) in place. Optionally, the free end of the C spring 256 can engage the male fastener 106 (e.g., tab 126) and apply a force thereto. This C spring arrangement can be beneficial for narrow brackets because the effectiveness of the spring may not depend on the length thereof.

The retainer 200 can have a groove 212. The groove 212 can provide access to at least a portion of the C spring 256. The groove 212 can enable a tool to reach the C spring 256 and apply a force thereto. The groove 212 can enable the tab 126 of the male fastener 106 to be rotated to contact the C spring 256. The groove 212 can be oriented in an opposite direction relative to the groove 112 of the male fastener 106.

The bracket 200 can have a stop 204. The stop 204 can prevent movement of the male fastener in a direction, which can include the gingival direction. The stop 204 can be positioned on a side of the bracket 200 that is opposite the retainer 208. Optionally, the stop 204 can be positioned on the gingival side of the bracket 200. The stop 204 can have an overhang 206. The overhang 206 can extend over a portion of the slot 202 that can receive the male fastener 206. The overhang 206 can retain the male fastener 106 within the slot 202 of the bracket.

The stop 204 can have a recess 240, as shown in FIG. 6A. The recess 240 can enable the male fastener 106 to be rotated while a portion of the male fastener 106 is positioned under the overhang 206. The stop 204 can have an angled surface 238 that enables a portion of the male fastener 106 to be conveniently positioned under the overhang 206, as shown in FIG. 6B. The stop 204, optionally, can have a hole 264 extending therethrough. Optionally, the stop 204 does not include the hole 264.

The bracket 200 can include a face 214 that forms a portion (e.g., a side) of the slot 202 of the bracket. The bracket can include a protrusion 216 (e.g., bump) extending from the face 214. The protrusion 216 can, when the male fastener 106 is retained under the C spring 256, push the male fastener 106 against an edge of the C spring 256 and the overhang 206. The bracket 200 can include a raised face 215. The raised face 215 can be positioned farther away from a back surface 246 of the bracket 200 than the face 214. The protrusion 216 can be positioned between the raised face 215 and the face 214. A channel 260 can separate mesial and distal portions of the protrusion 216, face 214, and raised face 215. The channel 260 can extend along a longitudinal axis of the bracket 200. The channel 260 can be positioned between mesial and distal sides of the bracket 200.

The archform 100 can have a male fastener 106. The male fastener 106 can have arms 108, 110. The arms 108, 110 can be on opposing sides of the male fastener 106. The arms 108, 110 can be on the mesial and distal sides of the male fastener 106. The arms 108, 110, as described elsewhere herein can flex (e.g., deflect) under a force (e.g., load). The arms 108, 110, as described elsewhere herein can return to an undeflected configuration absent the application of a force. The arms 108, 110 can be separated by a space 120. The arms 108, 110 can curve inward toward the space 120. The arms 108, 110 can flex into the space 120.

The archform 100 can have a tab 126. The tab 126 can be retained under the C spring 256. The tab 126 can have a groove 112 that can engage a tool. The tool can apply a force to the groove 112 that deflects the arms 108, 110, thereby decreasing the length of the male fastener 106 such that the male fastener 106 can be rotated under the C spring or rotated out from under the C spring. The groove 112 can decrease the likelihood that the tool will slip when applying a load to the male fastener 106.

During installation, the portion of the male fastener 106 opposite the tab 126 can be positioned into the slot 202 and under the overhang 206, such that the male fastener 106 is angled relative to the face 214 and/or raised face 215. The tab 126 can contact the C spring 256. The tab 126 can be at least partially within the groove 212. The tool can be positioned between and/or within the groove 212 and the groove 112. The tool can be pushed toward the C spring 256 and/or rotated toward the stop 204, causing the C spring 256 to deflect, the arms 108, 110 to deflect, and/or the male fastener 106 to be rotated under the C spring 256. During the deflection of the C spring 256, the C spring 256 can flex into the recess 254 and back into the opening 252. The tool can be removed. The C spring 256 can return to an undeflected state and/or deflect to apply a retaining force to the male fastener 106 at interface 262, shown in FIG. 6C. Specifically, the free end (e.g., edge of the C spring 256) can contact the male fastener 106 at interface 262, which can include applying a retaining force to the male fastener 106. The male fastener 106 can be retained under the overhang 206 and C spring 256. The protrusion 216 can push the male fastener 106 against the C spring 256 and the overhang 206, which can prevent sliding between the archform 100 (e.g., male fastener 106) and the bracket 200.

During removal, the tool can be positioned between the groove 212 and the C spring 256. The tool can be rotated away from the stop 204, causing the C spring 256 to deflect, the arms 108, 110 to deflect, and/or the male fastener 106 (e.g., the tab 126) to be rotated out from under the C spring 256 (e.g., out from under the free end of the C spring 256). The C spring 256 can return to an undeflected state. The male fastener 106 can be removed from the slot 202 and from under the overhang 206. During insertion and removal of the male fastener 106, forces can be concentrated on the C spring 256 and the tool 300, while the remainder of the bracket 200 can experience relatively small forces.

Figure 7A:
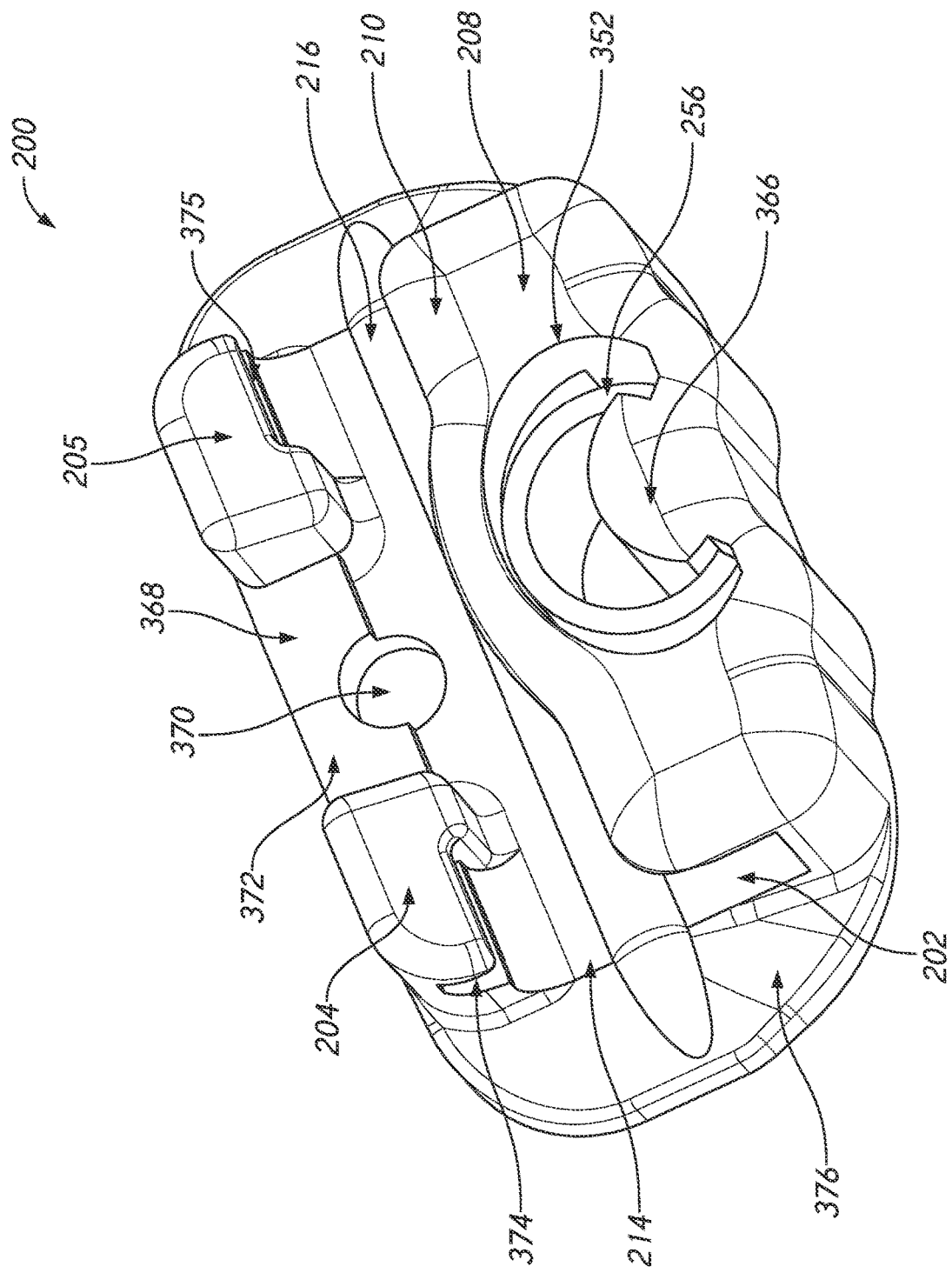
FIG. 7A illustrates a bracket.

FIGS. 7A-7E illustrate an orthodontic bracket and archform system that uses friction-free mechanics. As shown in FIG. 7A, the orthodontic bracket 200 can include a slot 202 that can receive a male fastener 106 of an archform 100. At least a portion of the slot 202 can be defined by a face 214 of the bracket 200. At least a portion of the slot 202 can be defined by a retainer 208. The retainer 208 can have an overhang 210, similar to the overhangs described elsewhere herein. The overhang 210 can extend over the slot 202 and help to retain the male fastener 106 therein. The retainer 208 can be on the gingival side of the bracket 200.

Figure 7B:
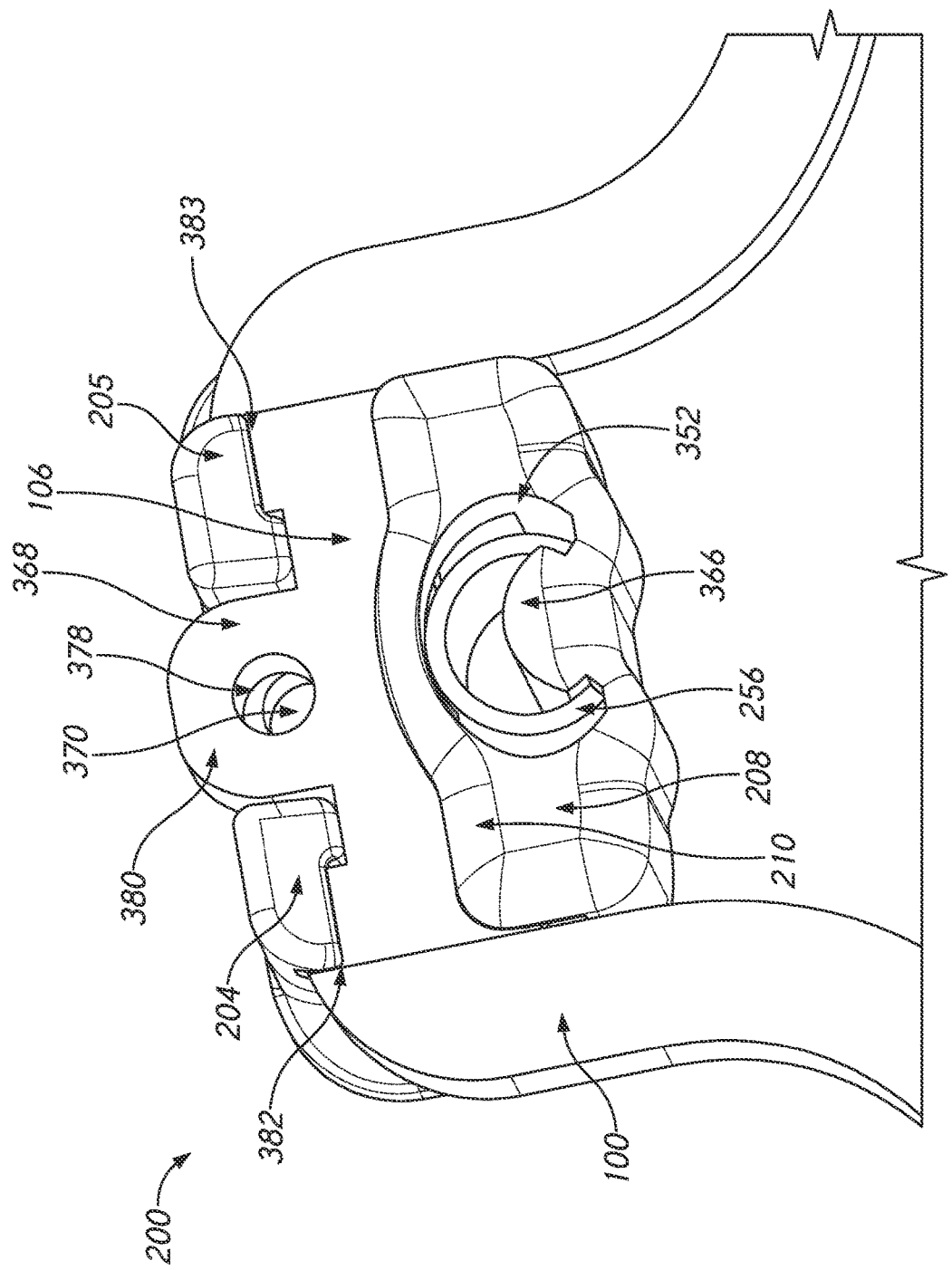
FIG. 7B illustrates the bracket of 7A retaining an archform.
Figure 7C:
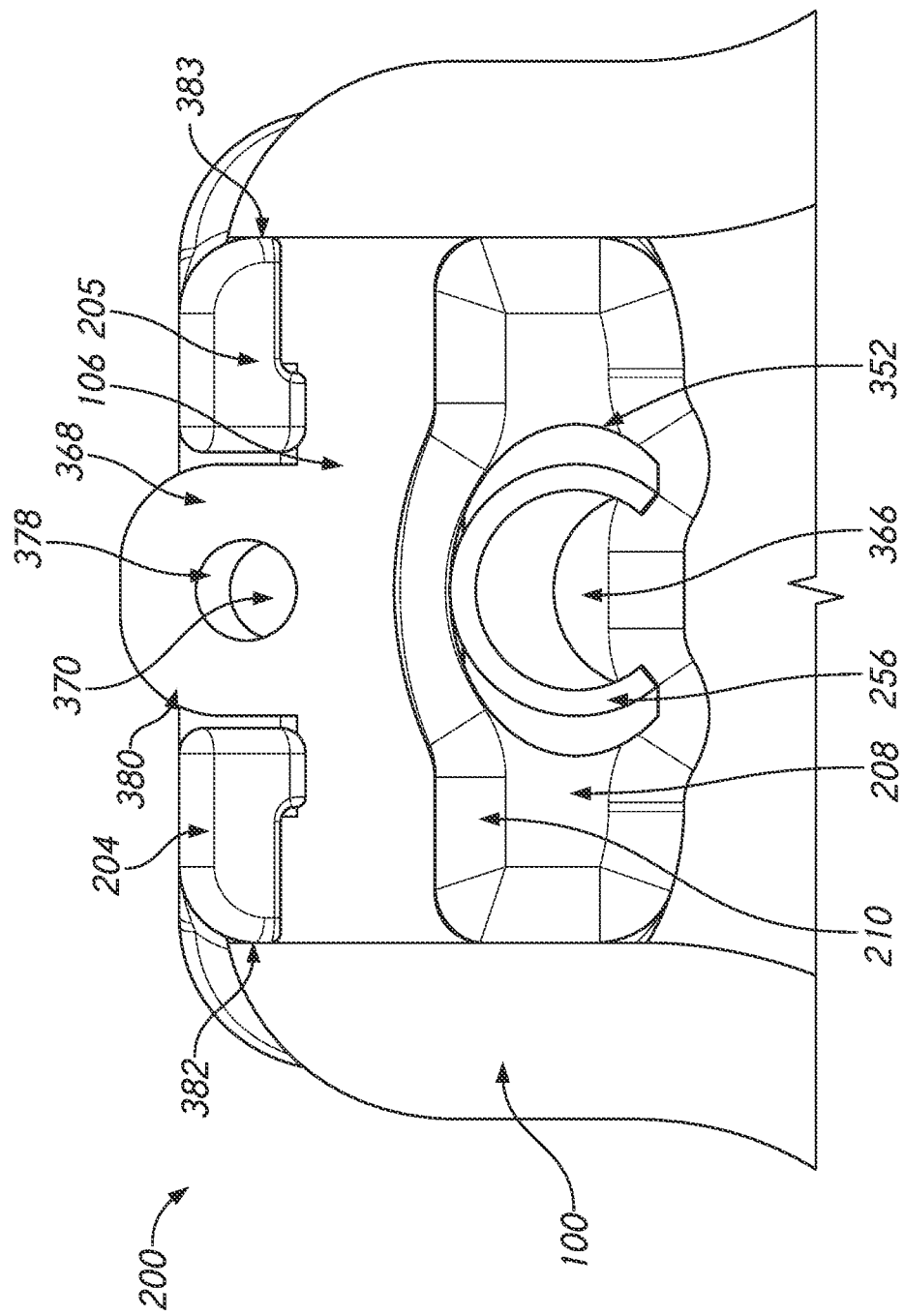
FIG. 7C illustrates another view of FIG. 7B.
Figure 7D:
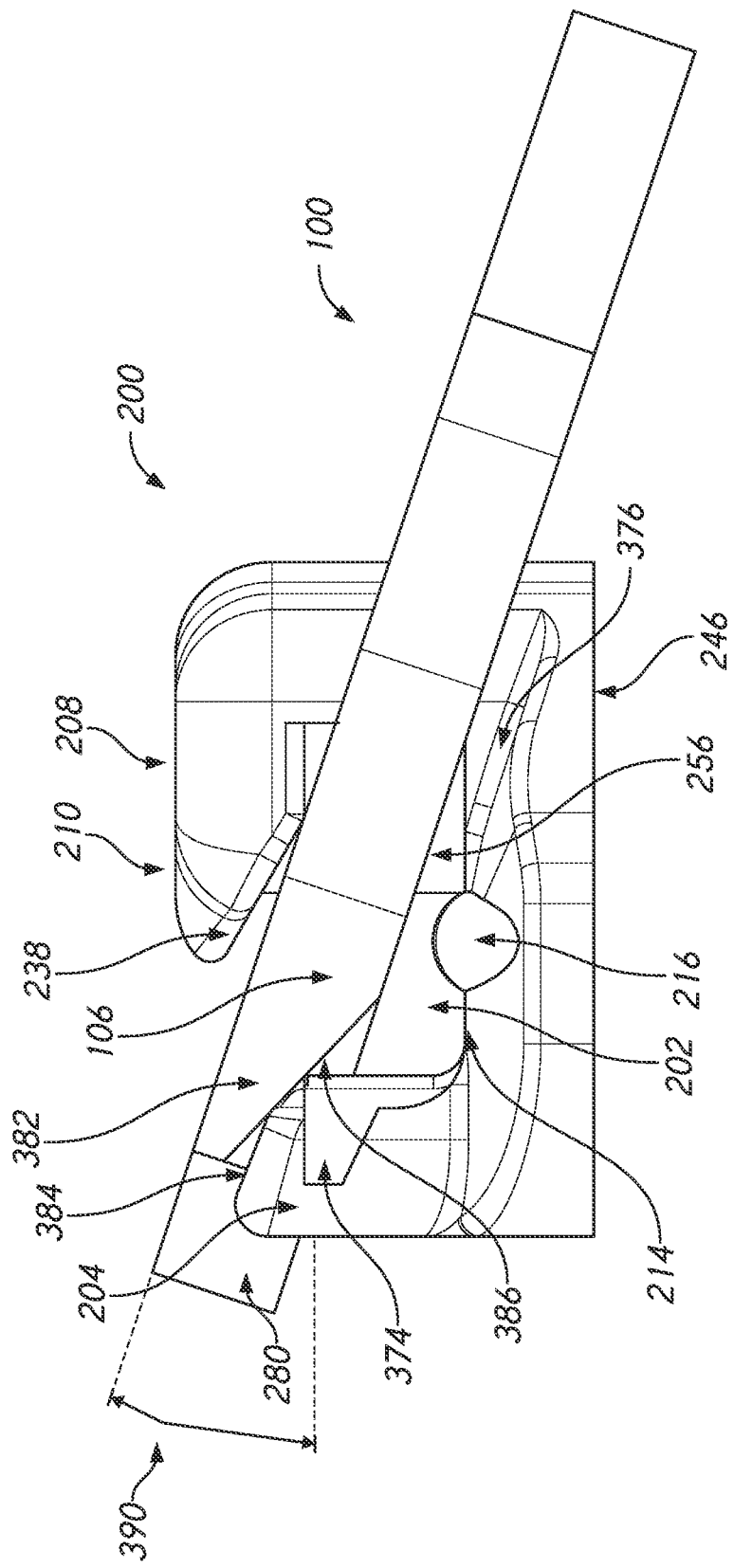
FIG. 7D illustrates the archform being inserted into the bracket of FIG. 7B.
Figure 7E:
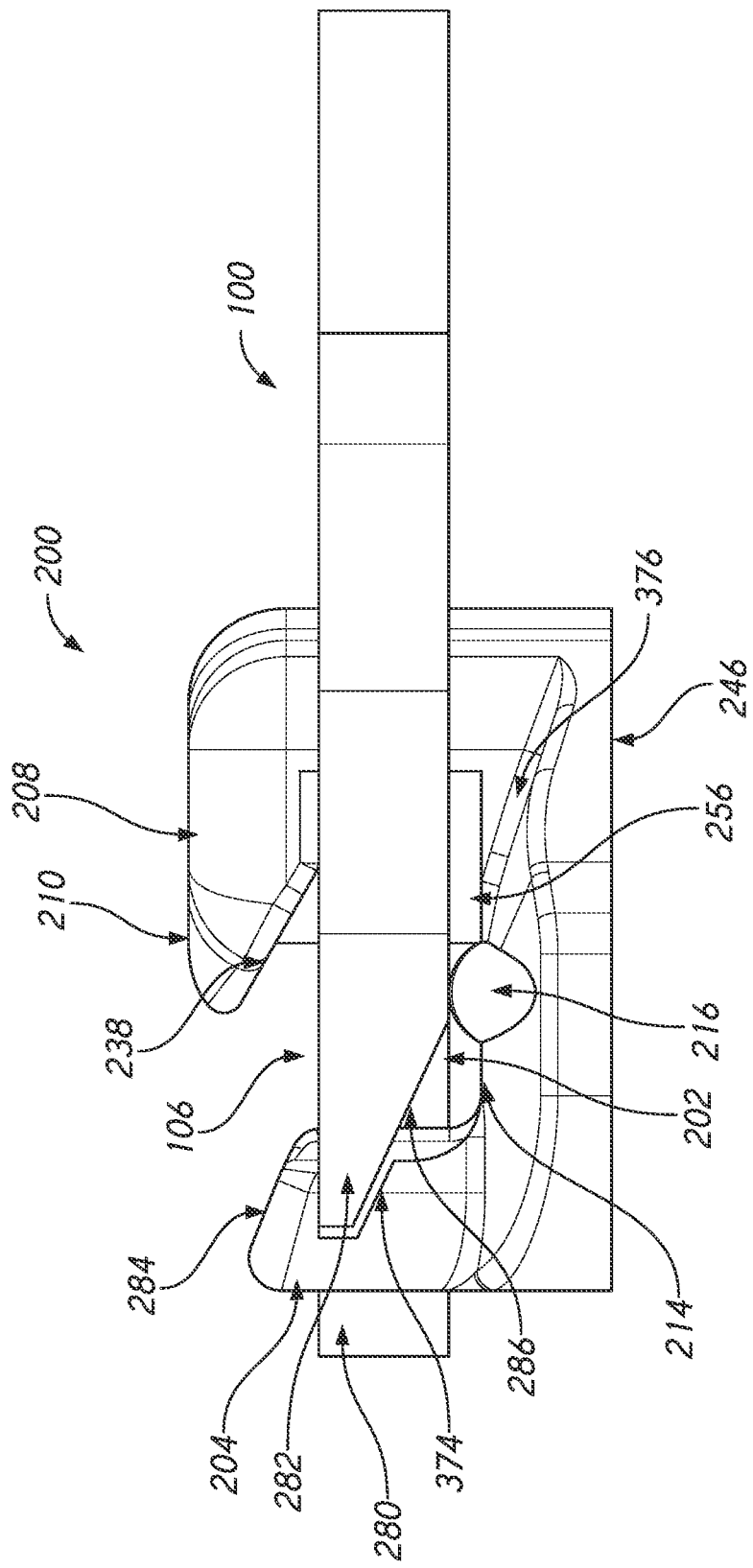
FIG. 7E illustrates side view of 7B.

The retainer 208 can have an opening 352 that holds a C spring 256 (e.g., spring, leaf spring). The opening 352 can be an oval shape to allow the C spring 256 to flex (e.g., deflect). The periphery of the opening 352 can prevent the C spring 256 from flexing beyond a desired range. The opening 352 can be oriented perpendicularly to the face 214 of the bracket. The retainer 208 can have a guide 366 (e.g., guide rail, protrusion, longitudinal protrusion, bar) that can orient the C spring 256 within the opening 352. The guide 366 can prevent the C spring 256 from twisting and/or otherwise being inadvertently removed from the bracket 200 and/or opening 352. The guide 366 can extend through and/or within the opening 352. The guide 366 can be oriented perpendicularly relative to the face 214 of the bracket 200. The C spring 256 can be positioned through the opening 352 and over the guide 366. Opposing ends of the C spring 256 can be positioned on opposing sides of the guide 366. The C spring 256, as shown in FIGS. 7D and 7E, can be exposed to at least a portion of the slot 202. The male fastener 106, when inserted into the slot 202, can contact and flex the C spring 256. The C spring 256 can apply a force to the male fastener 106, which can retain the male fastener 106 within the slot 202 of the bracket 200. The C spring 256 can be positioned away from a handle 380 of the male fastener 106 during installation, reducing the risk that the C spring 256 will be damaged by tools, such as pliers, explorer tools, etc.

The bracket 200 can include stops 204, 205. The stops 204, 205 can be separated by a gap 368 therebetween. The stops 204, 205 can have cutouts 374, 375 (e.g., recesses, voids, spaces) that receive wedges 382, 383 (e.g., fingers) of the male fastener 106, as shown in FIGS. 7B, 7D, and 7E. The cutouts 374, 375 and wedges 382, 383 can cooperate to prevent sliding (e.g., reduce lateral movement) between the archform 100 (e.g., male fastener 106) and the bracket 200. The stops 204, 205 can have angled surfaces 384, as shown in FIG. 7D, that enable the male fastener 106 to be inserted into the slot 202 of the bracket 200 at an angle.

The gap 368 can receive a handle 380 (e.g., tab, tongue) of the male fastener 106. The handle 380, positioned between the stops 204, 205, can prevent sliding between the archform 100 (e.g., male fastener 106) and the bracket. A raised surface 372 can extend the gap 362 and between the stops 204, 205. The raised surface 372 can support the handle 380 off the face 214 of the bracket 200.

An aperture 370 can be positioned between the stops 204, 205. The aperture 370 can be sized and shaped to receive at least a portion of a tool during installation and removal of the male fastener 106 within the bracket. The aperture 370 can extend through at least a portion of the raised surface 372 and/or the face 214.

The bracket 200 can have a protrusion 216 that is similar to the other protrusions 216 described herein. The protrusion 216 can extend from the face 214 of the bracket 200. The protrusion can extend from proximate or at the mesial and distal sides of the bracket 200. The protrusion 216 can push the male fastener 206 against the overhang 210 and the cutouts 374, 375 when positioned within the bracket 200.

The bracket 200 can have inclined surfaces 376 that facilitate inserting the male fastener 106 within the bracket 200. The inclined surface 376 can be positioned on opposing sides of the retainer 208. As shown in FIG. 7D, the inclined surfaces 376 can facilitate the male fastener 106 being positioned within the slot 202 of the bracket 200 at an angle before being securely retained within or removed from the bracket 200. Similarly, the retainer 208 and/or overhang 210 can have an angled surface 238 that can facilitate the male fastener 106 being positioned within the slot of the bracket 200 at an angle before being securely retained within or removed from the bracket 200.

The archform 100 can have a male fastener 100, as shown in FIG. 7B. The male fastener 100 can be inserted into and retained by the bracket 200 (e.g., slot 202). The male fastener 106 can have a handle 380 (e.g., tab). The handle 380 can allow the archform 100 to be gripped, such as with pliers, to insert the male fastener 106 into the bracket 200. The handle 380 can provide a purchase point for pliers. The handle 380, optionally, is configured such that it does not add additional strength to the archform 100 such that, if damaged, the archform 100 will perform as intended. Accordingly, optionally, nicking or damaging the handle 380 does not affect the performance or fatigue life of the archform 100. This is especially advantageous with an archform 100 made of nickel titanium which can be notch sensitive. The handle 380 can include a hole 378. The hole 378 can receive at least a portion of a tool (e.g., explorer, explorer tool) to position the male fastener 106.

The male fastener 106 can include wedges 382, 383 (e.g., fingers). The wedges 382, 383 can be formed by laser cutting and/or waterjet cutting the male fastener 106 to create the edge 286, defining at least a portion of the wedges 382, 383. As shown in FIG. 7D, the male fastener 106 can be inserted at an angle 390 relative to the face 214 and/or back surface 246, which can be referred to as the insertion/removal angle of attack. The wedges 382, 383, with the edge 286, can reduce the insertion/removal angle of attack, which can improve the ease of male fastener 106 insertion within the bracket 200. The wedges 382, 383 can be positioned within the cutouts 282, 283 of the stops 204, 205.

During insertion, the male fastener 106 can be inserted at an angle 390 into the slot 202 of the bracket 200. The inclined surfaces 376, angled surfaces 384, edges 286 of the wedges 382, 383, and/or angled surface 238 can ease insertion (e.g., reduce the insertion angle 390) of the male fastener 106 into the slot 202 of the bracket 200. A force can be applied to the male fastener 106, which can be with a tool interfacing with the handle 380, such that the C spring 256 is compressed. The male fastener 106 can be rotated toward the face 214 such that the male fastener 106 is parallel with the face 214. The force applied to the male fastener 106 can be removed, allowing the C spring 256 to push the wedges 382, 383 into the cutouts 374, 375, as shown in FIG. 7E. The protrusion 216 can push the male fastener 106 into the overhang 210 and/or push the wedges 382, 383 against respective surfaces of the cutouts 374, 375. As shown in FIG. 7B, portions of the archform 100 proximate the male fastener 106 can interface with sides of the bracket 200 (e.g., mesial and distal sides) to reduce and/or prevent lateral movement between the archform 100 (e.g., male fastener 106) and the bracket 200.

During removal, a tool can be inserted into the hole 378 of the handle 380. Optionally, the tool can be inserted through the hole 378 of the handle 380 and at least partially into the hole 370. The tool can be tilted (e.g., rotated) in the direction of the retainer 208, which can compress the C spring 256, remove the wedges 382, 383 from the cutouts 374, 375, and rotate the side of the male fastener 106 with the handle 380 out of the slot 202 of the bracket 200. The male fastener 106 can then be removed from the bracket 200 at an angle.

Figure 7G:
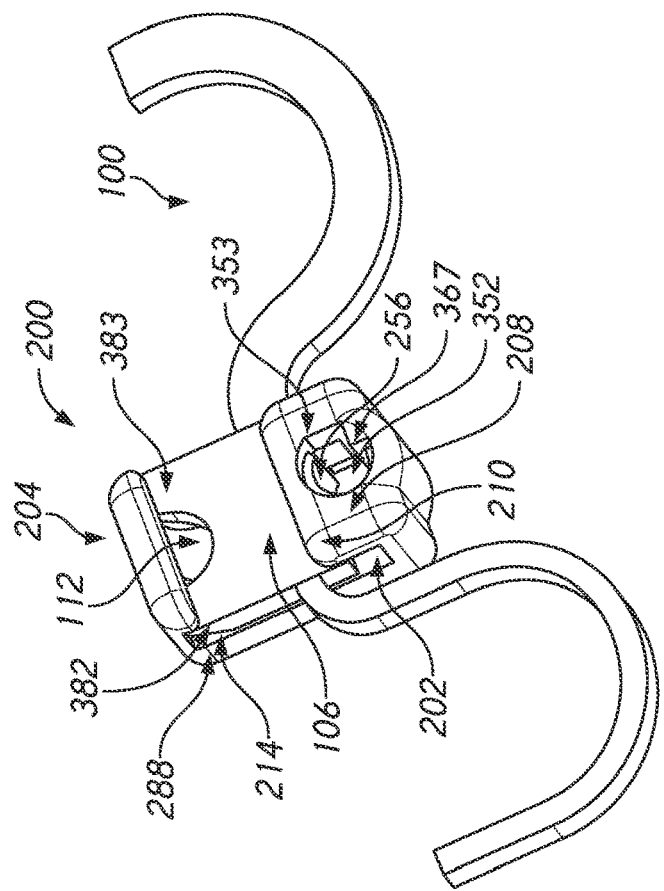
FIG. 7G illustrates a view of a bracket and a male fastener of an archform for a lower anterior bracket.
Figure 7F:
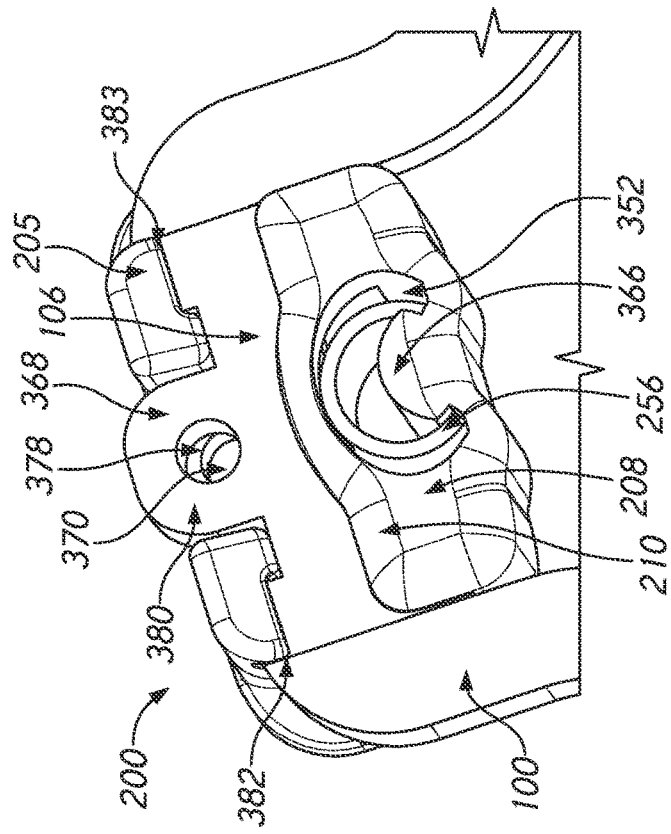
FIG. 7F illustrates a view of 7B.

As shown in FIGS. 7F and 7G, similar retaining mechanisms can be used for molar brackets, as shown in FIG. 7F, and lower anterior brackets, as shown in FIG. 7G. Optionally, the lower anterior bracket shown in FIG. 7G can have some differences compared to the molar bracket shown in FIG. 7F due to tooth sizes. As shown in FIG. 7G, the bracket 200 can include a stop 204. The stop 204 can include cutouts and/or an overhang as described elsewhere herein. The cutouts and/or overhang can receive wedges 382, 383 of the male fastener 106.

The bracket 200 can include a retainer 208. The retainer 208 can have an overhang 210. The retainer 208 can have an opening 352 that houses a C spring 256. One end of the C spring 256 can be coupled, which can include fixed, to a flange 367 to help prevent unintentional removal of the C spring 256. The other end of the C spring 256 can be free, allowing the C spring 256 to flex under the application of a force and return to an unflexed configuration absent the application of the force. At least a portion of the C spring 256 can be accessible via the slot 202 of the bracket 200 such that a male fastener 106 inserted into the slot 202 can compress the C spring 256.

The archform 100 can have a male fastener 106. The male fastener 106 can have a handle 288. The handle 288 can be gripped by tools, such as pliers, to manipulate the archform 100 without negatively impacting the performance of the archform 100.

The male fastener 106 can include wedges 382, 383 that can be separated by a groove 112. The groove 112 can receive a tool that can apply a force thereto such that the male fastener 106 compresses the C spring 256 and enables the wedges 382, 383 to maneuver around the stop 204 during insertion and/or removal of the male fastener 106. The male fastener 106 can be inserted and removed from the bracket 200 using similar techniques to those described elsewhere herein.

Figure 8B:
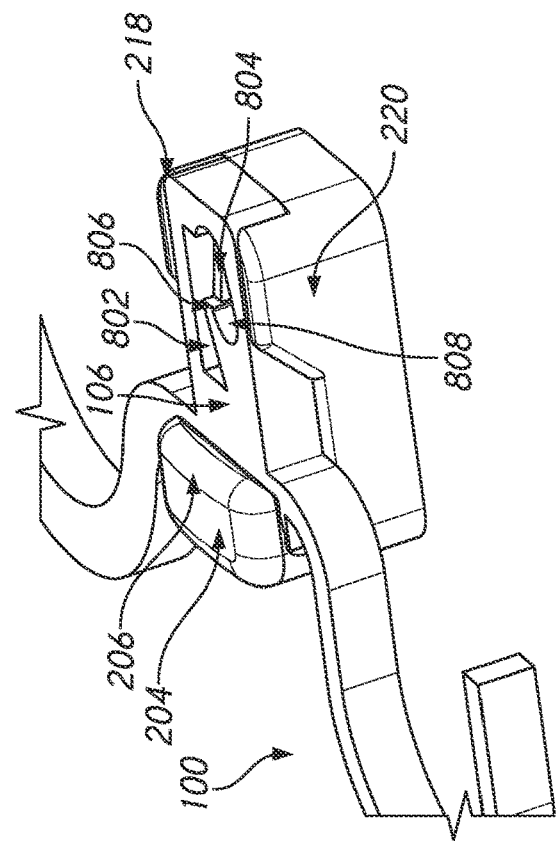
FIG. 8B illustrates the archform retained within the bracket of 8A.
Figure 8A:
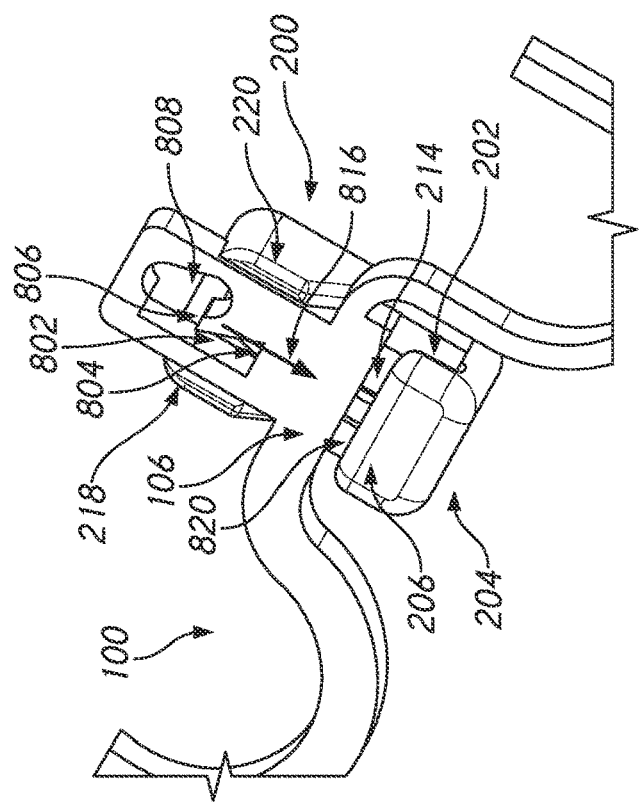
FIG. 8A illustrates an archform being positioned within a bracket.
Figure 8C:
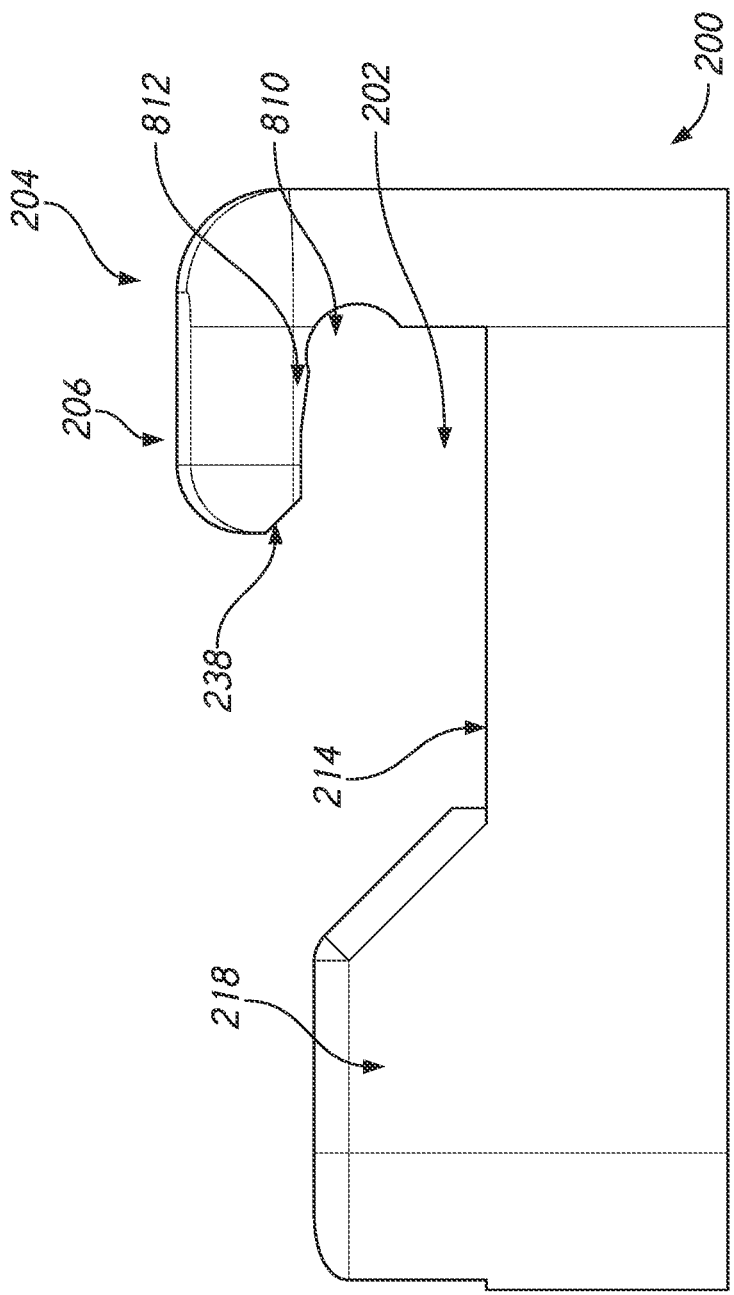
FIG. 8C illustrates the bracket of FIG. 8A.

FIGS. 8A-8D illustrate an orthodontic bracket and archform system that uses friction-free mechanics. As shown in FIG. 8A, the archform 100 can have a male fastener 106. The male fastener 106 can include a guiding channel 802 (e.g., recess, channel). The guiding channel 802 can guide a tab 804 of a bracket 200. The guiding channel 802 can guide a tab 804 to flex around the surface(s) of the guiding channel 804 to engage with a holding surface 806 (e.g., surface). The tab 804 can be made of a variety of material such as sheet metal. The tab 804 can hold the male fastener 106 within the slot of the bracket 200. The bracket 200 can include a tool receiving channel 808 that can receive a tool to deflect the tab 804 from the holding surface 806 to decouple the male fastener 106 from the bracket.

The bracket 200 can have walls 218, 220. The walls 218, 220 can align the male fastener 106 within the bracket 200. The walls 218, 220 can prevent sliding (e.g., slop) between the archform 100 and the bracket 200. The walls 218, 220 can be positioned on distal and mesial sides of the bracket 200. The walls 218, 220 can define a channel 820 to guide the male fastener 106 into the slot 202 of the bracket 200 as the male fastener 106 moves in the direction 816.

The bracket 200 can have a stop 204. The stop 204 can be disposed on an end of the bracket 200, which can include the gingival end of the bracket 200. The stop 204 can have an overhang 206. The overhand 206 can be configured to retain the male fastener 106 within a slot 202. The stop 204 can include a recess 810 to enable the male fastener 106 to rotate within the slot 202. The overhang 206 can have a chamfer 238 which can help enable the male fastener 106 to rotate within the slot 202. The overhang 206 can have a wedge 812 (e.g., angled surface, tapered surface, protrusion) that is similar to the protrusions 812. The wedge 812 can extend from the overhang 206 in the direction of the face 214. The wedge 812 can push the male fastener 106 into the face 214 to prevent and/or reduce sliding (e.g., slop) between the archform 100 (e.g., male fastener 106) and the bracket 200.

The bracket 200 can have a face 214. The face 214, as shown in FIG. 8D, can have a tool receiving recess 822 (e.g., recess) that can receive a tool, which is moved through the tool receiving channel 808 to deflect the tab 804 from the holding surface 806. Once the tab 804 is removed from the holding surface 806, the male fastener 806 can be removed from the slot 202.

During installation, the male fastener 106 is positioned on the face 214 (e.g., parallel to the face 214) of the bracket 200 between the walls 218, 220. The male fastener 106 is moved in the direction 816. As the male fastener 106 moves in the direction 816, the guiding channel 802 guides the tab 804 of the bracket 202. Optionally, the male fastener 106 is angled relative to the face 214 until the tab 804 can be positioned within the guiding channel 802. The guiding channel 802 can guide a tab 804 to flex around the surface(s) of the guiding channel 804 to engage with the holding surface 806, retaining the male fastener 106 within the slot 202. The wedge 812 can push the male fastener 106 into the surface 214.

During removal, a tool (e.g., explorer tool) is positioned within the tool receiving recess 822 and/or tool receiving channel 808. The tool is moved through the tool receiving channel 808 toward the tab 804. The tool deflects the tab 804 from the holding surface 804 such that the male fastener 106 can be removed from the slot 202. The tool can, which can include simultaneously, engage a periphery of the tool receiving channel 808 to remove the male fastener 106 from the bracket 200 and/or slot 202.

Optionally, the tab 8040 can have more than one engagement stages (e.g., more than one feature that can engage with the holding surface 806 and/or another surface of the male fastener 106, such that a clinician can choose the depth into which the male fastener 106 is inserted into the slot 202. The flexible locking mechanism 804 (e.g., tab) may have more than one engagement stages. For example, for severely maloccluded teeth, a clinician may want the archform partially engaged into the slot 202. This will allow maximum articulation and flexibility of the archform 100 which can allow the archform 100 to be more easily connected to the displaced teeth. As the teeth come into occlusion, the clinician may push and lock the archform 100 further into the slot 202 to get the full expression of the archform 100. The slot 202 can have one or more tapered sides that, when the male fastener 106 is slid into the slot 202, contacts the male fastener 106. This can eliminate play between the archform 100 (e.g., male fastener 106) and the bracket 200, which can provide improved tooth control.

Optionally, the brackets described are positioned on a lingual or labial side of a patient's teeth.

Optionally, the brackets and non-sliding archforms described herein can cooperate to cause translational movement of a patient's teeth. Optionally, the same locking mechanism can be used for molars and lower anterior teeth. Optionally, the archform profiles can have enough flexibility and stretch to level and align a patient's teeth during the initial stages of malocclusion treatment. Optionally, the bracket and archforms disclosed herein can be designed reduce the risk of inadvertent coupling between brackets and the archform, for example, when removing the archform from neighboring brackets. Optionally, the brackets and archform reduce the amount of sliding (e.g., slop) between the archform and brackets. Optionally, the archform includes features, such as handles, tabs, etc., that can be used to maneuver the archform, reducing deformation and/or damage of the archform. Optionally, the bracket is bonded to the patient's teeth with sufficient shear strength and tensile strength to reduce the likelihood of inadvertent debonding. Optionally, the brackets can be debonded from teeth using lingual debonding pliers or debonding pliers without damaging the enamel of a patient's teeth. Optionally, archforms made of nickel titanium, stainless steel, titanium-molybdenum alloy, shape memory alloy, super elastic metals, and/or other suitable alloys can be used. Optionally, the brackets can reduce adhesive intrusion into the brackets. Optionally, the same litigating mechanism can be used for all teeth. Optionally, the surfaces (e.g., lingual surfaces), and/or other surfaces, of the bracket are rounded, which can include a radius of greater than 0.050-0.010, 0.010-0.015, 0.015-0.020, 0.020-0.025, and/or greater than 0.025 inches. Optionally, the brackets do not open inadvertently when a patient is brushing teeth. Optionally, tie wings can be used in addition to the locking mechanisms disclosed herein. Optionally, interproximal loops of the archform do not dig into the gum line of the patient during installation of the archform.

Optionally, an archform may be activated by deflecting it away from its default position and inserting into a snapped position within an orthodontic bracket that is bonded to a tooth. When this elastic deflection occurs, the archform may exert a reaction force in the direction that returns the archform to the designed configuration, thereby transferring forces to the tooth and causing orthodontic tooth movement.

This archform activation may completely control any tooth movement in three-dimensional space.

For mesio-distal tooth movement, if there is space between adjacent teeth, snap fitting an archwire into an orthodontic bracket may cause an interproximal structure to deform in one or more directions, which may cause the archform to be activated, leading to closing of space in the mesial-distal direction. Whereas, if there is overlap between adjacent teeth, archform snap fitting into an orthodontic bracket may cause an interproximal structure to deform in a different direction, which may cause the archwire also to be activated, this time leading to opening of space in the mesial-distal direction.

For occlusal-gingival tooth movement, if the adjacent teeth are not at the same level, an archform snap fitting into an orthodontic bracket may cause connecting archwire connectors and interproximal structures to deflect in a slanted manner which may cause the archform to be activated, leading to tooth correction in the occlusal-gingival direction.

For facio-lingual tooth movement, archform snap fitting into an orthodontic bracket may cause the wire to be pushed away from its original position which may cause the archform to be activated, leading to tooth correction in the facio-lingual direction.

The various configurations of archforms and orthodontic brackets that have been discussed may provide one or more advantages as described herein.

There may be superior mesio-distal angulation and facio-lingual inclination orthodontic control because the vertical male connector may offer a longer arm for coupling forces to the orthodontic bracket when compared to the rectangular dimensions of an edgewise appliance. Moreover, the spread of the two parallel side bars of some male connectors may make them function like a twin orthodontic bracket in providing a force couple in dealing with any axial rotation.

The interproximal structures may allow the operator to adjust the rigidity of the archform, which may provide versatility for the same archform cross-sectional configuration to be used in a wide array of cases.

The interproximal structures can be designed to allow patients to easily floss while undergoing orthodontic treatment.

The interproximal structures may be designed to have a certain type of shape (including loops, and complex 3D shapes). These shapes can be used to hold elastic rubber bands.

The archform may be designed such that it can be activated to move the teeth. This type activation may be self-activating and self-limiting because it may not require use of external forces such as power chain and coil springs to move the teeth. This type of activation may also be self-limiting because the archform may only exert forces that return the archform to its original shape, negating the need for frequent appointments.

This approach may also not permit sliding of the archform with respect to the orthodontic bracket, thus making movement of the teeth much more predictable.

Figure 9A:
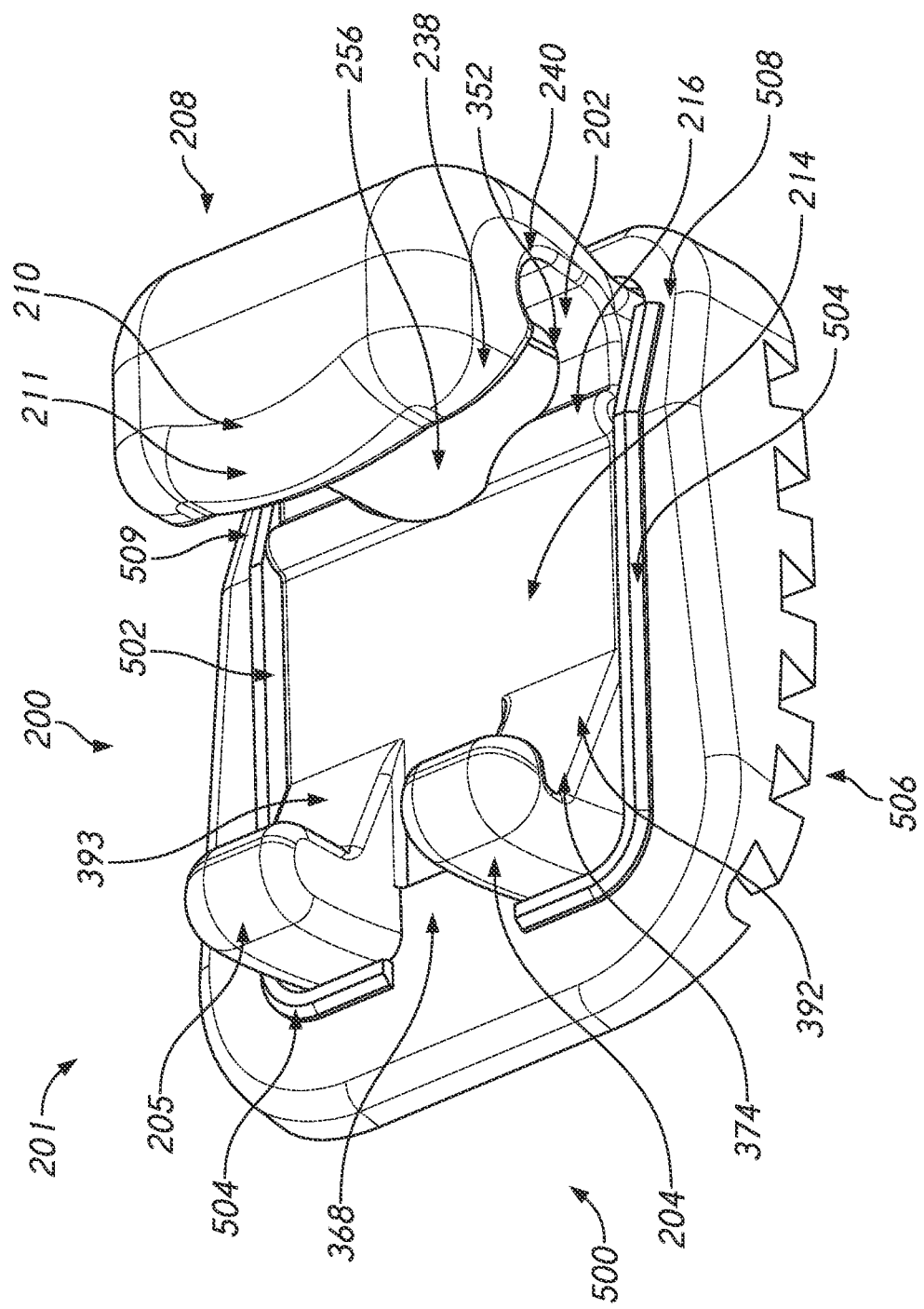
FIGS. 9A and 9B illustrate various views of a multi-part bracket.
Figure 9B:
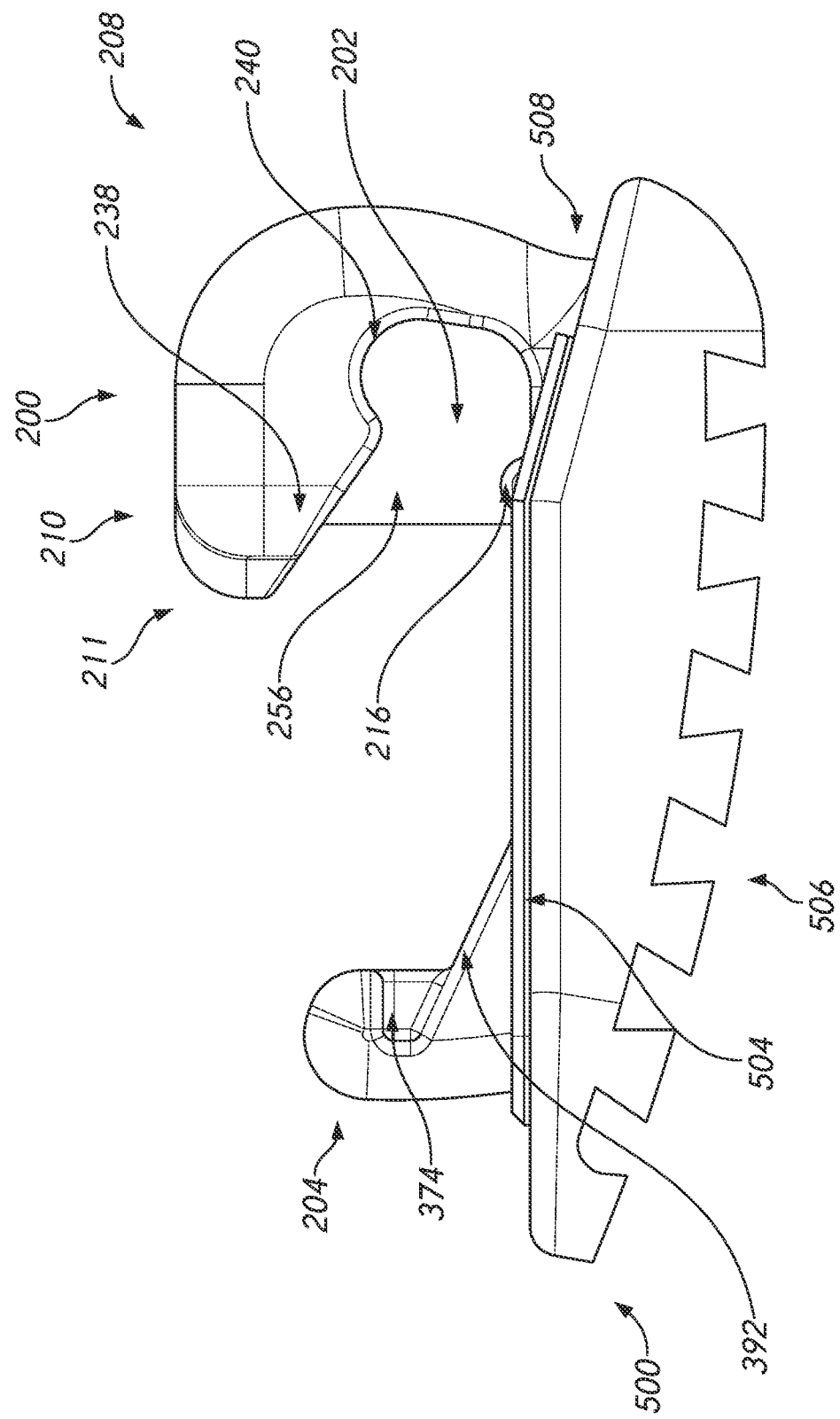

FIGS. 9A and 9B illustrate a bracket assembly 201 (e.g., two piece bracket assembly). As shown in FIG. 9A, the bracket assembly 201 can include a pad (receiving pad, receiving base, base) 500 that can receive an orthodontic bracket 200, which can be coupled to the male fastener of an archform to facilitate tooth movement. The pad 500 can be bonded to a patient's tooth (e.g., on the lingual side or labial side of a patient's tooth) and receive the bracket 200. The pad 500 can be modified for attachment to various teeth depending on tooth size and/or desired control. For example, a wider pad 500 can be used to improve tooth rotational control without increasing the width of the bracket 200. This can enable the bracket 200 to be more widely used amongst different teeth without modifying the bracket 200. Optionally, the pad 500 can be modified or different pads 500 used to enable the same style bracket 200 (e.g., a common bracket) to be more widely used amongst different teeth. This can reduce the number of varieties of brackets needed for a treatment plan, which can reduce cost and/or complexity. The shape and/or contour of the pad 500 can be economically changed because the pad 500 is separate from the bracket 200. Optionally, the bracket 200 and pad 500 can be formed together.

The pad 500 can be manufactured via a variety of techniques such as injection molding, casting, machining, additive manufacturing, etc. In some instances, metal injection molding may be preferred. The pad 500 can include a pocket (opening, void, depression, hole, receiving space) 502 to receive the bracket 200. A portion of the periphery of the pocket 502 can include filler material 504 that can be used to weld (e.g., laser weld) the bracket 200 to the pad 500. The filler material 504 can be disposed on the sides (e.g., mesial and distal sides) of the periphery of the pocket 502, such that the sides (e.g., mesial and distal sides) of the periphery of the pocket 502 can be welded (e.g., laser welded) to the sides (e.g., mesial and distal sides) of the bracket 200. Optionally, the pad 500 and bracket 200 can be tack welded together prior to laser welding.

The pad 500 can include undercut(s) (cut(s), gap(s), textured surface, void(s), slot(s)) 506 to facilitate improved bonding between the pad 500 and the patient's teeth. The undercut(s) 506 can be molded into the pad 500. Optionally, the undercuts 506 can be machined into the pad 500. The undercut(s) 506 can be disposed on a side of the pad 500 that is opposite the pocket 502. The undercut(s) 506 can extend the width of the pad 500. The undercut(s) 506 can extend between the mesial and distal sides of the pad 500. The pad 500, being separate from the bracket 200, can have undercut(s) 506 conveniently molded therein.

The pad 500 can have inclined surfaces 508, 509, similar to inclined surfaces 376 described elsewhere herein, that can facilitate inserting the male fastener 106 within the bracket 200. The inclined surface 508, 509 can be positioned on opposing sides of the retainer 208. The inclined surfaces 376 can facilitate the male fastener 106 being positioned within the slot 202 of the bracket 200 at an angle before being securely retained within, which can include being parallel to the face 214 of the bracket 200, or removed from the bracket 200.

As described above, the bracket 200 can be disposed within the pocket 502 of the pad 500 during use. Optionally, the bracket 200 can be used independently of the pad 500 and bonded to a patient's tooth. The bracket 200 can be manufactured via a variety of techniques such as injection molding, casting, machining, additive manufacturing, etc. In some instances, metal injection molding may be preferred.

The bracket 200 can be used with an archform 100 to move a patient's teeth utilizing non-sliding mechanics. The orthodontic bracket 200 can include a slot 202 that can receive a male fastener of an archform. At least a portion of the slot 202 can be defined by a face 214 of the bracket 200. At least a portion of the slot 202 can be defined by a retainer 208. The retainer 208 can have an overhang 210, similar to the overhangs described elsewhere herein. The overhang 210 can include a curved portion 211 that extends over the face 214 of the bracket 200. The curved portion 211 can help to retain a male fastener 106 within the bracket 200.

The overhang 210 can extend over the slot 202 and help to retain a male fastener therein. The retainer 208 can be on the gingival side of the bracket 200. Optionally, the retainer 208 can be disposed on the occlusal side of the bracket 200. The retainer 208 and/or overhang 210 can include an angled surface 238 that can facilitate a male fastener being positioned within the slot 202 of the bracket 200 at an angle before being securely retained within or removed from the bracket 200. Similarly, the retainer 208 can have a recess 240 (e.g., undercut), as detailed elsewhere herein. The recess 240 can enable (e.g., facilitate) a male fastener to rotate out of or into the slot 202 of the bracket 200 without being prohibited by the retainer 208, as detailed elsewhere herein.

The retainer 208 can include a C spring 256 (e.g., spring, leaf spring). As described elsewhere herein, the C spring 256 can help to securely retain a male fastener within the bracket 200. The retainer 208 can have an opening 352 that holds the C spring 256. The opening 352 can be an oval shape to allow the C spring 256 to flex (e.g., deflect). The periphery of the opening 352 can prevent the C spring 256 from flexing beyond a desired range. The opening 352 can be oriented perpendicularly to the face 214 of the bracket 200. The C spring 256 can be perpendicularly oriented relative to the face 214 of the bracket 200. The C spring 256 can extend between and/or partially through the retainer 208 and the face 214 of the bracket 200

The C spring 256 can be exposed to at least a portion of the slot 202. The male fastener 106, when inserted into the slot 202, can contact and flex the C spring 256. The C spring 256 can apply a force to the male fastener 106 to push the male fastener 106 into stops 204, 205, which can retain the male fastener 106 within the slot 202 of the bracket 200. The C spring 256 can be positioned away from a handle 380 of the male fastener 106 during installation, reducing the risk that the C spring 256 will be damaged by tools, such as pliers, explorer tools, etc. The C spring 256 can extend through the protrusion 216. Optionally, the protrusion 216 can be offset from the C spring 256.

The bracket 200 can include stops 204, 205. The stops 204, 205 can be separated by a gap 368 therebetween. The stops 204, 205 can have cutouts 374, 375 (e.g., recesses, voids, spaces) that receive wedges 382, 383 (e.g., fingers) of the male fastener 106. The cutouts 374, 375 and wedges 382, 383 can cooperate to prevent sliding (e.g., reduce lateral movement) between the archform 100 (e.g., male fastener 106) and the bracket 200. The stops 204, 205 can include ramps (inclined surface, angled surface, ramp) 392, 393. The ramps 392, 393 can extend from the face 214 to the cutouts 374, 375. The ramps 392, 393 can be angled to interface with the wedges 382, 383. The stops 204, 205 can be positioned proximate the sides (e.g., longitudinal sides, mesial and distal sides) of the bracket 200. The stops 204, 205 can be disposed on an opposing side of the bracket 200 relative to the retainer 208.

The gap 368 can receive a handle 380 (e.g., tab) of the male fastener 106. The handle 380, positioned between the stops 204, 205, can help to prevent sliding between the archform 100 (e.g., male fastener 106) and the bracket.

The bracket 200 can have a protrusion 216 that is similar to the other protrusions 216 described herein. The protrusion 216 can extend from the face 214 of the bracket 200. The protrusion 216 can extend between longitudinal sides (e.g., mesial and distal sides) of the bracket 200. The protrusion 216 can push the male fastener 206 against the overhang 210 and/or the cutouts 374, 375 when positioned within the slot 202 of the bracket 200 for secure retention.

Figure 10A:
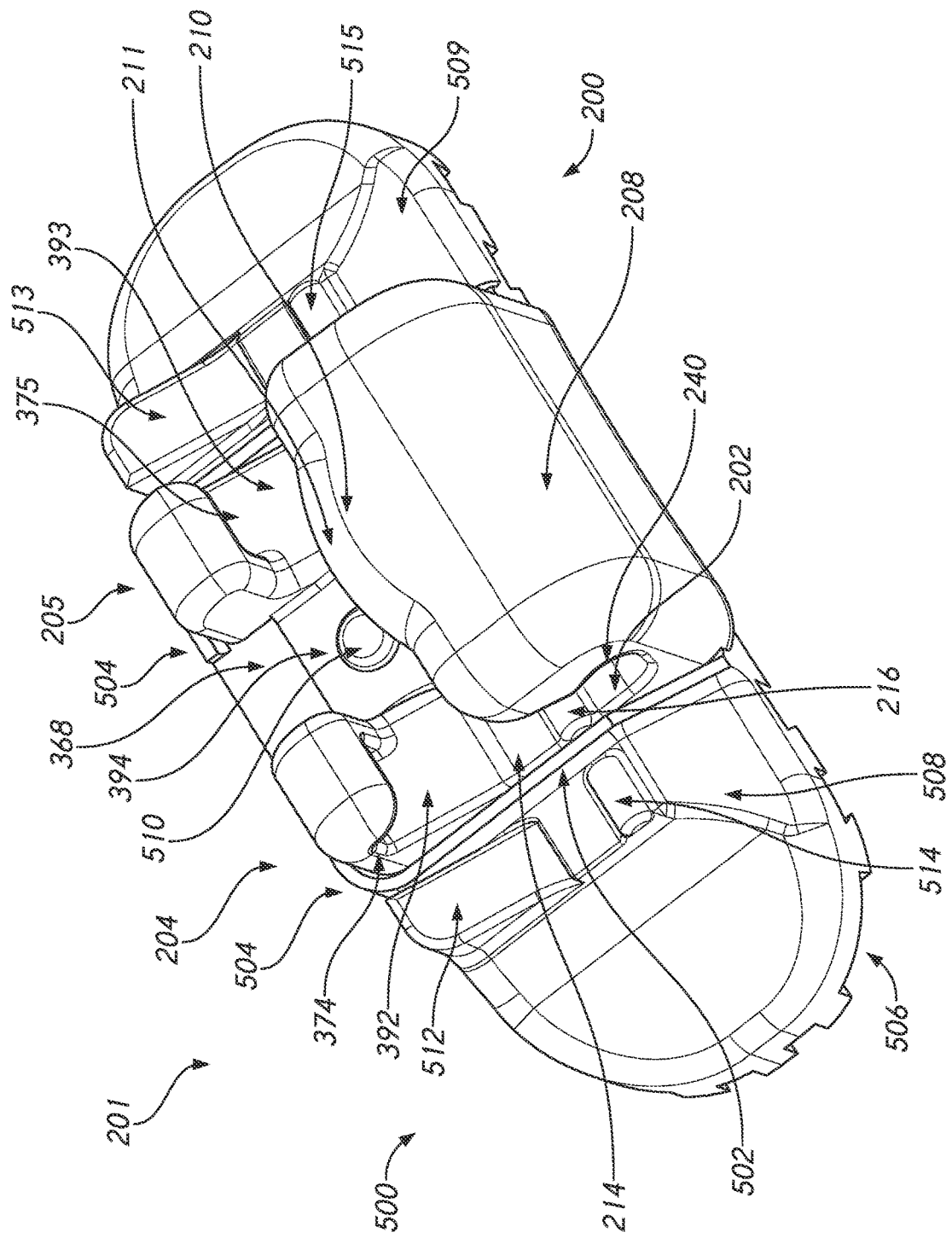
FIG. 10A illustrates a multi-part bracket that can be placed on a molar of a patient.

FIG. 10A illustrates a bracket assembly 201 with a pad 500 and bracket 200. The bracket assembly 201, pad 500, and/or bracket 200 illustrated in FIG. 10A can include the same or similar features as the bracket assembly 201, pad 500, and/or bracket 200 illustrated in FIGS. 9A and 9B. Optionally, the bracket 200 illustrated in FIGS. 9A and 9B can be used for the lower anterior teeth of a patient while the bracket 200 illustrated in FIG. 10A can be used for all other teeth of the patient (e.g., molars, etc.). The bracket 200 illustrated in FIG. 10A can be referred to as the common bracket because the bracket 200 can be used with most of the teeth of the patient.

The bracket 200 illustrated in FIG. 10A can include an aperture (hole, void, opening) 394. The aperture 394 can receive a protrusion (cylinder, projection, pillar, pin) 510 of the pad 500. The protrusion 510 can be inserted through the aperture 394. As described elsewhere herein, the bracket 200 can be tack welded to the pad 500 before laser welding during coupling. As illustrated in FIG. 10A, however, the protrusion 510 can be inserted into the aperture 394 and laser welded to bracket 200 to remove the process of tack welding before laser welding. Laser welding the protrusion 510 to the bracket 200 when positioned within the aperture 394 can prevent the bracket 200 from lifting out of the pocket 502 when one of the longitudinal sides (e.g., mesial or distal sides) of the bracket 200 is laser welded.

The bracket 200 illustrated in FIG. 10A may be narrow enough to be used on most teeth of a patient but not wide enough (e.g., insufficient distance between longitudinal sides, insufficient distance between mesial and distal sides) for effective rotation control for molar teeth. Accordingly, the pad 500 can have a width that provides effective rotation control for molar teeth without requiring the bracket 200 to be widened. The pad 500 illustrated in FIG. 10A can be wider, for improved rotational control, compared to the pad 500 illustrated in FIGS. 9A and 9B.

The pad 500 illustrated in FIG. 10A can include features similar to the bracket 200 (e.g., carry over bracket features) to improve rotational control while still using a narrow bracket 200. For example, the pad 500 can include protrusions (bumps) 514, 515, which can be similar to the protrusion 216 of the bracket 200. The protrusions 514, 515 can be distributed on opposing sides of the bracket 200. The protrusions 514, 515 can be distributed on opposing sides of the protrusion 216 of the bracket 200. The protrusions 514, 515 can be aligned with the protrusion 216 of the bracket 200. The protrusions 514, 515 can help to retain the male fastener 106 of the archform 100 within the bracket 200 to facilitate non-sliding mechanics. The protrusions 514, 515 can, similar to the protrusion 216 of the bracket 200, push the male fastener 106 of the archform 100 against the overhang 210 and/or stops 204, 205. Optionally, the protrusions 514, 515 can effectively be an extension of the protrusion 216.

The pad 500 illustrated in FIG. 10A can include inclined surfaces (angled surface, ramp) 512, 513, which can be similar to ramps 392, 393. The inclined surfaces 512, 513 can be distributed on opposing sides of the bracket 200. The inclined surface 512 can be positioned proximate the ramp 392. The inclined surface 513 can be positioned proximate the ramp 393. The inclined surfaces 512, 513 can interface with the wedges 382, 383 of the male fastener 106. The inclined surfaces 512, 513 can interface with the wedges 382, 383 to prevent sliding (e.g., reduce lateral movement) between the archform 100 (e.g., male fastener 106) and the bracket 200 and/or control rotational movement of the tooth. Optionally, the inclined surfaces 512, 513 can be offset from the wedges 382, 383 in a neutral position but contact the wedges 382, 383 with rotational movement. Optionally, the inclined surfaces 512, 513 can effectively be an extension of the ramps 392, 393.

FIGS. 10B and 10C illustrate the male fastener 106 of an archform 100 positioned within the slot 202 of the bracket 200. The male fastener 106 can include a handle 380, which can be grasped to manipulate the male fastener 106. The handle 308 can be positioned in the gap 368 between the stops 204, 205. The handle 308 can include flange(s) (tab(s)) 396. The flange(s) 396 can be positioned on an end of the male fastener 106 and/or handle 308. The flange(s) 396 can be positioned on opposing sides of the handle 380. The flange(s) 396 can include two flanges, as illustrated.

As described elsewhere herein, the male fastener 106 can be inserted into the slot 202 of the bracket 200 at an angle, which can be facilitated by the angled surface 238 of the overhang 210 and/or the inclined surface(s) 508, 509. The male fastener 106 can be pushed against the C spring 256, which can deflect the C spring 256, and rotated toward the face 214 of the bracket 200. Optionally, the male fastener 106 can include a recess 402 (e.g., curved recess, groove) which can interface with the C spring 256, as shown in FIG. 10B. The recess 402 can be positioned opposite the handle 380.

With the male fastener 106 substantially parallel with the face 214 of the bracket 200, the male fastener 106 can be pushed by the C spring 256 against the stops 204, 205. The wedges 282, 283 can be positioned within the cutouts 374, 375 and/or contact the ramps 392, 393. The protrusion 216, as described elsewhere herein, can push the male fastener 106 against the overhang 210 and/or stops 204, 205. The protrusions 514, 515 can push the male fastener 106 against the overhang 210 and/or stops 204, 205. The ramps 392, 393 can contact the wedge(s) 282, 283, which can include pushing the wedge(s) 282, 283 against the stops 204, 205. As the male fastener 106 is pushed by the C spring 256 toward the stops 204, 205, the ramps 392, 393 can push the wedges 282, 283 into the cutouts 374, 375. Optionally, the inclined surfaces 512, 513 of the pad 500 can interface with the wedges 382, 383. Optionally, the inclined surfaces 512, 513 can be offset from the wedges 382, 383 in a neutral position but interface upon rotational movement.

As illustrated in FIG. 10C, the features of the pad 500 can enlarge the effective bracket width of the bracket 200 compared to the actual width of the bracket 200. The inclined surface(s) 512, 513 and/or protrusion(s) 514, 515 can increase the effective bracket width of the bracket 200, which can include providing increased rotational control.

The bracket assembly 201 with the separate pad 500 and bracket 200 can, as described elsewhere herein, reduce the variety of brackets 200 needed to treat a patient. Optionally, one bracket design can be used for lower anterior teeth while another bracket design can be used for molars and all other teeth. When manufacturing with metal injection molding (MIM) techniques, this can reduce mold costs by eliminating the quantity of bracket molds needed. This can result in higher volume manufacturing runs due to wider applicability of use of a bracket 200, which can reduce costs. The bracket assembly 201 can improve tooth rotational control (on any given tooth) without increasing the width of the bracket 200.

Figure 11A:
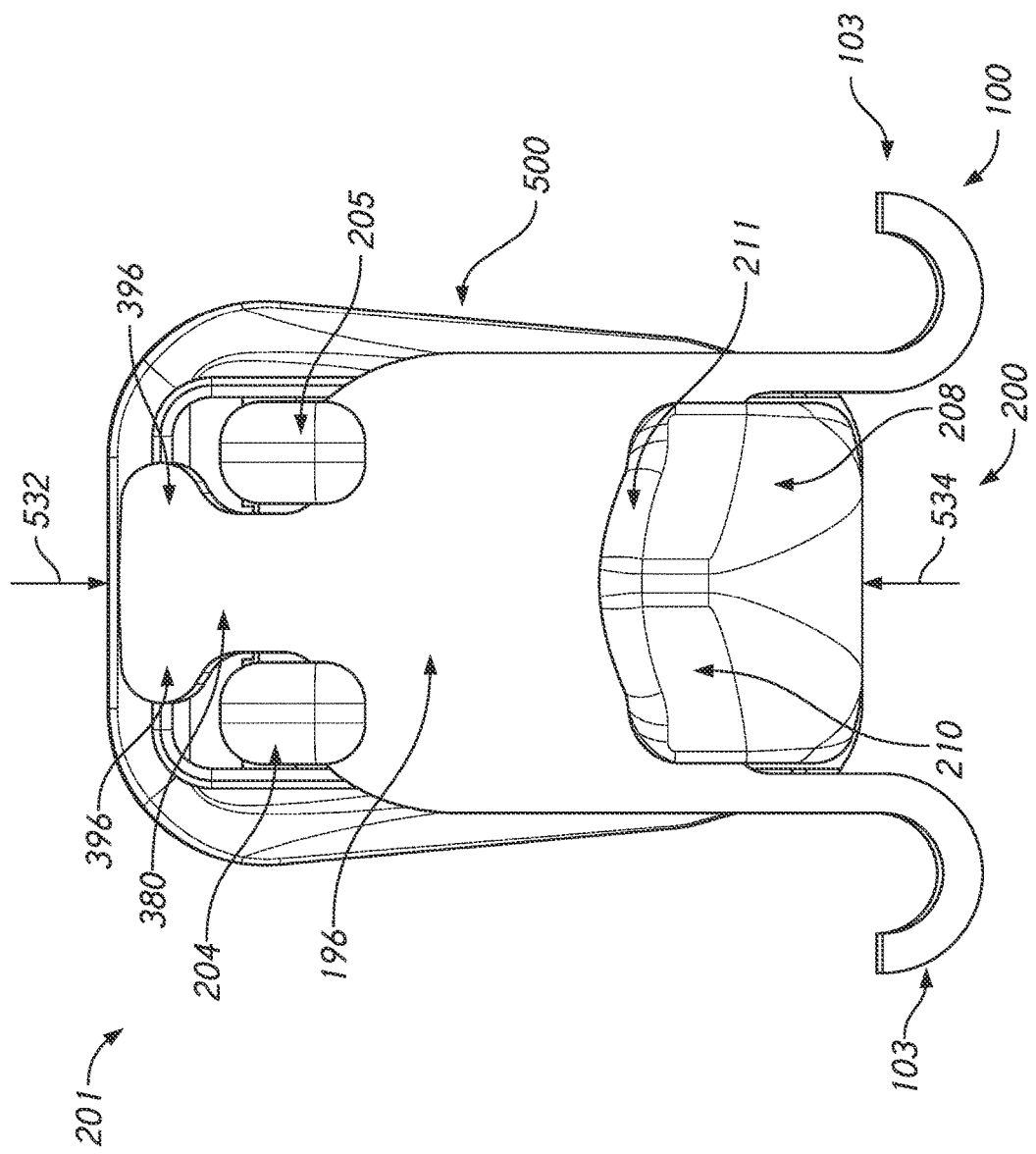
FIG. 11A illustrates a multi-part bracket.

FIG. 11A illustrates a bracket assembly 201 (e.g., two piece bracket assembly). The bracket assembly 201 can include the pad 500 with the orthodontic bracket 200 coupled thereto. The orthodontic bracket 200 can receive the male fastener 106 of the archform to facilitate tooth movement. As illustrated, the male fastener 106 is securely retained by the bracket 200 via the stops 204, 205 and retainer 208 (e.g., overhang 210).

As described elsewhere herein, the handle 380 can include flange(s) 396, which can be described as forming a hammerhead type shape. The handle 380 can be disposed between the stops 204, 205 to help prevent relative movement between the bracket 200 and the male fastener 106. The handle 380 can be used to remove the male fastener 106 from the bracket 200 and/or place the male fastener 106 in the bracket 200. In some variants, the handle 380 can extend from the bracket 200 in the occlusal direction. In some variants, the handle 380 can extend from the bracket 200 in the gingival direction. In some variants, an opening/closing tool that uses equal and opposite forces can be used to place and/or remove the male fastener 106 of the archform 100. In some variants, a hemostat or forceps type tool can be used to place and/or remove the male fastener 106 of the archform 100.

For example, to remove the male fastener 106, one side of the forceps can grip the handle 380 at surface 532 (e.g., occlusal side, surface) while the other side of the forceps can grip the retainer 208 at surface 354 (e.g., gingival side or gingival surface). The operator can squeeze the forceps together to push the male fastener 106 against the C-spring 256 (e.g., oval spring), shown in FIG. 11B, which can move the male fastener 106 (e.g., occlusal edges disposed on opposing sides of the handle 380) out from under the stops 204, 205 of the bracket 200 as the C-spring 256 is compressed. The forceps can be rotated away from the stops 204, 205 to rotate the male fastener 106 such that the male fastener 106 is decoupled from the bracket 200.

The bracket 200 and/or male fastener 106 can include features to prevent over travel (e.g., excessive deflection) of the C-spring 256 (e.g., oval spring). As described elsewhere herein, the bracket 200 can include the guide 366 (e.g., guide rail, protrusion, longitudinal protrusion, bar). The guide 366 can maintain the position of the C-spring 256 within the opening 352 and/or prevent the C-spring 256 from being excessively deflected (e.g., prevent from being deflected past an elastic limit). For example, the C-spring 256, in some variants, can be deflected until contacting the guide 366. In some variants, the periphery of the opening 352 can restrict deflection of the C-spring 256 to protect against over travel. As described elsewhere herein, the opening 352 can be disposed in the retainer 208 and/or the portion of the bracket 200 opposite the retainer 200. In some variants, surface(s) 130 of the male fastener 106 can engage with the surface(s) 520 of the bracket 200 (e.g., retainer 208) to help prevent over travel of the C-spring 256 during compression. For example, the surface(s) 130 of the male fastener 106 can be displaced toward the surface(s) 520 of the bracket 200 until contract, which can prevent further deflection of the C-spring 256 (e.g., prevent over travel of the oval spring 256). The one or more of the features detailed above can prevent the oval spring 256 from over travel or being compressed beyond the elastic limit of the oval spring 256 even when the operator may squeeze the forceps excessively.

For installation, the portion of the male fastener 106 opposite the handle 380 can be disposed under the overhang 210 of the retainer 208 of the bracket 200 to contact and/or be positioned proximate the C-spring 256 such that the male fastener 106 is angled relative to the bracket 200. In some variants, the recess 402 of the male fastener 106 can contact the C-spring 256. In some variants, the operator can grab the handle 380 of the male fastener 106 to position the male fastener 106 as described above. The inclined surfaces 508, 509 and/or chamfer 238 can assist the operator in positioning the male fastener 106 as described above.

To securely couple the male fastener 106 to the bracket 200, one side of the forceps can grip the handle 380 at surface 532 while the other side of the forceps can grip the retainer 208 at surface 354. The operator can squeeze the forceps together to push the male fastener 106 against the C-spring 256 which can enable the operator to pivot the male fastener 106 toward the bracket 200 and around the stops 204, 205 as the C-spring 256 is compressed. The operator can stop squeezing (e.g., applying a compressive force) with the forceps, or similar tool, which can release the C-spring 256 to apply a force against the male fastener 106 such that the male fastener 106 is pushed against and/or under the stops 204, 205. The C-spring 256 can be protected against over travel or deflection past an elastic limit via at least the features described elsewhere herein.

As described elsewhere herein, the bracket assembly 201 with the pad 500 and bracket 200 can enable a single bracket design to be used across several teeth. Instead of altering the bracket 200 from tooth to tooth, the pad 500 can be altered as needed from tooth to tooth. For example, the pad 500 can be different sizes and/or have different features depending on the tooth to which the pad 500 will be bonded while still being able to receive and/or bond to the bracket 200. This can reduce cost. For example, the number of styles (e.g., SKUs) of brackets 200 can be reduced, which can result in higher volume manufacturing runs of brackets 200 to reduce cost. The pad 500 can also be cheaper to manufacture than brackets 200 because pad molds can be less expensive than bracket molds, which can result in cheaper manufacturing cost due to more pad variations than bracket variations.

Figure 11B:
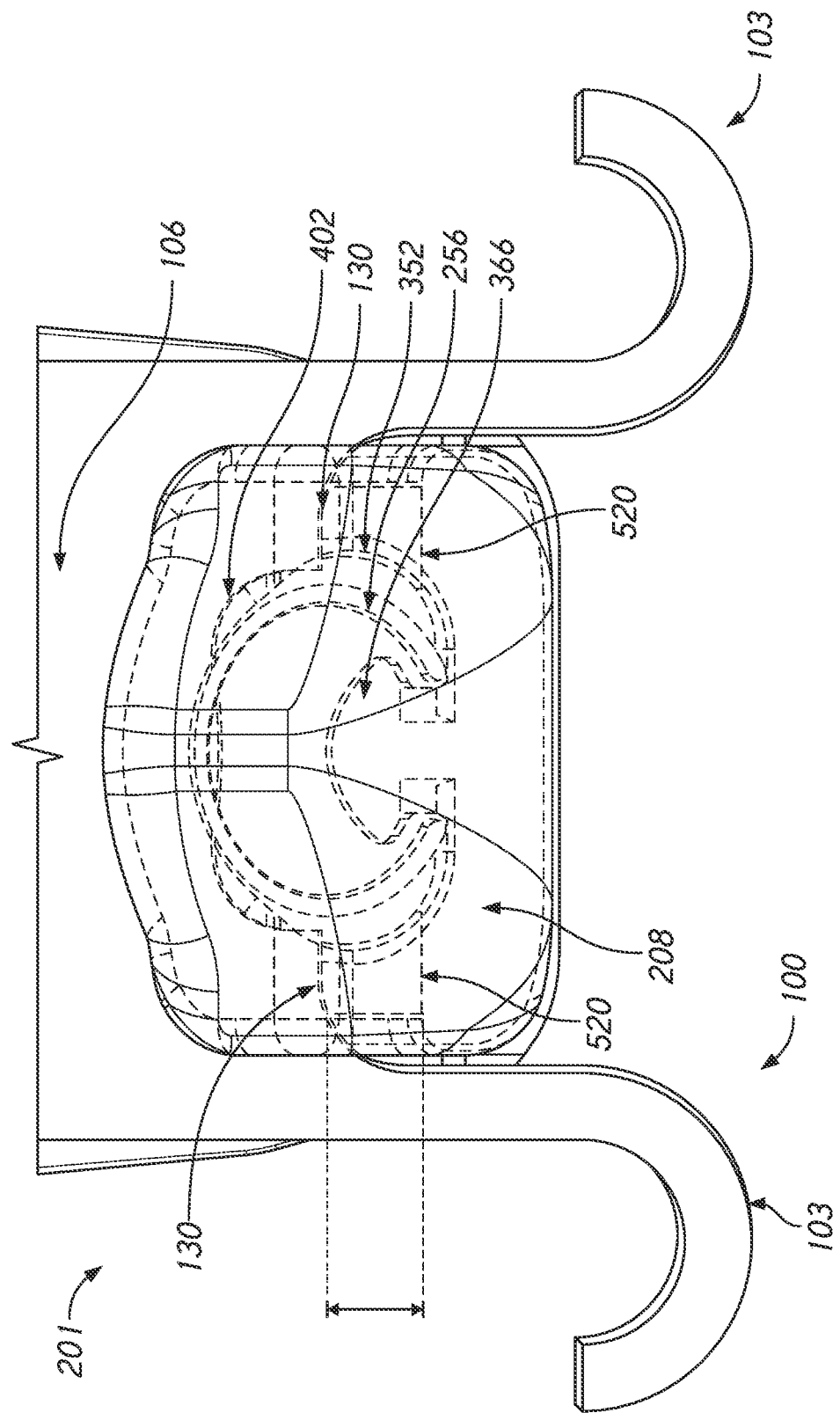
FIG. 11B illustrates a portion of the multi-part bracket of FIG. 11A.
Figure 11C:
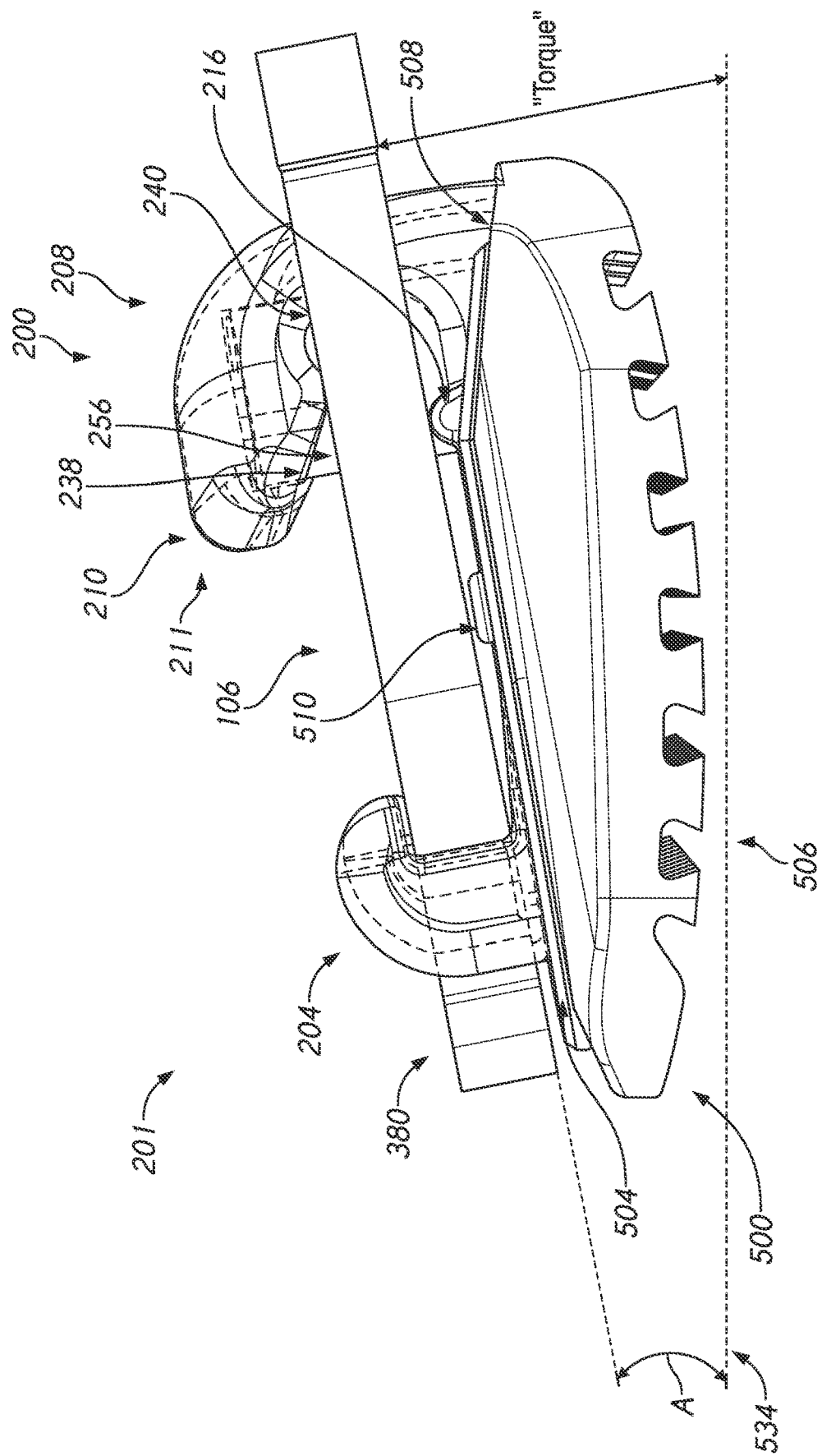
FIG. 11C illustrates a section view of the multi-part bracket of FIG. 11A.
Figure 12:
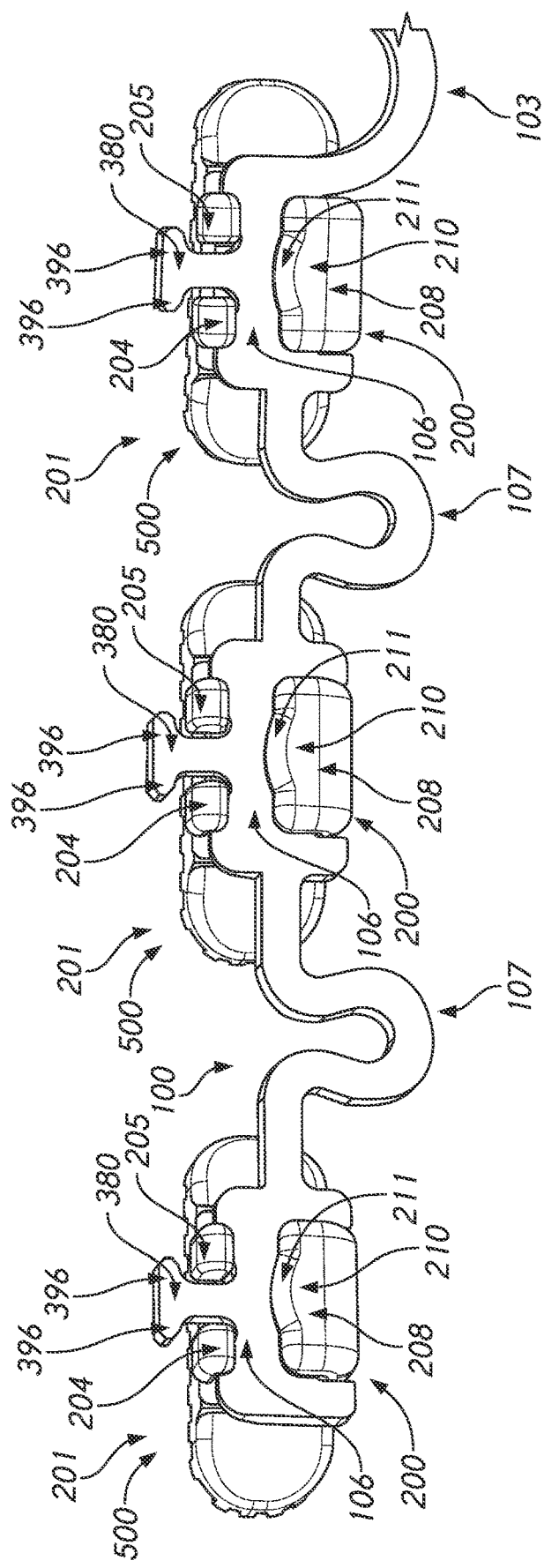
FIG. 12 illustrates a plurality of multi-part brackets coupled to an archform.

In some variants, a lower anterior bracket, such as the bracket 200 illustrated in FIGS. 11A-11C, can be used with pads 500 on the lower 3-3 while another style bracket 200 (e.g., illustrated in FIG. 12, can be used with a pad 500 (which may vary from tooth to tooth) on all other teeth of the patient. This can enable two bracket designs to be used during orthodontic treatment with various style pads 500.

As described above, despite using the same bracket 200, pads 500 may vary from tooth to tooth. For example, different "torque" may be added to some pads 500 to help keep the interproximal loops 103 of the archform 100 away from the gingiva of the patient. The "torque" can be implemented in the pads 500 instead of the brackets 200 because, as explained above, the pads 500 can be varied from tooth to tooth while receiving the same style bracket 200. In some variants, the "torque" can be implemented in the pads 500 instead of the brackets 200 because the amount of "torque" can be individually tailored for each particular tooth of a patient. In some variants, the "torque" can be the angle A, as illustrated in FIG. 11C, between the surface 534 of the patient's tooth and the bottom surface of the male fastener 106. In some variants, for example, the pads 500 for lower 3-3 teeth can have ten degrees of torque (as shown in FIG. 11C) but other torque angles are contemplated, such as 5, 6, 7, 8, 9, 10, 11, 12, 13, 14, 15, 16, 17, 18, 19, 20, or more than 20 degrees. In some variants, the pads 500 for molars can have zero degrees of torque but other torque angles are contemplated, such as 1, 2, 3, 4, 5, or more degrees. In some variants, the pads 500 for other teeth besides molars and the lower 3-3 can have five degrees of torque but other torque angles are contemplated, such as 5, 6, 7, 8, 9, and 10 degrees or more.

FIG. 12 illustrates a plurality of bracket assemblies 201 coupled to an archform 100. As illustrated, the pads 500 have widths to increase rotational control of the tooth onto which a given pad 500 is coupled. The archform 100 (e.g., archwire) can include hooks 107 (e.g., loops) that can allow for the use of elastics, such as bands, etc. This can facilitate treatment of class II and class III malocclusions.

Figure 13B:
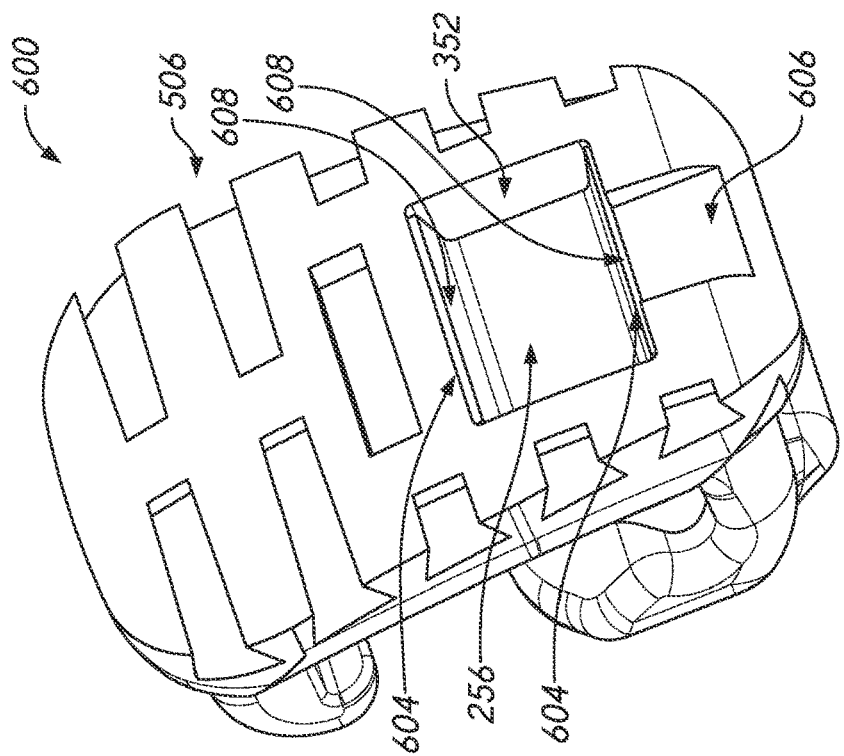
FIG. 13B illustrates a rear view of the bracket of FIG. 13A.
Figure 13A:
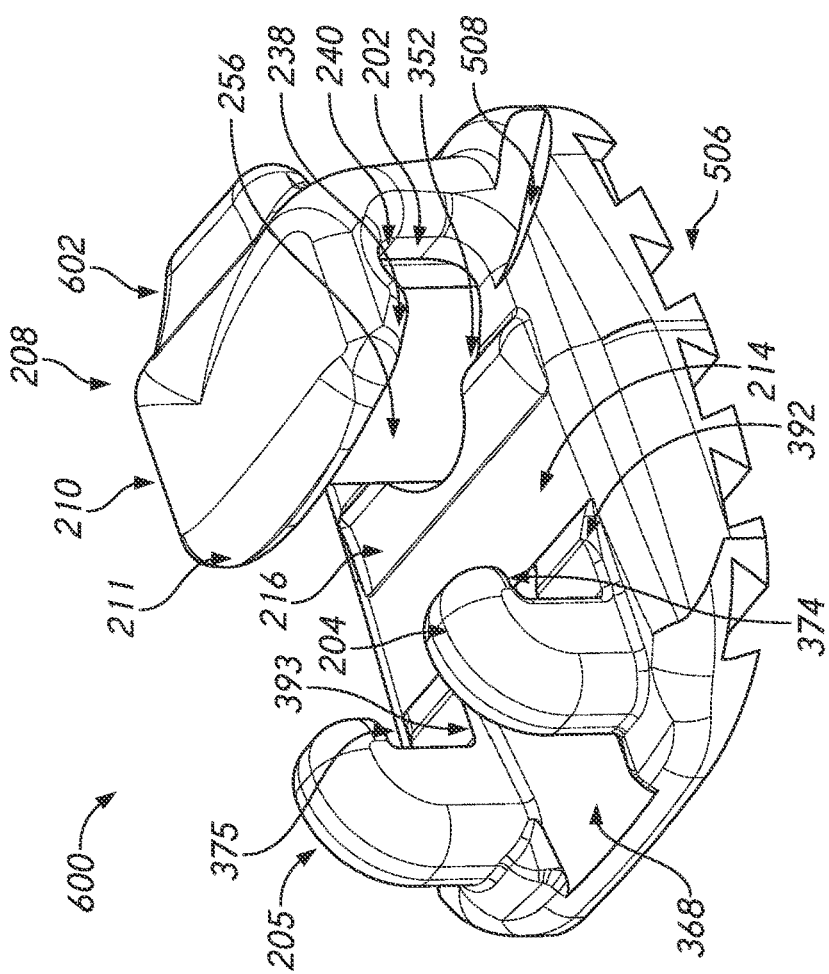
FIG. 13A illustrates a bracket.

FIGS. 13A and 13B illustrate a bracket 600. The bracket 600 can include some or all of the features described in reference to other brackets or assemblies described herein. The bracket 600 can include undercut(s) (cut(s), gap(s), textured surface, void(s), slot(s)) 506, similar to those described in reference to the foregoing pads. The undercuts 506 can facilitate improved bonding between the bracket 600 and the teeth of a patient (e.g., adhesive can flow into the undercuts 506). In contrast to some of the foregoing assemblies, the bracket 600 may, in some variations, not have a separate pad but, instead, include the undercuts 506 on a side of the bracket 600. The bracket 600 can be referred to as a one-piece bracket or one-piece bracket/pad assembly.

The bracket 600 can include a C spring 256 (e.g., spring, leaf spring, spring locking pin, locking spring, round locking spring). The C spring 256 can be positioned within an opening 352 of the bracket 600 and under the overhang 210 of the bracket 600. The opening 352 can extend through a bottom of the bracket 600 (e.g., side of the bracket 600 of the undercuts 506). The C spring 256 can be installed through the opening 352 extending through the bottom of the bracket 600. The C spring 256 can include one or more tabs 608 (i.e., flanges) that can engage with a periphery of the opening 352 to facilitate positioning the C spring 256 therein. The opening 352, on the bottom side of the bracket 600, can be covered to help secure the C spring 256 in place and/or to impede adhesive from flowing into the opening 352. The opening 352 can be covered via a variety of techniques, such as with sheet metal, a mesh pad, and/or others. In some variants, the sheet metal covering the opening 352 can be welded at one or more locations 604. In some variants, the mesh pad can facilitate improved bonding with the surface of the tooth upon which the bracket 600 is located. In some variants, the bracket 600 can include a groove 606 (i.e., channel) that can facilitate positioning or removing the cover over the opening 352. For example, the groove 606 can enable a tool to have access to the cover over the opening 352 and/or enable the tool to place the cover over the opening 352.

The bracket 600 can include a protuberance 602, also referred to as a bump, engagement region, protrusion, etc. The protuberance 602 can be disposed on the retainer 208, which can include being formed as part of the retainer 208. The protuberance 602 can be engaged by a tool (e.g., opening/closing tool) to install or remove the male fastener 106 from the bracket 600.

Figure 13C:
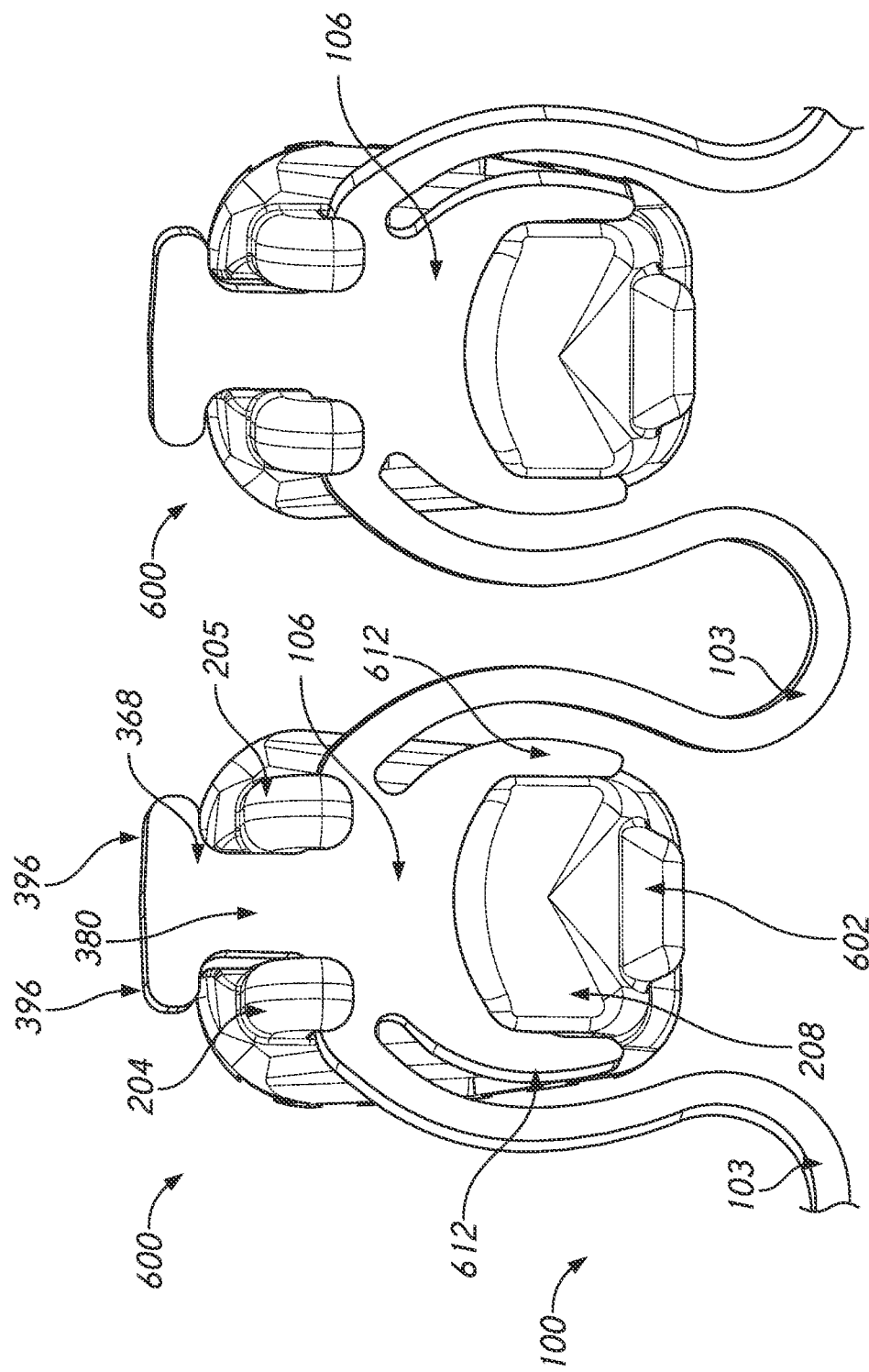
FIG. 13C illustrates the bracket of FIG. 13A coupled to an archform.

FIG. 13C. illustrates a segment of an archform 100 coupled with brackets 600. The segment of the archform 100 illustrated can correspond to specific teeth or a specific portion of the arch of the patient, such as the anterior teeth. The archform 100 includes a male fastener 106 that can be coupled to the bracket 600. The male fastener 106 can include a tongue 380 (i.e., tab, handle) that can be disposed between the stops 204, 205. Stated differently, the tongue 380 can be disposed in the gap 368 between the stops 204, 205. The handle 308 can include flange(s) 396 (tab(s)) that can help secure the male fastener 106 to the bracket 600.

The male fastener 106 can include arms 612 that can help secure the male fastener 106 and bracket 600 together. For example, the male fastener 106 can include arms 612. In some variants, the male fastener 106 can include two arms. In some variants, the male fastener 106 can include one, three, four, or more arms 216. The arms 612 can grip, hold, grasp, hug, snap around, and/or otherwise interface with the bracket 600 (e.g., mesial and distal sides of the retainer 208) to provide improved grip control. In some variants, the arms 612 can snap around the lateral sides (e.g., me of the retainer 208. The arms 612 can extend in a direction that is opposite the tongue 380. In some variants, the arms 612 can curve outward away from a central longitudinal axis of the male fastener 106. The arms 612 can hold the archform 100 (e.g., male fastener 106) in place on the bracket 600 as an operator positions a tool (e.g., open/closing tool) to secure the archform 100 to the bracket 600, as described herein. Specifically, the arms 612 can hold, which can include lightly hold, the male fastener 106 to the bracket 600 during the installation process and further secure the male fastener 106 to the bracket 600 after installation. For example, the arms 612 can hold the archform 100 in position (e.g., couple the male fastener 106 to the bracket 600) while a clinician positions a tool (e.g., opening/closing tool) to secure the archform 100 to the bracket 600 (e.g., position the male fastener 106 within the bracket 600). This can free the clinician to not hold the archform 100 with an opposite hand while repositioning the tool (e.g., opening/closing tool) with the other hand. The arms 612 can couple to the retainer 208 of the bracket 600. For example, the arms 612 can extend to engage, which can include couple to, contact, grip, etc., the mesial and distal sides of the retainer 208. In some variants, the arms 612 can apply a force to the retainer 208 when secured there around. In some variants, the arms 612 can be offset from the interproximal loops 103 extending from the male fastener 106. In some variants, the arms 612 can have a curvature that corresponds to a portion of the interproximal loops.

Figure 13D:
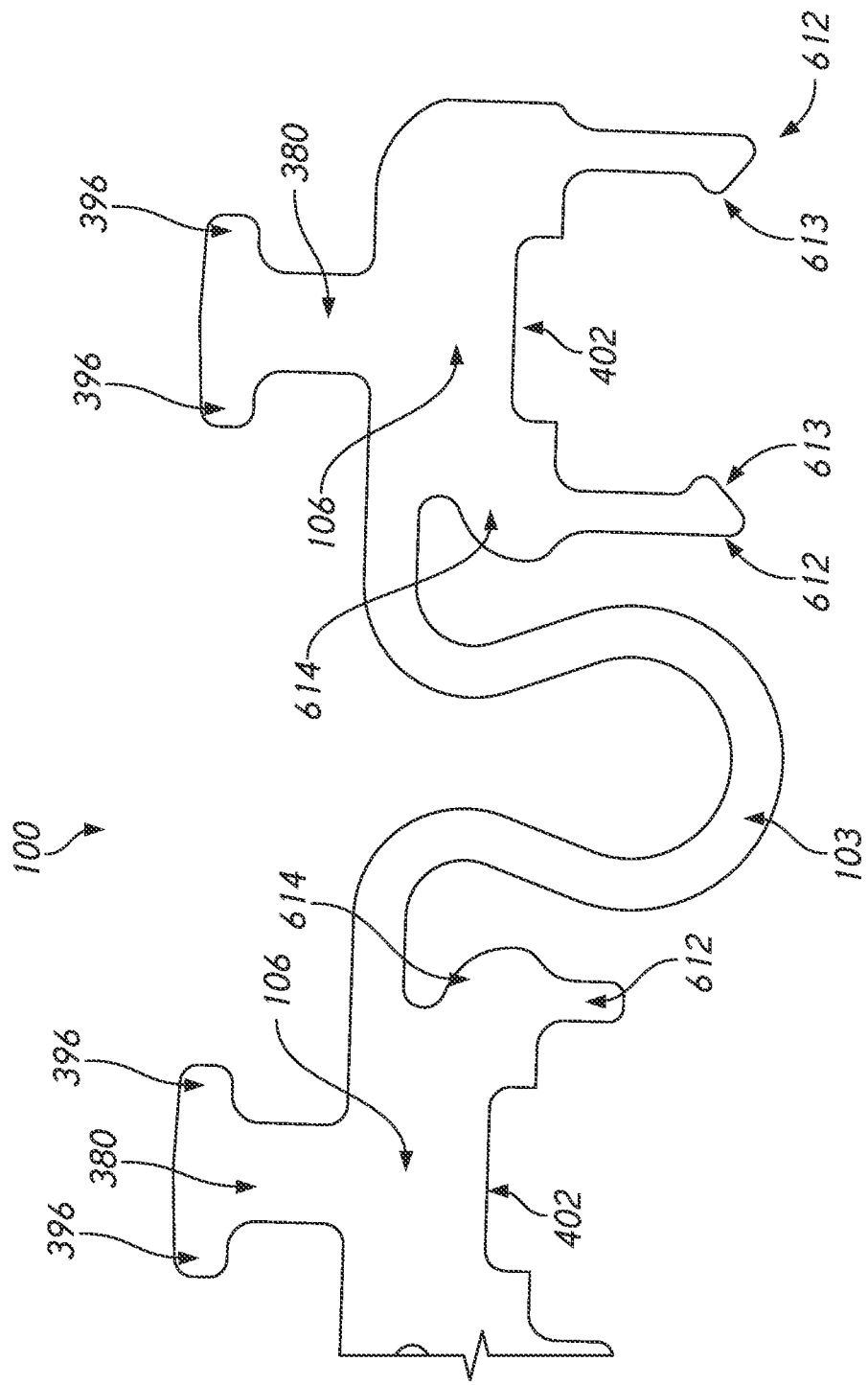
FIG. 13D illustrates an archform.

FIG. 13D illustrates a segment of an archform 100, which can include at least some or all of the features of the archforms described elsewhere herein. The segment of the archform 100, illustrated in FIG. 13D, can be used with molars. The male fastener 106 can include a recess 402 (e.g., curved recess, groove) which can couple to the retainer 208 of the bracket 600. The male fastener 106 can be disposed in the bracket 600 such that the recess 402 receives the C spring 256. The male fastener 106 can include curves 614, also referred to as hips. The curves 614 can be disposed on opposing lateral sides of the male fastener 106 (e.g., mesial and distal sides). The curves 614 can engage with features of the bracket 600, which can facilitate rotational control. For example, in some variants, the curves 614 can engage with the retainer 208 and/or other portions of the bracket 600.

The archform 100 can include arms 612. The arms 612 can extend in a direction opposite of the tongue 380. The arms 612 can be varying lengths. The arms 612 can be straight, curved, and/or in other configurations. The arms 612 can include engagement features 613 (also referred to as tabs, flanges, etc.) which can engage with features of the bracket 600, such as the retainer 208, to hold the male fastener 106 to the bracket 600. The engagement features 613 can be disposed proximate an end of the arms 612. The engagement features 613 can extend inward, which can include toward a central longitudinal axis of the male fastener 106. During installation, a clinician can engage the archform 100 with molar brackets first. The arms 612 can secure the archform 100 to one or more brackets 600, which can prevent the archform 100 from disengaging with the brackets 600 as the clinician repositions an opening/closing tool to place a male fastener 106 in the bracket 600.

The archform 100 can be conveniently cut to a desired length, as illustrated in FIG. 13D. The bracket 600 can shield the patient from discomfort burrs from the cutting operation. The interproximal loops 103 can be engaged by elastics as part of a treatment plan. In some variants, the interproximal loops 103 can act as hooks to engage elastics.

FIG. 13E illustrates an archform 100 with customized features 616. As described elsewhere herein, the archform and brackets can be positioned on the labial or lingual side of a patient's teeth. The customized features 616 can be aesthetically pleasing (e.g., stylized) or convey a message. Accordingly, the archform 100 with the customized features 616 can be disposed on the labial side of the teeth. In some variants, the customized features 616 can include letter(s), logo(s), symbol(s), and/or other features. For example, as illustrated, the customized features 616 include letters conveying a message, which can enable the patient to display the message upon smiling. The customized features 616 can be part of and/or disposed at the interproximal loops 103. In some variants, the customized features 616 can be positioned on other portions of the archform 100. In some variants, the customized features can be a different color than other portions of the archform 100 to enable easier identification.

Figures 14A, 14B:
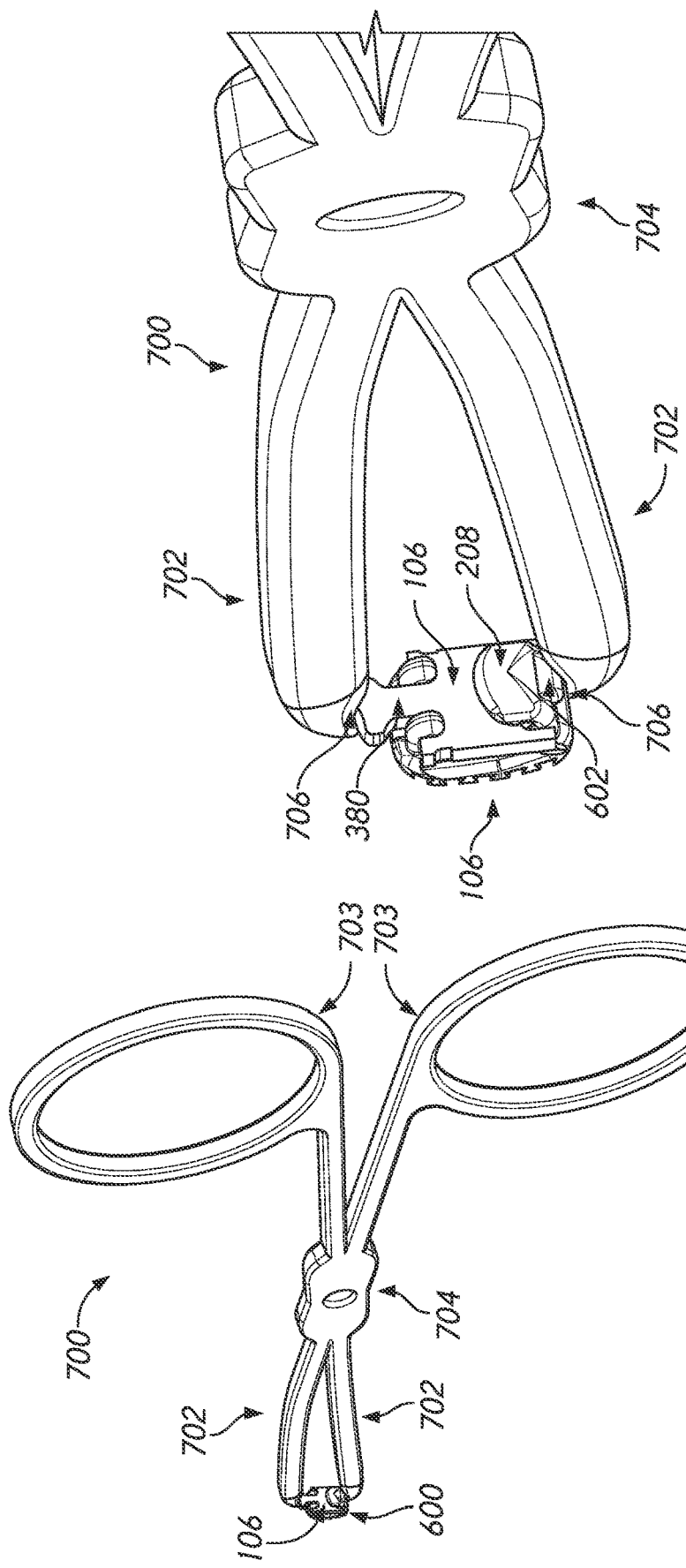
FIG. 14A illustrates a tool grasping a portion of an archform disposed within a bracket.
FIG. 14B illustrates an enlarged view of a portion of the tool of FIG. 14A grasping the bracket.
Figure 14C:
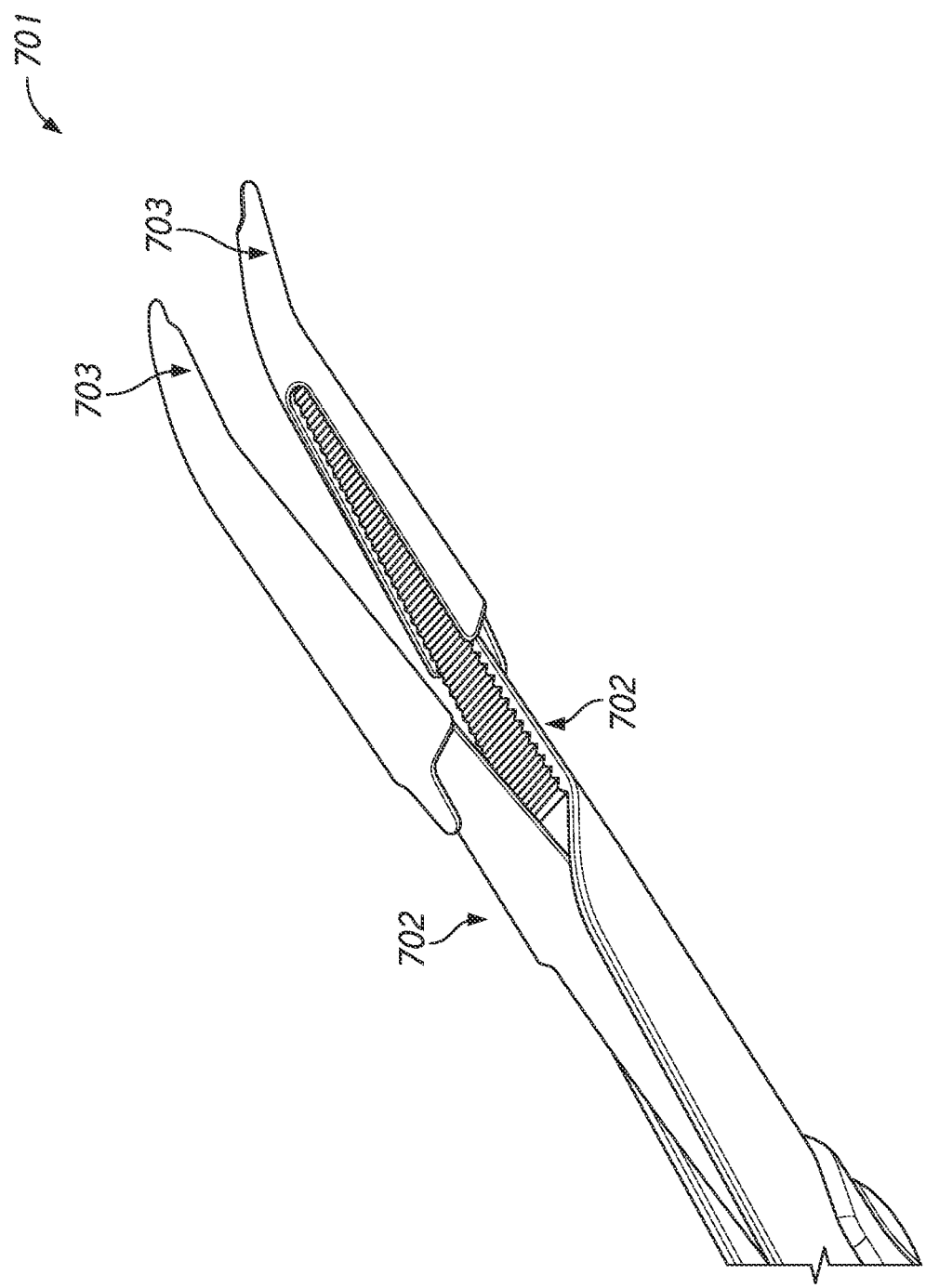
FIG. 14C illustrates a tool, such as a hemostat, that can be used for archform insertion into a mouth of a patient.

FIGS. 14A-14B illustrate a tool 700, also referred to as an opening/closing tool, which can be used to position a male fastener 106 of an archform 100 in a bracket 600. The tool 700 can be used to grab portions of the archform 100, including the male fastener 106, during installation and removal. The tool 700 can include two members 702 that pivot relative to each other at pivot 704. Each member 702 can include loops 703, also referred to as grasping portions, which can be gripped by the clinician to rotate the members 702 relative to each other to grab or release a portion of the archform 100. For example, FIG. 14A illustrates the tool 700 gripping a male fastener 106 within a bracket 600. As shown in FIG. 14B, each of the members 702 can include a groove 706 that can facilitate a secure grip of the male fastener 106 and/or bracket 600, which can include the protuberance 602. The groove 706 of one member 702 can engage with the tongue 708 of the male fastener 106 and the groove 706 of the other member 702 can engage with the protuberance 602 of the bracket 600. The tool 700 can engage/disengage the archform 100 in the occlusal/gingival direction. The tool 700 can use equal and opposite force to insert/remove the archform 100 from the bracket 600, which can reduce discomfort to the patient. The tool 700, in some variants, can be molded as one. FIG. 14C illustrates a tool 701, such as a hemostat. The tool 701 can be used to grasp, such as grasp portions of the archform 100, including the male fastener 106, during installation and removal. The tool 701 can include two members 702 that can pivot relative to each other to grasp. The tool 701 can include tips 703. The tips 703 can be formed via a variety of techniques, which can include by way of metal injection molding (MIM) manufacturing. The tips 703 can be attached to the two members 702—e.g., one tip 703 to each member 702. The tips 703 can be attached (e.g., laser or brazed) onto the two members, respectively. In some variants, the tips 703 can be attached (e.g., laser or brazed) onto ends of the two members, respectively. In some variants, the tool 701 can be bought off the shelf and the tips 703 manufactured and attached thereto.

During installation, the clinician can grip, which can be via the tool 700, a segment of the archform 100 that is to be coupled with the molars or other portion of the arch of the patient. The clinician can engage the arms 216 of the male fastener 106 with the bracket 600 disposed on the molar or other tooth of the patient, which can include positioning the arms 216 on opposing sides (e.g., mesial and distal) of the retainer 208 of the bracket 600. The male fastener 106 can be positioned at an angle relative to the face 214 of the bracket 600, as described elsewhere herein. For example, the inclined surfaces 508, 509 and/or angled surface 238 can enable the male fastener 106 to be positioned at an angle relative to the face 214 of the bracket 600. With the arms 216 holding the male fastener 106 onto the retainer 208 of the bracket 600, the clinician can release the grip of the tool 700 on the male fastener 106 to reposition the tool 700. The tool 700 can be repositioned such that one member 702 engages the tongue 380 of the male fastener 106 and the other member 702 engages the protuberance 602 of the bracket 600, which can include engaging the groove(s) 706 as illustrated in FIG. 14B. The clinician can squeeze the loops 703 together to apply opposite and equal forces onto the male fastener 106 and the protuberance 602 of the retainer 208 with the members 702, which can compress the C spring 256. With the C spring 256 compressed, the clinician can rotate the male fastener 106 towards the face 214 of the bracket 600, which can include positioning the male fastener 106 parallel to the face 214 of the bracket 600. The clinician can release the members 702 to allow the C spring 256 to push the male fastener 106 into the cutouts 374, 375 (also referred to as spaces or pockets) of the stops 204, 205, securing the male fastener 106 within the slot 202 of the bracket 600. As described elsewhere herein, the protrusion 216 (bump) can push the male fastener 106 against the overhang 210 to secure the male fastener 106 within the slot 202 of the bracket 600.

During removal, the clinician can grip, which can be via the tool 700, the male fastener 106 and the bracket 600 such that one member 702 engages the tongue 380 of the male fastener 106 and the other member 702 engages the protuberance 602 of the bracket 600, which can include engaging the groove(s) 706 as illustrated in FIG. 14B. The clinician can squeeze the loops 703 together to apply opposite and equal forces onto the male fastener 106 and the protuberance 602 of the retainer 208 with the members 702, which can compress the C spring 256. With the C spring 256 compressed, the male fastener 106 can be moved out from the cutouts 374, 375 of the stops 204, 205. The clinician can rotate the male fastener 106 away from the face 214 of the bracket 600, which can include positioning the male fastener 106 at an angle relative to the face 214 of the bracket 600. The inclined surfaces 508, 509 and/or angled surface 238 can enable the male fastener 106 to be positioned at an angle relative to the face 214 of the bracket 600. The clinician can release the grip of the tool 700 on the male fastener 106 and protuberance 602 and reposition to grip the male fastener 106 for removal from the bracket 600. In some variants, the bracket 600 does not have a protuberance 602 and the member 702 can engage another feature of the bracket 600.

Figure 15A:
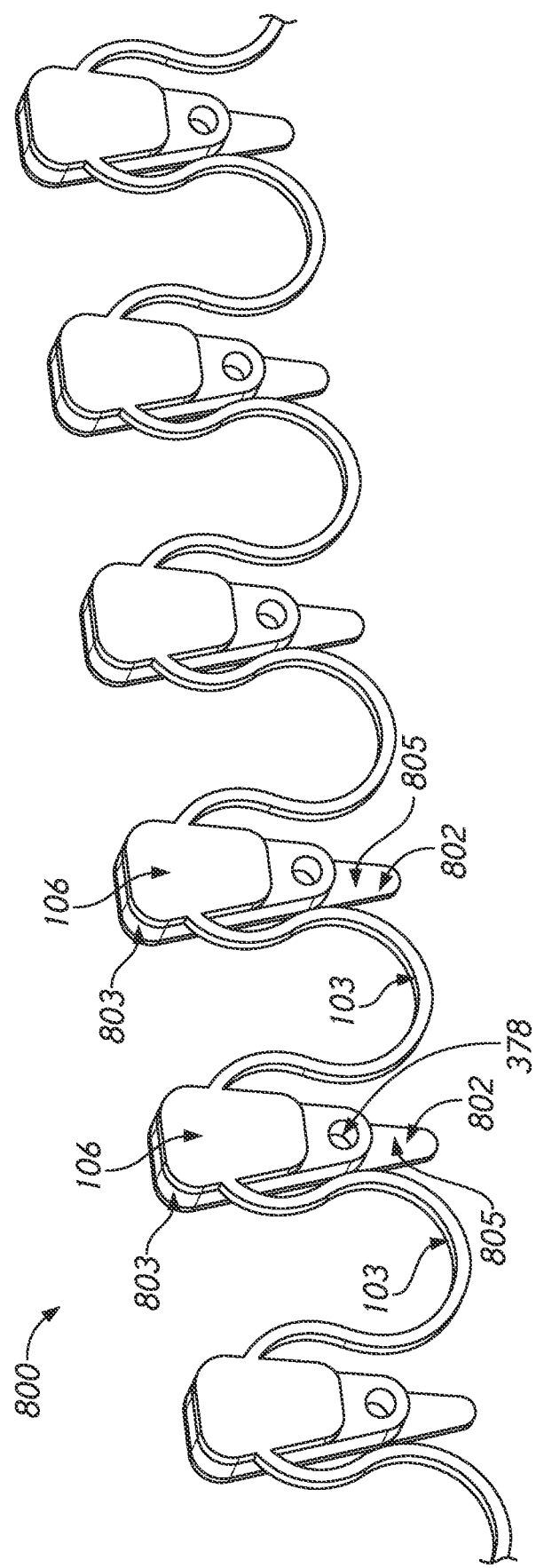
FIG. 15A illustrates an archform that can be adhered or otherwise fixed to teeth of a patient.

FIG. 15A illustrates a segment of an archform 800. The archform 800 can have a configuration that is set for an individual patient. The archform 800 can be installed on the labial or lingual side of a patient's teeth. The archform 800 can be installed in the mouth of a patient by the patient or a clinician. Installation by the patient can advantageously reduce or eliminate the need to visit an orthodontic office in person. In some variants, the archform 800 can be installed on the teeth of the patient without brackets. The archform 800 can include a reduced profile, which can improve a patient's comfort. The small profile (i.e., low profile) of the archform 800 can reduce or eliminate occlusions with the opposite arch. The archform 800 can be adhered to the teeth of the patient as described below, which can reduce chair time at a clinician's office to prepare teeth for bonding. The archform 800 can include a small profile, which may reduce speech impediments. In some variants, the small profile of the archform 800 can prevent or lessen bulging out of the lips of the patient after installation. The archform 800 may not need to be removed from the mouth of the patient for eating or drinking, reducing compliance issues that may occur with trays. The archform 800 can be configured to ease flossing.

The archform 800 can include a plurality of male fasteners 106. The male fasteners 106 can be flat. The male fasteners 106 can be a variety of shapes, which can include having four rounded corners with one side being larger than the other. Adjacent male fasteners 106 can be separated by an interproximal loop 103, which can apply a force on the teeth of the patient and/or be coupled with elastics according to a treatment plan. In some variants, a straight segment or other configuration can separate adjacent male fasteners 106. The interproximal loops 103 can extend in the gingival or occlusal directions.

The male fasteners 106 can be coupled, which can include attached, adhered, and/or otherwise fixed, to an mounting pad 803, also referred to as an adhesive foam layer, foam release tab, tab, foam mounting pad, mounting element, etc. In some variants, the mounting pad 803 includes an adhesive on opposing sides, one side adhered to the male fastener 106 and the other adhered to a protective layer 802, also referred to as a protective peel layer. In some variants, the mounting pad 803 can be referred to as double-sided tape. The mounting pad 803 can be various shapes, which may vary depending on tooth size. For example, a larger mounting pad 803 may be desired for a larger tooth while a smaller mounting pad 803 may be desired for a smaller tooth. In some variants, a larger mounting pad 803, e.g., one with a larger adhesive surface, may provide increased rotational control. The mounting pad 803 can include a shape with three curved corners, with one side of the mounting pad 803 being larger than the other. The mounting pad 803 can have a periphery that is the same as a portion of the male fastener 106. For example, the larger end of the mounting pad 803 can have a periphery that is the same or similar to the male fastener 106. The mounting pad 803 can include a hole 378, which can be engaged by a tool to manipulate the mounting pad 803 and/or archform 800. The hole 378 can receive at least a portion of a tool (e.g., explorer, explorer tool) to manipulate the mounting pad 803.

The protective layer 802 can be removed to expose an adhesive surface of the mounting pad 803. The protective layer 802 can have a portion 805 (also referred to as a tab) that extends beyond the periphery of the mounting pad 803 when positioned thereon. The portion 805 can extend in an occlusal, gingival, or other direction. In some variants, the portion 805 extends away from the male fastener 106, which can be in the same direction as the interproximal loops 103.

The archform 800 can be formed per a patient treatment plan. For example, the archform 800 can be configured to be placed on the maloccluded teeth of the patient, such that the archform 800 can exert forces on the teeth to move the teeth from a first position to a second position. The archform 800 can be formed via scans and digital models of the patient's teeth. In some variants, the archform 800 can become soft and/or more pliable when immersed in fluid, such as water, that is either above or below body temperature, depending on the material properties of the archform 800. This can make manipulation of the archform 800 easier during installation.

During installation, the protective layer 802 can be removed to expose the adhesive surface of the mounting pad 803 that is attached to a male fastener 106. The mounting pad(s) 803 with the adhesive surface exposed can be pressed against respective teeth of the patient according to a treatment plan to adhere the mounting pad 803 to the respective surface of the teeth of the patient. To remove the archform 800, the clinician or patient can pull the mounting pad 803, which can stretch the mounting pad 803, by the portion that extends beyond the periphery of the male fastener 106 such that the adhesive bond between the adhesive surface of the mounting pad 803 and the tooth is broken. In some variants, the clinician or patient can pull the mounting pad 803, which can stretch the mounting pad 803, in a direction that is parallel to the surface of the tooth upon which the mounting pad 803 is adhered to break the adhesive bond between the mounting pad 803 and the tooth of the patient. In some variants, the clinician or patient can pull the mounting pad 803 in the lingual and/or occlusal direction to break the adhesive bond, which can include stretching and breaking the adhesive bond and/or mounting pad 803. In some variants, the clinician or user can interface with the hole 378, which can be via a tool, to pull the mounting pad 803 to break the adhesive bond. In some variants, the clinician or user can pull the mounting pad 803 in the lingual direction to stretch and break the foam adhesive layer between the archform 800 and the tooth. The archform 800 can be supplied to a patient or clinician with extra mounting pads 803, such that a mounting pad 803 can be replaced if compromised (e.g., archform 800 is dropped to a contaminated surface with an adhesive surface of the mounting pad 803 exposed) to facilitate multiple installation attempts.

Figure 15B:
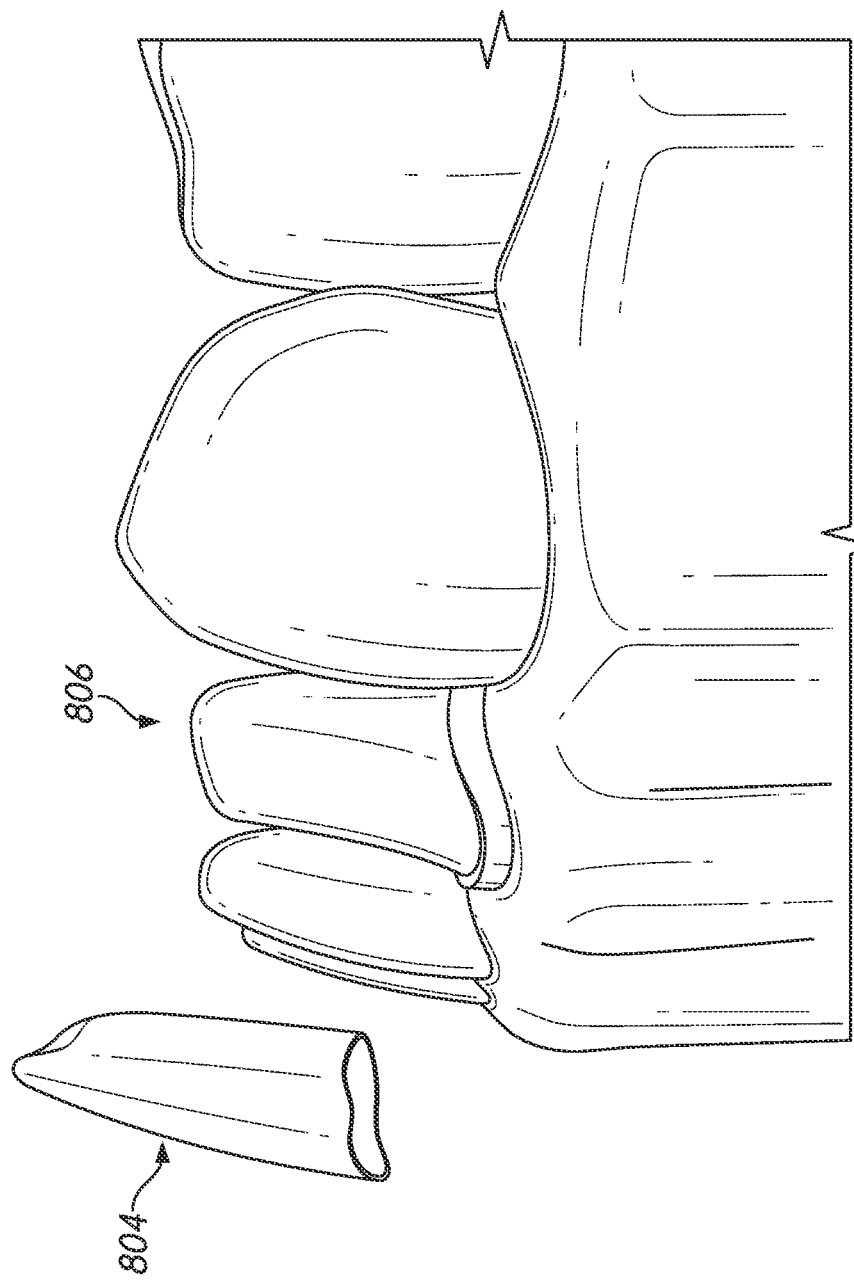
FIG. 15B illustrates caps that can be attached or otherwise incorporated into an archform that can be applied to teeth of a patient.

FIG. 15B illustrates caps 804. The caps 804 can, in some variants, be referred to as veneers or porcelain veneers. The caps 804 can be thin. The caps 804 can be incorporated into the archform 800 to conceal features of the archform 800 and/or facilitate an aesthetic look. For example, the back surface of the caps 804 (or other surface) can be coupled, which can include at least adhered, fixed, attached, etc., to the male fasteners 106, other features of the archform 800, and/or tooth of the patient, which can be via a mounting pad similar to the mounting pad 803, to conceal features of the archform 800 and/or facilitate an aesthetic look. In some variants, a protective layer can be removed, by the patient or clinician, from a mounting pad adhered to the cap 804 to expose an adhesive surface which can be pushed against the surface of the patient's respective tooth and/or male fastener 106 to couple the cap 804 to the patient's tooth. In some variants, a portion of the mounting pad adhered to the cap 804, which can be a transparent tab or portion, can protrude beyond the periphery of the cap 804 when the cap 804 is adhered to the surface of the patient's tooth and/or male fastener 106. The portion of the mounting pad protruding beyond the periphery of the cap 804, which can be a transparent tab or portion, can be pulled and/or stretched by the patient or clinician to break the adhesive bond between the surface of the patient's tooth and the adhesive surface of the mounting pad. In some variants, the adhesive can include a whitening solution to whiten the patient's teeth while the patient wears the appliance. In some variants, the back surface of the caps 804 can include disinfectant or other solution to prevent decalcification. In some variants, the mounting pad on the back surface of the cap(s) 804 can prevent or reduce the existence of gaps (e.g., nooks and crannies) between the caps 804 and the tooth surface, which may eliminate or reduce the need to include a disinfectant or other solution to prevent decalcification. The archform 800 can be part of a treatment plan using multiple archforms 800, as described elsewhere herein. An initial archform 800 can be removed as described herein and a second archform 800 can be installed as needed to further move maloccluded teeth. In some variants, a third, fourth, or more archforms 800 can be installed and removed in series as part of a treatment plan.

The caps 804 can be tooth-shaped in three dimensions, which can provide a superior fit on a respective tooth. The caps 804 can be shaped to correspond to a respective tooth of the patient, which can be based on digital scans and/or models of the patient's teeth. In some variants, the caps 804 can be generically shaped to correspond to a variety of teeth. In some variants, the caps 804 can be colored and/or shaped to provide aesthetic qualities to a patient's smile once installed In some variants, the caps 804 can include various color(s), design(s), logo(s), letter(s), symbol(s), etc. to customize the caps 804. In some variants, the color of the caps 804 can match the color of the patient's teeth.

In some variants, the archform 800 can be installed using a soluble structure 808, such as a soluble tray or IDB tray, as shown in FIG. 15C. In some variants, the soluble structure 808 can be water-soluble, which can include being made of melted/dried (caramelized) sugar or cellulose. The soluble structure can be structurally stiff when dry to hold the archform 800 incorporated therewith in the shape of the current patient malocclusion, which can enable the patient or clinician to easily install the archform 800. The patient or clinician can rinse the patient's mouth with water after installation-dissolving the soluble structure 808. In some variants, the soluble structure 808 can dissolve without leaving solid waste. The soluble structure 808 can be easier to use than the typical IDB trap, which can facilitate patient installation. The soluble structure 808 can provide an appearance that is more consumer oriented.

During installation, the protective layers 805 covering adhesive surfaces of mounting pads 803 that are attached to respective male fasteners 106 of an archform 800 can be removed. With the archform 800 held in the shape of a patient's current malocclusion by the soluble structure 808, the archform 800 can be placed on the patient's teeth with the soluble structure 808. After placement, the patient's mouth can be rinsed with a liquid, such as water-causing the soluble structure 808 to dissolve. In some variants, the caps 804 can be adhered to the male fasteners 106 and/or patient's teeth.

Figure 16A:
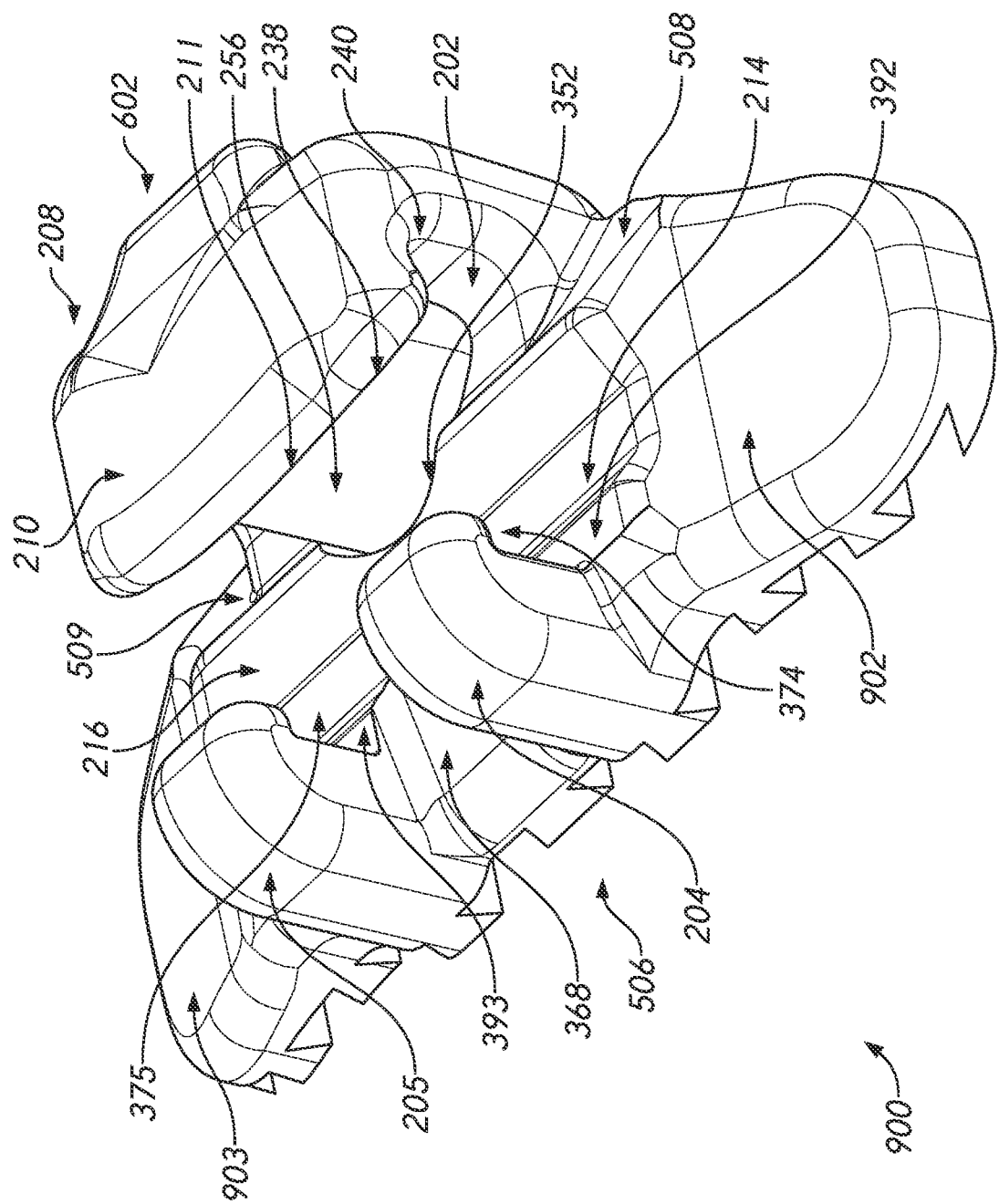
FIG. 16A illustrates a bracket, which can at least be attached to a molar.

FIG. 16A illustrates a bracket 900. The bracket 900 can include some or all of the features described in reference to other brackets or assemblies described herein. Some features of the bracket 900 may be replaced with features described in reference to other brackets or assemblies described herein. The bracket 900 can be disposed on the lingual or buccal side of a patient's teeth. The bracket 900 illustrated in FIGS. 16A-16C and 16E can be attached to any tooth of the patient but may be particularly suited for a molar.

The bracket 900 can couple with an archform to facilitate moving a patient's teeth using non-sliding mechanics. In some variants, sliding and/or non-sliding mechanics can be used. In some variants, the bracket 900, and the other brackets described herein, can have utility when used with archforms of different configurations than those described herein. The bracket 900 can include a slot 202, also referred to as a receiving region or receiving space, that can receive a connector (e.g., male connector) of an archform therein such that the connector is prevented from sliding relative to the bracket 900 when installed in a patient's mouth. The slot 202 can be positioned between a retainer 208 and stops 204, 205. The slot 202 can be at least partially defined between the retainer 208, stops 204, 205, and a face 214 of the bracket 900.

As described herein, the retainer 208 can help to retain a male connector within the slot 202. The retainer 208 can at least be positioned proximate or at a gingival or occlusal side of the bracket 900. The retainer 208 can extend from the face 214 of the bracket 900. The retainer 208 can include one or more features to improve handling the bracket 900. For example, the retainer 208 can have a protuberance 602, also referred to as a bump, protrusion, or engagement region, that can be gripped by a tool during handling of the bracket 900. The protuberance 602 can extend in a gingival or occlusal direction.

The retainer 208 can include one or more features to improve retention of the male connector received in the slot 202 of the bracket. For example, the retainer 208 can include an extension 210, e.g., overhang. The overhang 210 help hold the male connector within the slot 202. The overhang 210 can be offset from the face 214. The overhang 210 can extend over the slot 202 and/or face 214. The overhang 210 can include a curved portion 211 that extends over the face 214 of the bracket 900. The retainer 208 and/or overhang 210 can include an angled surface 238 that can facilitate a male connector being positioned within the slot 202 of the bracket 900 at an angle before being rotated toward the face 214 of the bracket and being locked within the bracket 900, such as in the slot 202. The retainer 208 can include a recess 240, also referred to as a gap, undercut, cutout, space, etc., that can facilitate the male connector being rotated in and out of the slot 202 of the bracket 900 as detailed herein.

Figure 16B:
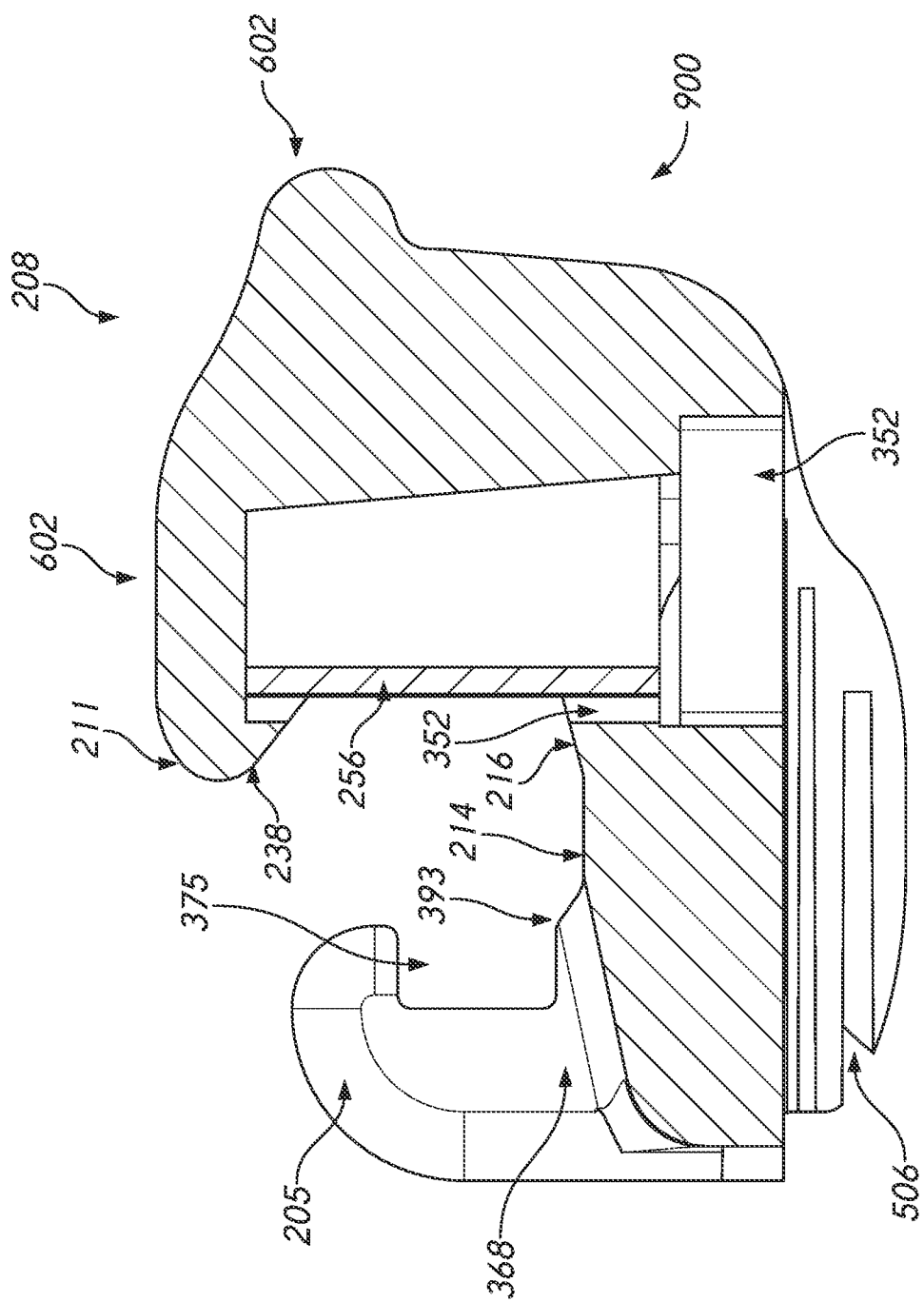
FIG. 16B illustrates a section view of the bracket illustrated in FIG. 16A.
Figure 16C:
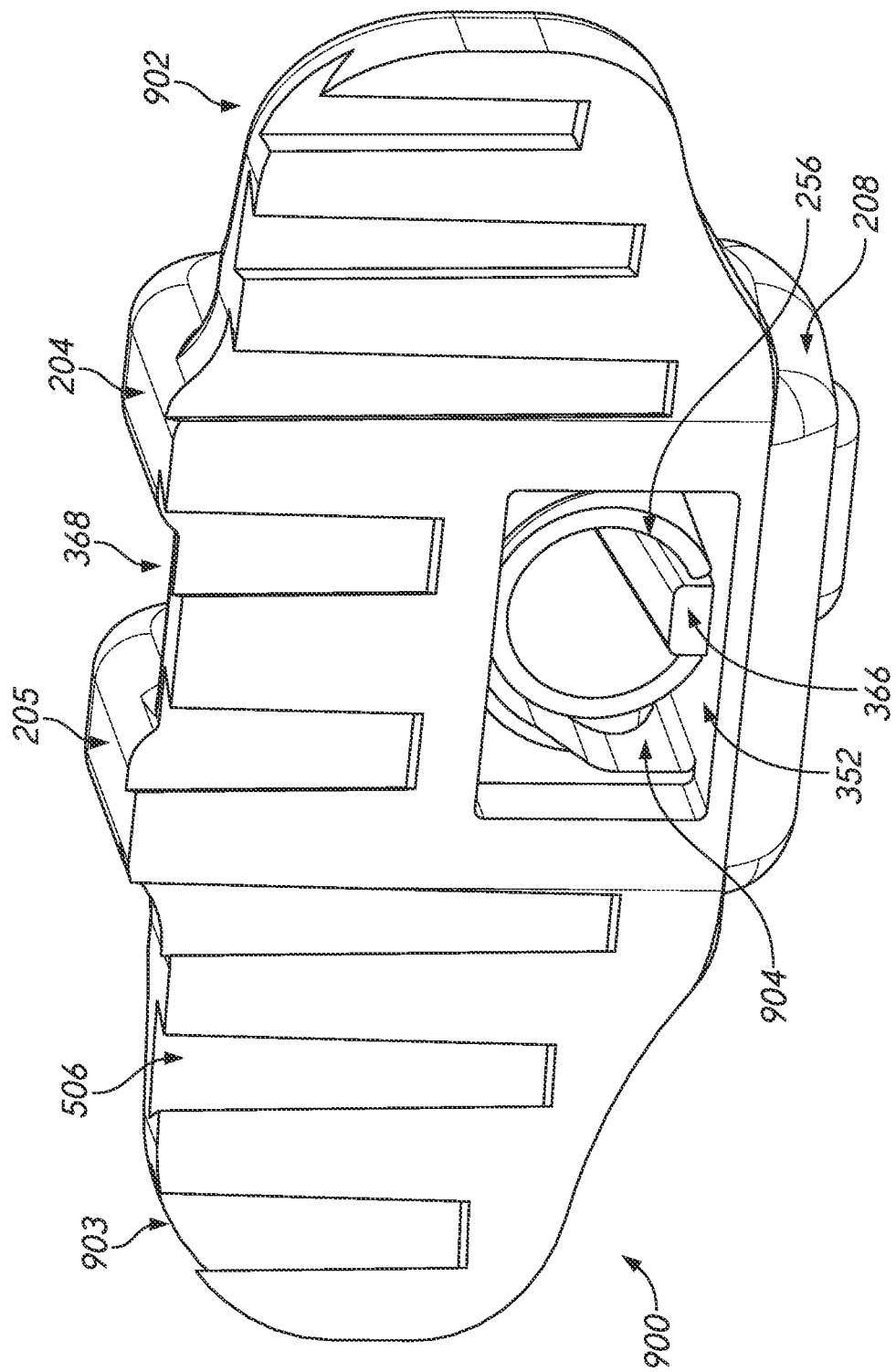
FIG. 16C illustrates a rear view of the bracket illustrated in FIG. 16A.

The bracket 900 can include a spring 256 (e.g., lock spring) that can facilitate locking the male fastener of the archform within the bracket 900. The spring 256 can be a compressible material with resilient properties that can be biased to a certain position. The spring 256 can be a C spring, rounded spring, leaf spring, etc. The spring 256 can be housed within an opening 352. The opening 352 can be disposed through at least a portion of the retainer 208. As illustrated in FIGS. 16B and 16C, the C spring 256 can be inserted into the opening 352 by way of the face of the bracket 900 that is opposite the face 214. The C spring 256 can be exposed to the slot 202 such that the male connector can contact the C spring 256 when positioned within the slot 202. The C spring 256 can be oriented with a longitudinal axis thereof oriented perpendicularly relative to the plane of the face 214. The opening 352 can be contoured and/or shaped to prevent titling and/or rattling of the C spring 256 within the opening 352. The opening 352 can be bounded by a periphery that can help to prevent the C spring 256 from deflecting beyond a desired range (e.g., beyond elastic deformation).

The C spring 256 can be positioned around a guide 366 (e.g., guide rail, protrusion, longitudinal protrusion, bar), as shown in FIGS. 16B and 16C. For example, the longitudinal free ends of the C spring 256 can be positioned on opposing sides of the guide 366 such that the longitudinal free ends apply a compressive force thereon to secure the C spring 256 in position. The gap of the C spring 256 between the longitudinal free ends can be positioned over the guide 366. The guide 366 can be disposed on a periphery of the opening 352. The guide 366 can help to maintain the position of the C spring 256 within the opening 356. The guide 366 can include a periphery and/or cross-sectional size that increases in size as the guide extends farther into the opening 356. This increasing profile can help secure the C spring 256 to the guide 366. For example, the longitudinal free ends of the C spring 366 can more securely grip the larger periphery of the guide 366 as the C spring 366 is inserted into the opening 352.

The spring 366, in some variants, can be made of a superelastic material (e.g., NiTi). The spring 366 can be heat treated to raise or lower the transformation temperature of the material forming the spring 366. Accordingly, the spring rate of the spring 366 can be modified (e.g., optimized) via heat treating, which can alter the amount of force that a clinician needs to provide to insert or remove the male connector 106 from within the slot 202 of the bracket 900. For example, heat treating the spring 366 to raise the transformation temperature can reduce the spring rate, making insertion and removal of the male connector 106 easier (e.g., require less force from the clinician). In some variants, exposing the spring 366 to cold temperatures (e.g., spray with cold water) can reduce the spring rate of the spring 366. Cold temperatures, in some variants, can be at least those temperatures lower than body temperature. The exposure to cold temperatures, in some variants, can change the spring 366 from an austentite phase into the martensite phase. Body temperature can warm the spring 366, returning the spring rate to a pre-cold-exposure level.

With the C spring 366 positioned within the opening 352, a sheet can be secured over the opening 352 to help prevent adhesive, such as a bonding agent, from entering into the opening 352. In some variants, a mesh can be applied over the sheet to increase bonding strength between the bracket 900 and a tooth surface. The sheet can be coupled to the bracket 900 via a variety of techniques which can include laser welding, adhesive, etc. As described herein, with the male connector of an archform in the bracket 900, the C spring 366 can apply a force to the male connector that pushes the male connector against and/or at least partially under the stops 204, 205 such that the male connector is locked within the slot 202 of the bracket 900.

The stops 204, 205 can be proximate an opposite end of the bracket 900 relative to the retainer 602. In some variants, the stops 204, 205 can be in a mirrored configuration about a central plane of the bracket 900. The stops 204, 205 can include receiving spaces 374, 375, respectively. The receiving spaces 374, 375 can be at least partially bounded by extensions (e.g., overhangs) of the stops 204, 205. The receiving spaces 374, 375, which can also be referred to as pockets or cutouts, can receive, respectively, a portion of the male connector therein to secure the male connector within the slot 202. In some variants, the bracket 900 can include two stops 204, 205. In some variants, the bracket 900 may include one, three, or four or more stops that can help retain the male connector of the archform within the bracket. The stops 204, 205 can be spaced apart from each other, which can be in the mesial-distal direction. A gap 368 can separate the stops 204, 205. The gap 368 can receive a portion of the male connector, as described herein. The portion of the face 214 spanning the gap 368 can be at least flat, angled, or curved. The portion of the face 214 spanning the gap 368 can be angled relative to other portions of the face 214 and curved at an end of the bracket 900.

The bracket 900 can include ramps 392, 393. The ramps 392, 393 can also be referred to as inclined surfaces, protrusions, angled surfaces, wedges, bumps, etc. The ramps 392, 393 can extend away from the face 214 of the bracket 900. The ramps 392, 393 can push the male connector against the stops 204, 205 to help secure the male connector within the slot 202. The ramps 392, 393 can push the male connector against the overhangs of the stops 204, 205. The ramps 392, 393 can include a flat surface that can engage the male connector when the male connector is secured within the slot 202. In some variants, the ramps 392, 393 can extend beyond a width of the stops 204, 205, respectively, which can help improve rotational control of a tooth.

The bracket 900 can include a protrusion 216 (e.g., bump). The protrusion 216 can extend from the face 214. The protrusion 216 apply a force against the male connector, when positioned within the slot 202, to push the male connector against the stops 204, 205 and/or overhang 210 of the retainer 208 to help secure the male connector. The protrusion 216 can extend laterally beyond a width of the retainer 208. The protrusion 216 can extend laterally beyond the stops 204, 205. In some variants, the opening 352 can disrupt a portion of the protrusion 216, which can help improve rotational control of a tooth.

The bracket 900 can include inclined surfaces 508, 509 that can facilitate inserting a male connector within the slot 202 of the bracket 200 before rotating the male connector toward the face 214 of the bracket 900 to lock the male connector into place. The inclined surfaces 508, 509 can be positioned on opposing sides of the retainer 208.

The bracket 900 can include lateral extensions 902, 903, which can also be referred to as lateral wings. The lateral extensions 902, 903 can help the bracket 900 to better control movement of a molar. For example, the lateral extensions 902, 903 can facilitate better rotational control. The lateral extensions 902, 903 can also provide more surface area for a textured surface 506 for improved bonding.

The bracket 900 can include a textured surface 506, also referred to as a surface with undercuts, cuts, gaps, voids, and/or slots, which is illustrated in FIG. 16C. The textured surface 506 can be disposed on a side of the bracket 900 that is opposite the face 214. The textured surface 506 can facilitate bonding the bracket 900 to a surface of the patient's teeth. Specifically, an adhesive applied to the textured surface 506 can bond the textured surface 506 to the surface of the patient's tooth. The textured surface 506 can provide an increased surface area to facilitate improved bonding compared to an un-textured surface.

Figure 16D:
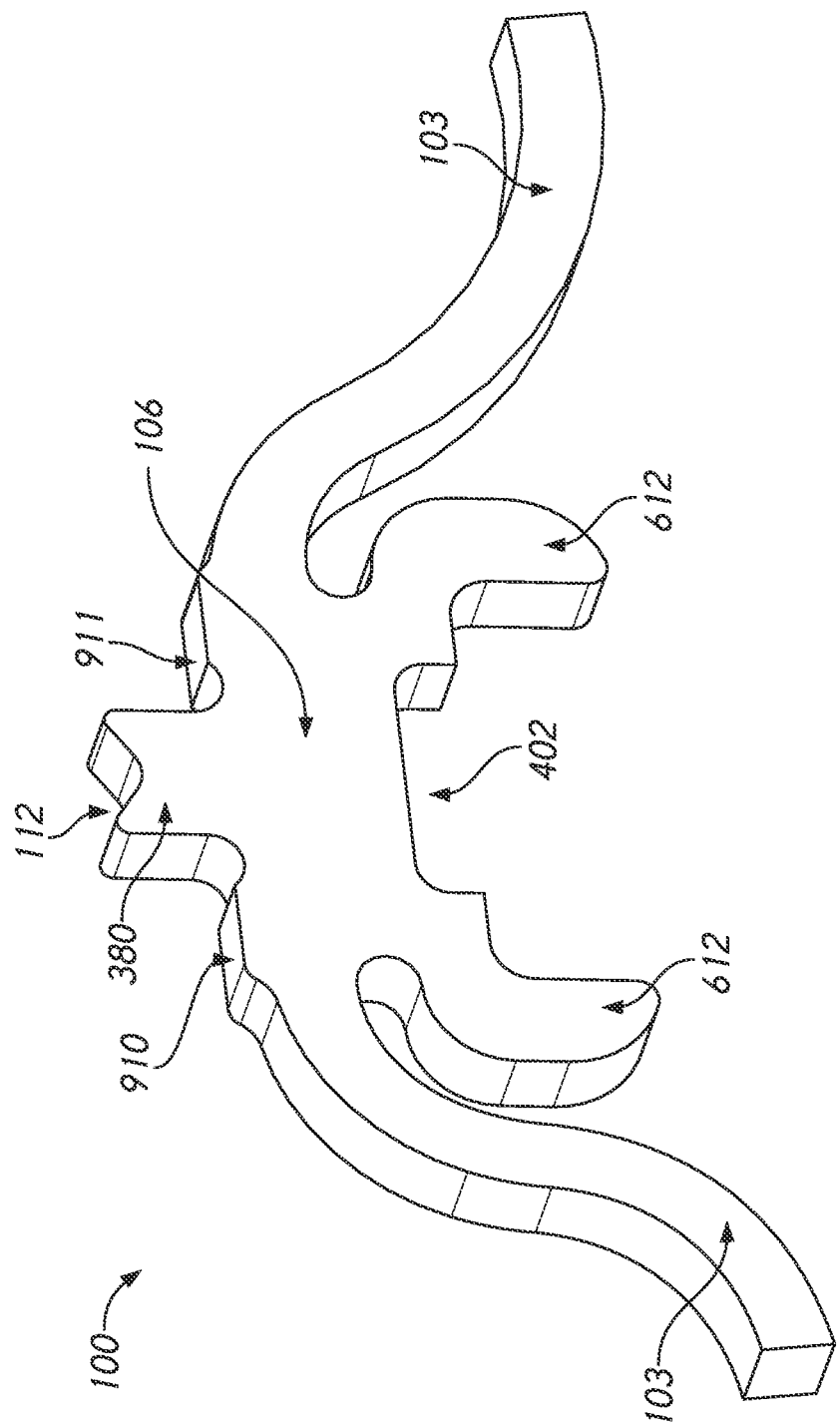
FIG. 16D illustrates a male connector of an archform.

FIG. 16D illustrates a male connector 106 of an archform 100. The male connector 106 can also be referred to as a connector, fastener, male fastener, etc. The male connector 106 and/or archform 100 can include some all of the features described in reference to other brackets or assemblies described herein. Some features of the male connector 106 and/or archform 100 may be replaced with features described in reference to other male connectors 106 and/or archforms 100.

The male connector 106 can be retained within the slot 202 of a bracket 900 as described herein. The male connector 106 can be oriented in different orientations to move a tooth of a patient. The male connector 106 can be disposed between interproximal structures 103, which can also be referred to as interproximal loops, bends, angles, features, etc. The interproximal structures 103, as described herein, can apply forces to adjacent male connector(s) 106 to move teeth of a patient. The interproximal structures 103 can have varying widths, lengths, curvatures, bends, etc. to apply varying forces as desired.

The male connector 106 can have arms 612. The arms 612 can extend in a direction that is opposite that of a tab 380 (e.g., tongue). The arms 612 can extend in at least an occlusal or gingival direction. The arms 612 can grip one or more features of the bracket 900 to help secure the male fastener 106 and/or provide improved control of a tooth of the patient. The arms 612 can grip the retainer 208. For example, the arms 612 can grip, hold, grasp, hug, snap around, and/or otherwise interface with the mesial and distal sides of the retainer 208. In some variants, the arms 612 can hold the archform 100 (e.g., male fastener 106) in place on the bracket 900 as an operator positions a tool to secure the archform 100 to the bracket 900, as described herein. The arms 612 can include outer sides that are curved, which can help the arms 612 better grip the retainer 208. A recess 402, also referred to as a gap, can be disposed between the arms 612. The recess 402 can receive the C spring 256 when the male connector 106 is locked into the slot 202 of the bracket 900. The periphery defining at least a portion of the recess 402 can contact the C spring 256. The C spring 256 can apply a force against the periphery of the recess 402 to push the male connector 106 against the stops 204, 205, which can position a portion of the male connector 106 under overhangs of the stops 204, 205. The male connector 106 can include contact surfaces 910, 911 which can contact the stops 204, 205. The contact surfaces 910, 911 can be flat to provide a secure point of contact with the stops 204, 205. The stops 204, 205 can have corresponding flat surfaces. The contact surfaces 910, 911 can be disposed on a side of the male fastener 106 that is opposite the arms 612 and/or recess 402. The contact surfaces 910, 911 can be disposed on opposing sides of a tab 380.

The tab 380 can be disposed on a side of the male connector 106 that is opposite the arms 612 and/or recess 402. The tab 380 can be disposed in the gap 368 between the stops 204, 205 when the male connector 106 is disposed in the slot 202 of the bracket 900. The tab 380 can contact inner sides of the stops 204, 205, which can help to prevent sliding of the male connector 106 in a mesial-distal direction relative to the bracket 900. The tab 380 can extend in a gingival or occlusal direction, depending on the desired orientation. The tab 380 can include a groove 112. The groove 112 can be disposed on an end of the tab 380. The groove 112 can receive a tool to facilitate positioning the male connector 106 into the slot 202 of the bracket 900 or removing the male connector 106 therefrom. The groove 112 can help to prevent inadvertent sliding of a tool being used to place the male connector 106 into the slot 202. The male connector 106 can include curves to reduce stress concentrators.

As described herein, the archform 100 can be formed with a variety of techniques. In some variants, the archform 100 is cut from a sheet of material, which can include shape memory materials and/or others. The sheet of material can be flat having two opposing parallel sides. The archform 100 can be cut via a variety of techniques (e.g., laser cut, waterjet cut, plasma cut, punching, etc.) from the sheet of material. The sheet of material can have a uniform thickness but features of the archform 100 can be cut to have varying widths to apply different forces to teeth according to a treatment plan. For example, the archform 100 can have more rigid features as a patient progresses through a treatment plan. The archform 100 can have interproximal loops 103 with narrower widths at the beginning of a treatment plan to improve user comfort. The archform 100 can have interproximal loops 103 with wider widths at the middle or end of a treatment plan. The archform 100 can have male connectors 106 and interproximal structures 103 in an alternating pattern. In some variants, more than one interproximal structure 103 is disposed between adjacent male connectors 106. In some variants, no interproximal structure(s) 103 are disposed between adjacent male connectors 106. In some variants, the archform 100 can include separate segments corresponding to different portions of a patient's dental arch. In some variants, the archform 100 is not coupled to all teeth of the patient. In some variants, the archform 100 is coupled to every tooth of the patient. In some variants, the archform 100 can include straight sections.

Figure 16E:
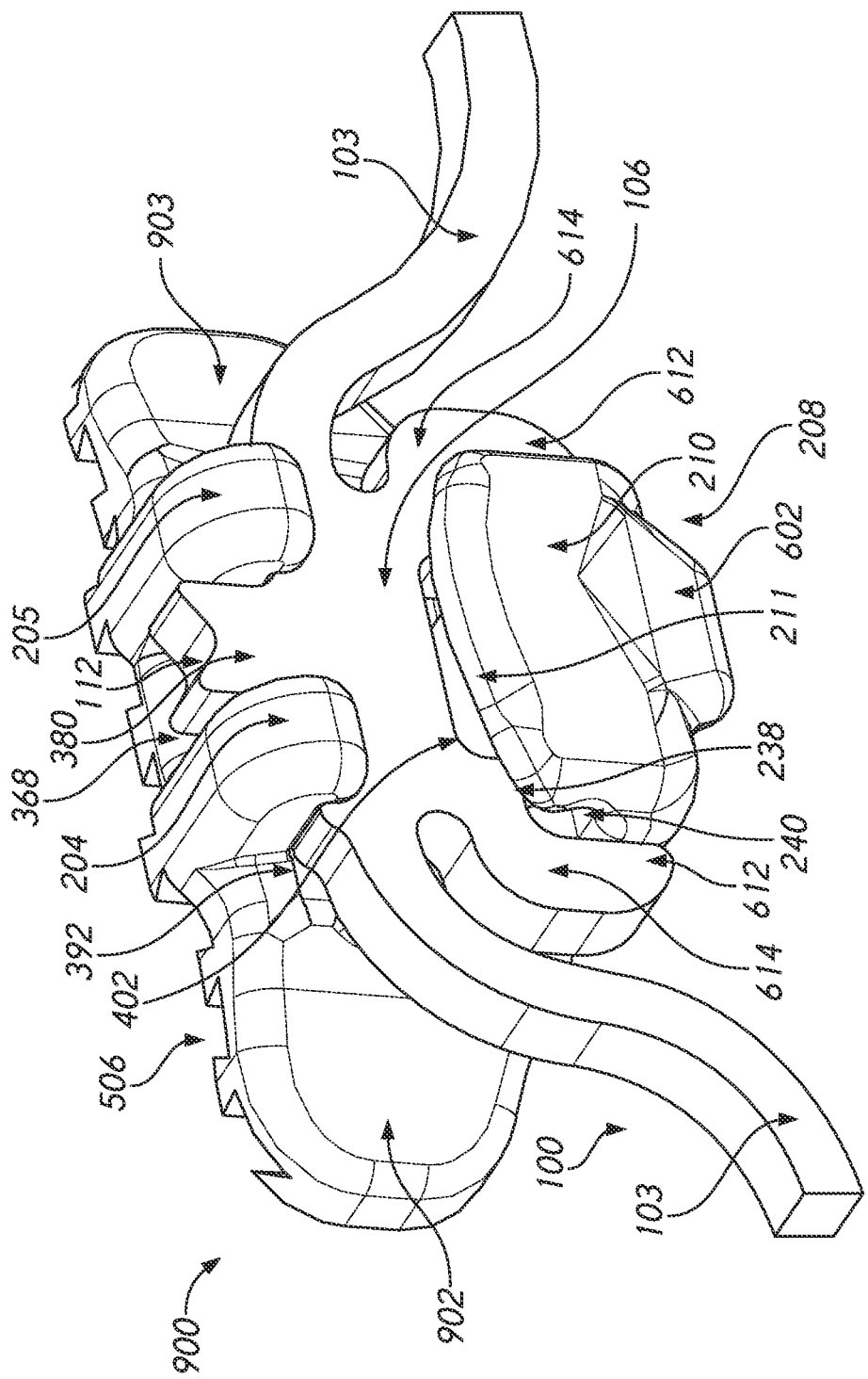
FIG. 16E illustrates the male connector illustrated in FIG. 16D coupled to the bracket illustrated in FIG. 16A.

FIG. 16E illustrates the male connector 106 coupled to the bracket 900. As illustrated, the C spring 256 pushes the male connector 106 against the stops 204, 205 and/or under at least a portion of the stops 204, 205. The contact surfaces 910, 911 can contact the stops 204, 205. The force applied by the C spring 256 can lock the male connector 106 under the overhangs of the stops 204, 205 and the overhang 210 of the retainer 208.

The bracket 900 and/or male fastener 106 of the archform 100 can include modifications to accommodate the various teeth of the patient, such as the molars, bicuspids, lower anterior, and upper central teeth.

Figure 17A:
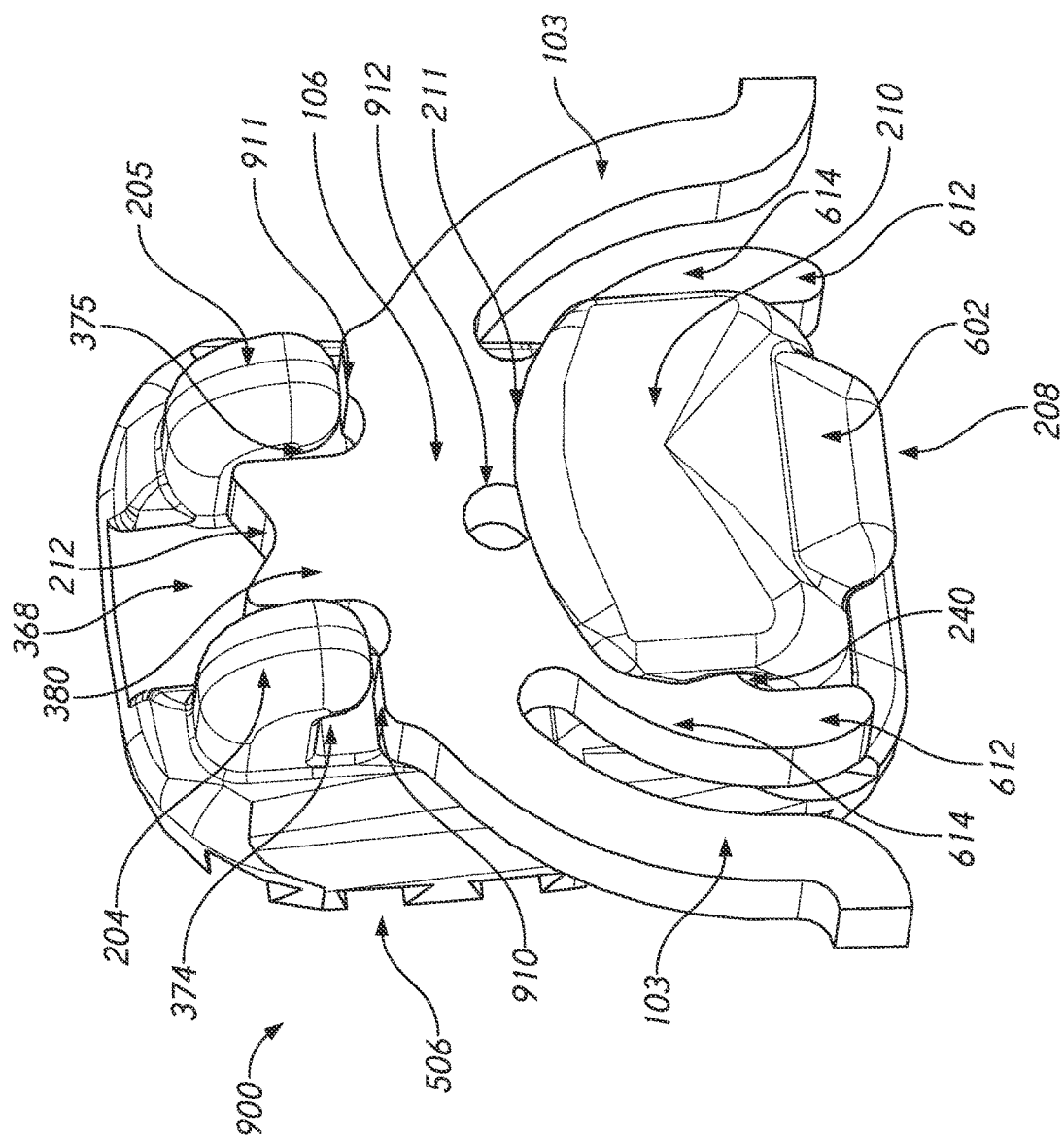
FIG. 17A illustrates a bracket, which can at least be attached to a lower anterior tooth, coupled to a male connector of an archform.

FIG. 17A illustrates the bracket 900 that can be attached to any tooth of the patient but may be particularly suited for a lower anterior tooth. As illustrated, the bracket 900 may omit the lateral extensions to accommodate for the narrow width of the lower anterior teeth. The bracket 900 configured for the lower anterior teeth may have a narrower overall width compared to the bracket 900 configured for molars or other larger teeth. The width of the retainer 208 can be narrowed compared to a configuration for molars. The stops 204, 205 can be spaced inward from an edge of the bracket 900, which can be from a gingival or occlusal edge of the bracket 900.

Figure 17B:
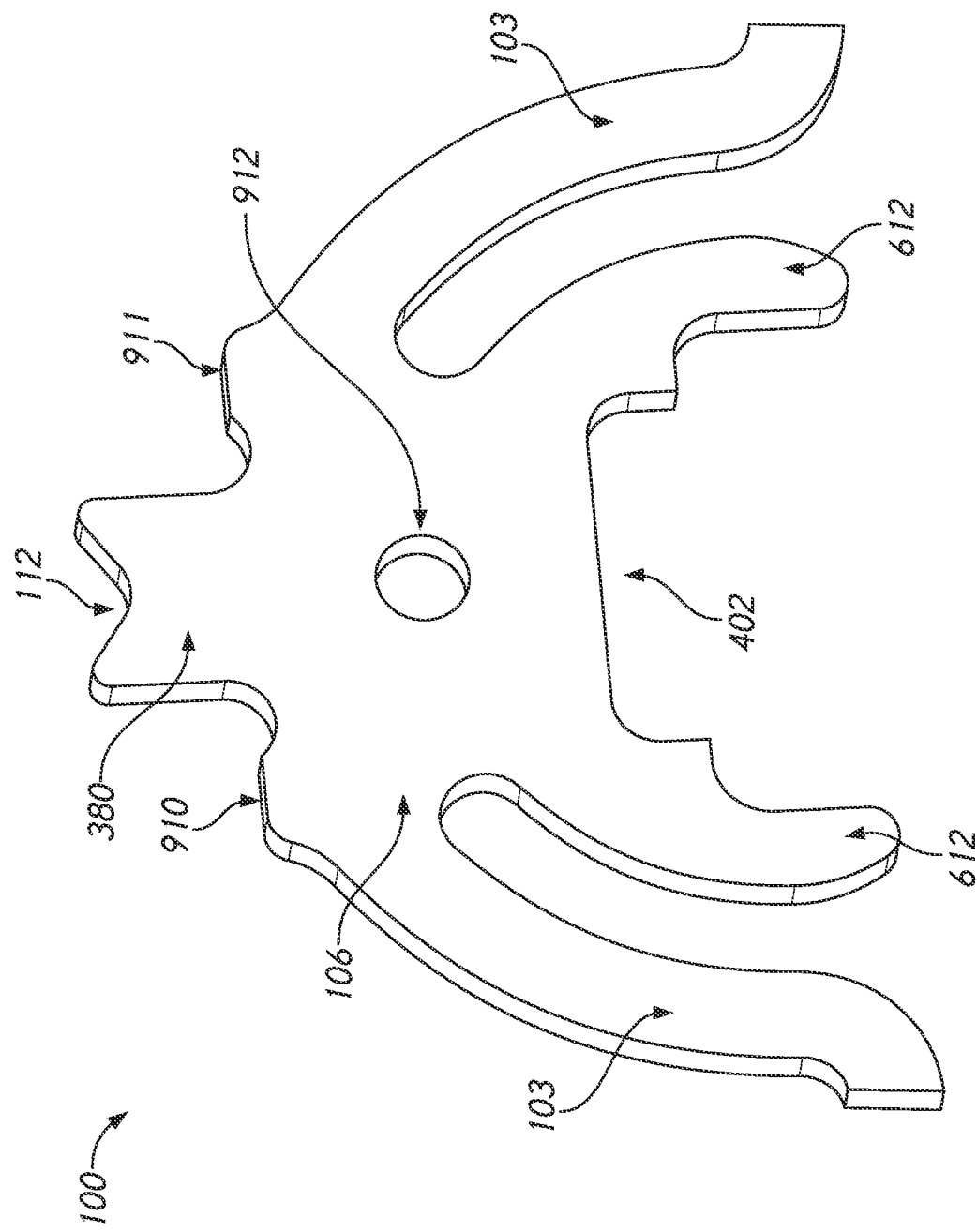
FIG. 17B illustrates the male connector of the archform illustrated in FIG. 17A.

As illustrated in FIG. 17B, the male connector 106 can include one or more features to indicate that the male connector 106 is configured to be positioned on the lower teeth of a patient. For example, the male connector 106 can include an aperture 912. The male connector 106 can include other modifications to facilitate coupling with a bracket 900 configured for use on a specific tooth of the patient, such as the size of the tab 380, distance between the arms 612, size of the recess 402, and/or others.

Figure 18:
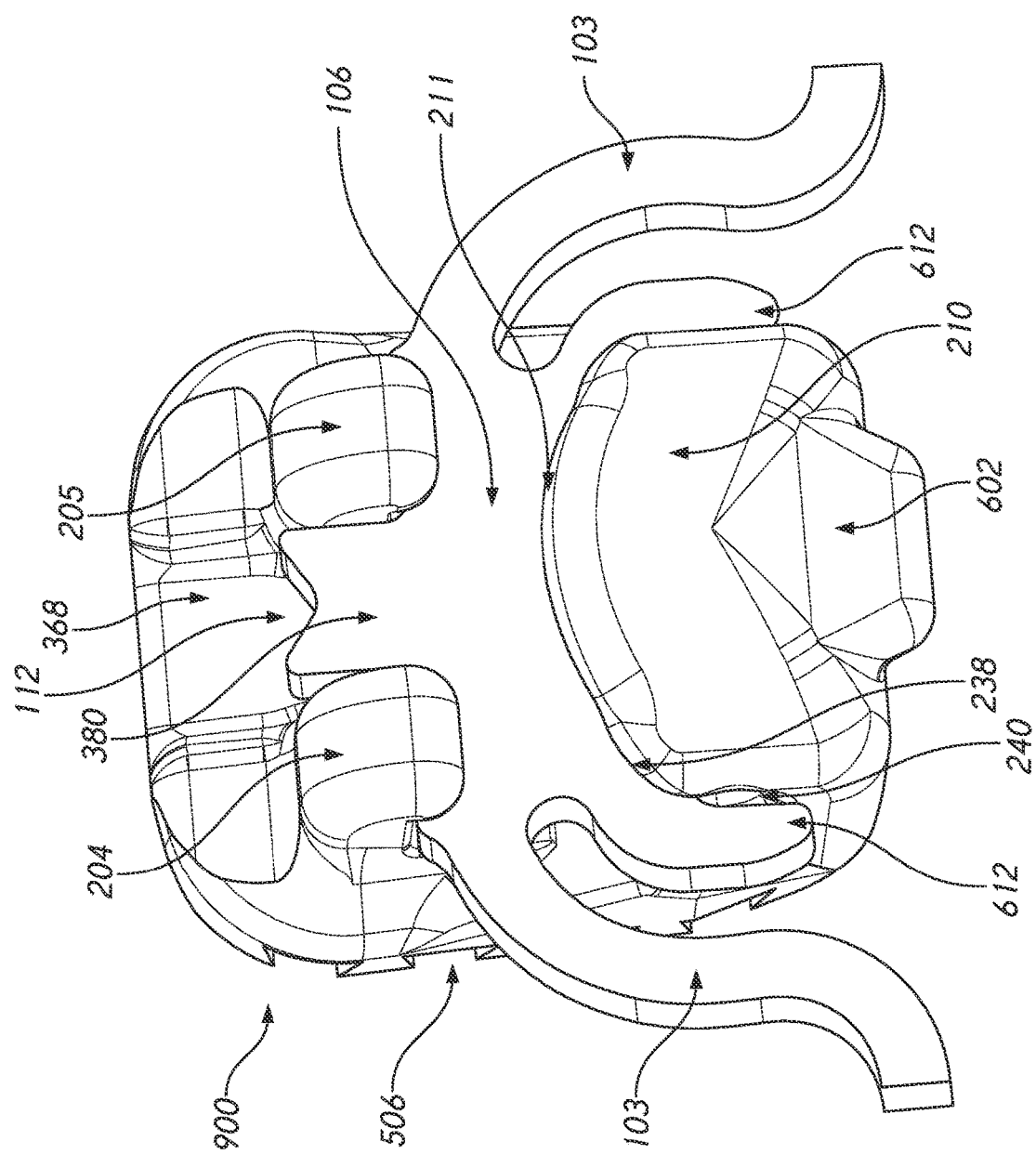
FIG. 18 illustrates a bracket, which can at least be attached to a upper central tooth, coupled to a male connector of an archform.

FIG. 18 illustrates the bracket 900 that can be attached to any tooth of the patient but may be particularly suited for an upper central tooth of the patient. As illustrated, the bracket 900 may omit the lateral extensions to accommodate for the narrower width of the upper central teeth compared to molars. The stops 204, 205 can be spaced inward from an edge of the bracket 900, which can be from a gingival or occlusal edge of the bracket 900. The stops 204, 205 may be spaced inward to a greater extent than on the lower anterior teeth.

Figure 19:
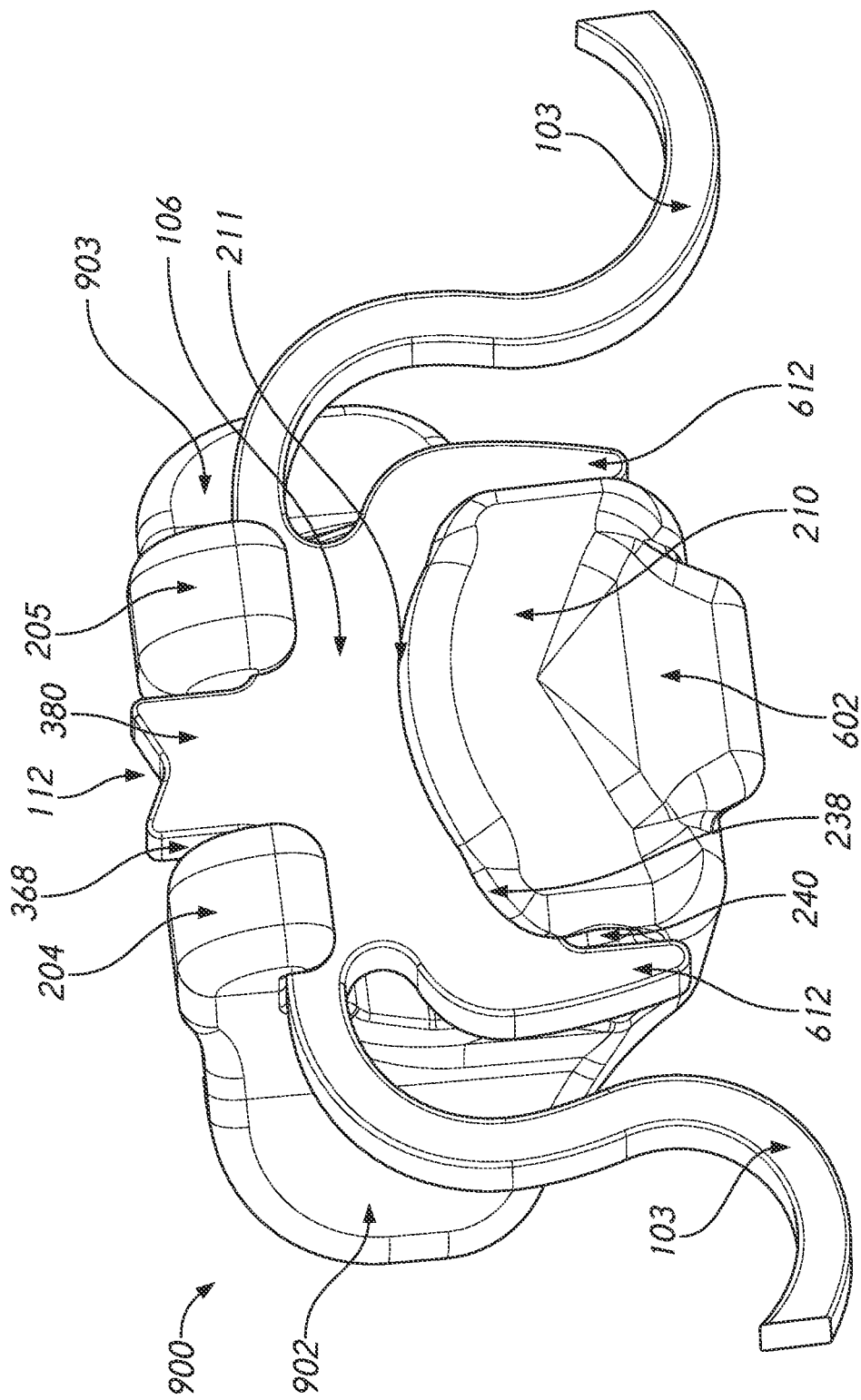
FIG. 19 illustrates a bracket, which can at least be attached to a bicuspid, coupled to a male connector of an archform.

FIG. 19 illustrates the bracket 900 that can be attached to any tooth of the patient but may be particularly suited for bicuspids of the patient. The bracket 900 may include later extensions 902, 903, but the later extensions 902, 903 may extend laterally to a lesser extent than for a molar, which can be due to the smaller width of a bicuspid. The stops 204, 205 may be positioned at or proximate the edge of the bracket 900, which can be on the gingival or occlusal edge of the bracket 900. The interproximal loops 103 can extend more horizontally (e.g., in a more mesial-distal direction) proximate the male connector 106.

Figure 20A:
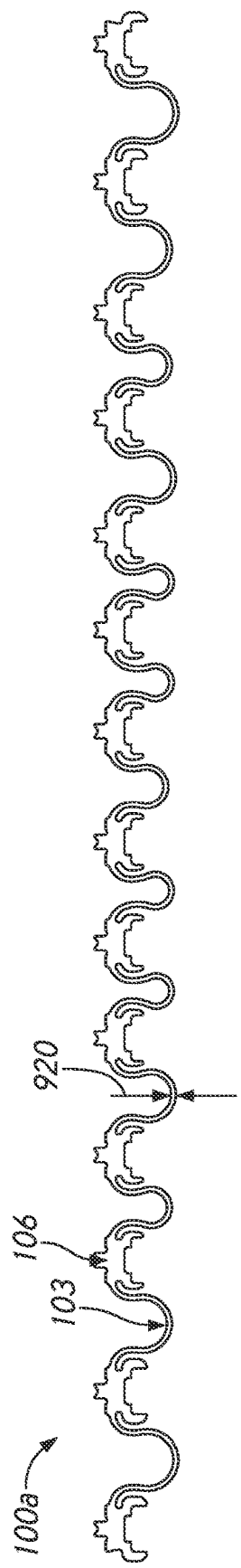
FIG. 20A illustrates an upper initial archform.
Figure 20B:
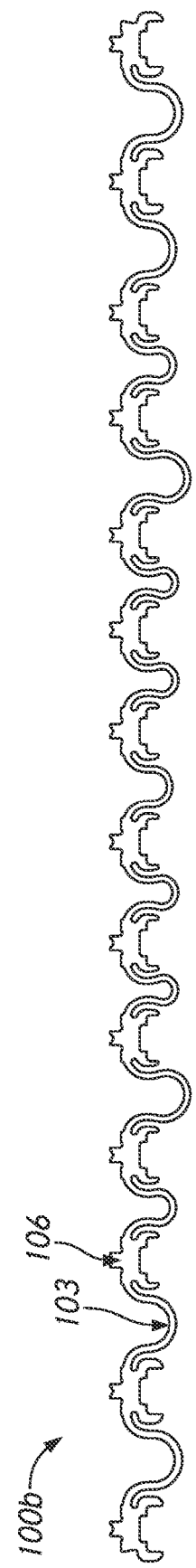
FIG. 20B illustrates an upper intermediate archform.
Figure 20C:
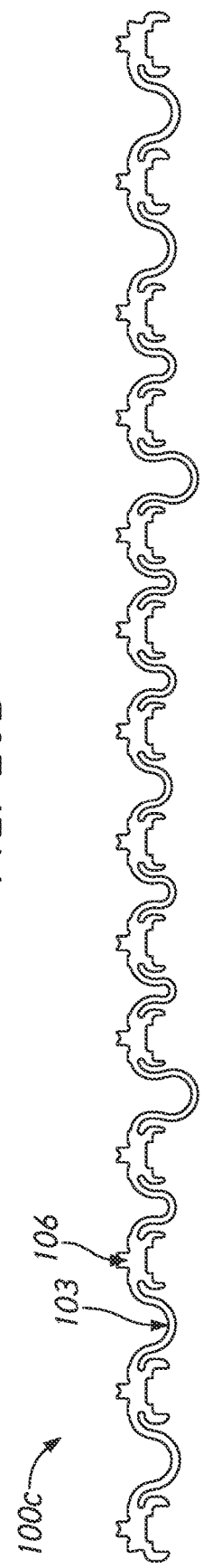
FIG. 20C illustrates an upper final archform.

As described herein, a treatment plan for a patient can include staged archforms 100. For example, multiple archforms 100 can be used in a staged sequence to move the patient's teeth from maloccluded positions to a planned position. FIGS. 20A-20C illustrate three upper archforms 100 that can be used during a treatment plan. FIG. 20A illustrates an upper initial archform 100a, FIG. 20B illustrates an upper intermediate archform 100b, and FIG. 20C illustrates an upper final archform 100c. In some variants, fewer archforms 100 may be used, which can include one or two. In some variants, more archforms 100 can be used, which can include four, five, six, or more. The treatment plan can begin with installation of the upper initial archform 100a to move teeth. The initial archform 100a can be removed after a duration of time and replaced with the upper intermediate archform 100b. The intermediate archform 100b can be removed after a duration of time and replaced with the upper final archform 100c to move the patient's teeth into a final configuration. The interproximal structures 103 of the archforms 100 can increase in rigidity as a patient progresses through a treatment plan (e.g., the upper final archform 100c can be more rigid than the initial archform 100a). In some variants, this can occur via increasing the width (e.g., dimension 920) of the interproximal structures 103 as a patient progresses through a treatment plan. In some variants, a treatment plan may begin with an intermediate or final archform. In some variants, a treatment plan may end with an initial or intermediate archform.

In some variants, the male connectors 106 remain the same size and/or shape. In some variants, the orientation of the male connectors 106 may change during treatment. In some variants, the interproximal structures 103 may change between staged archforms 100 of a treatment plan, which can include changing in curvature, width, length, etc. For example, the interproximal structures 103 may become increasingly wider (e.g., wider in the dimension 920) from one stage to the next. For example, the widths (e.g., dimension 920) of the interproximal loops 103 in the upper initial archform 100a can be the smallest of a treatment plan, the upper intermediate archform 100b can include intermediate widths, and the upper final archform 100c can include the largest widths. A staged approach can improve a patient's comfort during treatment-gradually moving the patient's teeth. The interproximal loops 103 in an archform 103 can vary in width (e.g., dimension 920) to change forces applied to adjacent teeth. For example, a greater width can correspond with greater forces. The interproximal loops 103 may be wider in the portion of the archform 100 corresponding to the molar portion of the dental arch due to the greater forces that may be desired for moving molars compared to an anterior tooth.

Figure 21A:
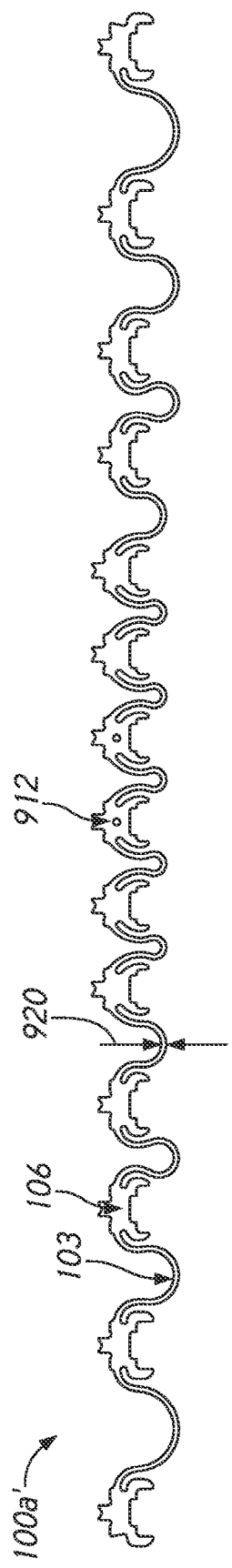
FIG. 21A illustrates a lower initial archform.
Figure 21B:
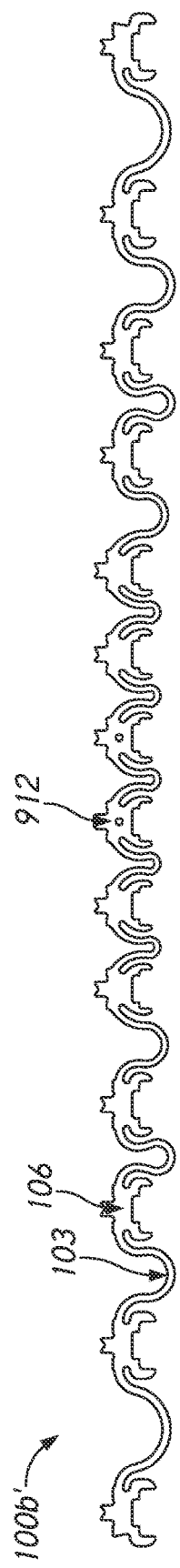
FIG. 21B illustrates an upper intermediate archform.
Figure 21C:
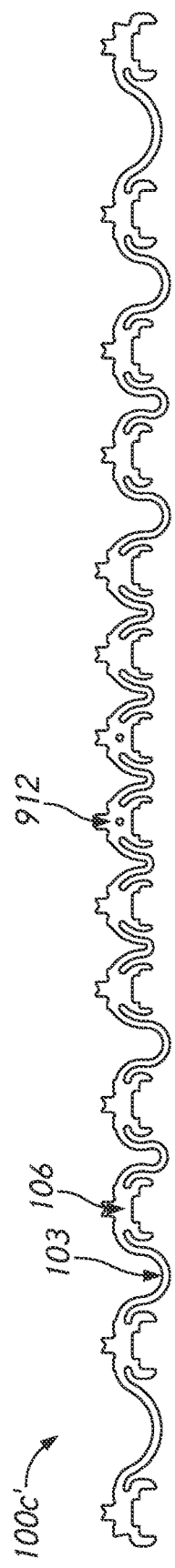
FIG. 21C illustrates an upper final archform.

FIGS. 21A-21C illustrate lower archforms 100 that can be used in staged succession according to a treatment plan of a patient. The lower archforms 100 can include indicia, such as apertures 912, in male connectors 106, as described herein, to differentiate an upper archform 100 from a lower archform 100. FIG. 21A illustrates a lower initial archform 100*a*'. FIG. 21B illustrates a lower intermediate archform 100*b*'. FIG. 21C illustrates a lower final archform 100*c*'. As described in reference to the upper archforms 100, the lower archforms 100 can include alterations between different stages to apply different forces on a patient's teeth, which can improve a user's comfort during a treatment plan. The interproximal structures 103 can be altered as described herein to impart different forces (e.g., increase in rigidity by increasing the width across dimension 920) on a patient's teeth.

Figure 22:
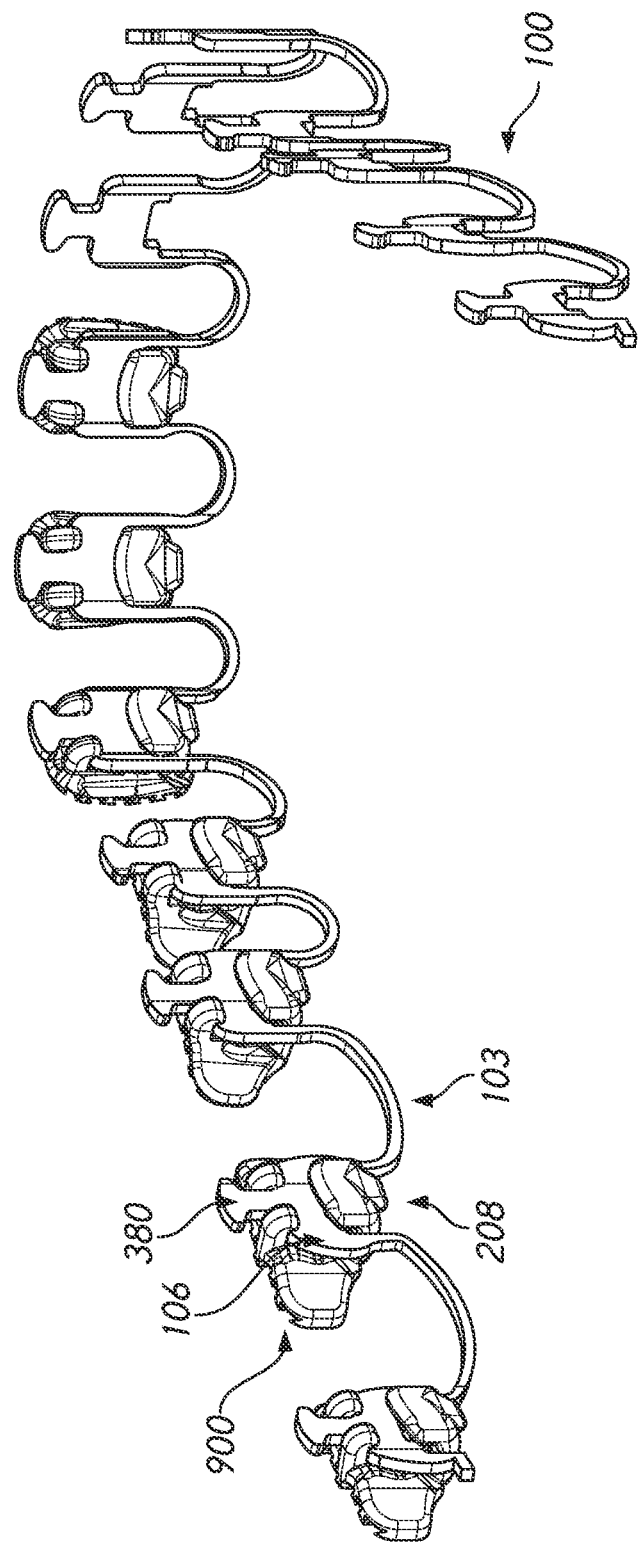
FIG. 22 illustrates an orthodontic appliance for a patient with crowded teeth.

FIG. 22 illustrates an archform 100 configured for a patient with crowded teeth. As illustrated, the male connectors 106 may not include the arms, described herein, to grip the mesial and distal sides of the retainer 208. Instead, the portions of the interproximal bends 103 proximate the male connectors 106 can extend away from the male connectors 106 in a gingival or occlusal direction such that the portions of the interproximal bends 103 proximate the male connectors 106 can grip the mesial and distal sides of the retainer 208. This can help to prevent sliding between the male connectors 106 and the brackets 900 in the mesial-distal direction and/or assist in installation (e.g., the interproximal bends 103 can hold the male connector 106 onto a bracket 900 as a clinician manipulates a tool to secure the male connector 106 within the bracket 900).

FIGS. 23A-23G illustrate an end of a tool 1000, which can be referred to as a director or director, that can be used to assist in installing and/or removing a male connector 106. The tool 100 can include an angled surface 1002, which can also be referred to as an inclined surface. The angled surface 1002 can be straight and/or curved. The angled surface 1002 can extend from a free end to a curved portion 1004. The angled surface 1002 and curved portion 1004 can contact (e.g., engage with) the groove 112 disposed on the tab 380 of a male fastener 106 and/or other features to help install the male connector 106 into a bracket 900 and/or remove the male connector 106 from a bracket 900. In some variants, the tool 1000 can include a solid handle. In some variants, the tool 1000 can include a hollow handle. The hollow handle of the tool 1000 can amplify an audible sound (e.g., clicking sound) that can be emitted when the male connector 106 is inserted or removed from within the slot of the bracket (e.g., coupled to the bracket). The emitted sound can indicate to a clinician that the male connector 109 is locked within the bracket 900.

Figure 23A:
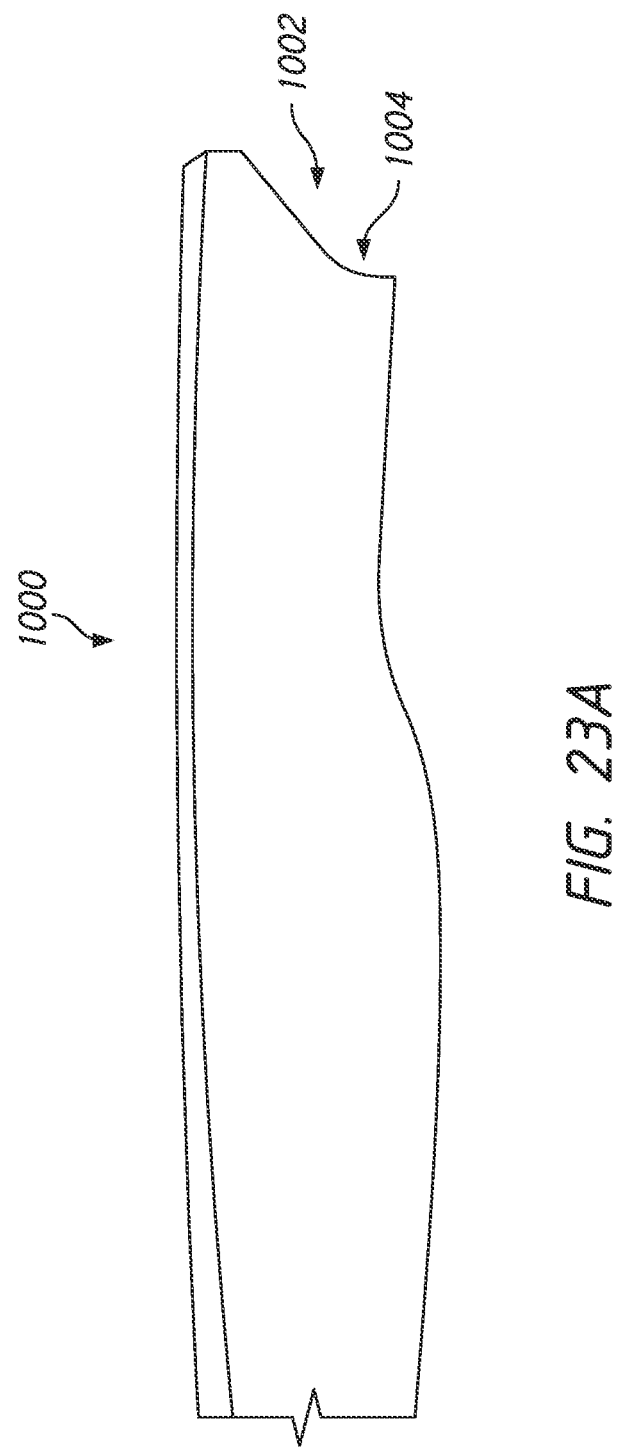
FIG. 23A illustrates a tool for installing or removing a male connector from a bracket.
Figure 23B:
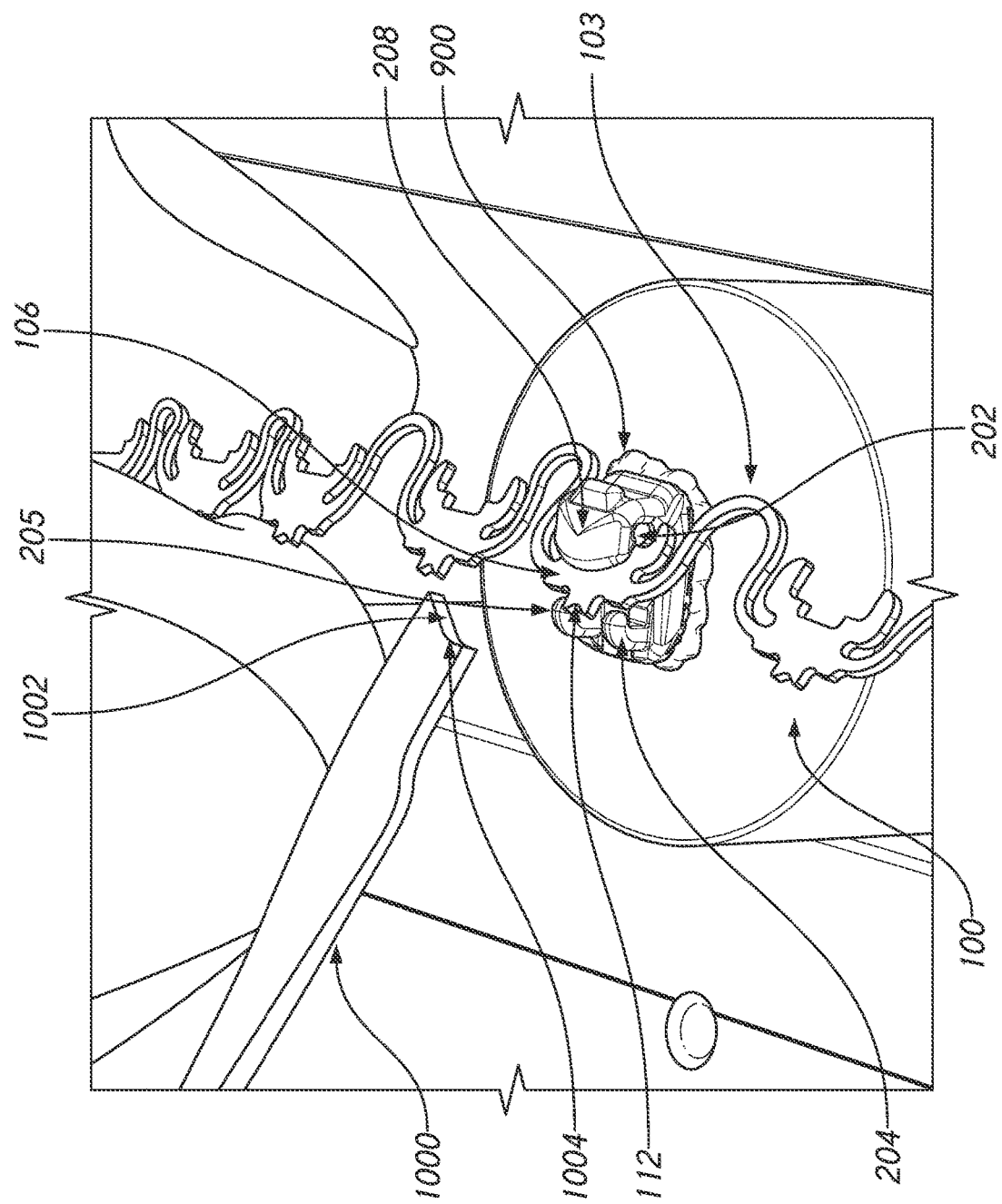
FIG. 23B illustrates a male connector inserted into a slot of a bracket at an angle.
Figure 23C:
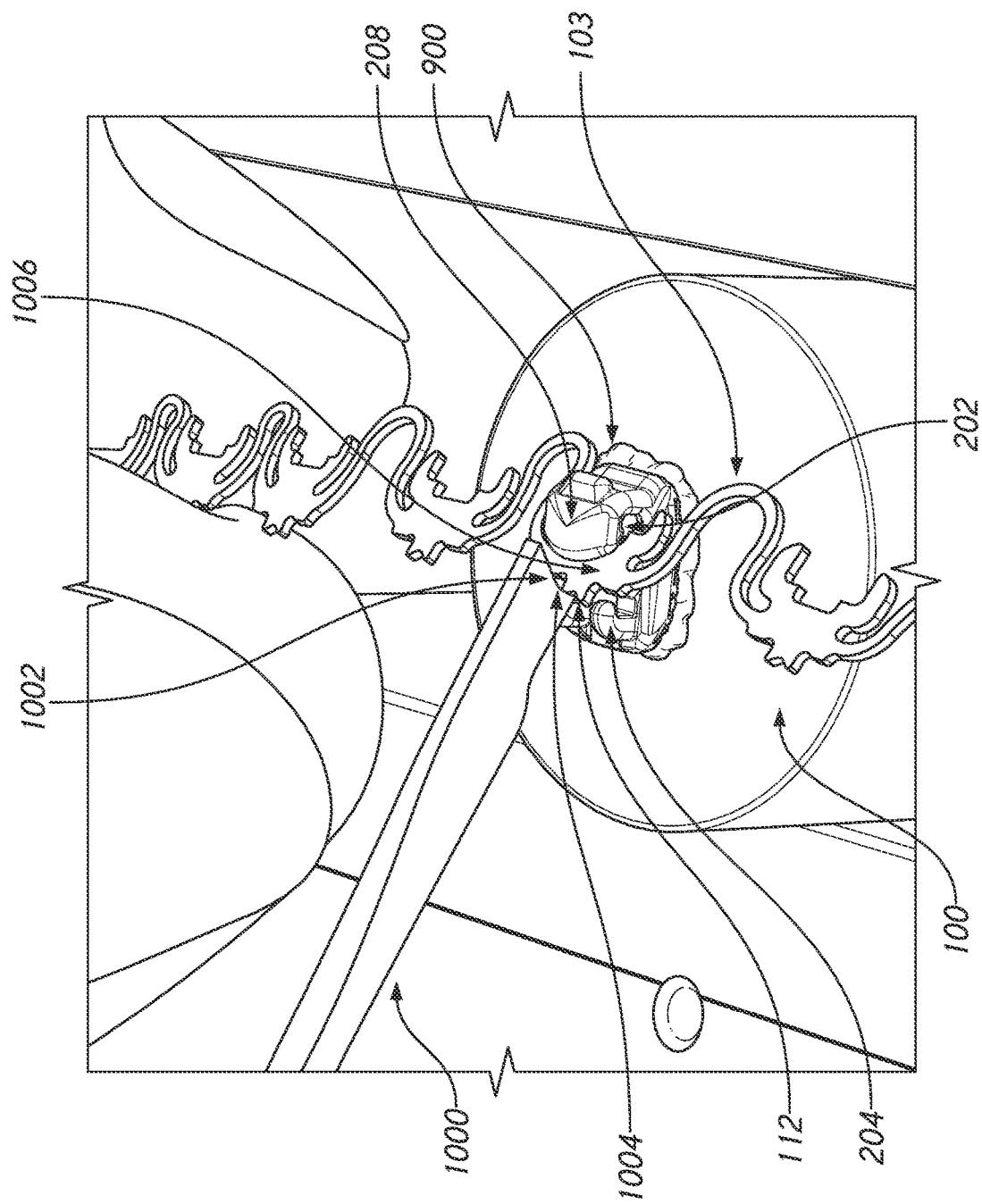
FIG. 23C illustrates the tool illustrated in FIG. 23A applying a force against the male connector to compress a spring and rotate the male connector toward the bracket.

To install a male connector 106, the male connector 106 can be inserted into the slot 202 of a bracket 900 at an angle (e.g., angled relative to the face 214), as described herein and as illustrated in FIG. 23B. The recess 402 of the male connector 106 can be positioned under the overhang 210 of the retainer 208 such that the periphery of the recess 402 contacts the C spring 256.

The angled surface 1002 of the tool 100 can face toward the bracket 900 when installing a male connector 106, as shown in FIG. 23B. The curved portion 1004 can be brought into contact with the groove 112. The angled surface 1002 can help guide the groove 112 into the curved portion 1004. The clinician manipulating the tool 100 can apply, by way of the tool 100, a force against groove 112 toward the C spring 256 and the face 214 of the bracket 900. As a result, the C spring 256 can be compressed such that the male connector 106 can be rotated past the stops 204, 205 and toward the face 214 of the bracket 900 until the male connector 106 is positioned within the slot 202 (e.g., parallel with the face 214), as illustrated in FIG. 23D. The clinician can cease applying the force to the male connector 106 by way of the tool 100 such that the C spring 256 applies a force to the male connector 106 in the direction of the stops 204, 205 so that the male connector 106 is pushed against and/or under a portion of the stops 204, 205—locking the male connector 106 within the slot 202 of the bracket 900. The force of the C spring 256 against the male connector 106 can securely retain the male connector 106 within the slot of the bracket 900. In the locked position, one or more portions of the male connector 106 can be positioned within the receiving spaces 374, 375 of the stops 204, 205, which can be behind the overhangs of the stops 204, 205. In the locked position, contact surfaces 910, 911 of the male connector 106 can contact the stops 204, 205, which can include corresponding contact surfaces of the stops 204, 205. In the locked position, the male connector 106 can be placed behind the overhang 210 of the retainer 208. The placement of the male connector 900 within the slot 202 of the bracket 900 in the locked configuration can emit an audible sound (e.g., a clicking sound). As described herein, the tool 1000 can have a hollow handle which can amplify the audible sound. The emitted sound can indicate to a clinician that the male connector 900 is locked within the bracket 900.

Figure 23E:
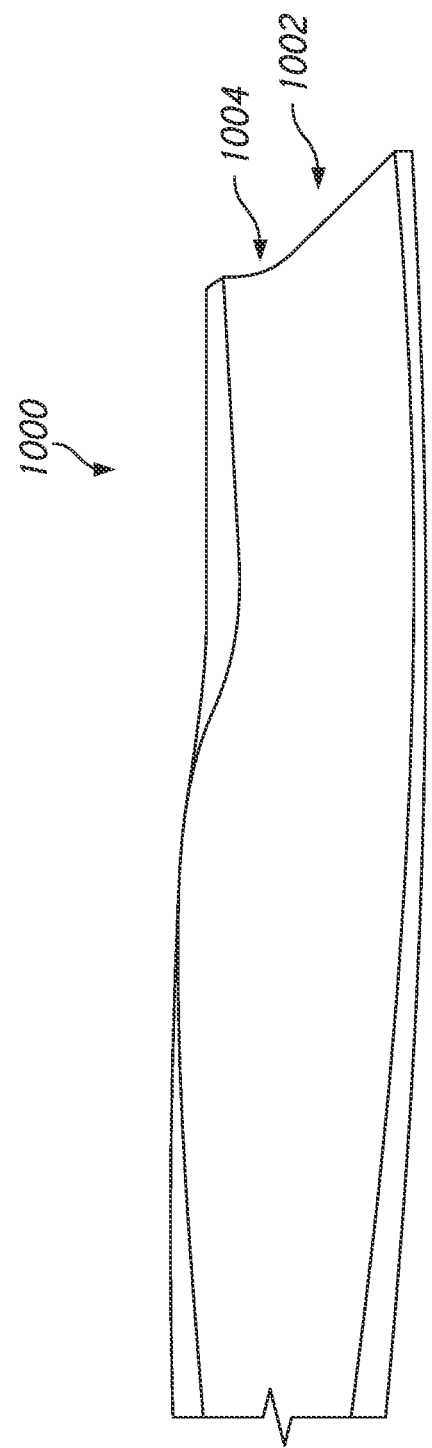
FIG. 23E illustrates the tool in FIG. 23A reoriented.
Figure 23F:
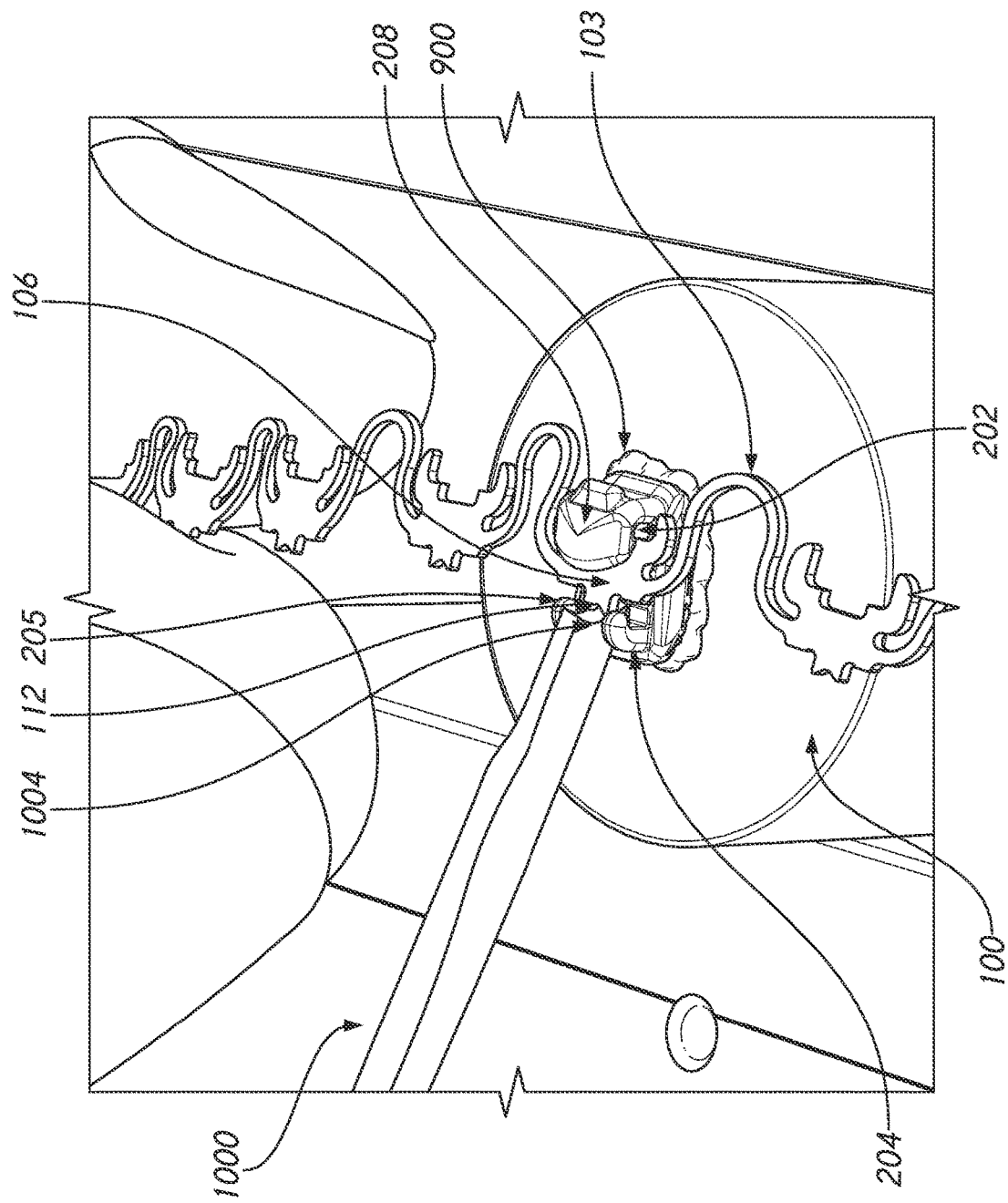
FIG. 23F illustrates the tool illustrated in FIG. 23E applying a force against the male connector to compress the spring and rotate the male connector away from the bracket.
Figure 23G:
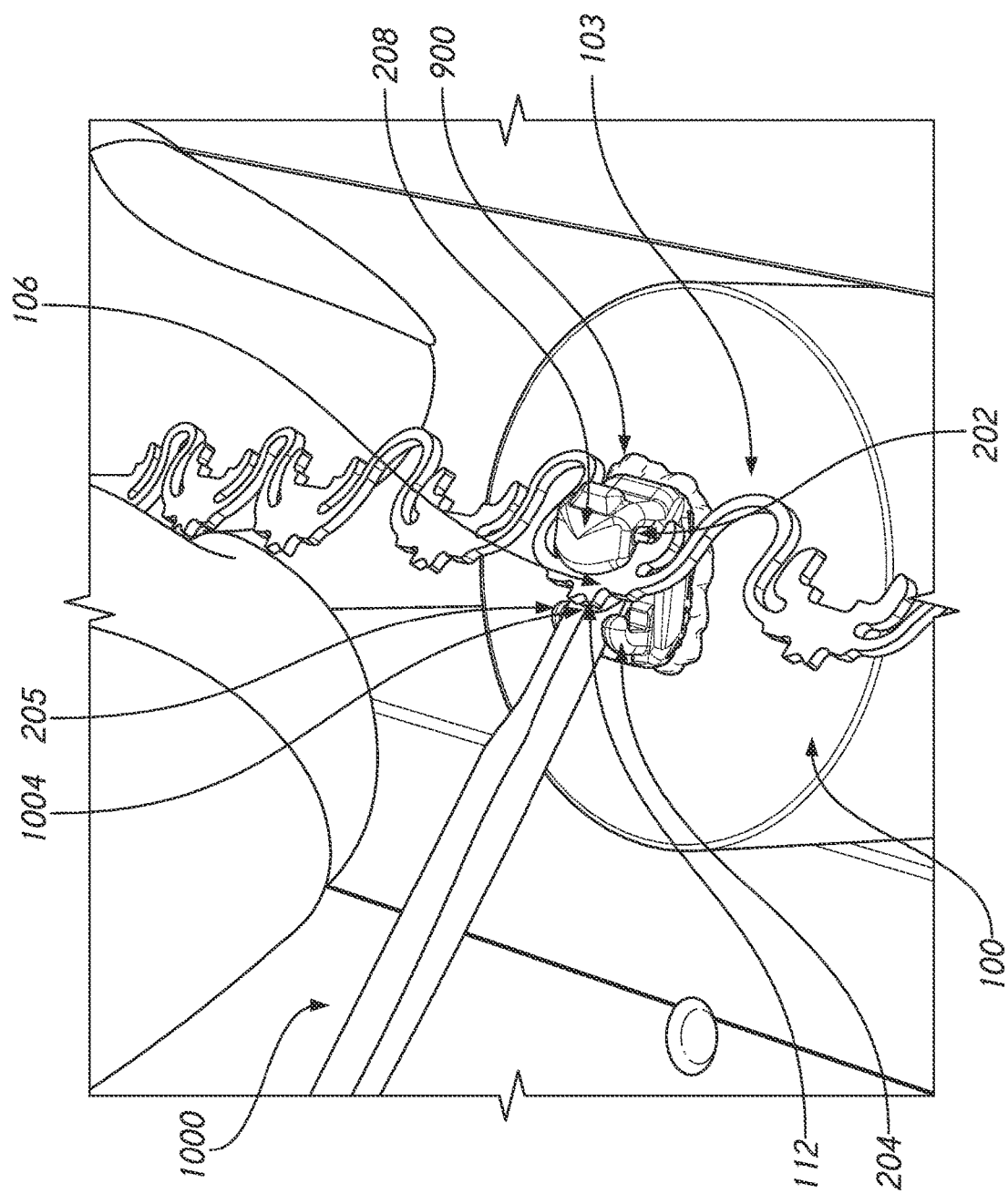
FIG. 23G illustrates the male connector rotated out of the slot of the bracket.

To decouple the male connector 106 from the bracket 900 with the tool 1000, the tool 1000 can be reoriented such that the angled surface 1002 is facing away from the bracket 900, as illustrated in FIGS. 23E and 23F. The tool 1000 can be positioned such that the curved portion 1004 contacts the groove 112 and the angled surface is positioned behind the tab 380 of the male connector 106, as illustrated in FIG. 23F. The clinician manipulating the tool 1000 can apply a force, by way of the tool 1000, to the male connector 106 such that the male connector 106 moves in the direction of the C spring 256. The C spring 256 can be compressed and the male connector 106 moved from behind the extensions (e.g., overhangs) of the stops 204, 205 (e.g., disengage from the stops 204, 205). The clinician can apply a force to the male connector 106 with the tool 1000 away from the bracket 900, which can include applying a force via the angled surface 1002 against the male connector 106. This can rotate the male connector 106 away from the face 214 and out of the slot 202 of the bracket 900, as illustrated in FIG. 23G. In some variants, movement of the tool 1000 toward the C spring 256 can cause the male connector 106 to slide up the angled surface 1002 and rotate out of the slot 202. The removal of the male connector 106 from the locked configuration within the slot 202 of the bracket 900 can emit an audible sound (e.g., a clicking sound) that can indicate to a clinician that the male connector 106 has been removed. The hollow handle of the tool 1000 can amplify the audible sound. The male connector 106 can then be grasped by a tool, such as a hemostat, to remove the male connector 106 from within the slot 202.

A kit and/or system can include one or more components (e.g., bracket(s), archform(s), tray(s), tool(s), etc.) described herein. For example, in some variants, a kit and/or system can include a plurality of brackets (e.g., molar brackets, lower anterior brackets, bicuspid brackets, and/or upper central brackets), one or more archforms (e.g., an upper initial, lower initial, upper intermediate, lower intermediate, upper final, and/or lower final archform), a tool for handling and/or installing the brackets and/or archforms, a tray (e.g., indirect bonding tray) for positioning the plurality of brackets on teeth of the patient for bonding, and/or an adhesive (e.g., bonding agent) for attaching the plurality of brackets to the teeth of the patient. In some variants, the kit and/or system can include the components to install an orthodontic appliance (e.g., brackets and archform) in the mouth of the patient. The kit, in some variants, can include all the components for a treatment plan, which can at least include those components not readily found at an orthodontic clinic and/or components custom designed for the patient. The kit, in some variants, can include a plurality of archforms to be used in sequence according to a treatment plan to move the patient's teeth from maloccluded positions to planned positions.

The archforms, brackets, caps, and/or trays described herein can be made via 3D oral scans of a patient's mouth. For example, a 3D scan of the patient's mouth can be taken, enabling an archform, bracket, cap, and/or tray to be designed and manufactured. The archform can be designed to fit the patient's teeth in the shape of the patient's current malocclusion and move the patient's teeth to a second state. In some variants, one archform can change the configuration of the patient's teeth from a maloccluded state to a finished state. In some variants, multiple archforms are used in sequence to move the patient's teeth from a maloccluded stat to a finished state. The 3D scans described herein can be performed using a mobile device of a patient or clinician, such as a smartphone, or computer. In some variants, an application can be used to perform the 3D scans-providing the patient with instructions on how to perform the scan and when a scan is successful. The scan can be performed using the mobile device's built-in camera or via an attachment that operatively connects to the mobile device or computer. The data from the 3D scan can be used to design and manufacture an archform, bracket, cap, and/or tray. The data from the 3D scan can be uploaded into a data center (i.e., cloud) of the designer and/or manufacturer of archforms, brackets, caps, and/or trays to create a case for the patient.

The archforms described herein can be cut (e.g., laser, waterjet, etc.) from a sheet of material, such as a shape memory material (e.g., nitinol). The sheet of material can be flat. A 3D scan of a patient's mouth (e.g., teeth, archform) can be taken using one or more of the methods described herein. A virtual setup (e.g., 3D model) of the patient's teeth can be created. The teeth can be digitally reconfigured to a planned configuration. Digital brackets can be disposed on the teeth in the planned configuration. A fixture can be manufactured (e.g., 3D printed, machined, cast, etc.) based on the virtual setup of the teeth in the planned configuration. The fixture can include retention features (e.g., hooks, slots, etc.) disposed at positions corresponding to the positions of the digital brackets in the virtual setup. An archform can be deflected to be disposed on the fixture. For example, connectors (e.g., male connectors, male fasteners, etc.) of the archform can be disposed in the retention features of the fixture, deflecting the archform. The archform can be custom shaped via heat setting (e.g., exposure to heat) such that the deflected configuration of the archform is the default configuration of the archform. Orthodontic brackets, which can include at least those described herein, can be bonded to the teeth of the patient (e.g., at positions corresponding to the positions of the digital brackets in the virtual setup). The custom shaped archform can be deflected to be disposed in the orthodontic brackets. For example, the connectors of the custom shaped archform can be coupled to the orthodontic brackets as described herein. The deflected custom shaped archform can apply one or more forces to the teeth of the patient to move the one or more teeth toward the planned configuration as the custom shaped archform moves back toward the default configuration. As described herein, a treatment plan can incorporate multiple archforms with varying characteristics. For example, a treatment plan can involve sequentially installing multiple archforms in the mouth of the patient. The multiple archforms can increase in rigidity as a patient progresses through a treatment plan. In some variants, the archforms can be custom cut based on the scans of the patient's mouth, which can account for abnormalities such as missing teeth.

Figure 24:
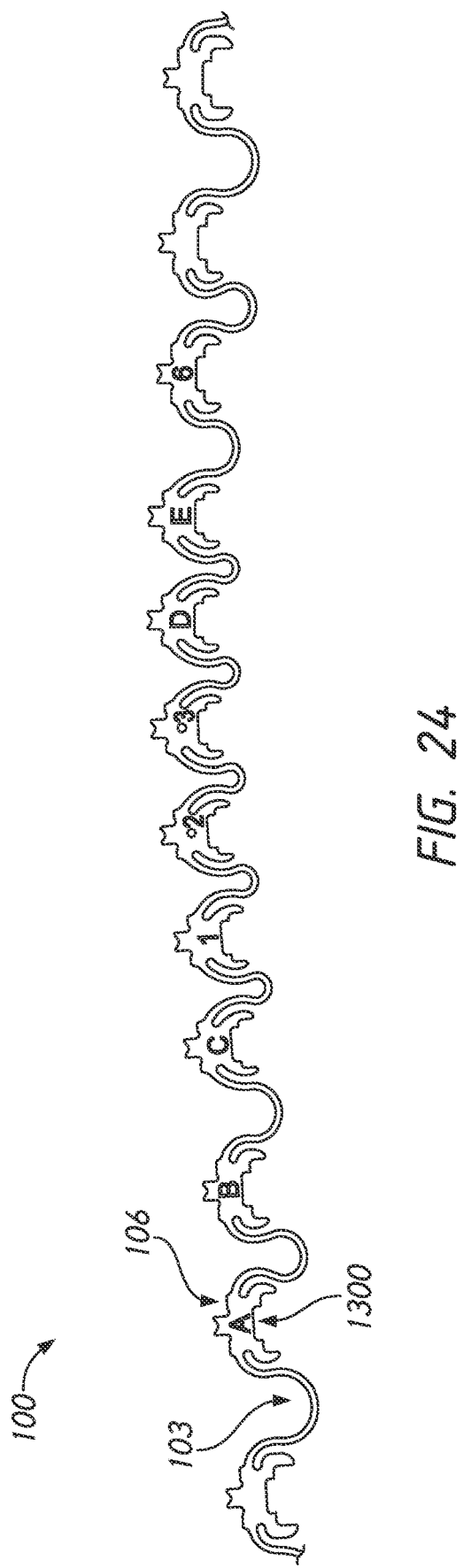
FIG. 24 illustrates an archform with indicia corresponding to a patient.

FIG. 24 illustrates an archform 100 with indicia 1300 corresponding to a patient. The indicia 1300 can include letters, numbers, signs, illustrations, marks, and/or other features that correspond to a patient. For example, the indicia 1300 can include a patient ID associated with a patient. The indicia 1300 can be used by systems and/or clinicians to ensure that the correct archform 100 is installed in a patient's mouth. The indicia 1300 can include other information, such as whether the archform is for installation on the upper or lower arch. The indicia 1300 can include computer readable features. The indicia 1300 can be disposed on one or more of the male connectors 106 (e.g., locking connectors). The indicia 1300 can be laser etched, laser engraved, formed into the archform 100, painted on the archform 100, and/or otherwise disposed on the archform 100.

It is intended that the scope of this present invention herein disclosed should not be limited by the particular disclosed embodiments described above. This invention is susceptible to various modifications and alternative forms, and specific examples have been shown in the drawings and are herein described in detail. This invention is not limited to the detailed forms or methods disclosed, but rather covers all equivalents, modifications, and alternatives falling within the scope and spirit of the various embodiments described and the appended claims. Various features of the orthodontic brackets and archforms described herein can be combined to form further embodiments, which are part of this disclosure. The orthodontic brackets described herein can be bonded to a patient's teeth and the archforms described herein can be deflected and coupled thereto as part of a treatment plan. The archforms can move toward a default position and move the patient's teeth from a first position to a second position. The archforms described herein can be installed in sequence to move the patient's teeth. The orthodontic brackets described herein can be bonded to the teeth of the patient in various orientations, which can include orienting the orthodontic bracket in a first gingival-occlusal orientation and reorienting the orthodontic bracket one hundred and eighty degrees to a second gingival-occlusal orientation (e.g., rotating the orthodontic bracket one hundred and eighty degrees).

Methods of using the orthodontic brackets and/or archforms (including device(s), apparatus(es), assembly(es), structure(s) or the like) are included herein; the methods of use can include using or assembling any one or more of the features disclosed herein to achieve functions and/or features of the system(s) as discussed in this disclosure. Methods of manufacturing the foregoing system(s) are included; the methods of manufacture can include providing, making, connecting, assembling, and/or installing any one or more of the features of the system(s) disclosed herein to achieve functions and/or features of the system(s) as discussed in this disclosure.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "tying a tie onto an orthodontic bracket" includes "instructing the tying of a tie onto an orthodontic bracket." The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. An orthodontic appliance comprising:
   a plurality of orthodontic brackets, wherein each orthodontic bracket of the plurality of orthodontic brackets is configured to be disposed on a tooth of a patient, each orthodontic bracket comprising:
      a slot;
      a stop disposed on an occlusal side of the slot; and
      a retainer disposed on a gingival side of the slot, the retainer comprising a spring;
   an archform configured to move teeth of the patient from a first configuration to a second configuration, the archform comprising:
      a plurality of connectors, wherein each connector of the plurality of connectors is configured to be placed within the slot between the stop and the retainer of one orthodontic bracket of the plurality of orthodontic brackets such that the spring applies a force against the connector to push the connector against the stop, securing at least a portion of the connector behind the stop and the retainer in a locked configuration; and
      a plurality of interproximal structures, wherein at least one interproximal structure of the plurality of interproximal structures is positioned between at least some adjacent connectors of the plurality of connectors;
   wherein the plurality of connectors do not slide in a mesial-distal direction relative to the plurality of orthodontic brackets with the plurality of connectors in locked configurations within the slots of the plurality of orthodontic brackets; and
   wherein the plurality of interproximal structures are configured to apply a force to adjacent connectors of the plurality of connectors to move one or more teeth of the patient.

2. The orthodontic appliance of claim 1, wherein the spring is a C spring.

3. The orthodontic appliance of claim 1, wherein the spring is disposed within an opening of the retainer.

4. The orthodontic appliance of claim 1, wherein each orthodontic bracket of the plurality of orthodontic brackets comprises two stops disposed on the occlusal side of the orthodontic bracket, the two stops being separated by a gap.

5. The orthodontic appliance of claim 4, wherein the gap is configured to receive a tab of one connector of the plurality of connectors.

6. The orthodontic appliance of claim 1, wherein each orthodontic bracket of the plurality of orthodontic brackets comprises a protrusion disposed on a face thereof, the protrusion configured to push the connector received within the slot against an overhang of the retainer.

7. The orthodontic appliance of claim 1, wherein each orthodontic bracket of the plurality of orthodontic brackets comprises a ramp disposed on a face thereof, the ramp configured to push the connector received within the slot against an overhang of the stop.

8. The orthodontic appliance of claim 1, wherein each orthodontic bracket of the plurality of orthodontic brackets comprises a textured surface configured to bond to a surface of one tooth of the teeth of the patient.

9. The orthodontic appliance of claim 1, wherein at least one orthodontic bracket of the plurality of orthodontic brackets comprises lateral wings extending in the mesial-distal direction, the lateral wings configured to bond to a surface of one tooth of the teeth of the patient to facilitate rotational control.

10. The orthodontic appliance of claim 1, wherein at least one connector of the plurality of connectors comprises a pair of arms configured to respectively grip a mesial side and a distal side of the retainer.

11. The orthodontic appliance of claim 1, wherein each orthodontic bracket of the plurality of orthodontic brackets comprises two stops disposed on the occlusal side of the orthodontic bracket, the two stops being separated by a gap, and where each connector of the plurality of connectors comprises a tab configured to be placed within the gap.

12. The orthodontic appliance of claim 11, wherein the tab comprises a groove configured to contact a tool to facilitate insertion and/or removal of the plurality of connectors from the slots of the plurality of orthodontic brackets.

13. The orthodontic appliance of claim 1, wherein a rigidity of the plurality of interproximal structures is greater at distal ends of the archform compared to a central portion.

14. The orthodontic appliance of claim 1, wherein the plurality of interproximal structures comprise interproximal loops.

15. The orthodontic appliance of claim 1, wherein the archform is formed from a sheet of material.

16. The orthodontic appliance of claim 1, wherein opposing sides of the archform are parallel to each other.

17. The orthodontic appliance of claim 1, wherein the plurality of orthodontic brackets are configured to be disposed on lingual surfaces of the teeth of the patient.

18. The orthodontic appliance of claim 1, wherein the spring is configured to exert the force on the connector in an occlusal direction.

19. The orthodontic appliance of claim 1, wherein the at least one interproximal structure comprises a loop that is open in an occlusal direction to permit flossing between adjacent teeth.

20. The orthodontic appliance of claim 1, wherein the archform comprises a custom memorized shape that corresponds to the second configuration of the teeth of the patient.

* * * * *